(12) United States Patent
Miyazaki et al.

(10) Patent No.: US 8,189,074 B2
(45) Date of Patent: *May 29, 2012

(54) ZOOM LENS SYSTEM, INTERCHANGEABLE LENS APPARATUS AND CAMERA SYSTEM

(75) Inventors: Kyoichi Miyazaki, Osaka (JP); Katsu Yamada, Osaka (JP); Takuya Imaoka, Kanagawa (JP); Masaki Sampei, Hyogo (JP); Yoshio Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 486 days.

This patent is subject to a terminal disclaimer.

(21) Appl. No.: 12/416,452

(22) Filed: Apr. 1, 2009

(65) Prior Publication Data
US 2010/0091172 A1    Apr. 15, 2010

(30) Foreign Application Priority Data
Apr. 2, 2008    (JP) ................. 2008-096380

(51) Int. Cl.
    *G02B 15/12*    (2006.01)
(52) U.S. Cl. ............... 348/240.3; 348/345; 359/684
(58) Field of Classification Search ............ 348/240.99, 348/240.3, 347; 359/362, 364–366, 676, 359/683, 684, 739–740; 396/72, 76, 85
    See application file for complete search history.

(56) References Cited

U.S. PATENT DOCUMENTS

| | | | |
|---|---|---|---|
| 6,545,824 B2 * | 4/2003 | Sensui | 359/749 |
| 6,882,369 B1 | 4/2005 | Ito | |
| 7,126,759 B2 * | 10/2006 | Sensui | 359/680 |
| 7,843,651 B2 * | 11/2010 | Kanazashi | 359/750 |
| 2005/0219708 A1 | 10/2005 | Shibayama et al. | |
| 2005/0275949 A1 | 12/2005 | Fujimoto et al. | |
| 2006/0215279 A1 | 9/2006 | Shibayama | |
| 2006/0268427 A1 * | 11/2006 | Mihara | 359/686 |
| 2007/0297067 A1 | 12/2007 | Muramatsu et al. | |

FOREIGN PATENT DOCUMENTS

| | | |
|---|---|---|
| JP | 2000-111789 A | 4/2000 |
| JP | 2000-333064 A | 11/2000 |
| JP | 2005-284097 A | 10/2005 |
| JP | 2005-316396 A | 11/2005 |
| JP | 2005-352057 A | 12/2005 |
| JP | 2006-221092 A | 8/2006 |
| JP | 2006-267425 A | 10/2006 |
| JP | 2007-219315 A | 8/2007 |
| JP | 2008-003195 A | 1/2008 |
| JP | 2008-015251 A | 1/2008 |

* cited by examiner

*Primary Examiner* — Clayton E LaBalle
*Assistant Examiner* — Leon W Rhodes, Jr.
(74) *Attorney, Agent, or Firm* — Pearne & Gordon LLP

(57) ABSTRACT

A zoom lens system is provided that includes a compactly constructed focusing lens unit and that has a suppressed change in the image magnification at the time of movement of a focusing lens unit. The zoom lens system according to the present invention comprises a plurality of lens units and an aperture diaphragm arranged in the lens unit. The plurality of lens units include: a negative lens unit that is arranged on an object side relative to the aperture diaphragm and provided with negative optical power having an absolute value greatest in the entire system and that moves in a direction along an optical axis at the time of zooming; and a focusing lens unit that is arranged in an optical path between the negative lens unit and the aperture diaphragm and that moves in a direction along the optical axis at the time of focusing such that an interval relative to the negative lens unit should vary.

9 Claims, 95 Drawing Sheets

ZOOM LENS SYSTEM, INTERCHANGEABLE LENS APPARATUS AND CAMERA SYSTEM

BACKGROUND OF THE INVENTION

1. Field of the Invention

The present invention relates to a zoom lens system and, in particular, to a zoom lens system suitable for an imaging lens system employed in an interchangeable lens apparatus in a so-called interchangeable-lens type digital camera system (simply referred to as a "camera system", in some cases hereinafter). Further, the present invention relates to an interchangeable lens apparatus and a camera system that employ this zoom lens system.

2. Description of the Background Art

In recent years, interchangeable-lens type digital camera systems are spreading rapidly. Such an interchangeable-lens type digital camera system has: a camera body employing an image sensor composed of a CCD (Charge Coupled Device), a CMOS (Complementary Metal-Oxide Semiconductor) or the like; and an interchangeable lens apparatus employing an imaging lens system for forming an optical image on the light receiving plane of the image sensor. Zoom lens systems applicable to such a camera system are disclosed in Japanese Laid-Open Patent Publication Nos. 2005-284097, 2005-352057, 2006-221092, 2005-316396, 2006-267425, 2007-219315, 2008-3195 and 2008-15251.

On the other hand, camera systems are known that have the function (referred to as a "live view function", hereinafter) of displaying image data acquired by a shooting lens system and an image sensor onto a display apparatus such as a liquid crystal display in the camera body (e.g., Japanese Laid-Open Patent Publication Nos. 2000-111789 and 2000-333064).

In the camera systems described in Japanese Laid-Open Patent Publication Nos. 2000-111789 and 2000-333064, focusing operation is performed by a contrast AF method when the live view function is active. The contrast AF indicates focusing operation performed on the basis of a contrast value of image data outputted from the image sensor. The operation of contrast AF is described below.

First, a camera system oscillates a focusing lens unit in optical axis directions at a high speed (referred to as "wobbling", hereinafter) so as to detect the direction of deviation from an in-focus condition. After the wobbling, the camera system detects a signal component in a particular frequency band of the image region from the output signal of the image sensor, and then calculates the optimal position for the focusing lens unit that realizes an in-focus condition. After that, the camera system moves the focusing lens unit to the optimal position, so that the focusing operation is completed. When focusing operation is to be performed continuously in the case of shooting a video or the like, the camera system repeats this series of operation.

In general, for the purpose of avoiding uneasiness that could be caused by flicker and the like, displaying of a video is performed at a high speed approximately of 30 frames per second or the like. Thus, basically, video image taking in the interchangeable-lens type digital camera system need also be performed at 30 frames per second. Accordingly, the focusing lens unit need be driven at a high speed of 30 Hz at the time of wobbling.

Nevertheless, when the focusing lens unit is heavier, a motor or an actuator of larger size is necessary for moving the focusing lens unit at a high speed. This causes a problem that the lens barrel has an excessively large outer diameter. Then, in each of the zoom lens systems described in the above-mentioned patent documents, the focusing lens unit is hardly of light weight.

Further, it should be noted that in interchangeable-lens type digital camera systems, the size of the image corresponding to a photographic object varies in association with wobbling. The variation in the size of the image is caused mainly by the fact that the movement of the focusing lens unit in the optical axis directions generates a change in the focal length of the entire lens system. Then, when a large change in the image taking magnification is generated in association with wobbling, the person who takes an image feels uneasiness.

SUMMARY OF THE INVENTION

An object of the present invention is to provide: a zoom lens system that includes a compactly constructed focusing lens unit and that has a suppressed change in the image magnification at the time of movement of a focusing lens unit; and an interchangeable lens apparatus and a camera system that employ this zoom lens system.

The zoom lens system according to the present invention comprises a plurality of lens units and an aperture diaphragm arranged in the lens unit. Then, the plurality of lens units include: a negative lens unit that is arranged on an object side relative to the aperture diaphragm and provided with negative optical power having an absolute value greatest in the entire system and that moves in a direction along an optical axis at the time of zooming; and a focusing lens unit that is arranged in an optical path between the negative lens unit and the aperture diaphragm and that moves in a direction along the optical axis at the time of focusing such that an interval relative to the negative lens unit should vary.

The interchangeable lens apparatus according to the present invention comprises: a zoom lens system described above; and a camera mount section connected to a camera body provided with an image sensor for receiving an optical image formed by the zoom lens system and then converting the optical image into an electric image signal.

The camera system according to the present invention comprises: an interchangeable lens apparatus that includes the zoom lens system described above; and a camera body that is connected to the interchangeable lens apparatus via a camera mount section in an attachable and detachable manner and that includes an image sensor for receiving an optical image formed by the zoom lens system and then converting the optical image into an electric image signal.

According to the present invention, a zoom lens system that includes a compactly constructed focusing lens unit and that has a suppressed change in the image magnification at the time of movement of a focusing lens unit, an interchangeable lens apparatus and a camera system that employ this zoom lens system can be provided.

These and other objects, features, aspects and effects of the present invention will become clearer on the basis of the following detailed description with reference to the accompanying drawings.

DESCRIPTION OF THE PREFERRED EMBODIMENTS

Figure 1:
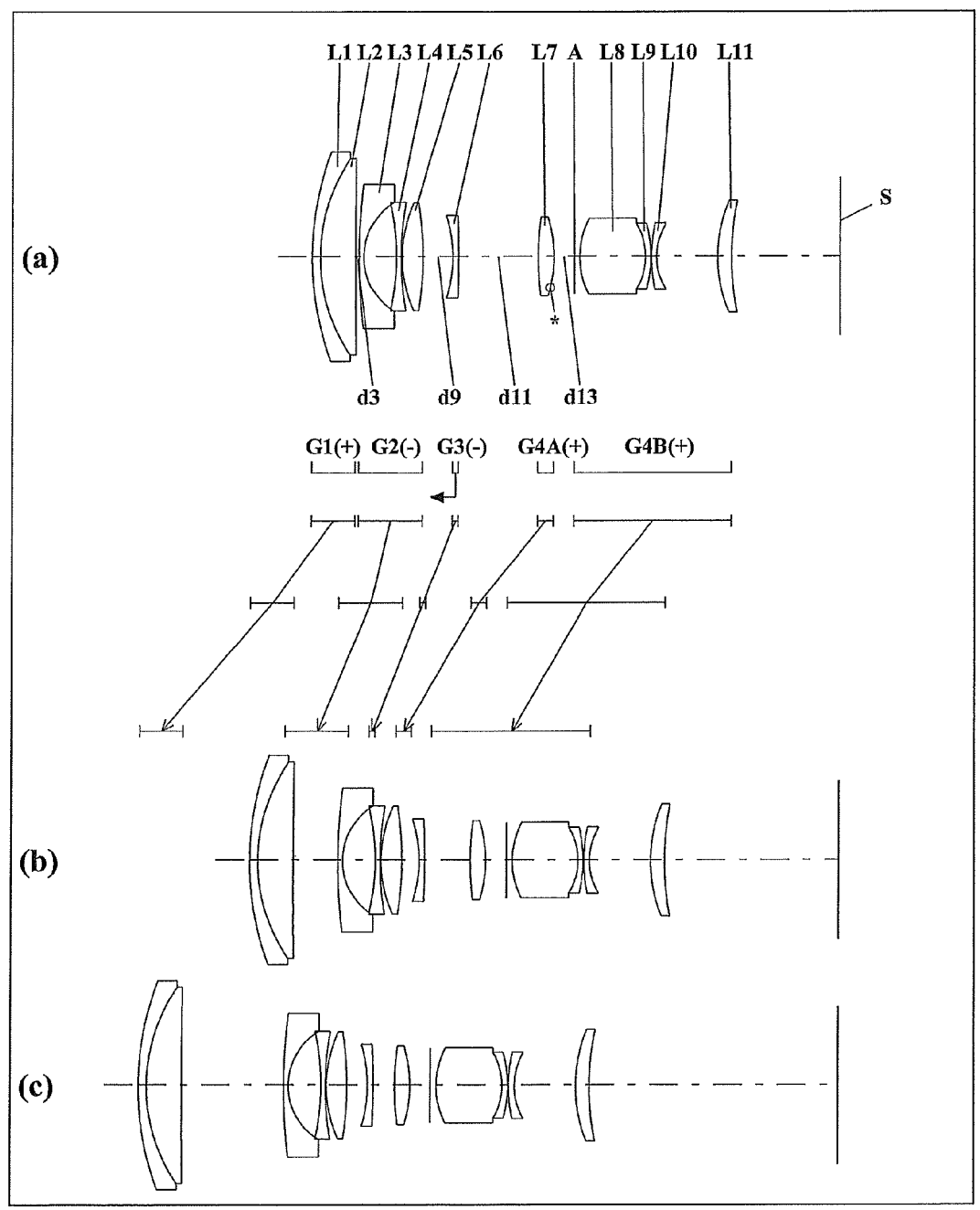
FIG. 1 is a lens arrangement diagram showing an infinity in-focus condition of a zoom lens system according to Embodiment 1 (Example 1)
Figure 2:
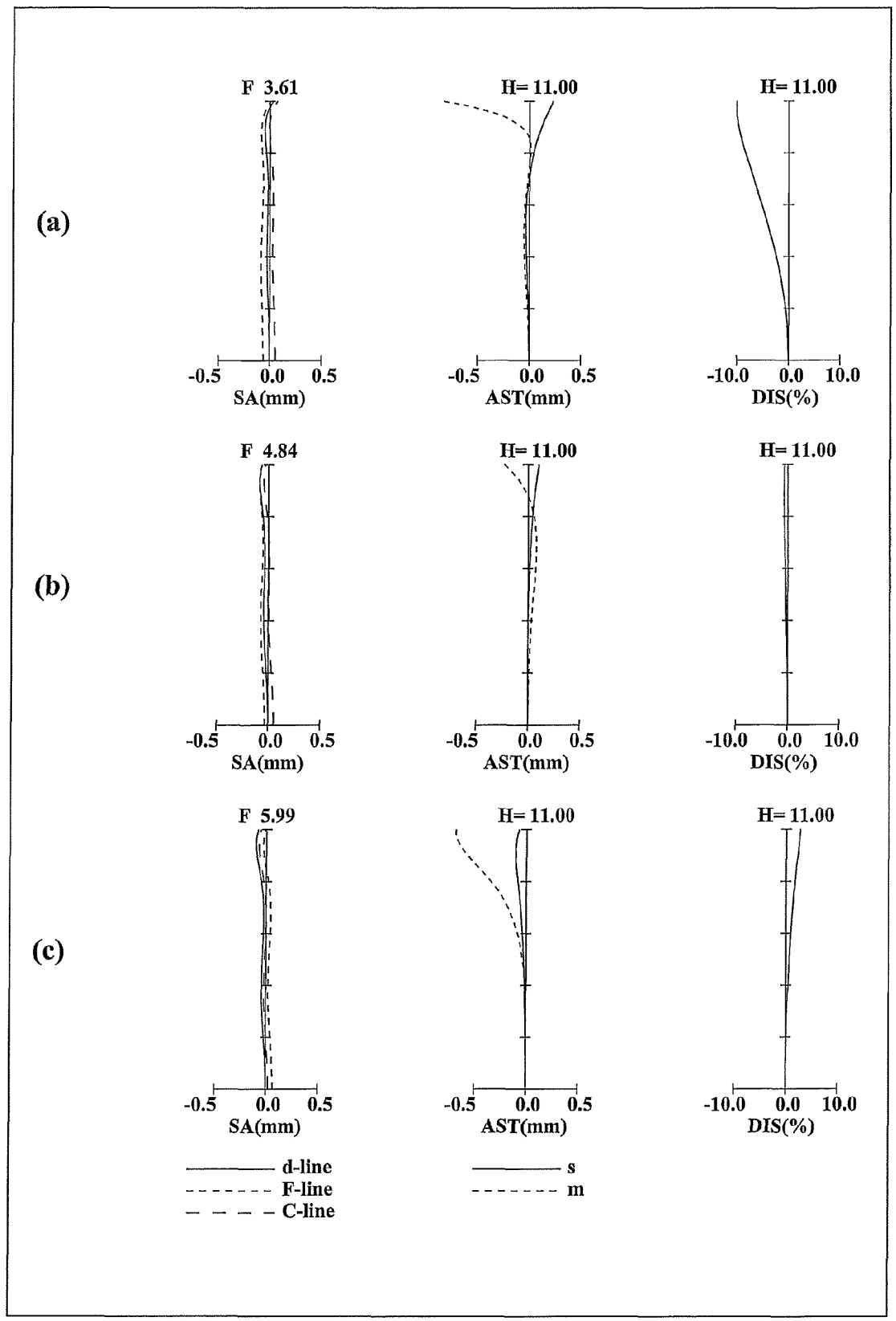
FIG. 2 is a longitudinal aberration diagram showing an infinity in-focus condition of a zoom lens system according to Example 1.
Figure 3:
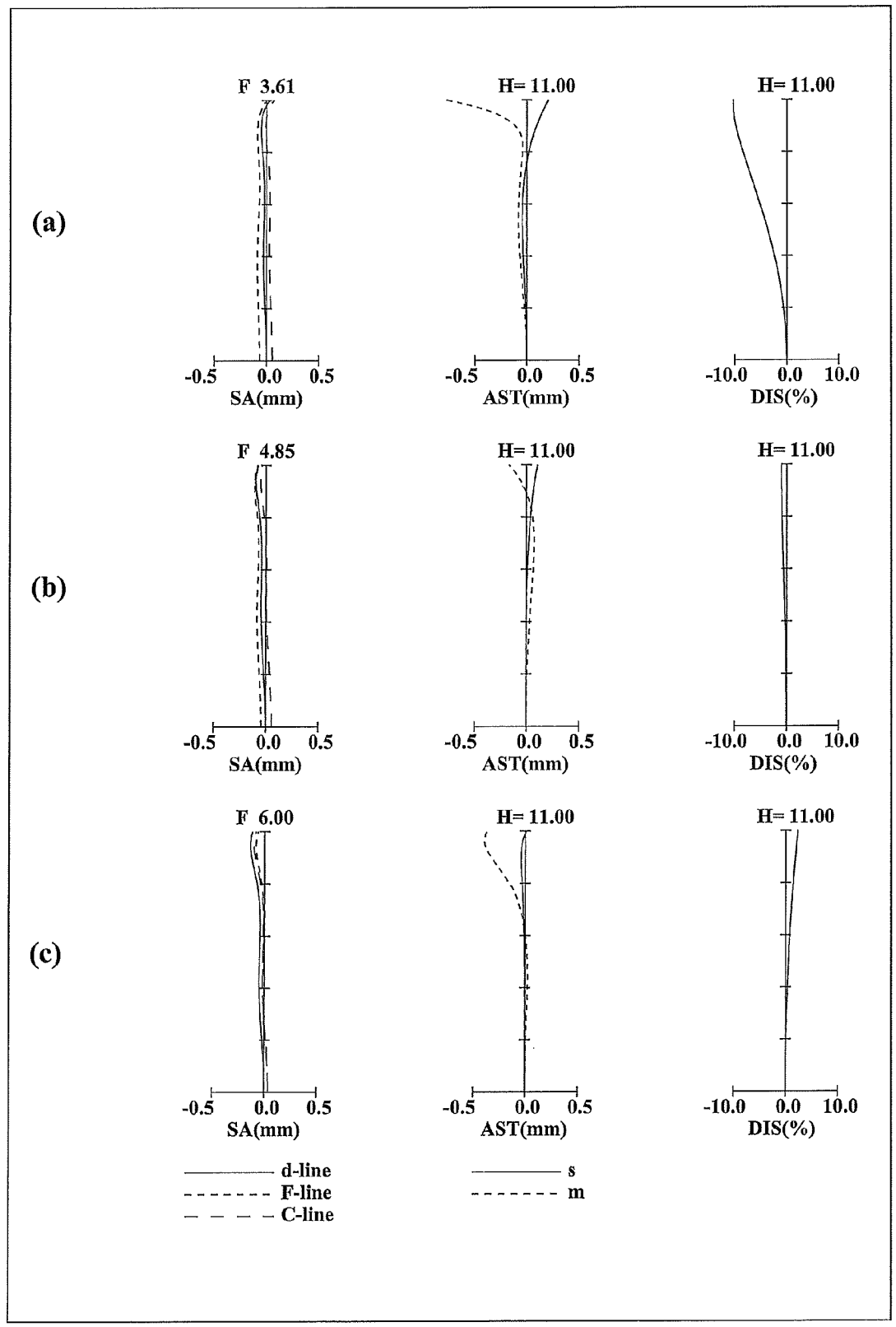
FIG. 3 is a longitudinal aberration diagram showing a close-point in-focus condition of a zoom lens system according to Example 1.
Figure 4:
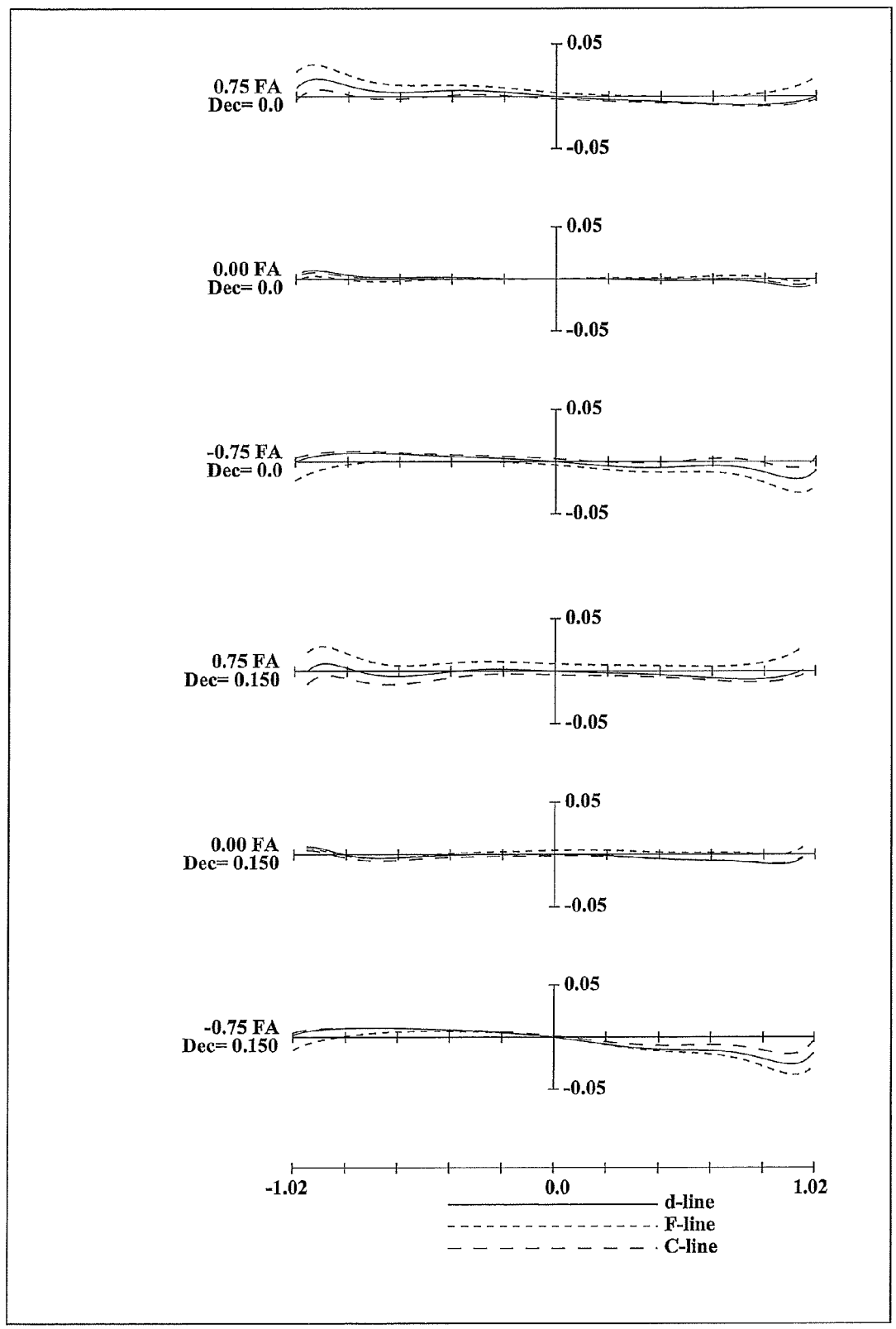
FIG. 4 is a lateral aberration diagram in a basic state where image blur compensation is not performed and in an image blur compensation state at a telephoto limit of a zoom lens system according to Example 1.

Each of FIGS. 1, 5, 9, 13, 17, 21, 25, 29, 33, 37, 41, 45, 49, 53, 57, 61, 65, 68, 71, 74, 77, 80, 83, 87 and 91 shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. In the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Further, in FIGS. 1, 5, 9, 13, 17, 21, 25, 29, 33, 37, 41, 45, 49, 53, 57, 61, 65, 68, 71, 74, 77, 80, 83, 87 and 91, an asterisk "*" imparted to a particular surface indicates that the surface is aspheric. In each Fig., symbol (+) or (−) imparted to the symbol of each lens unit corresponds to the sign of the optical power of the lens unit. Further, in each Fig., the straight line located on the most right-hand side indicates the position of the image surface S.

Embodiment 1

The zoom lens system according to Embodiment 1, in order from the object side to the image side, comprises a first lens unit G1 having positive optical power, a second lens unit G2 having negative optical power, a third lens unit G3 having negative optical power, a lens unit G4A having positive optical power, and a lens unit G4B having positive optical power. The lens units G4A and G4B constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other.

The second lens unit G2, in order from the object side to the image side, comprises: a negative meniscus third lens element L3 with the convex surface facing the object side; a bi-concave fourth lens element L4; and a bi-convex fifth lens element L5.

The third lens unit G3 is composed of a negative meniscus sixth lens element L6 with the convex surface facing the image side.

The lens unit G4A is composed of a bi-convex seventh lens element L7. The image side surface of the seventh lens element L7 is aspheric.

The lens unit G4B, in order from the object side to the image side, comprises: a bi-convex eighth lens element L8; a negative meniscus ninth lens element L9 with the convex surface facing the image side; a negative meniscus tenth lens element L10 with the convex surface facing the object side; and a positive meniscus eleventh lens element L11 with the convex surface facing the object side. The eighth lens element L8 and the ninth lens element L9 are cemented with each other.

In zooming from a wide-angle limit to a telephoto limit, the first lens unit G1 to the lens unit G4B individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the lens unit G4A should decrease. The aperture diaphragm A moves to the object side together with the lens unit G4B.

Further, at the time of focusing from an infinity in-focus condition to a close-point in-focus condition, the third lens unit G3 moves to the object side along the optical axis.

Further, for the purpose of compensation of image blur caused by vibration applied to the entire system, the third lens unit G3 moves in a direction perpendicular to the optical axis.

Embodiment 2

The zoom lens system according to Embodiment 2, in order from the object side to the image side, comprises a first lens unit G1 having positive optical power, a second lens unit G2 having negative optical power, a third lens unit G3 having negative optical power, a lens unit G4A having positive optical power, and a lens unit G4B having positive optical power. The lens units G4A and G4B constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a bi-concave fourth lens element L4; and a bi-convex fifth lens element L5.

The third lens unit G3 is composed of a negative meniscus sixth lens element L6 with the convex surface facing the image side.

The lens unit G4A is composed of a bi-convex seventh lens element L7. The image side surface of the seventh lens element L7 is aspheric.

The lens unit G4B, in order from the object side to the image side, comprises: a bi-convex eighth lens element L8; a bi-concave ninth lens element L9; a bi-convex tenth lens element L10; a negative meniscus eleventh lens element L11 with the convex surface facing the image side; and a positive meniscus twelfth lens element L12 with the convex surface facing the object side. The eighth lens element L8 and the ninth lens element L9 are cemented with each other with an adhesive layer in between.

In zooming from a wide-angle limit to a telephoto limit, the first lens unit G1 to the lens unit G4B individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the lens unit G4A should decrease. The aperture diaphragm A moves to the object side together with the lens unit G4B.

Further, at the time of focusing from an infinity in-focus condition to a close-point in-focus condition, the third lens unit G3 moves to the object side along the optical axis.

Further, for the purpose of compensation of image blur caused by vibration applied to the entire system, the third lens unit G3 moves in a direction perpendicular to the optical axis.

Embodiment 3

The zoom lens system according to Embodiment 3, in order from the object side to the image side, comprises a first lens unit G1 having positive optical power, a second lens unit G2 having negative optical power, a third lens unit G3 having negative optical power, a lens unit G4A having positive optical power, and a lens unit G4B having positive optical power. The lens units G4A and G4B constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a bi-concave fourth lens element L4; and a bi-convex fifth lens element L5.

The third lens unit G3 is composed of a negative meniscus sixth lens element L6 with the convex surface facing the image side.

The lens unit G4A is composed of a positive meniscus seventh lens element L7 with the convex surface facing the image side.

The lens unit G4B, in order from the object side to the image side, comprises: a bi-convex eighth lens element L8; a negative meniscus ninth lens element L9 with the convex surface facing the image side; a bi-convex tenth lens element L10; a bi-concave eleventh lens element L11; and a bi-convex twelfth lens element L12. The eighth lens element L8 and the ninth lens element L9 are cemented with each other with an adhesive layer in between. The object side surface of the tenth lens element L10 is aspheric.

In zooming from a wide-angle limit to a telephoto limit, the first lens unit G1 to the lens unit G4B individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the lens unit G4A should decrease. The aperture diaphragm A moves to the object side together with the lens unit G4B.

Further, at the time of focusing from an infinity in-focus condition to a close-point in-focus condition, the third lens unit G3 moves to the object side along the optical axis.

Further, for the purpose of compensation of image blur caused by vibration applied to the entire system, the third lens unit G3 moves in a direction perpendicular to the optical axis.

Embodiment 4

The zoom lens system according to Embodiment 4, in order from the object side to the image side, comprises a first lens unit G1 having positive optical power, a second lens unit G2 having negative optical power, a third lens unit G3 having negative optical power, a lens unit G4A having positive optical power, and a lens unit G4B having positive optical power. The lens units G4A and G4B constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a bi-concave fourth lens element L4; and a bi-convex fifth lens element L5.

The third lens unit G3 is composed of a negative meniscus sixth lens element L6 with the convex surface facing the image side.

The lens unit G4A is composed of a positive meniscus seventh lens element L7 with the convex surface facing the image side.

The lens unit G4B, in order from the object side to the image side, comprises: a bi-convex eighth lens element L8; a negative meniscus ninth lens element L9 with the convex surface facing the image side; a bi-convex tenth lens element L10; a bi-concave eleventh lens element L11; and a bi-convex twelfth lens element L12. The eighth lens element L8 and the ninth lens element L9 are cemented with each other with an adhesive layer in between. The tenth lens element L10 and the eleventh lens element L11 are also cemented with each other with an adhesive layer in between. The object side surface of the tenth lens element L10 is aspheric.

In zooming from a wide-angle limit to a telephoto limit, the first lens unit G1 to the lens unit G4B individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the lens unit G4A should decrease. The aperture diaphragm A moves to the object side together with the lens unit G4B.

Further, at the time of focusing from an infinity in-focus condition to a close-point in-focus condition, the third lens unit G3 moves to the object side along the optical axis.

Further, for the purpose of compensation of image blur caused by vibration applied to the entire system, the lens unit G4A moves in a direction perpendicular to the optical axis.

Embodiment 5

The zoom lens system according to Embodiment 5, in order from the object side to the image side, comprises a first lens unit G1 having positive optical power, a second lens unit G2 having negative optical power, a third lens unit G3 having negative optical power, a lens unit G4A having positive optical power, and a lens unit G4B having positive optical power. The lens units G4A and G4B constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a bi-concave fourth lens element L4; and a bi-convex fifth lens element L5.

The third lens unit G3 is composed of a negative meniscus sixth lens element L6 with the convex surface facing the image side.

The lens unit G4A is composed of a positive meniscus seventh lens element L7 with the convex surface facing the image side.

The lens unit G4B, in order from the object side to the image side, comprises: a bi-convex eighth lens element L8; a bi-concave ninth lens element L9; a bi-convex tenth lens element L10; a negative meniscus eleventh lens element L11 with the convex surface facing the image side; and a bi-convex twelfth lens element L12. The eighth lens element L8 and the ninth lens element L9 are cemented with each other with an adhesive layer in between. The tenth lens element L10 and the eleventh lens element L11 are also cemented with each other with an adhesive layer in between. The object side surface of the tenth lens element L10 is aspheric.

In zooming from a wide-angle limit to a telephoto limit, the first lens unit G1 to the lens unit G4B individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the lens unit G4A should decrease. The aperture diaphragm A moves to the object side together with the lens unit G4B.

Further, at the time of focusing from an infinity in-focus condition to a close-point in-focus condition, the third lens unit G3 moves to the object side along the optical axis.

Further, for the purpose of compensation of image blur caused by vibration applied to the entire system, the lens unit G4A moves in a direction perpendicular to the optical axis.

Embodiment 6

Further, the zoom lens system according to Embodiment 6, in order from the object side to the image side, comprises: a first lens unit G1 having positive optical power; a second lens unit G2 having negative optical power; a third lens unit G3 having negative optical power; and a fourth lens unit G4 having positive optical power.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a bi-concave fourth lens element L4; and a bi-convex fifth lens element L5. The image side surface of the fourth lens element L4 is aspheric.

The third lens unit G3 is composed of a bi-concave sixth lens element L6.

The fourth lens unit G4, in order from the object side to the image side, comprises a bi-convex seventh lens element L7, a bi-convex eighth lens element L8, a bi-concave ninth lens element L9, a bi-convex tenth lens element L10, a bi-concave eleventh lens element L11, and a bi-convex twelfth lens element L12. The eighth lens element L8 and the ninth lens element L9 are cemented with each other with an adhesive layer in between. The tenth lens element L10 and the eleventh lens element L11 are also cemented with each other with an adhesive layer in between. The object side surface of the tenth lens element L10 is aspheric.

In zooming from a wide-angle limit to a telephoto limit, the first lens unit G1 to the fourth lens unit G4 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the fourth lens unit G4 should decrease. The aperture diaphragm A moves to the object side together with the fourth lens unit G4.

Further, at the time of focusing from an infinity in-focus condition to a close-point in-focus condition, the third lens unit G3 moves to the object side along the optical axis.

Further, for the purpose of compensation of image blur caused by vibration applied to the entire system, the third lens unit G3 moves in a direction perpendicular to the optical axis.

Embodiment 7

The zoom lens system according to Embodiment 7, in order from the object side to the image side, comprises a first lens unit G1 having positive optical power, a second lens unit G2 having negative optical power, a third lens unit G3 having negative optical power, a fourth lens unit G4 having positive optical power, a lens unit G5A having positive optical power, and a lens unit G5B having negative optical power. The lens units G5A and G5B constitute a fifth lens unit G5.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

The third lens unit G3, in order from the object side to the image side, comprises: a bi-concave seventh lens element L7; and a positive meniscus eighth lens element L8 with the convex surface facing the object side.

The fourth lens unit G4, in order from the object side to the image side, comprises: a bi-convex ninth lens element L9; a positive meniscus tenth lens element L10 with the convex surface facing the object side; and a negative meniscus eleventh lens element L11 with the convex surface facing the object side. The object side surface of the tenth lens element L10 is aspheric.

The lens unit G5A, in order from the object side to the image side, comprises: a negative meniscus twelfth lens element L12 with the convex surface facing the object side; and a bi-convex thirteenth lens element L13. The twelfth lens element L12 and the thirteenth lens element L13 are cemented with each other. The image side surface of the thirteenth lens element L13 is aspheric.

The lens unit G5B, in order from the object side to the image side, comprises: a bi-concave fourteenth lens element L14; a bi-convex fifteenth lens element L15; and a negative meniscus sixteenth lens element L16 with the convex surface facing the image side. The object side surface of the fifteenth lens element L15 is aspheric.

In zooming from a wide-angle limit to a telephoto limit, the first lens unit G1 to the lens unit G5B individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, the interval between the third lens unit G3 and the fourth lens unit G4 should decrease, and the interval between the fourth lens unit G4 and the lens unit G5A should decrease. The aperture diaphragm A moves to the object side together with the fourth lens unit G4.

Further, at the time of focusing from an infinity in-focus condition to a close-point in-focus condition, the third lens unit G3 moves to the object side along the optical axis.

Further, for the purpose of compensation of image blur caused by vibration applied to the entire system, the lens unit G5A moves in a direction perpendicular to the optical axis.

Embodiment 8

The zoom lens system according to Embodiment 8, in order from the object side to the image side, comprises a first lens unit G1 having positive optical power, a second lens unit G2 having negative optical power, a third lens unit G3 having negative optical power, a lens unit G4A having positive optical power, a lens unit G4B having negative optical power, and a fifth lens unit G5 having positive optical power. The lens units G4A and G4B constitute a fourth lens unit G4.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a bi-convex sixth lens element L6.

The third lens unit G3 is composed of a negative meniscus seventh lens element L7 with the convex surface facing the image side.

The lens unit G4A, in order from the object side to the image side, comprises a bi-convex eighth lens element L8, a bi-convex ninth lens element L9, a bi-concave tenth lens element L10 and a bi-convex eleventh lens element L11. The ninth lens element L9 and the tenth lens element L10 are cemented with each other with an adhesive layer in between. The image side surface of the eighth lens element L8 is aspheric.

The lens unit G4B, in order from the object side to the image side, comprises: a positive meniscus twelfth lens element L12 with the convex surface facing the image side; and a bi-concave thirteenth lens element L13. The twelfth lens element L12 and the thirteenth lens element L13 are cemented with each other.

The fifth lens unit G5, in order from the object side to the image side, comprises: a positive meniscus fourteenth lens element L14 with the convex surface facing the image side; a negative meniscus fifteenth lens element L15 with the convex surface facing the image side; a bi-convex sixteenth lens element L16; and a negative meniscus seventeenth lens element L17 with the convex surface facing the image side. The sixteenth lens element L16 and the seventeenth lens element L17 are cemented with each other with an adhesive layer in between. The image side surface of the fourteenth lens element L14 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should increase, the interval between the third lens unit G3 and the lens unit G4A should decrease, and the interval between the lens unit G4B and the fifth lens unit G5 should increase. The aperture diaphragm A moves to the object side together with the lens unit G4A.

Further, at the time of focusing from an infinity in-focus condition to a close-point in-focus condition, the third lens unit G3 moves to the object side along the optical axis.

Further, for the purpose of compensation of image blur caused by vibration applied to the entire system, the lens unit G4B moves in a direction perpendicular to the optical axis.

Embodiment 9

The zoom lens system according to Embodiment 9, in order from the object side to the image side, comprises a first lens unit G1 having positive optical power, a second lens unit G2 having negative optical power, a third lens unit G3 having negative optical power, a lens unit G4A having positive optical power, a lens unit G4B having negative optical power, and a fifth lens unit G5 having positive optical power. The lens units G4A and G4B constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a negative meniscus fourth lens element L4 with the convex surface facing the object side; and a positive meniscus fifth lens element L5 with the convex surface facing the object side.

The third lens unit G3 is composed of a negative meniscus sixth lens element L6 with the convex surface facing the image side.

The lens unit G4A, in order from the object side to the image side, comprises: a bi-convex seventh lens element L7; and a negative meniscus eighth lens element L8 with the convex surface facing the image side. The seventh lens element L7 and the eighth lens element L8 are cemented with each other with an adhesive layer in between.

The lens unit G4B is composed of a negative meniscus ninth lens element L9 with the convex surface facing the image side.

The fifth lens unit G5, in order from the object side to the image side, comprises: a bi-convex tenth lens element L10; a bi-convex eleventh lens element L11; and a negative meniscus twelfth lens element L12 with the convex surface facing the object side. The object side surface of the tenth lens element L10 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should increase, the interval between the third lens unit G3 and the lens unit G4A should decrease, and the interval between the lens unit G4B and the fifth lens unit G5 should decrease. The aperture diaphragm A moves to the object side together with the lens unit G4A.

Further, at the time of focusing from an infinity in-focus condition to a close-point in-focus condition, the third lens unit G3 moves to the object side along the optical axis.

Further, for the purpose of compensation of image blur caused by vibration applied to the entire system, the lens unit G4B moves in a direction perpendicular to the optical axis.

Embodiment 10

The zoom lens system according to Embodiment 10, in order from the object side to the image side, comprises a first lens unit G1 having positive optical power, a second lens unit G2 having negative optical power, a third lens unit G3 having negative optical power, a lens unit G4A having positive optical power, a lens unit G4B having negative optical power, and a lens unit G4C having positive optical power. The lens units G4A to G4C constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a bi-concave fourth lens element L4; and a bi-convex fifth lens element L5.

The third lens unit G3 is composed of a negative meniscus sixth lens element L6 with the convex surface facing the image side.

The lens unit G4A, in order from the object side to the image side, comprises: a positive meniscus seventh lens element L7 with the convex surface facing the image side; a bi-convex eighth lens element L8; and a bi-concave ninth lens element L9. The eighth lens element L8 and the ninth lens element L9 are cemented with each other with an adhesive layer in between.

The lens unit G4B is composed of a negative meniscus tenth lens element L10 with the convex surface facing the object side.

The lens unit G4C comprises: a bi-convex eleventh lens element L11; and a negative meniscus twelfth lens element L12 with the convex surface facing the image side. The eleventh lens element L11 and the twelfth lens element L12 are cemented with each other with an adhesive layer in between. The object side surface of the eleventh lens element L11 is aspheric.

In zooming from a wide-angle limit to a telephoto limit, the first lens unit G1 to the lens unit G4C individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the lens unit G4A should decrease. The aperture diaphragm A moves to the object side together with the lens unit G4A.

Further, at the time of focusing from an infinity in-focus condition to a close-point in-focus condition, the third lens unit G3 moves to the object side along the optical axis.

Further, for the purpose of compensation of image blur caused by vibration applied to the entire system, the lens unit G4B moves in a direction perpendicular to the optical axis.

Embodiment 11

The zoom lens system according to Embodiment 11, in order from the object side to the image side, comprises a first lens unit G1 having positive optical power, a second lens unit G2 having negative optical power, a third lens unit G3 having negative optical power, a lens unit G4A having positive optical power, a lens unit G4B having negative optical power, and a lens unit G4C having positive optical power. The lens units G4A to G4C constitute a fourth lens unit G4.

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other with an adhesive layer in between.

The second lens unit G2, in order from the object side to the image side, comprises: a negative meniscus third lens element L3 with the convex surface facing the object side; a bi-concave fourth lens element L4; and a bi-convex fifth lens element L5.

The third lens unit G3 is composed of a negative meniscus sixth lens element L6 with the convex surface facing the image side.

The lens unit G4A, in order from the object side to the image side, comprises: a positive meniscus seventh lens element L7 with the convex surface facing the image side; a bi-convex eighth lens element L8; and a bi-concave ninth lens element L9. The eighth lens element L8 and the ninth lens element L9 are cemented with each other with an adhesive layer in between.

The lens unit G4B is composed of a negative meniscus tenth lens element L10 with the convex surface facing the object side.

The lens unit G4C, in order from the object side to the image side, comprises: a bi-convex eleventh lens element L11; and a negative meniscus twelfth lens element L12 with the convex surface facing the image side. The eleventh lens element L11 and the twelfth lens element L12 are cemented with each other with an adhesive layer in between. The object side surface of the eleventh lens element L11 is aspheric.

In zooming from a wide-angle limit to a telephoto limit, the first lens unit G1 to the lens unit G4C individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease and then increase, and the interval between the third lens unit G3 and the lens unit G4A should decrease. The aperture diaphragm A moves to the object side together with the lens unit G4A.

Further, at the time of focusing from an infinity in-focus condition to a close-point in-focus condition, the third lens unit G3 moves to the object side along the optical axis.

Further, for the purpose of compensation of image blur caused by vibration applied to the entire system, the lens unit G4B moves in a direction perpendicular to the optical axis.

Embodiment 12

The zoom lens system according to Embodiment 12, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. The object side surface of the fourth lens element L4 is aspheric.

The third lens unit G3, in order from the object side to the image side, comprises: a negative meniscus eighth lens element L8 with the convex surface facing the object side; and a bi-convex ninth lens element L9. The eighth lens element L8 and the ninth lens element L9 are cemented with each other. The image side surface of the ninth lens element L9 is aspheric.

The fourth lens unit G4, in order from the object side to the image side, comprises a bi-convex tenth lens element L10, a bi-convex eleventh lens element L11, and a bi-concave twelfth lens element L12. The eleventh lens element L11 and the twelfth lens element L12 are cemented with each other.

The fifth lens unit G5, in order from the object side to the image side, comprises: a bi-convex thirteenth lens element L13; a bi-concave fourteenth lens element L14; a bi-convex fifteenth lens element L15; and a negative meniscus sixteenth lens element L16 with the convex surface facing the image side. The fifteenth lens element L15 and the sixteenth lens element L16 are cemented with each other. The object side surface of the fourteenth lens element L14 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Further, for the purpose of compensation of image blur caused by vibration applied to the entire system, the fourth lens unit G4 moves in a direction perpendicular to the optical axis.

Embodiment 13

The zoom lens system according to Embodiment 13, in order from the object side to the image side, comprises a first lens unit G1 having positive optical power, a second lens unit G2 having negative optical power, a third lens unit G3 having positive optical power, a lens unit G4A having negative optical power, a lens unit G4B having negative optical power, and a fifth lens unit G5 having positive optical power. The lens units G4A and G4B constitute a fourth lens unit G4.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The lens unit G4A, in order from the object side to the image side, comprises a bi-convex ninth lens element L9 and a bi-concave tenth lens element L10. The ninth lens element L9 and the tenth lens element L10 are cemented with each other with an adhesive layer in between.

The lens unit G4B is composed of a bi-concave eleventh lens element L11.

The fifth lens unit G5, in order from the object side to the image side, comprises: a bi-convex twelfth lens element L12; a positive meniscus thirteenth lens element L13 with the convex surface facing the image side; a negative meniscus fourteenth lens element L14 with the convex surface facing the image side; and a bi-convex fifteenth lens element L15. The thirteenth lens element L13 and the fourteenth lens element L14 are cemented with each other with an adhesive layer in between. The two surfaces of the twelfth lens element L12 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the lens unit G4A should increase, and the interval between the lens unit G4B and the fifth lens unit G5 should decrease. The aperture diaphragm A moves to the object side together with the lens unit G4A.

Further, at the time of focusing from an infinity in-focus condition to a close-point in-focus condition, the third lens unit G3 moves to the image side along the optical axis.

Further, for the purpose of compensation of image blur caused by vibration applied to the entire system, the lens unit G4B moves in a direction perpendicular to the optical axis.

Embodiment 14

The zoom lens system according to Embodiment 14, in order from the object side to the image side, comprises a first lens unit G1 having positive optical power, a second lens unit G2 having negative optical power, a third lens unit G3 having positive optical power, a lens unit G4A having negative optical power, a lens unit G4B having negative optical power, and a fifth lens unit G5 having positive optical power. The lens units G4A and G4B constitute a fourth lens unit G4.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The lens unit G4A, in order from the object side to the image side, comprises: a positive meniscus ninth lens element L9 with the convex surface facing the object side; and a negative meniscus tenth lens element L10 with the convex surface facing the object side. The ninth lens element L9 and the tenth lens element L10 are cemented with each other with an adhesive layer in between.

The lens unit G4B is composed of a planer-concave eleventh lens element L11 with the concave surface facing the object side.

The fifth lens unit G5, in order from the object side to the image side, comprises a bi-convex twelfth lens element L12, a bi-convex thirteenth lens element L13, a bi-concave fourteenth lens element L14 and a bi-convex fifteenth lens element L15. The thirteenth lens element L13 and the fourteenth lens element L14 are cemented with each other with an adhesive layer in between. The two surfaces of the twelfth lens element L12 are aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the lens unit G4A should increase, and the interval between the lens unit G4B and the fifth lens unit G5 should decrease. The aperture diaphragm A moves to the object side together with the lens unit G4A.

Further, at the time of focusing from an infinity in-focus condition to a close-point in-focus condition, the third lens unit G3 moves to the image side along the optical axis.

Further, for the purpose of compensation of image blur caused by vibration applied to the entire system, the lens unit G4B moves in a direction perpendicular to the optical axis.

Embodiment 15

The zoom lens system according to Embodiment 15, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The fourth lens unit G4, in order from the object side to the image side, comprises a bi-convex ninth lens element L9 and a bi-concave tenth lens element L10. The ninth lens element L9 and the tenth lens element L10 are cemented with each other with an adhesive layer in between.

The fifth lens unit G5, in order from the object side to the image side, comprises: a bi-convex eleventh lens element L11; a positive meniscus twelfth lens element L12 with the convex surface facing the image side; a bi-concave thirteenth lens element L13; and a bi-convex fourteenth lens element L14. The twelfth lens element L12 and the thirteenth lens element L13 are cemented with each other with an adhesive layer in between. The two surfaces of the eleventh lens element L11 are aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Further, for the purpose of compensation of image blur caused by vibration applied to the entire system, the fourth lens unit G4 moves in a direction perpendicular to the optical axis.

Embodiment 16

The zoom lens system according to Embodiment 16, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The fourth lens unit G4, in order from the object side to the image side, comprises a bi-convex ninth lens element L9 and a bi-concave tenth lens element L10. The ninth lens element L9 and the tenth lens element L10 are cemented with each other with an adhesive layer in between.

The fifth lens unit G5, in order from the object side to the image side, comprises: a bi-convex eleventh lens element L11; a positive meniscus twelfth lens element L12 with the convex surface facing the image side; a bi-concave thirteenth lens element L13; and a bi-convex fourteenth lens element L14. The twelfth lens element L12 and the thirteenth lens element L13 are cemented with each other with an adhesive layer in between. The two surfaces of the eleventh lens element L11 are aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Further, for the purpose of compensation of image blur caused by vibration applied to the entire system, the fourth lens unit G4 moves in a direction perpendicular to the optical axis.

Embodiment 17

The zoom lens system according to Embodiment 17, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side. The object side surface of the fifth lens element L5 is aspheric.

The third lens unit G3 is composed of a bi-convex seventh lens element L7. The two surfaces of the seventh lens element L7 are aspheric.

The fourth lens unit G4, in order from the object side to the image side, comprises: a positive meniscus eighth lens element L8 with the convex surface facing the object side; and a negative meniscus ninth lens element L9 with the convex surface facing the object side. The eighth lens element L8 and the ninth lens element L9 are cemented with each other.

The fifth lens unit G5, in order from the object side to the image side, comprises a bi-convex tenth lens element L10, a bi-concave eleventh lens element L11, and a bi-convex twelfth lens element L12. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase and then decrease, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 18

The zoom lens system according to Embodiment 18, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

The third lens unit G3 is composed of a bi-convex seventh lens element L7. The two surfaces of the seventh lens element L7 are aspheric.

The fourth lens unit G4, in order from the object side to the image side, comprises a bi-convex eighth lens element L8 and a bi-concave ninth lens element L9. The eighth lens element L8 and the ninth lens element L9 are cemented with each other. The object side surface of the eighth lens element L8 is aspheric.

The fifth lens unit G5, in order from the object side to the image side, comprises: a bi-convex tenth lens element L10; a bi-concave eleventh lens element L11; a bi-convex twelfth lens element L12; and a planer-concave thirteenth lens element L13 with the concave surface facing the object side. The twelfth lens element L12 and the thirteenth lens element L13 are cemented with each other. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 19

The zoom lens system according to Embodiment 19, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The image side surface of the eighth lens element L8 is aspheric.

The fourth lens unit G4, in order from the object side to the image side, comprises: a positive meniscus ninth lens element L9 with the convex surface facing the object side; and a negative meniscus tenth lens element L10 with the convex surface facing the object side. The ninth lens element L9 and the tenth lens element L10 are cemented with each other with an adhesive layer in between.

The fifth lens unit G5, in order from the object side to the image side, comprises: a bi-convex eleventh lens element L11; a negative meniscus twelfth lens element L12 with the convex surface facing the object side; a bi-convex thirteenth lens element L13; a negative meniscus fourteenth lens element L14 with the convex surface facing the image side; and a bi-convex fifteenth lens element L15. The thirteenth lens element L13 and the fourteenth lens element L14 are cemented with each other with an adhesive layer in between. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 20

The zoom lens system according to Embodiment 20, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The image side surface of the eighth lens element L8 is aspheric.

The fourth lens unit G4, in order from the object side to the image side, comprises: a positive meniscus ninth lens element L9 with the convex surface facing the object side; and a negative meniscus tenth lens element L10 with the convex surface facing the object side. The ninth lens element L9 and the tenth lens element L10 are cemented with each other with an adhesive layer in between.

The fifth lens unit G5, in order from the object side to the image side, comprises: a bi-convex eleventh lens element L11; a negative meniscus twelfth lens element L12 with the convex surface facing the object side; a bi-convex thirteenth lens element L13; a negative meniscus fourteenth lens element L14 with the convex surface facing the image side; and a bi-convex fifteenth lens element L15. The thirteenth lens element L13 and the fourteenth lens element L14 are cemented with each other with an adhesive layer in between. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should decrease and then increase, and the interval between the fourth lens unit G4 and the fifth lens unit G5 should decrease and then increase. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 21

The zoom lens system according to Embodiment 21, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having positive optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side.

The third lens unit G3 is composed of a bi-convex eighth lens element L8. The two surfaces of the eighth lens element L8 are aspheric.

The fourth lens unit G4, in order from the object side to the image side, comprises: a negative meniscus ninth lens element L9 with the convex surface facing the object side; and a positive meniscus tenth lens element L10 with the convex surface facing the object side. The ninth lens element L9 and the tenth lens element L10 are cemented with each other with an adhesive layer in between.

The fifth lens unit G5, in order from the object side to the image side, comprises: a bi-convex eleventh lens element L11; a negative meniscus twelfth lens element L12 with the convex surface facing the object side; a bi-convex thirteenth lens element L13; a bi-concave fourteenth lens element L14; and a bi-convex fifteenth lens element L15. The twelfth lens element L12, the thirteenth lens element L13 and the fourteenth lens element L14 are cemented with each other, each with an adhesive layer in between. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 22

The zoom lens system according to Embodiment 22, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side. The object side surface of the fifth lens element L5 is aspheric.

The third lens unit G3 is composed of a bi-convex seventh lens element L7. The two surfaces of the seventh lens element L7 are aspheric.

The fourth lens unit G4, in order from the object side to the image side, comprises a bi-convex eighth lens element L8 and a bi-concave ninth lens element L9. The eighth lens element L8 and the ninth lens element L9 are cemented with each other.

The fifth lens unit G5, in order from the object side to the image side, comprises a bi-convex tenth lens element L10, a bi-concave eleventh lens element L11, and a bi-convex twelfth lens element L12. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase and then decrease, and the interval between the fourth lens unit G4 and the fifth lens unit G5 should decrease. The aperture diaphragm. A moves to the object side together with the fourth lens unit G4.

Further, at the time of focusing from an infinity in-focus condition to a close-point in-focus condition, the third lens unit G3 moves to the image side along the optical axis.

Embodiment 23

The zoom lens system according to Embodiment 23, in order from the object side to the image side, comprises a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a bi-concave second lens element L2; and a positive meniscus third lens element L3 with the convex surface facing the object side.

The second lens unit G2 is composed of a bi-convex fourth lens element L4. The two surfaces of the fourth lens element L4 are aspheric.

The third lens unit G3, in order from the object side to the image side, comprises: a negative meniscus fifth lens element L5 with the convex surface facing the object side; and a positive meniscus sixth lens element L6 with the convex surface facing the object side. The fifth lens element L5 and the sixth lens element L6 are cemented with each other.

The fourth lens unit G4, in order from the object side to the image side, comprises: a bi-concave seventh lens element L7; and a positive meniscus eighth lens element L8 with the convex surface facing the object side. The seventh lens element L7 and the eighth lens element L8 are cemented with each other.

The fifth lens unit G5, in order from the object side to the image side, comprises: a bi-convex ninth lens element L9; and a negative meniscus tenth lens element L10 with the convex surface facing the image side. The image side surface of the ninth lens element L9 is aspheric.

In zooming from a wide-angle limit to a telephoto limit, the first lens unit G1 first moves to the image side and then moves to the object side. The second lens unit G2 to the fifth lens unit G5 individually move to the object side. More specifically, in zooming from a wide-angle limit to a telephoto limit, the individual lens units move along the optical axis such that the interval between the first lens unit G1 and the second lens unit G2 should decrease, the interval between the second lens unit G2 and the third lens unit G3 should increase and then decrease, the interval between the third lens unit G3 and the fourth lens unit G4 should increase, and the interval between the fourth lens unit G4 and the fifth lens unit G5 should decrease. The aperture diaphragm A moves to the object side together with the third lens unit G3.

Further, at the time of focusing from an infinity in-focus condition to a close-point in-focus condition, the second lens unit G2 moves to the image side along the optical axis.

Further, for the purpose of compensation of image blur caused by vibration applied to the entire system, the fourth lens unit G4 moves in a direction perpendicular to the optical axis.

Embodiment 24

The zoom lens system according to Embodiment 24, in order from the object side to the image side, comprises a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a bi-concave second lens element L2; and a positive meniscus third lens element L3 with the convex surface facing the object side.

The second lens unit G2 is composed of a positive meniscus fourth lens element L4 with the convex surface facing the object side. The two surfaces of the fourth lens element L4 are aspheric.

The third lens unit G3, in order from the object side to the image side, comprises: a negative meniscus fifth lens element L5 with the convex surface facing the object side; and a bi-convex sixth lens element L6. The fifth lens element L5 and the sixth lens element L6 are cemented with each other with an adhesive layer in between.

The fourth lens unit G4, in order from the object side to the image side, comprises: a bi-concave seventh lens element L7; and a positive meniscus eighth lens element L8 with the convex surface facing the object side. The seventh lens element L7 and the eighth lens element L8 are cemented with each other with an adhesive layer in between.

The fifth lens unit G5, in order from the object side to the image side, comprises: a bi-convex ninth lens element L9; and a negative meniscus tenth lens element L10 with the convex surface facing the image side. The image side surface of the ninth lens element L9 is aspheric.

In zooming from a wide-angle limit to a telephoto limit, the first lens unit G1 first moves to the image side and then moves to the object side. The second lens unit G2 to the fifth lens unit G5 individually move to the object side. More specifically, in zooming from a wide-angle limit to a telephoto limit, the individual lens units move along the optical axis such that the interval between the first lens unit G1 and the second lens unit G2 should decrease, the interval between the second lens unit G2 and the third lens unit G3 should increase and then decrease, the interval between the third lens unit G3 and the fourth lens unit G4 should increase, and the interval between the fourth lens unit G4 and the fifth lens unit G5 should decrease. The aperture diaphragm A moves to the object side together with the third lens unit G3.

Further, at the time of focusing from an infinity in-focus condition to a close-point in-focus condition, the second lens unit G2 moves to the image side along the optical axis.

Further, for the purpose of compensation of image blur caused by vibration applied to the entire system, the fourth lens unit G4 moves in a direction perpendicular to the optical axis.

Embodiment 25

The zoom lens system according to Embodiment 25, in order from the object side to the image side, comprises a first lens unit G1 having negative optical power, a second lens unit G2 having positive optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a bi-concave second lens element L2; and a positive meniscus third lens element L3 with the convex surface facing the object side.

The second lens unit G2 is composed of a positive meniscus fourth lens element L4 with the convex surface facing the object side. The two surfaces of the fourth lens element L4 are aspheric.

The third lens unit G3, in order from the object side to the image side, comprises: a negative meniscus fifth lens element L5 with the convex surface facing the object side; and a bi-convex sixth lens element L6. The fifth lens element L5 and the sixth lens element L6 are cemented with each other with an adhesive layer in between.

The fourth lens unit G4, in order from the object side to the image side, comprises: a bi-concave seventh lens element L7; and a positive meniscus eighth lens element L8 with the convex surface facing the object side. The seventh lens element L7 and the eighth lens element L8 are cemented with each other with an adhesive layer in between.

The fifth lens unit G5, in order from the object side to the image side, comprises: a bi-convex ninth lens element L9; and a negative meniscus tenth lens element L10 with the convex surface facing the image side. The image side surface of the ninth lens element L9 is aspheric.

In zooming from a wide-angle limit to a telephoto limit, the first lens unit G1 first moves to the image side and then moves to the object side. The second lens unit G2 and the third lens unit G3 individually move to the object side. The fourth lens unit first moves to the object side and then moves to the image side. The fifth lens unit G5 moves to the object side. More specifically, in zooming from a wide-angle limit to a telephoto limit, the individual lens units move along the optical axis such that the interval between the first lens unit G1 and the second lens unit G2 should decrease, the interval between the second lens unit G2 and the third lens unit G3 should increase and then decrease, the interval between the third lens unit G3 and the fourth lens unit G4 should increase, and the interval between the fourth lens unit G4 and the fifth lens unit G5 should decrease. The aperture diaphragm A moves to the object side together with the third lens unit G3.

Further, at the time of focusing from an infinity in-focus condition to a close-point in-focus condition, the second lens unit G2 moves to the image side along the optical axis.

Further, for the purpose of compensation of image blur caused by vibration applied to the entire system, the fourth lens unit G4 moves in a direction perpendicular to the optical axis.

The zoom lens system according to each of the above-mentioned embodiments includes: a lens unit that is arranged on the object side relative to the aperture diaphragm and provided with negative optical power having an absolute value greatest in the entire system; and a focusing lens unit arranged on the image side relative to the lens unit having negative optical power. This arrangement of the focusing lens unit reduces the image magnification change generated at the time of focusing.

The following description is given for conditions to be satisfied by the zoom lens system according to each embodiment. Here, in the zoom lens system according to each embodiment, a plurality of conditions to be satisfied are set forth. Thus, a configuration of a zoom lens system that satisfies as many applicable conditions as possible is most preferable. However, when an individual condition is satisfied, a zoom lens system having the corresponding effect can be obtained.

It is preferable that the zoom lens system according to each embodiment satisfies the following condition.

$$1.2 < |f_F/f_W| < 6.0 \quad (1)$$

(here, $f_T/f_W > 3.0$)

where, $f_F$ is a focal length of the focusing lens unit, $f_T$ is a focal length of the entire system at a telephoto limit, and $f_W$ is focal length of the entire system at a wide-angle limit.

The condition (1) sets forth the focal length of the focusing lens unit. When the value exceeds the upper limit of the condition (1), the focal length of the focusing lens unit becomes excessively great, and hence the amount of movement at the time of focusing increases. This prevents realization of a compact zoom lens system. In contrast, when the value goes below the lower limit of the condition (1), The focal length of the focusing lens unit becomes excessively small. Thus, aberration fluctuation at the time of focusing becomes excessively large. Accordingly, aberration cannot be compensated by other lens units.

It is preferable that the zoom lens system according to each embodiment satisfies the following condition.

$$0.10 < |f_F/f_T| < 1.8 \quad (2)$$

(here, $f_T/f_W > 3.0$)
where,
$f_F$ is a focal length of the focusing lens unit,
$f_T$ is a focal length of the entire system at a telephoto limit, and
$f_W$ is focal length of the entire system at a wide-angle limit.

The condition (2) sets forth the focal length of the focusing lens unit. When the value exceeds the upper limit of the condition (2), the focal length of the focusing lens unit becomes excessively great, and hence the amount of movement at the time of focusing increases. This prevents realization of a compact zoom lens system. In contrast, when the value goes below the lower limit of the condition (2), the focal length of the focusing lens unit becomes excessively small. Thus, aberration fluctuation at the time of focusing becomes excessively large. Further, error sensitivity in the focusing lens unit becomes high. This causes difficulty in assembling and adjustment.

It is preferable that the zoom lens system according to each embodiment satisfies the following condition.

$$1.00 < |f_F/f_{NW}| < 5.00 \quad (3)$$

(here, $f_T/f_W > 3.0$)
where,
$f_F$ is a focal length of the focusing lens unit,
$f_{NW}$ is a composite focal length of the focusing lens unit and the negative lens unit in an infinity in-focus condition at a wide-angle limit when the focusing lens unit has negative optical power, or the focal length of the negative lens unit when the focusing lens unit has positive optical power,
$f_T$ is a focal length of the entire system at a telephoto limit, and
$f_W$ is focal length of the entire system at a wide-angle limit.

The condition (3) sets forth the ratio between the focal length of the focusing lens unit and the focal length of the negative lens unit. When the value exceeds the upper limit of the condition (3), the focal length of the focusing lens unit becomes excessively great, and hence the amount of movement at the time of focusing increases. This prevents realization of a compact zoom lens system. In contrast, when the value goes below the lower limit of the condition (3), aberration fluctuation generated at the time of zooming cannot be compensated by the subsequent lens units. Further, the image magnification change generated in association with the movement of the focusing lens unit becomes excessively large. Thus, this situation is unpreferable.

Among the zoom lens systems according to the individual embodiments, when the negative lens unit is arranged on the image side relative to the lens unit having positive optical power with the interval in between that varies at the time of zooming, it is preferable that the zoom lens system satisfies the following condition.

$$1.20 < \beta_{NT}/\beta_{NW} < 4.50 \quad (4)$$

(here, $f_T/f_W > 3.0$)
where,
$\beta_{NT}$ is a composite focal length of the focusing lens unit and the negative lens unit in an infinity in-focus condition at a telephoto limit when the focusing lens unit has negative optical power, or a lateral magnification of the negative lens unit at a telephoto limit in an infinity in-focus condition when the focusing lens unit has positive optical power, $\beta_{NW}$ is a composite focal length of the focusing lens unit and the negative lens unit in an infinity in-focus condition at a wide-angle limit when the focusing lens unit has negative optical power, or a lateral magnification of the negative lens unit at a wide-angle limit in an infinity in-focus condition when the focusing lens unit has positive optical power,
$f_T$ is a focal length of the entire system at a telephoto limit, and
$f_W$ is focal length of the entire system at a wide-angle limit.

The condition (4) sets forth the magnification change in the negative lens unit, and substantially indicates the fraction of contribution to zooming. When the value goes outside the range of the condition (4), this situation causes difficulty in zooming itself. Further, aberration fluctuation generated at the time of zooming becomes excessively large, and hence cannot be compensated by other lens units.

Among the zoom lens systems according to the individual embodiments, when the negative lens unit is arranged on the image side relative to the lens unit having positive optical power with the interval in between that varies at the time of zooming, it is preferable that the zoom lens system satisfies the following condition.

$$0.01 < D_F/\Sigma D < 0.10 \quad (5)$$

where,
$D_F$ is an axial thickness of the focusing lens unit, and
$\Sigma D$ is a total of axial thicknesses of the lens elements in the entire system.

The condition (5) sets forth the axial thickness of the focusing lens unit. When the value exceeds the upper limit of the condition (5), the focusing lens unit becomes excessively large. This causes difficulty in focusing such as wobbling suitable for video image taking. In contrast, when the value goes below the lower limit of the condition (5), this situation causes difficulty in ensuring a focal length required for focusing. That is, the amount of movement at the time of focusing becomes excessively large, and hence this situation is unpreferable.

Among the zoom lens systems according to the individual embodiments, when the negative lens unit is arranged on the image side relative to the lens unit having positive optical power with the interval in between that varies at the time of zooming, it is preferable that the zoom lens system satisfies the following condition.

$$3.20 < |f_1/f_{NW}| < 8.50 \quad (6)$$

(here, $f_T/f_W > 3.0$)
where,
$f_1$ is a focal length of the positive lens unit arranged on the object side of the focusing lens unit,
$f_{NW}$ is a composite focal length of the focusing lens unit and the negative lens unit in an infinity in-focus condition at a wide-angle limit when the focusing lens unit has negative optical power, or the focal length of the negative lens unit when the focusing lens unit has positive optical power,
$f_T$ is a focal length of the entire system at a telephoto limit, and
$f_W$ is focal length of the entire system at a wide-angle limit.

The condition (6) sets forth the focal length of the positive lens unit arranged on the object side of the focusing lens unit. When the value exceeds the upper limit of the condition (6), aberration fluctuation generated at the time of zooming becomes excessively large. Further, difficulty arises in compensating off-axial aberration, especially, distortion. Thus, this situation is unpreferable. In contrast, when the value goes below the lower limit of the condition (6), aberration fluctuation generated at the time of zooming becomes excessively large. Further, degradation is caused in the performance at the time of focusing on a close object, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has negative optical power, it is preferable that the zoom lens system satisfies the following condition.

$$0.50 < D_{FWA}/f_W < 2.00 \quad (7)$$

(here, $f_T/f_W > 3.0$)
where,
$D_{FWA}$ is an axial interval from the vertex of a surface on the most image side of the focusing lens unit to the aperture diaphragm,
$f_T$ is a focal length of the entire system at a telephoto limit, and
$f_W$ is focal length of the entire system at a wide-angle limit.

The condition (7) sets forth the axial interval from the focusing lens unit to the aperture diaphragm in a case that the focusing lens unit has negative optical power. When the value exceeds the upper limit of the condition (7), the axial interval between the focusing lens unit and the aperture diaphragm becomes excessively great, and hence the focal length of the focusing lens unit increases relatively. This causes difficulty in realizing a compact zoom lens system. Further, when the value exceeds the upper limit of the condition (7), difficulty arises in compensating aberration, especially, spherical aberration fluctuation, generated at the time of focusing. In contrast, when the value goes below the lower limit of the condition (7), the axial interval between the focusing lens unit and the aperture diaphragm becomes excessively small. This causes difficulty in compensating distortion especially at a wide-angle limit, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has negative optical power, it is preferable that the zoom lens system satisfies the following condition.

$$0.10 < (D_F/f_W)*(f_T/f_W) < 2.00 \quad (8)$$

(here, $f_T/f_W > 3.0$)
where,
$D_F$ is an axial thickness of the focusing lens unit,
$f_T$ is a focal length of the entire system at a telephoto limit, and
$f_W$ is focal length of the entire system at a wide-angle limit.

The condition (8) sets forth the axial thickness of the focusing lens unit. When the value exceeds the upper limit of the condition (8), the axial thickness of the focusing lens unit becomes excessively great, and hence the weight of the focusing lens unit increases. Thus, this situation is unpreferable. In contrast, when the value goes below the lower limit of the condition (8), the axial thickness of the focusing lens unit becomes excessively small. This causes difficulty in manufacturing.

Among the zoom lens systems according to the individual embodiments, in a case that the negative lens unit is arranged on the image side relative to the lens unit having positive optical power with the interval in between that varies at the time of zooming and that the focusing lens unit has negative optical power, it is preferable that the zoom lens system satisfies the following condition.

$$0.02 < |D_F/f_F| < 0.15 \quad (9)$$

(here, $f_T/f_W > 3.0$)
where,
$D_F$ is an axial thickness of the focusing lens unit,
$f_F$ is a focal length of the focusing lens unit,
$f_T$ is a focal length of the entire system at a telephoto limit, and
$f_W$ is focal length of the entire system at a wide-angle limit.

The condition (9) relates to the focal length of the focusing lens unit. When the value exceeds the upper limit of the condition (9), the focal length of the focusing lens unit becomes excessively small. This causes difficulty in compensating aberration fluctuation at the time of focusing. In contrast, when the value goes below the lower limit of the condition (9), the focal length of the focusing lens unit becomes excessively great. Thus, the amount of movement at the time of focusing, especially at the time of wobbling, becomes excessively large. Hence, this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has negative optical power, it is preferable that the zoom lens system satisfies the following condition.

$$1.80 < |f_1/f_2| 4.00 \quad (10)$$

where,
$f_1$ is a focal length of the positive lens unit, and
$f_2$ is a focal length of the negative lens unit.

The condition (10) sets forth the focal length ratio between the positive lens unit and the negative lens unit. When the value exceeds the upper limit of the condition (10), this indicates that the focal length of the positive lens unit is excessively great. This causes difficulty in compensating distortion. In contrast, when the value goes below the lower limit of the condition (10), this indicates that the focal length of the negative lens unit is excessively great. Thus, the amount of movement of the negative lens unit at the time of zooming becomes excessively large, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has negative optical power, it is preferable that the zoom lens system satisfies the following condition.

$$0.40 < |f_2/f_F| < 1.80 \quad (11)$$

where,
$f_2$ is a focal length of the negative lens unit, and
$f_F$ is a focal length of the focusing lens unit.

The condition (11) sets forth the focal length ratio between the focusing lens unit and the negative lens unit. When the value exceeds the upper limit of the condition (11), this indicates that the focal length of the focusing lens unit is excessively small. Thus, the image magnification change at the time of focusing becomes excessively large, and hence this situation is unpreferable. In contrast, when the value goes below the lower limit of the condition (11), this indicates that the focal length of the negative lens unit is excessively small. This causes an increase in aberration fluctuation at the time of zooming, and hence causes difficulty in compensation by other lens units.

Among the zoom lens systems according to the individual embodiments, in a case that the negative lens unit is arranged on the image side relative to the lens unit having positive optical power with the interval in between that varies at the time of zooming and that the focusing lens unit has negative optical power, it is preferable that the zoom lens system satisfies the following condition.

$$1.50<|f_1/f_F|<4.00 \quad (12)$$

where, $f_1$ is a focal length of the lens unit having positive optical power, and $f_F$ is a focal length of the focusing lens unit.

The condition (12) sets forth the focal length ratio between the focusing lens unit and the positive lens unit. When the value exceeds the upper limit of the condition (12), this indicates that the focal length of the focusing lens unit is excessively small. Thus, the image magnification change at the time of focusing becomes excessively large, and hence this situation is unpreferable. In contrast, when the value goes below the lower limit of the condition (12), this indicates that the focal length of the positive lens unit is excessively small. This causes an increase in aberration fluctuation at the time of zooming, and hence causes difficulty in compensation by other lens units.

Among the zoom lens systems according to the individual embodiments, in a case that the negative lens unit is arranged on the image side relative to the lens unit having positive optical power with the interval in between that varies at the time of zooming and that the focusing lens unit has negative optical power, it is preferable that the zoom lens system satisfies the following condition.

$$0.40<(r_{EF}-r_{IF})/(r_{EF}+r_{IF})<2.20 \quad (13)$$

where, $r_{IF}$ is a radius of paraxial curvature of the most object side surface of the focusing lens unit, and $r_{EF}$ is a radius of paraxial curvature of the most image side surface of the focusing lens unit.

The condition (13) substantially sets forth the shape of the focusing lens unit. When the value goes outside the range of the condition (13), satisfactory compensation cannot be achieved for the off-axial aberration, especially, distortion. Thus, this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.15<D_{FWA}/f_W<0.30 \quad (14)$$

(here, $f_T/f_W>3.0$)

where, $D_{FWA}$ is an axial interval from the vertex of a surface on the most image side of the focusing lens unit to the aperture diaphragm, $f_T$ is a focal length of the entire system at a telephoto limit, and $f_W$ is focal length of the entire system at a wide-angle limit.

The condition (14) sets forth the axial interval from the focusing lens unit to the aperture diaphragm in a case that the focusing lens unit has negative optical power. When the value exceeds the upper limit of the condition (14), the axial interval between the focusing lens unit and the aperture diaphragm becomes excessively great, and hence the focal length of the focusing lens unit increases relatively. This causes difficulty in realizing a compact zoom lens system. Further, when the value exceeds the upper limit of the condition (14), difficulty arises in compensating aberration, especially, spherical aberration fluctuation, generated at the time of focusing. In contrast, when the value goes below the lower limit of the condition (14), the axial interval between the focusing lens unit and the aperture diaphragm becomes excessively small. This causes difficulty in compensating distortion especially at a wide-angle limit, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.50<(D_F/f_W)*(f_T/f_W)<1.50 \quad (15)$$

(here, $f_T/f_W>3.0$)

where, $D_F$ is an axial thickness of the focusing lens unit, $f_T$ is a focal length of the entire system at a telephoto limit, and $f_W$ is focal length of the entire system at a wide-angle limit.

The condition (15) sets forth the axial thickness of the focusing lens unit. When the value exceeds the upper limit of the condition (15), the axial thickness of the focusing lens unit becomes excessively great, and hence the weight of the focusing lens unit increases. Thus, this situation is unpreferable. In contrast, when the value goes below the lower limit of the condition (15), the axial thickness of the focusing lens unit becomes excessively small. This causes difficulty in manufacturing.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.02<|D_F/f_F|<0.15 \quad (16)$$

(here, $f_T/f_W>3.0$)

where, $D_F$ is an axial thickness of the focusing lens unit, $f_F$ is a focal length of the focusing lens unit, $f_T$ is a focal length of the entire system at a telephoto limit, and $f_W$ is focal length of the entire system at a wide-angle limit.

The condition (16) relates to the focal length of the focusing lens unit. When the value exceeds the upper limit of the condition (16), the focal length of the focusing lens unit becomes excessively small. This causes difficulty in compensating aberration fluctuation at the time of focusing. In contrast, when the value goes below the lower limit of the condition (16), the focal length of the focusing lens unit becomes excessively great. Thus, the amount of movement at the time of focusing, especially at the time of wobbling, becomes excessively large. Hence, this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$3.00 < |f_1/f_2| < 8.00 \quad (17)$$

where, $f_1$ is a focal length of the positive lens unit, and
$f_2$ is a focal length of the negative lens unit.

The condition (17) sets forth the focal length ratio between the positive lens unit and the negative lens unit. When the value exceeds the upper limit of the condition (17), this indicates that the focal length of the positive lens unit is excessively great. This causes difficulty in compensating distortion. In contrast, when the value goes below the lower limit of the condition (17), this indicates that the focal length of the negative lens unit is excessively great. Thus, the amount of movement of the negative lens unit at the time of zooming becomes excessively large, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.20 < |f_2/f_F| < 0.80 \quad (18)$$

where, $f_2$ is a focal length of the negative lens unit, and
$f_F$ is a focal length of the focusing lens unit.

The condition (18) sets forth the focal length ratio between the focusing lens unit and the negative lens unit. When the value exceeds the upper limit of the condition (18), this indicates that the focal length of the focusing lens unit is excessively small. Thus, the image magnification change at the time of focusing becomes excessively large, and hence this situation is unpreferable. In contrast, when the value goes below the lower limit of the condition (18), this indicates that the focal length of the negative lens unit is excessively small. This causes an increase in aberration fluctuation at the time of zooming, and hence causes difficulty in compensation by other lens units.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$1.50 < |f_1/f_F| < 4.00 \quad (19)$$

where, $f_1$ is a focal length of the lens unit having positive optical power, and
$f_F$ is a focal length of the focusing lens unit.

The condition (19) sets forth the focal length ratio between the focusing lens unit and the positive lens unit. When the value exceeds the upper limit of the condition (19), this indicates that the focal length of the focusing lens unit is excessively small. Thus, the image magnification change at the time of focusing becomes excessively large, and hence this situation is unpreferable. In contrast, when the value goes below the lower limit of the condition (19), this indicates that the focal length of the positive lens unit is excessively small. This causes an increase in aberration fluctuation at the time of zooming, and hence causes difficulty in compensation by other lens units.

Here, the individual lens units constituting each embodiment are composed exclusively of refractive type lens elements that deflect incident light by refraction (that is, lens elements of a type in which deflection is achieved at the interface between media each having a distinct refractive index). However, the present invention is not limited to this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Embodiment 26

Figure 95:
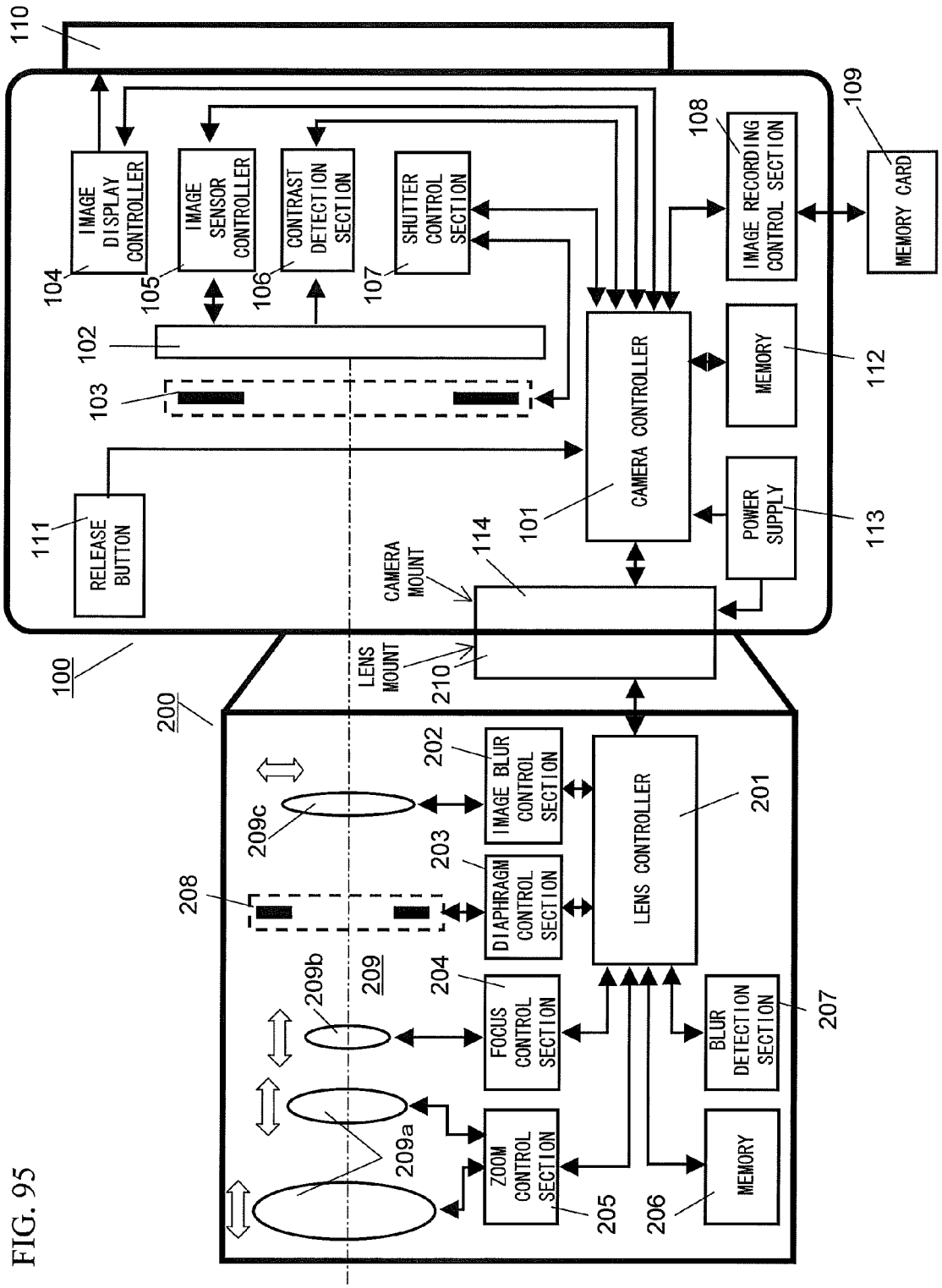
FIG. 95 is a block diagram of a camera system according to Embodiment 26.

FIG. 95 is a block diagram of a camera system according to Embodiment 26. The camera system according to Embodiment 26 includes a camera body 100 and an interchangeable lens apparatus 200.

The camera body 100 includes a camera controller 101, an image sensor 102, a shutter unit 103, an image display controller 104, an image sensor control section 105, a contrast detection section 106, a shutter control section 107, an image recording control section 108, a display 110, a release button 111, a memory 112, a power supply 113 and a camera mount 114.

The camera controller 101 is an arithmetic operation unit for controlling the entire camera system. The camera controller 101 is electrically connected to the image display controller 104, the image sensor control section 105, the contrast detection section 106, the shutter control section 107, the image recording control section 108, the memory 112 and the camera mount 114, and can exchange signals with these sections. Further, the camera controller 101 is electrically connected to the release button 111, and receives a signal generated at the time of operation of the release button 111. Moreover, the camera controller 101 is connected to the power supply 113.

The image sensor 102 is composed, for example, of a CMOS sensor. The image sensor 102 converts an optical image incident on the light receiving plane into image data, and then outputs the image data. The image sensor 102 is driven in accordance with a driving signal from the image sensor control section 105. In response to a control signal from the camera controller 101, the image sensor control section 105 outputs a driving signal for driving the image sensor 102, and then outputs to the camera controller 101 the image data outputted from the image sensor 102. In response to a control signal from the camera controller 101, the contrast detection section 106 calculates and detects the contrast of the image data outputted from the image sensor 102, and then outputs the result to the camera controller 101.

The shutter unit 103 includes a shutter plate for shutting off the optical path for the image light to be incident on the image sensor 102. The shutter unit 103 is driven in accordance with a driving signal from the shutter control section 107. In response to a control signal from the camera controller 101, the shutter control section 107 controls the opening or closing timing for the shutter plate of the shutter unit 103.

The display 110 is composed, for example, of a liquid crystal display unit. The display 110 is driven in accordance with a driving signal from the image display controller 104 so as to display an image on the display surface. In response to a control signal from the camera controller 101, the image display controller 104 outputs image data to be displayed on the display 110 and a driving signal for driving the display 110.

In response to a control signal from the camera controller 101, the image recording control section 108 outputs image data to a memory card 109 connected in an attachable and removable manner.

The camera mount 114 mechanically connects the camera body 100 to the interchangeable lens apparatus 200 described later. Further, the camera mount 114 serves also as an interface for electrically connecting the camera body 100 to the interchangeable lens apparatus 200 described later.

The interchangeable lens apparatus 200 includes a lens controller 201, an image blur control section 202, a diaphragm control section 203, a focus control section 204, a zoom control section 205, a memory 206, a blur detection section 207, a diaphragm unit 208, a zoom lens system 209 (a zoom lens unit 209a, a focusing lens unit 209b and an image blur compensation lens unit 209c), and a lens mount 210.

The lens controller 201 is an arithmetic operation unit for controlling the entirety of the interchangeable lens apparatus 200, and is connected through the lens mount 210 and the camera mount 114 to the camera controller 101 in the camera body described above. The lens controller 201 is electrically connected to the image blur control section 202, the diaphragm control section 203, the focus control section 204, the zoom control section 205, the memory 206 and the blur detection section 207, and can exchange signals with these sections.

The zoom lens system 209 is a zoom lens system according to Embodiment 1 described above. The zoom lens system 209 includes a zoom lens unit 209a, a focusing lens unit 209b, and an image blur compensation lens unit 209c. Here, the classification of the zoom lens unit 209a, the focusing lens unit 209b and the image blur compensation lens unit 209c is merely conceptual and adopted for simplicity of description. Thus, this classification does not exactly describe the actual construction of the actual zoom lens system. In the zoom lens system 209, zooming is achieved when the zoom lens unit 209a moves in a direction along the optical axis. In the zoom lens system 209, focusing is achieved when the focusing lens unit 209b moves in a direction along the optical axis. Further, in the zoom lens system 209, image blur compensation is achieved when the image blur compensation lens unit 209c moves in a direction perpendicular to the optical axis.

In response to a control signal from the lens controller 201, the image blur control section 202 detects and outputs the present position of the image blur compensation lens unit 209c. Further, the image blur control section 202 outputs a driving signal for driving the image blur compensation lens unit 209c, so as to drive the image blur compensation lens unit 209c in a direction perpendicular to the optical axis.

In response to a control signal from the lens controller 201, the diaphragm control section 203 detects and outputs the present position of the diaphragm unit 208. Further, the diaphragm control section 203 outputs a driving signal for driving the diaphragm blades provided in the diaphragm unit 208, and thereby opens or closes the diaphragm so as to change the F-number of the optical system.

In response to a control signal from the lens controller 201, the focus control section 204 detects and outputs the present position of the focusing lens unit 209b. Further, the focus control section 204 outputs a driving signal for driving focusing group 209b, so as to drive the focusing lens unit 209b in a direction along the optical axis.

In response to a control signal from the lens controller 201, the zoom control section 205 detects and outputs the present position of the zoom lens unit 209a. Further, the zoom control section 205 outputs a driving signal for driving the zoom lens unit 209a, so as to drive the zoom lens unit 209a in a direction along the optical axis.

In the above-mentioned configuration, when the release button 111 is pressed half, the camera controller 101 executes a routine of auto-focusing. First, the camera controller 101 communicates with the lens controller 201 via the camera mount 114 and the lens mount 210, so as to detect the state of the zoom lens unit 209a, the focusing lens unit 209b, the image blur compensation lens unit 209c and the diaphragm unit 208.

Then, the camera controller 101 communicates with the lens controller 201 via the camera mount 114 and the lens mount 210, so as to output to the lens controller 201 a control signal for driving and wobbling the focusing lens unit 209b. In accordance with the control signal, the lens controller 201 controls the focus control section 204 so as to drive and wobble the focusing lens unit 209b. At the same time, the camera controller 101 communicates with the lens controller 201 via the camera mount 114 and the lens mount 210, so as to output a control signal for instructing the lens controller 201 to adjust the aperture value into a predetermined value. In accordance with the control signal, the lens controller 201 controls the diaphragm control section 203 so as to drive the diaphragm blades of the diaphragm unit 208 in correspondence to the predetermined F-number.

On the other hand, the camera controller 101 outputs a control signal to the image sensor control section 105 and the contrast detection section 106. The image sensor control section 105 and the contrast detection section 106 individually acquire an output from the image sensor 102 in a manner corresponding to the sampling frequency of the wobbling drive of the focusing lens unit 209b. In accordance with the control signal from the camera controller 101, the image sensor control section 105 transmits image data corresponding to the optical image to the camera controller 101. The camera controller 101 performs predetermined image processing onto the image data, and then transmits the result to the image display controller 104. The image display controller 104 displays the image data in the form of a visible image onto the display 110.

Further, the contrast detection section 106 calculates the contrast value of the image data in association with wobbling, and then transmits the result to the camera controller 101. On the basis of the detection result from the contrast detection section 106, the camera controller 101 determines the direction of focusing movement and the amount of movement for the focusing lens unit, and then transmits the information thereof to the lens controller 201. The lens controller 201 outputs a control signal to the focus control section 204 so as to move the focusing lens unit 209b. In accordance with the control signal from the lens controller 201, the focus control section 204 drives the focusing lens unit 209b.

When auto-focusing is to be performed in a live view state, the above-mentioned operation is repeated. When auto-focusing is to be performed in a live view state, wobbling of the focusing lens unit 209b is performed continuously. At that time, the zoom lens system according to each embodiment has merely a small image magnification change in association with wobbling, and has a light weight. Thus, an imaging lens system suitable for the above-mentioned system is obtained.

Embodiment 26 given above has been described for a case that the zoom lens system according to Embodiment 1 is employed. However, obviously, a zoom lens system according to another embodiment may be employed. Here, among the zoom lens systems according to the embodiments, when a zoom lens system that does not include the image blur compensation lens unit 209c is employed, the configuration of the image blur control section 202 and the like is omitted.

EXAMPLES

Numerical examples are described below in which the zoom lens systems according to Embodiments 1 to 25 are implemented. As described later, Numerical Examples 1 to 25 correspond to Embodiments 1 to 25, respectively. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is the distance from a point on an aspheric surface at a height h relative to the optical axis to a tangential plane at the vertex of the aspheric surface, h is the height relative to the optical axis, r is the radius of curvature at the top, k is the conic constant, and An is the n-th order aspherical coefficient.

FIGS. 2, 6, 10, 14, 18, 22, 26, 30, 34, 38, 42, 46, 50, 54, 58, 62, 66, 69, 72, 75, 78, 81, 84, 88 and 92 are longitudinal aberration diagrams of an infinity in-focus condition of the zoom lens systems according to Numerical Examples 1, 2, 3, 4, 5, 6, 7, 8, 9, 10, 11, 12, 13, 14, 15, 16, 17, 18, 19, 20, 21, 22, 23, 24 and 25, respectively.

FIGS. 3, 7, 11, 15, 19, 23, 27, 31, 35, 39, 43, 47, 51, 55, 59, 63, 67, 70, 73, 76, 79, 82, 85, 89 and 93 are longitudinal aberration diagrams of a close-point in-focus condition of the zoom lens systems according to Numerical Examples 1, 2, 3, 4, 5, 6, 7, 8, 9, 10, 11, 12, 13, 14, 15, 16, 17, 18, 19, 20, 21, 22, 23, 24 and 25, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal image plane (in each Fig., indicated as "s") and the meridional image plane (in each Fig., indicated as "m"), respectively. In each distortion diagram, the vertical axis indicates the image height (in each Fig., indicated as H).

In each numerical example, as seen from the longitudinal aberration diagram of an infinity in-focus condition and the longitudinal aberration diagram of a close-point in-focus condition, also in a close-point in-focus condition, each zoom lens system achieves satisfactory aberration performance similar to that in an infinity in-focus condition.

FIGS. 4, 8, 12, 16, 20, 24, 28, 32, 36, 40, 44, 48, 52, 56, 60, 64, 86, 90 and 94 are lateral aberration diagrams in a basic state where image blur compensation is not performed and in an image blur compensation state of a zoom lens system according to Numerical Examples 1, 2, 3, 4, 5, 6, 7, 8, 9, 10, 11, 12, 13, 14, 15, 16, 23, 24, 25, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire second lens unit G2 moves by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional image plane is adopted as the plane containing the optical axis of the first lens unit G1.

Here, in the zoom lens system according to each numerical example, the amount ($Y_T$) of movement of the compensation lens unit in a direction perpendicular to the optical axis in an image blur compensation state at a telephoto limit is as follows.

TABLE 1

(amount of movement of compensation lens unit)

| Numerical Example | $Y_T$ |
|---|---|
| 1 | 0.150 |
| 2 | 0.170 |
| 3 | 0.290 |
| 4 | 0.300 |
| 5 | 0.320 |
| 6 | 0.400 |
| 7 | 0.280 |
| 8 | 0.320 |
| 9 | 0.450 |
| 10 | 0.500 |
| 11 | 0.470 |
| 12 | 0.400 |
| 13 | 0.500 |
| 14 | 0.500 |
| 15 | 0.200 |
| 16 | 0.050 |
| 23 | 0.190 |
| 24 | 0.220 |
| 25 | 0.220 |

As seen from the lateral aberration diagrams, in each zoom lens system, satisfactory symmetry is obtained in the lateral aberration at the axial image point. Further, when the lateral aberration at the +75% image point and the lateral aberration at the −75% image point are compared with each other in a basic state, all have a small degree of curvature and almost the same inclination in the aberration curve. Thus, decentering coma aberration and decentering astigmatism are small. This indicates that satisfactory imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, satisfactory image blur compensation can be performed without degrading the imaging characteristics.

Numerical Example 1

The zoom lens system of Numerical Example 1 corresponds to Embodiment 1 shown in FIG. 1. Table 2 shows the surface data of the zoom lens system of Numerical Example 1. Table 3 shows the aspherical data. Table 4 shows various data. Table 5 shows the zoom lens unit data.

TABLE 2

(surface data)

| Surface number | r | D | nd | vd |
|---|---|---|---|---|
| Object surface | ∞ | | | |
| 1 | 43.21710 | 1.20000 | 1.84666 | 23.8 |
| 2 | 25.43470 | 5.19210 | 1.80420 | 46.5 |
| 3 | 981.95530 | Variable | | |
| 4 | 82.59040 | 0.70000 | 1.88300 | 40.8 |
| 5 | 9.38020 | 4.75790 | | |
| 6 | −35.73240 | 0.70000 | 1.80420 | 46.5 |
| 7 | 44.32840 | 0.15000 | | |
| 8 | 18.94040 | 3.04020 | 1.84666 | 23.8 |
| 9 | −49.21050 | Variable | | |
| 10 | −19.76000 | 0.80000 | 1.80420 | 46.5 |
| 11 | −138.28540 | Variable | | |
| 12 | 41.91760 | 2.27020 | 1.48749 | 70.4 |
| 13* | −18.78750 | 3.00000 | | |
| 14 | ∞ | 0.80000 | | |
| (Aperture) | | | | |
| 15 | 11.80590 | 9.59870 | 1.48749 | 70.4 |
| 16 | −9.25040 | 0.80000 | 1.80991 | 41.0 |
| 17 | −19.17090 | 0.10000 | | |
| 18 | 22.73290 | 0.80000 | 1.84330 | 24.7 |
| 19 | 9.42400 | 8.93080 | | |
| 20 | 21.02660 | 2.03030 | 1.78220 | 25.7 |
| 21 | 41.29530 | BF | | |
| Image surface | ∞ | | | |

TABLE 3

(aspherical data)

| Surface No. | Parameters |
|---|---|
| 13 | K = −2.22931E−01, A4 = 3.37806E−05, A6 = 7.70077E−07, A8 = −4.63479E−08, A10 = 7.39065E−10 |

TABLE 4

(various data)

| Zooming ratio | | 3.05147 | |
|---|---|---|---|
| | Wide | Middle | Telephoto |
| Focal length | 14.4088 | 25.1686 | 43.9679 |
| F-number | 3.60905 | 4.84348 | 5.99491 |
| View angle | 40.3126 | 23.7421 | 13.6890 |
| Image height | 11.0000 | 11.0000 | 11.0000 |

TABLE 4-continued (various data)

| Overall length of lens system | 77.1851 | 86.0327 | 102.2025 |
|---|---|---|---|
| BF | 15.84139 | 25.45859 | 36.32682 |
| d3 | 0.5000 | 6.5616 | 14.9075 |
| d9 | 4.4250 | 2.5240 | 2.9980 |
| d11 | 11.5485 | 6.6183 | 3.1000 |

TABLE 5

(zoom lens unit data)

| Unit | Initial surface No. | Focal length |
|---|---|---|
| 1 | 1 | 58.21940 |
| 2 | 4 | −20.78405 |
| 3 | 10 | −28.75388 |
| 4 | 12 | 17.86944 |

Numerical Example 2

Figure 5:
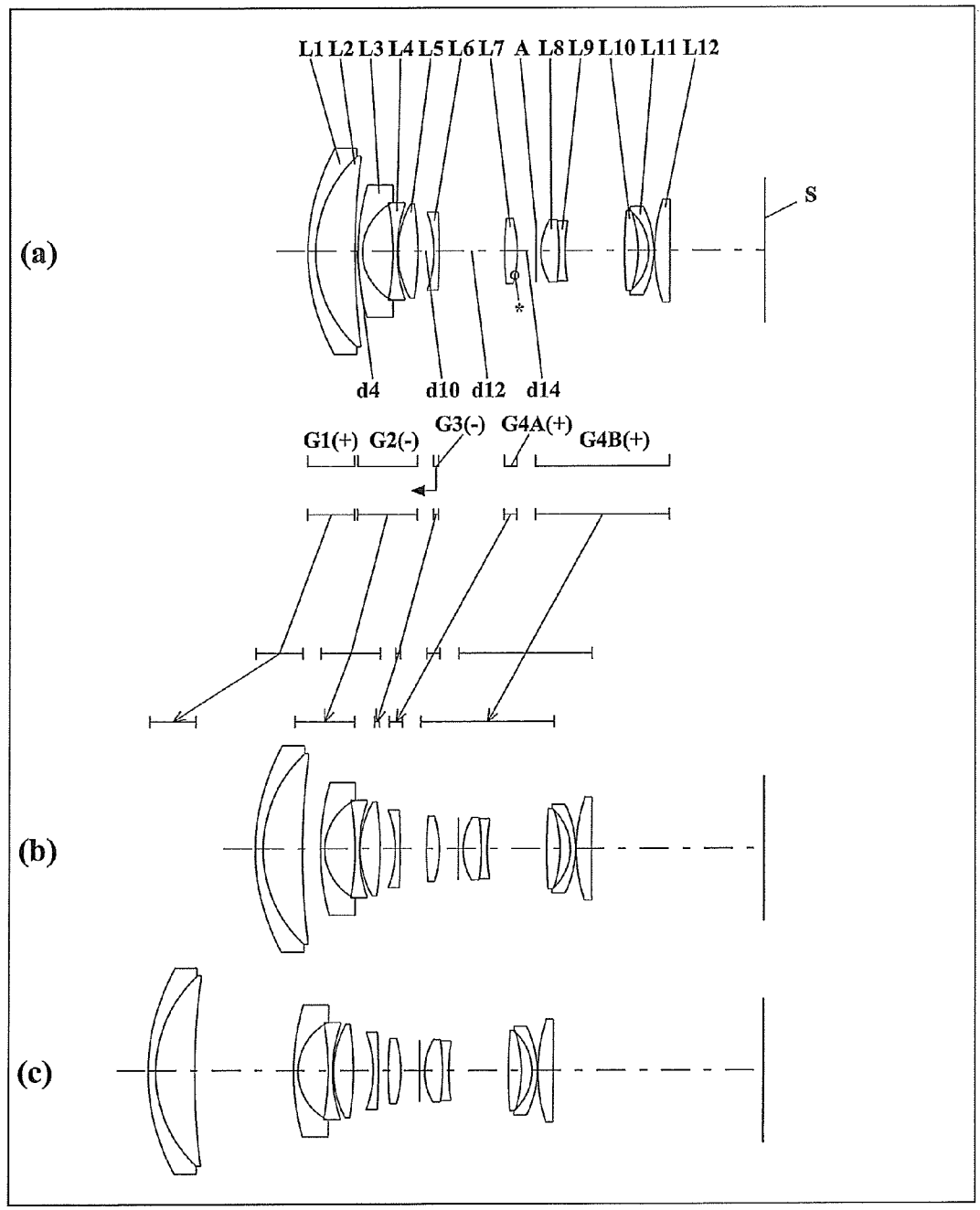
FIG. 5 is a lens arrangement diagram showing an infinity in-focus condition of a zoom lens system according to Embodiment 2 (Example 2)
Figure 6:
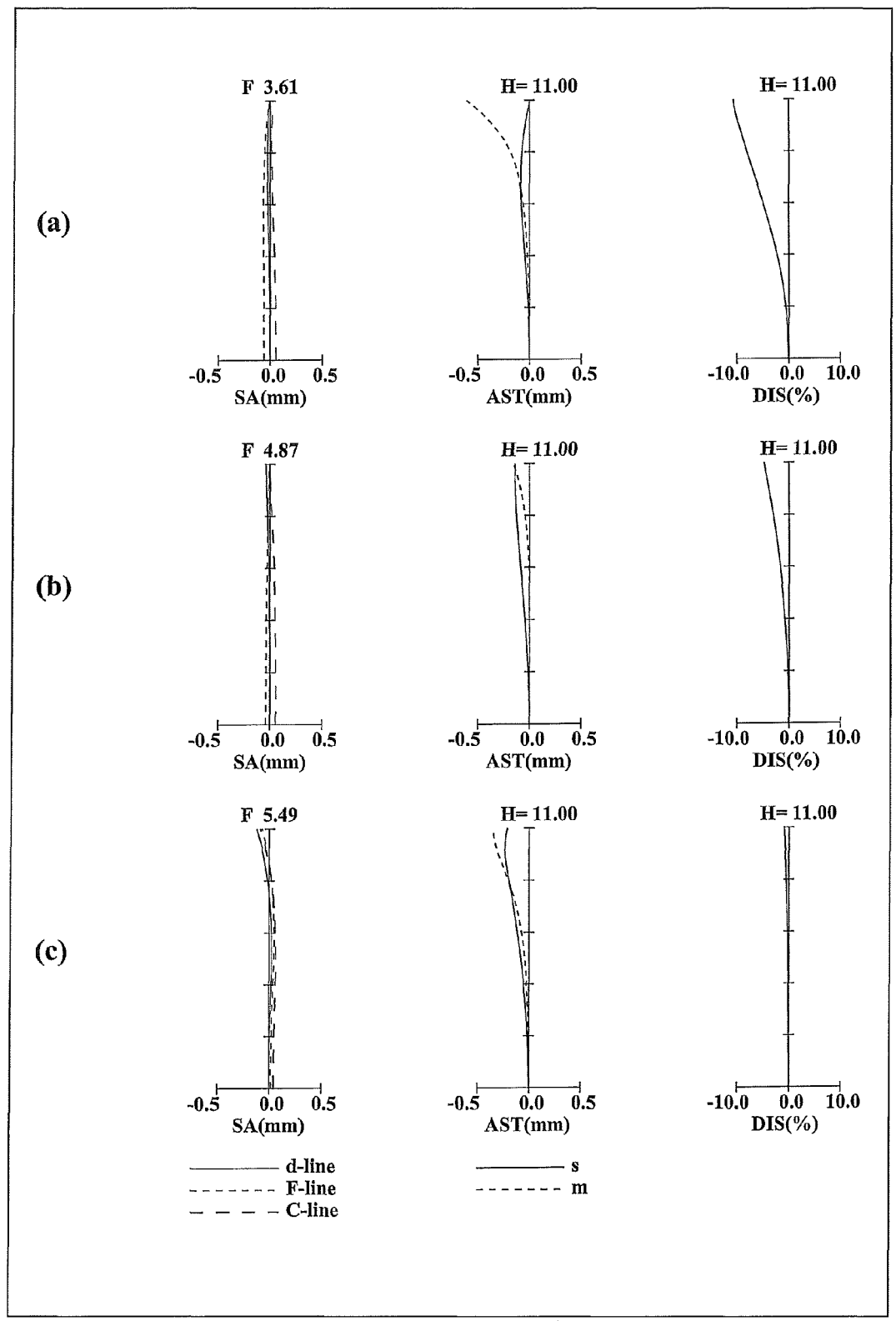
FIG. 6 is a longitudinal aberration diagram showing an infinity in-focus condition of a zoom lens system according to Example 2.
Figure 7:
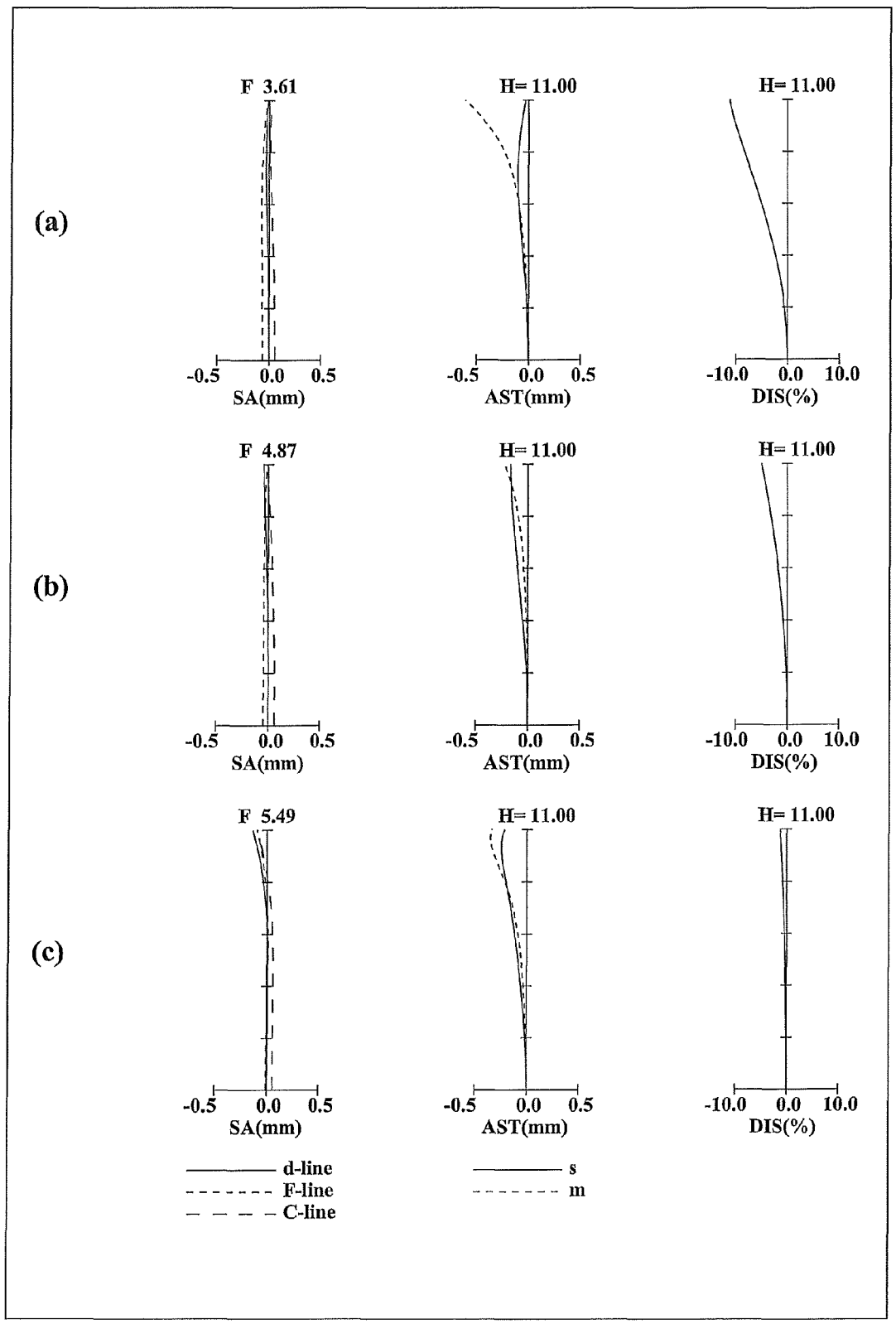
FIG. 7 is a longitudinal aberration diagram showing a close-point in-focus condition of a zoom lens system according to Example 2.
Figure 8:
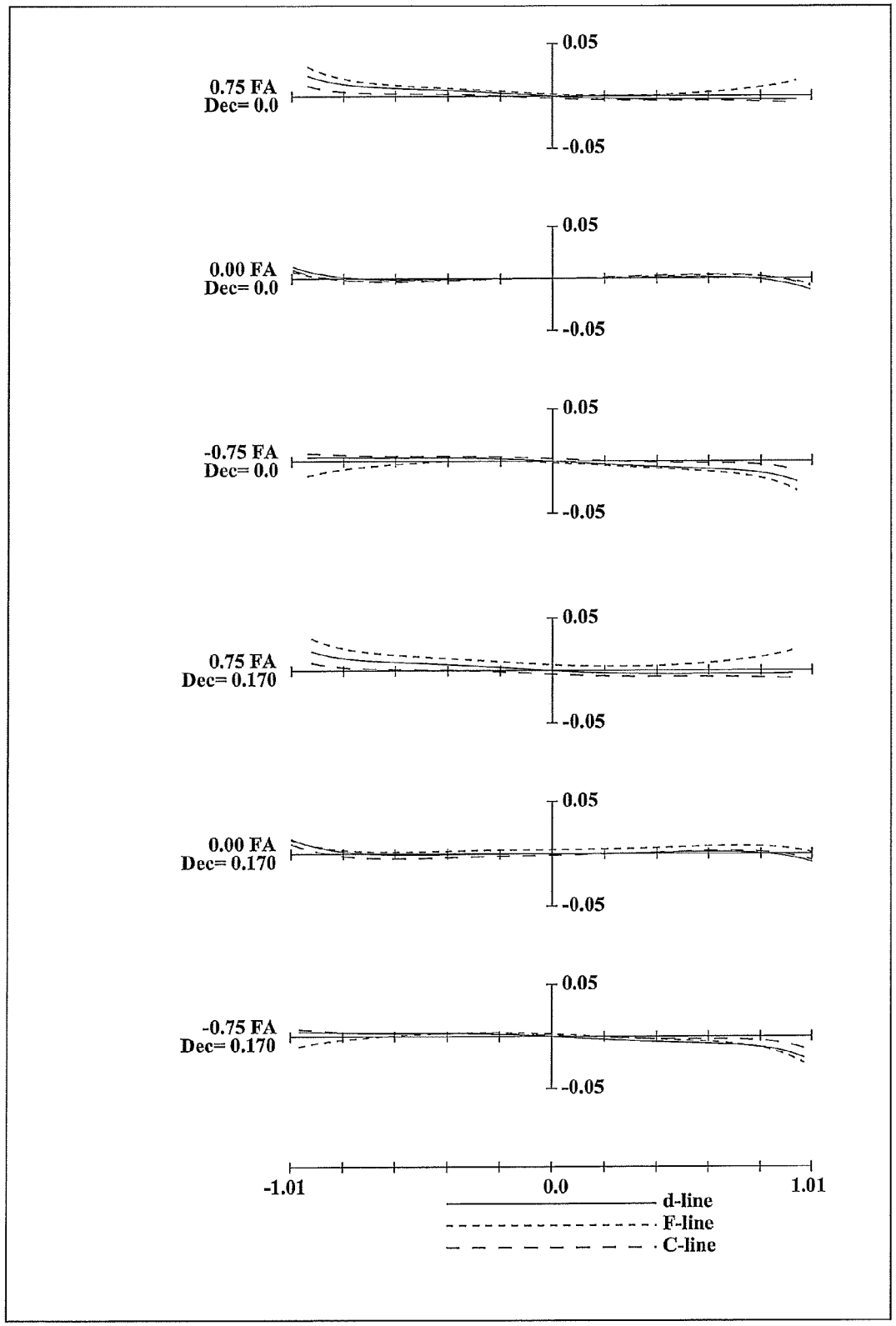
FIG. 8 is a lateral aberration diagram in a basic state where image blur compensation is not performed and in an image blur compensation state at a telephoto limit of a zoom lens system according to Example 2.

The zoom lens system of Numerical Example 2 corresponds to Embodiment 2 shown in FIG. 5. Table 6 shows the surface data of the zoom lens system of Numerical Example 2. Table 7 shows the aspherical data. Table 8 shows various data. Table 9 shows the zoom lens unit data.

TABLE 6

(surface data)

| Surface number | r | d | nd | vd |
|---|---|---|---|---|
| Object surface | ∞ | | | |
| 1 | 33.83330 | 1.20000 | 1.84666 | 23.8 |
| 2 | 20.77060 | 0.01000 | 1.56732 | 42.8 |
| 3 | 20.77060 | 6.28590 | 1.80420 | 46.5 |
| 4 | 116.39280 | Variable | | |
| 5 | 38.71660 | 0.70000 | 1.88300 | 40.8 |
| 6 | 8.80740 | 4.80720 | | |
| 7 | −44.40300 | 0.70000 | 1.80420 | 46.5 |
| 8 | 23.11540 | 0.15000 | | |
| 9 | 15.40440 | 3.15370 | 1.84666 | 23.8 |
| 10 | −49.21050 | Variable | | |
| 11 | −18.01480 | 0.80000 | 1.80420 | 46.5 |
| 12 | −132.85380 | Variable | | |
| 13 | 48.60620 | 2.03210 | 1.51443 | 63.3 |
| 14* | −18.57800 | 3.00000 | | |
| 15 | ∞ | 0.80000 | | |
| (Aperture) | | | | |
| 16 | 9.81310 | 2.84000 | 1.49475 | 69.6 |
| 17 | −36.80060 | 0.01000 | 1.56732 | 42.8 |
| 18 | −36.80060 | 0.96930 | 1.76995 | 27.6 |
| 19 | 29.16220 | 9.46760 | | |
| 20 | 84.07330 | 2.08380 | 1.48749 | 70.4 |
| 21 | −20.12000 | 1.68460 | | |
| 22 | −8.42020 | 0.80000 | 1.75221 | 51.7 |
| 23 | −15.68550 | 0.15000 | | |
| 24 | 26.62400 | 2.39610 | 1.54929 | 46.8 |
| 25 | 6476.67870 | BF | | |
| Image surface | ∞ | | | |

TABLE 7

(aspherical data)

| Surface No. | Parameters |
|---|---|
| 14 | K = 6.62676E−02, A4 = 2.73404E−05, A6 = 2.59552E−08, A8 = 6.74138E−10, A10 = −1.11287E−11 |

TABLE 8

(various data)

| Zooming ratio | | 3.05357 | |
|---|---|---|---|
| | Wide | Middle | Telephoto |
| Focal length | 14.4000 | 25.1643 | 43.9713 |
| F-number | 3.60956 | 4.87199 | 5.49083 |
| View angle | 40.5373 | 24.6639 | 14.1615 |
| Image height | 11.0000 | 11.0000 | 11.0000 |
| Overall length of lens system | 72.6963 | 80.8343 | 97.7212 |
| BF | 15.17359 | 27.31874 | 33.30463 |
| d4 | 0.5000 | 2.8614 | 15.6225 |
| d10 | 2.5839 | 2.3994 | 3.1538 |
| d12 | 10.3985 | 4.2145 | 1.6000 |

TABLE 9

(zoom lens unit data)

| Unit | Initial surface No. | Focal length |
|---|---|---|
| 1 | 1 | 59.63024 |
| 2 | 5 | −22.12178 |
| 3 | 11 | −25.99565 |
| 4 | 13 | 17.09235 |

Numerical Example 3

Figure 9:
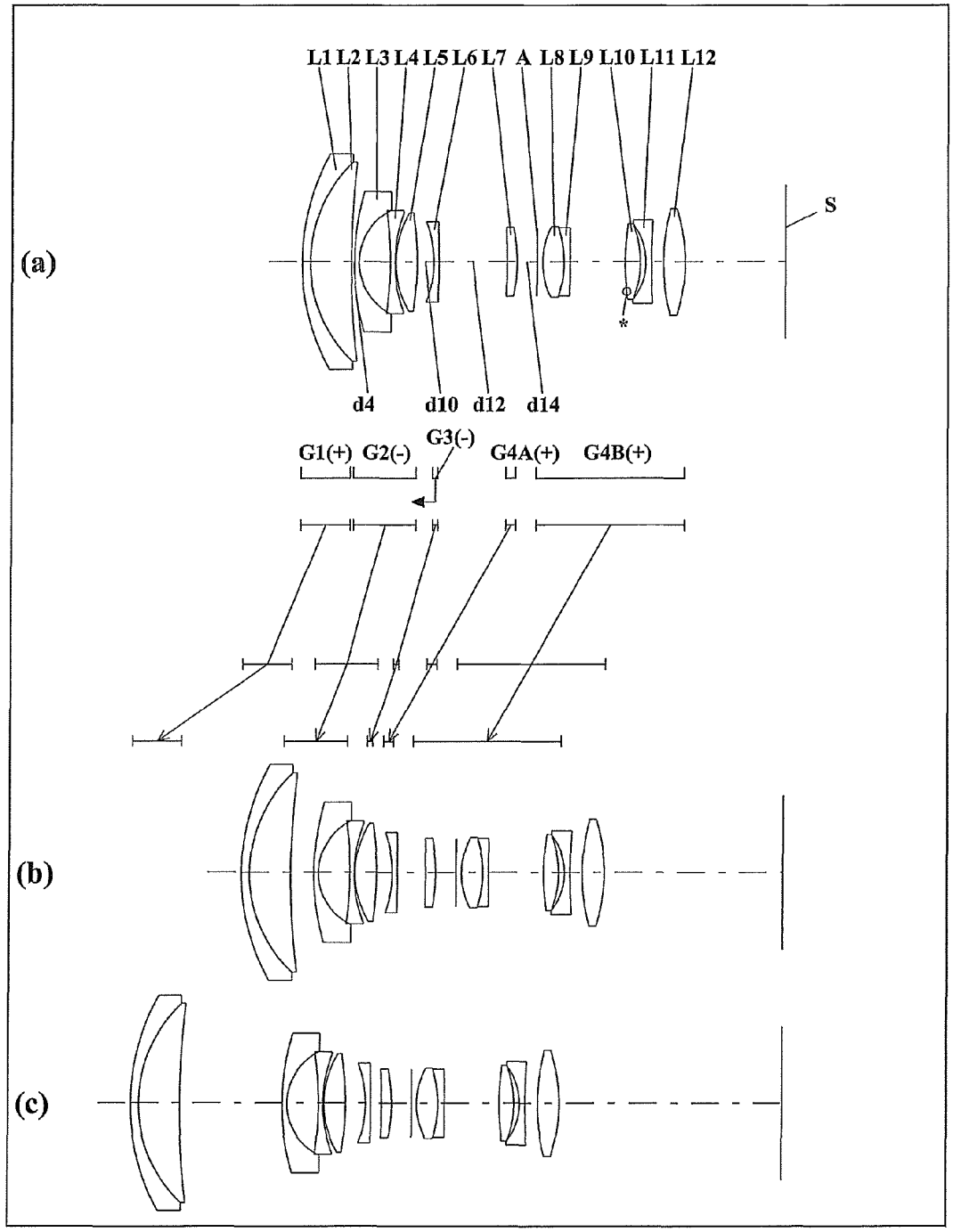
FIG. 9 is a lens arrangement diagram showing an infinity in-focus condition of a zoom lens system according to Embodiment 3 (Example 3)
Figure 10:
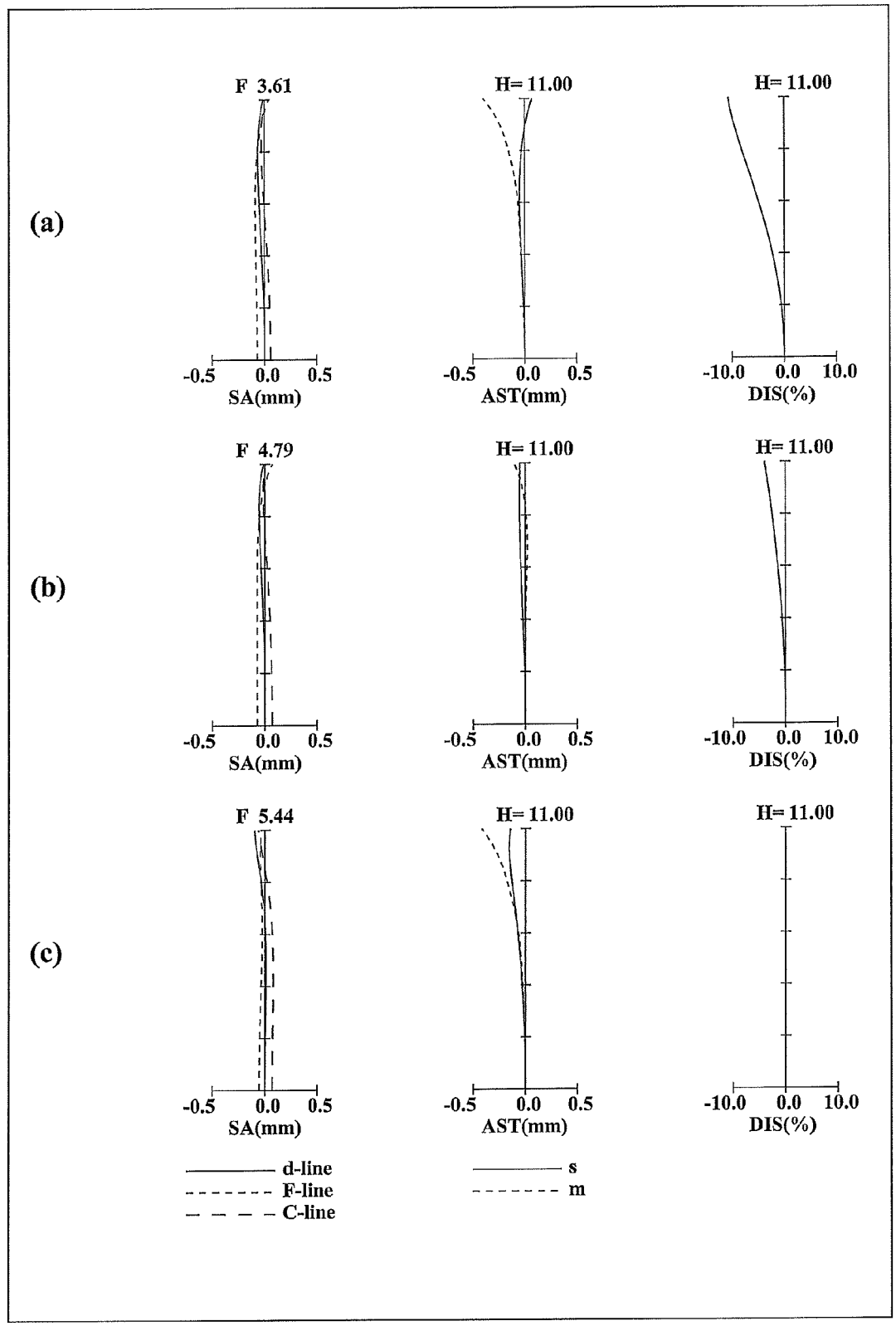
FIG. 10 is a longitudinal aberration diagram showing an infinity in-focus condition of a zoom lens system according to Example 3.
Figure 11:
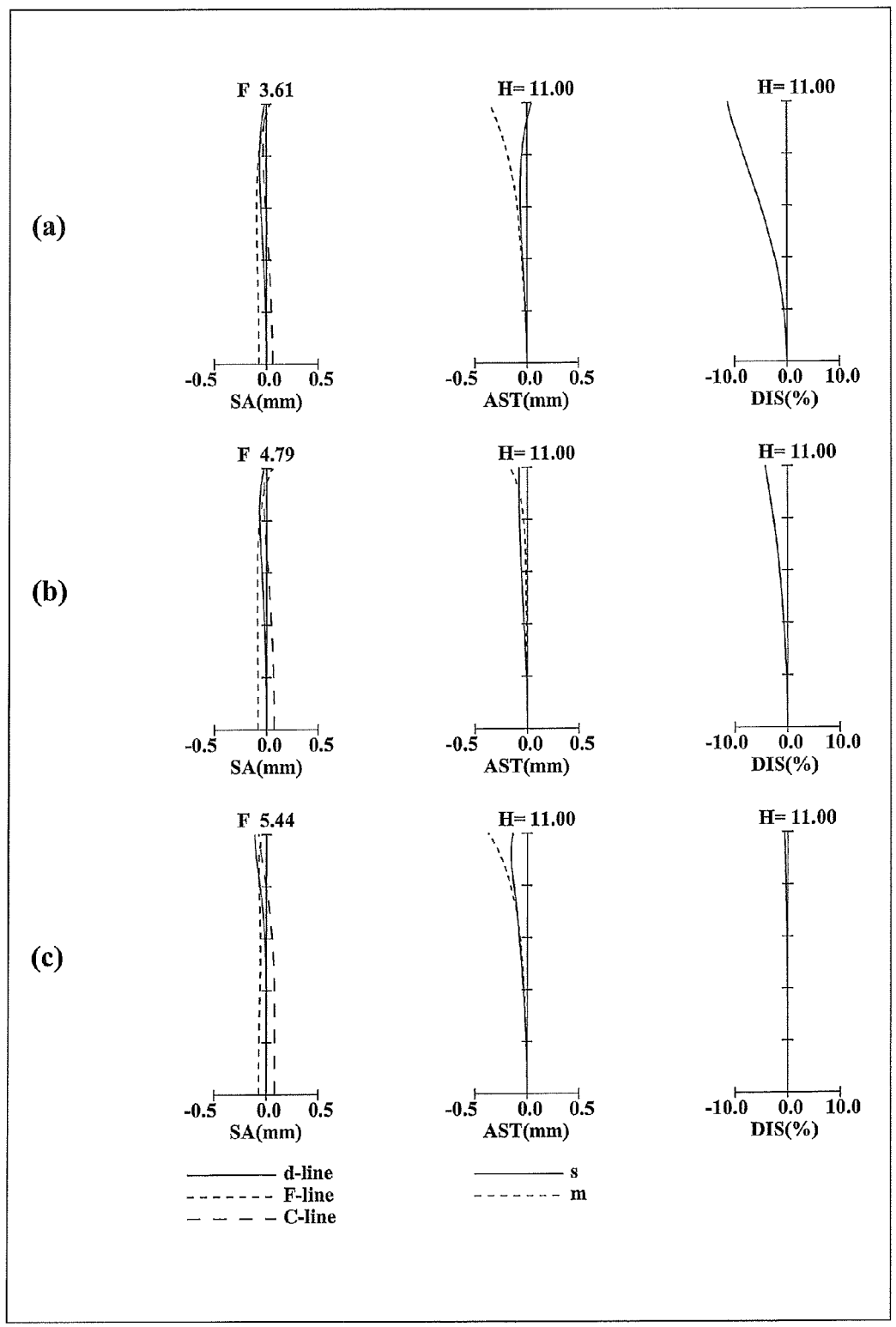
FIG. 11 is a longitudinal aberration diagram showing a close-point in-focus condition of a zoom lens system according to Example 3.
Figure 12:
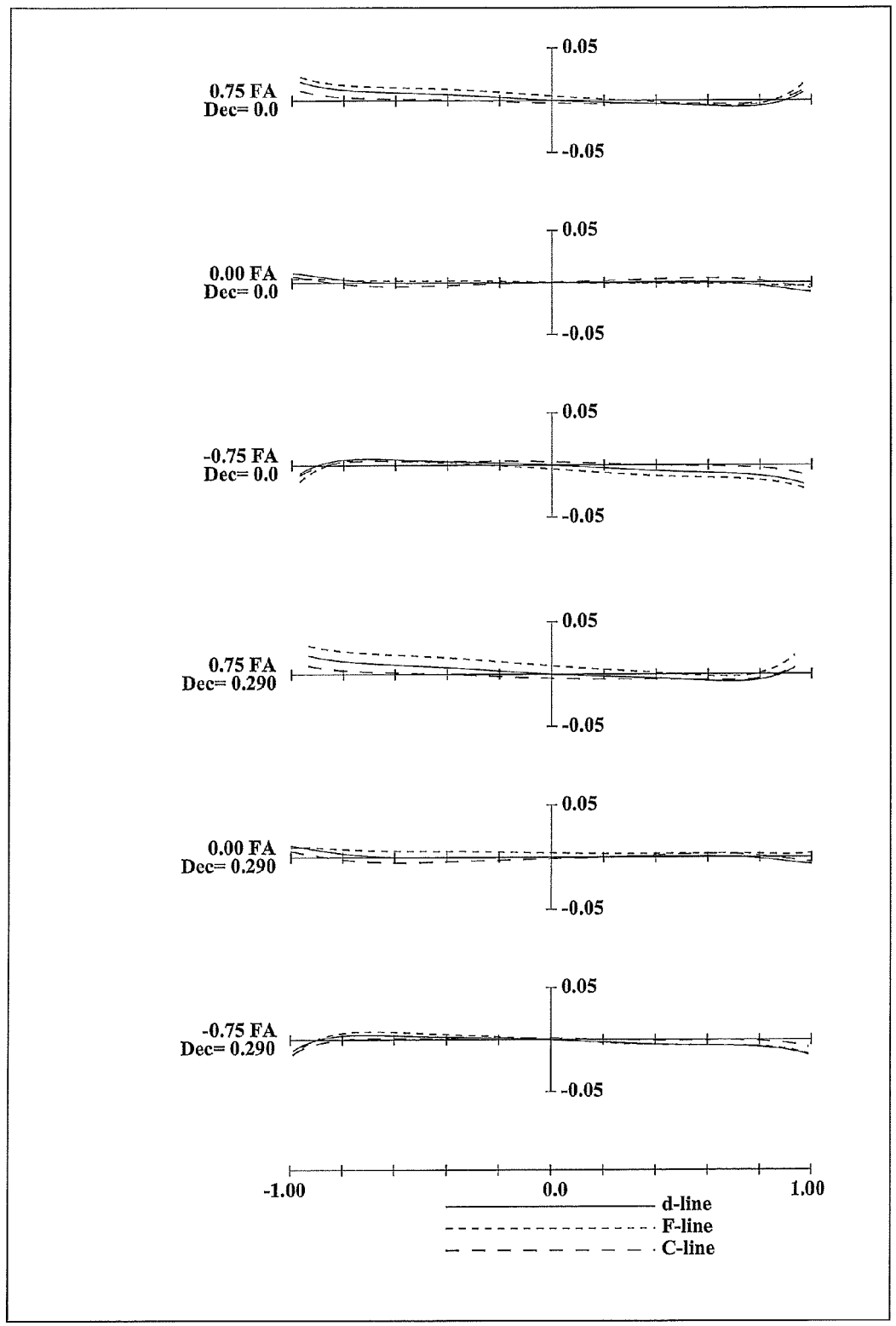
FIG. 12 is a lateral aberration diagram in a basic state where image blur compensation is not performed and in an image blur compensation state at a telephoto limit of a zoom lens system according to Example 3.

The zoom lens system of Numerical Example 3 corresponds to Embodiment 3 shown in FIG. 9. Table 10 shows the surface data of the zoom lens system of Numerical Example 3. Table 11 shows the aspherical data. Table 12 shows various data. Table 13 shows the zoom lens unit data.

TABLE 10

(surface data)

| Surface number | r | d | nd | vd |
|---|---|---|---|---|
| Object surface | ∞ | | | |
| 1 | 33.75060 | 1.20000 | 1.84666 | 23.8 |
| 2 | 20.77890 | 0.01000 | 1.56732 | 42.8 |
| 3 | 20.77890 | 6.15900 | 1.80420 | 46.5 |
| 4 | 120.41460 | Variable | | |
| 5 | 37.60080 | 0.70000 | 1.88300 | 40.8 |
| 6 | 8.72600 | 4.70880 | | |
| 7 | −55.82480 | 0.70000 | 1.80420 | 46.5 |
| 8 | 20.72170 | 0.15000 | | |
| 9 | 14.41540 | 3.22770 | 1.84666 | 23.8 |
| 10 | −49.21050 | Variable | | |
| 11 | −17.47170 | 0.80000 | 1.80420 | 46.5 |
| 12 | −253.90150 | Variable | | |
| 13 | −169.66660 | 1.52820 | 1.72916 | 54.7 |
| 14 | −27.83260 | 3.00000 | | |
| 15 | ∞ | 0.80000 | | |
| (Aperture) | | | | |
| 16 | 11.11030 | 3.20560 | 1.61016 | 60.9 |
| 17 | −17.84460 | 0.01000 | 1.56732 | 42.8 |
| 18 | −17.84460 | 0.91610 | 1.83802 | 26.3 |
| 19 | −678.72260 | 8.21640 | | |
| 20* | 29.09570 | 2.26450 | 1.48749 | 70.4 |
| 21 | −15.62460 | 0.85280 | | |
| 22 | −9.25560 | 0.80000 | 1.80477 | 45.9 |
| 23 | 93.92590 | 1.82920 | | |
| 24 | 30.39700 | 3.27490 | 1.58369 | 40.0 |
| 25 | −26.56500 | BF | | |
| Image surface | ∞ | | | |

TABLE 11

(aspherical data)

| Surface No. | Parameters |
|---|---|
| 20 | K = 0.00000E+00, A4 = −9.31373E−05, A6 = −8.61821E−07, A8 = 1.81544E−08, A10 = −1.10493E−09 |

TABLE 12

(various data)

| Zooming ratio | | 3.05267 | |
|---|---|---|---|
| | Wide | Middle | Telephoto |
| Focal length | 14.4045 | 25.1613 | 43.9722 |
| F-number | 3.60886 | 4.78574 | 5.43549 |
| View angle | 40.5307 | 24.4885 | 14.0613 |
| Image height | 11.0000 | 11.0000 | 11.0000 |
| Overall length of lens system | 72.7053 | 81.3086 | 97.7139 |
| BF | 15.17729 | 26.86964 | 33.35743 |
| d4 | 0.5000 | 3.4867 | 15.3708 |
| d10 | 2.4989 | 2.3529 | 3.0325 |
| d12 | 10.1759 | 4.2462 | 1.6000 |

TABLE 13

(zoom lens unit data)

| Unit | Initial surface No. | Focal length |
|---|---|---|
| 1 | 1 | 58.71443 |
| 2 | 5 | −24.41553 |
| 3 | 11 | −23.36629 |
| 4 | 13 | 16.94894 |

Numerical Example 4

Figure 13:
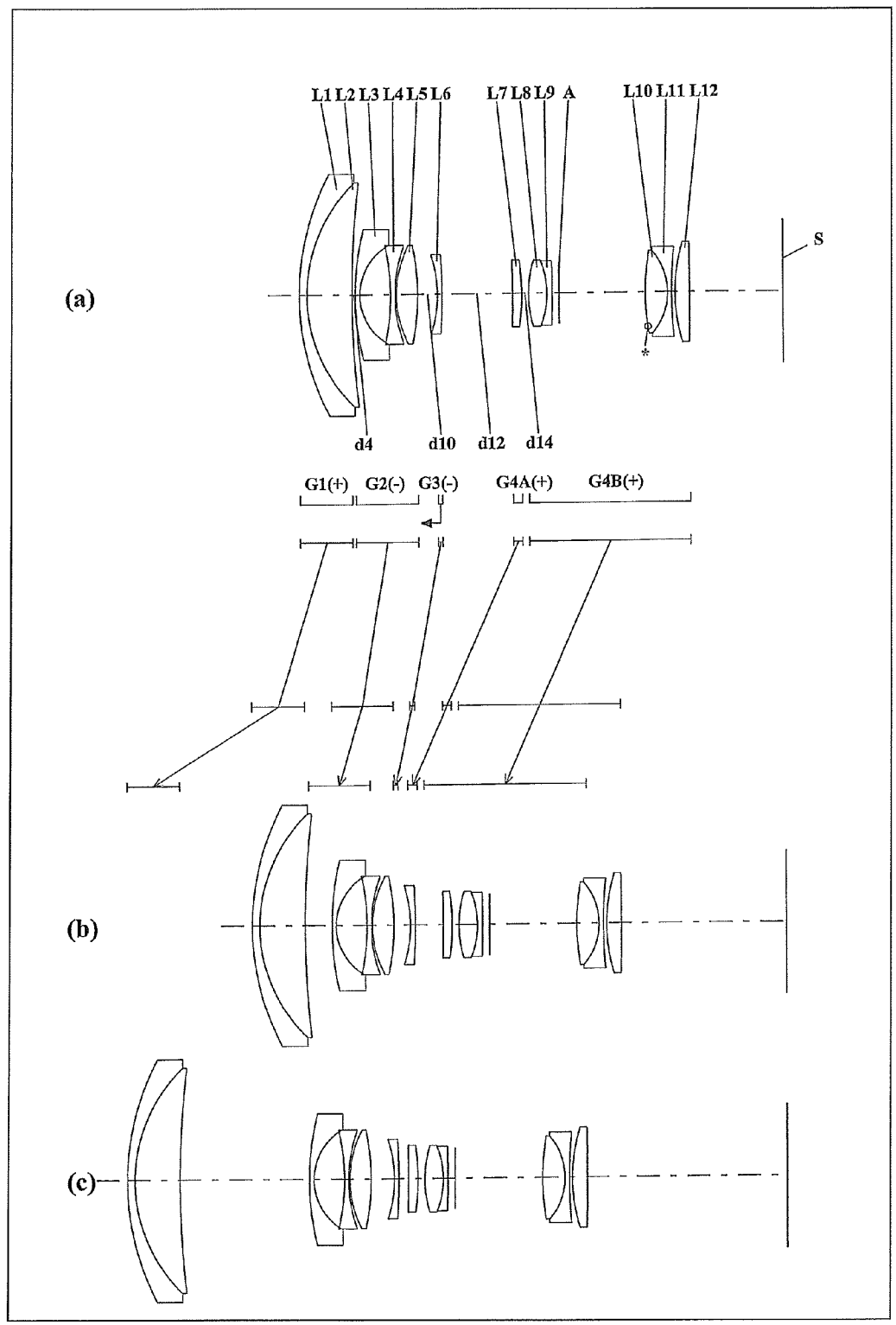
FIG. 13 is a lens arrangement diagram showing an infinity in-focus condition of a zoom lens system according to Embodiment 4 (Example 4)
Figure 14:
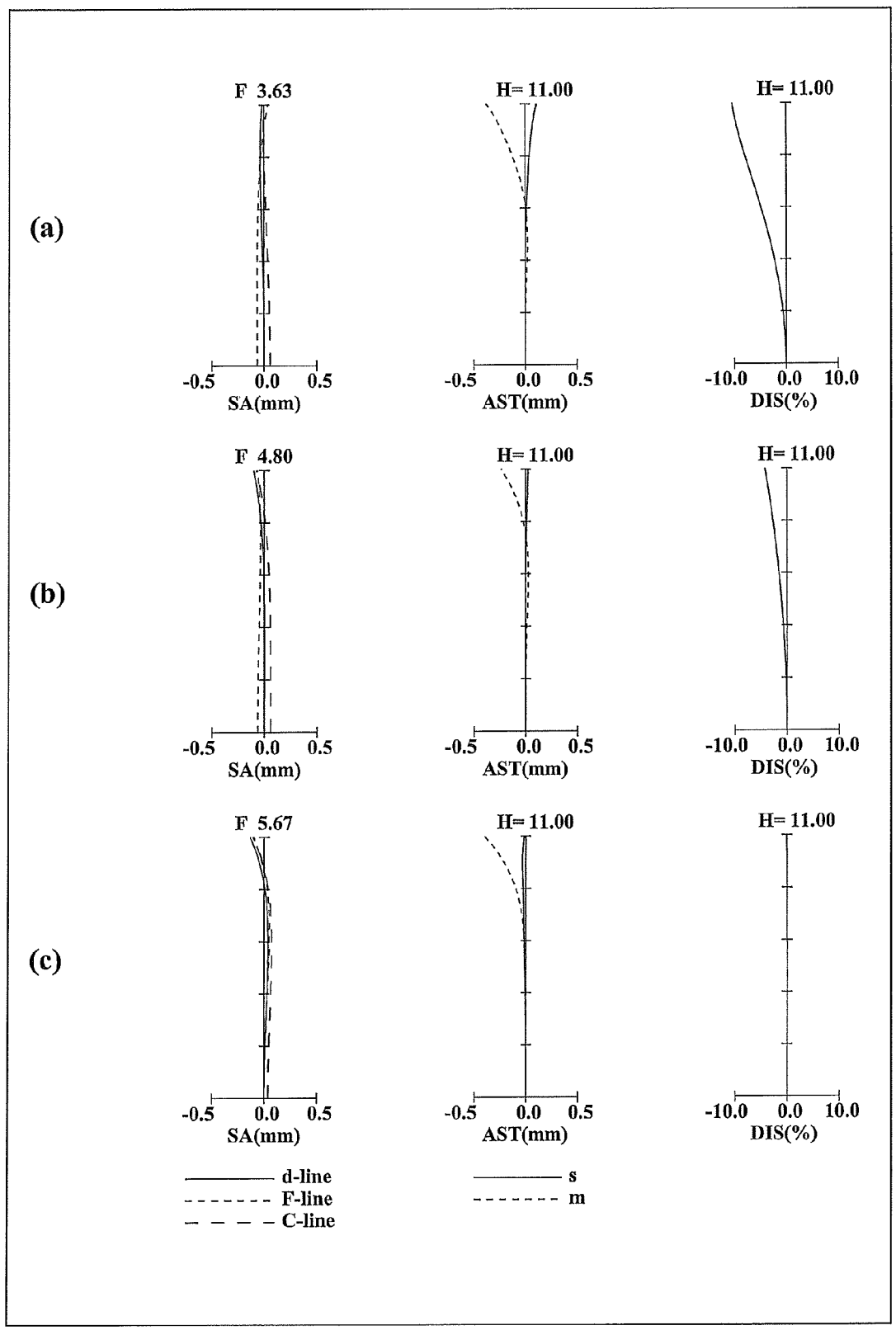
FIG. 14 is a longitudinal aberration diagram showing an infinity in-focus condition of a zoom lens system according to Example 4.
Figure 15:
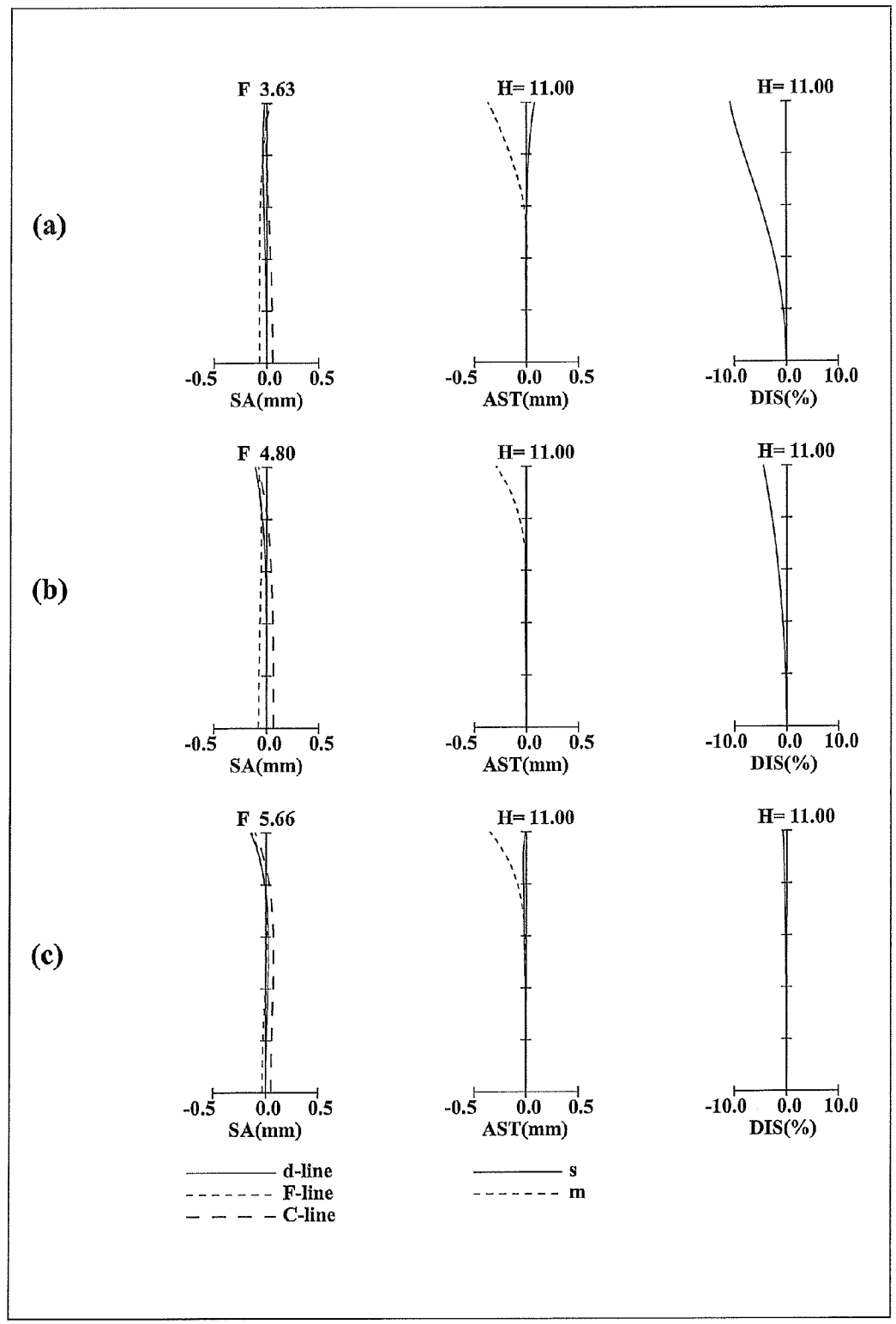
FIG. 15 is a longitudinal aberration diagram showing a close-point in-focus condition of a zoom lens system according to Example 4.
Figure 16:
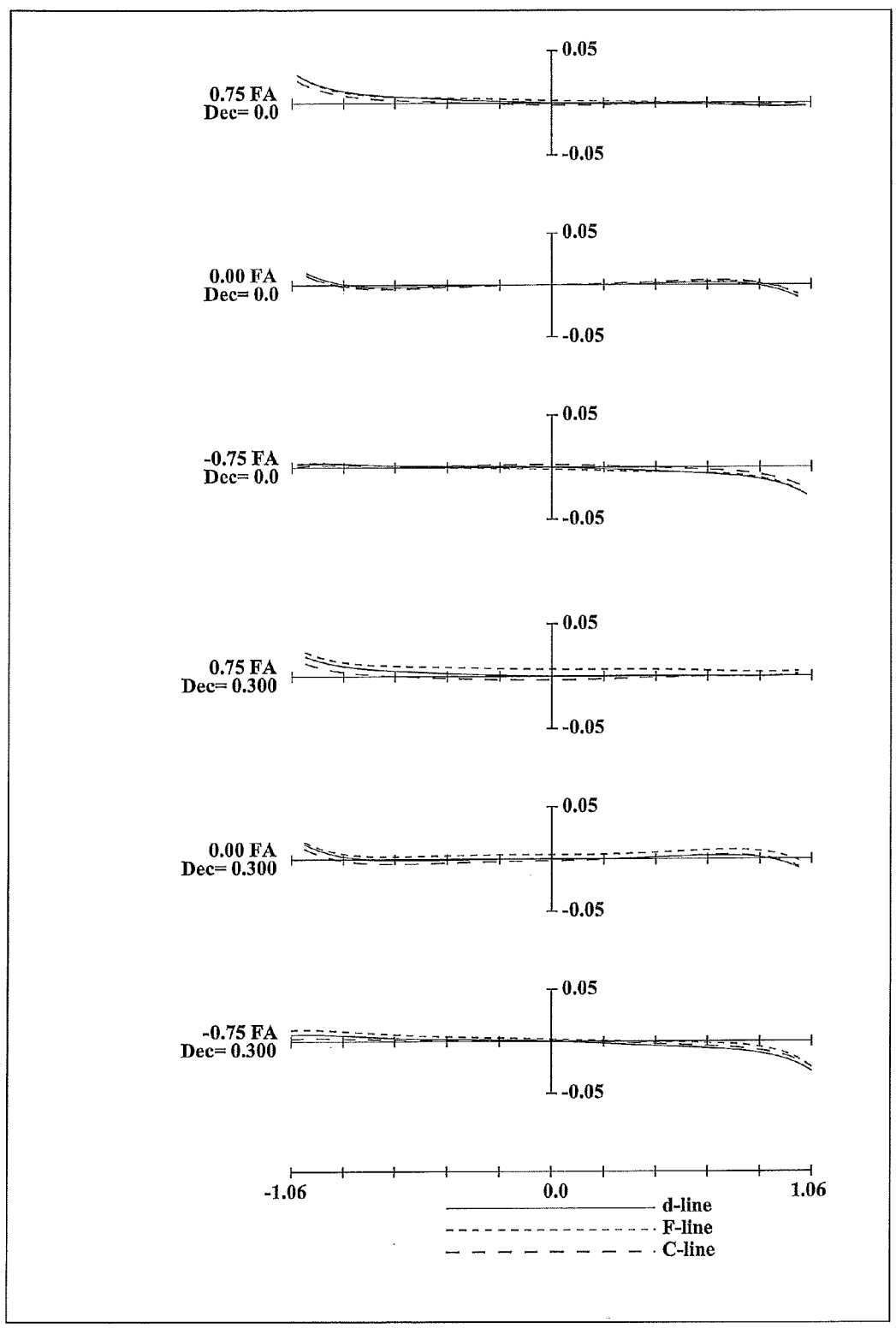
FIG. 16 is a lateral aberration diagram in a basic state where image blur compensation is not performed and in an image blur compensation state at a telephoto limit of a zoom lens system according to Example 4.

The zoom lens system of Numerical Example 4 corresponds to Embodiment 4 shown in FIG. 13. Table 14 shows the surface data of the zoom lens system of Numerical Example 4. Table 15 shows the aspherical data. Table 16 shows various data. Table 17 shows the zoom lens unit data.

TABLE 14

(surface data)

| Surface number | r | d | nd | vd |
|---|---|---|---|---|
| Object surface | ∞ | | | |
| 1 | 41.58720 | 1.20000 | 1.84666 | 23.8 |
| 2 | 24.98410 | 0.01000 | 1.56732 | 42.8 |
| 3 | 24.98410 | 7.27960 | 1.80420 | 46.5 |
| 4 | 148.93230 | Variable | | |
| 5 | 44.23380 | 0.70000 | 1.90366 | 31.3 |
| 6 | 9.20050 | 4.94480 | | |
| 7 | −35.03150 | 0.70000 | 1.80420 | 46.5 |
| 8 | 22.98100 | 0.18430 | | |
| 9 | 17.02960 | 3.41510 | 1.92286 | 20.9 |
| 10 | −37.71140 | Variable | | |
| 11 | −20.25230 | 0.70000 | 1.82386 | 32.0 |
| 12 | −105.30170 | Variable | | |
| 13 | −196.54500 | 1.44540 | 1.80420 | 46.5 |
| 14 | −38.60810 | 1.10000 | | |
| 15 | 18.40860 | 2.93490 | 1.74400 | 44.9 |
| 16 | −14.22720 | 0.01000 | 1.56732 | 42.8 |
| 17 | −14.22720 | 0.81380 | 1.84666 | 23.8 |

TABLE 14-continued (surface data)

| Surface number | r | d | nd | vd |
|---|---|---|---|---|
| 18 | −161.45670 | 1.10000 | | |
| 19 | ∞ | 13.89740 | | |
| (Aperture) | | | | |
| 20* | 33.37530 | 3.56480 | 1.51443 | 63.3 |
| 21 | −10.14430 | 0.01000 | 1.56732 | 42.8 |
| 22 | −10.14430 | 0.70000 | 1.80610 | 33.3 |
| 23 | 75.47740 | 0.50910 | | |
| 24 | 27.51340 | 2.37520 | 1.84666 | 23.8 |
| 25 | −500.00000 | BF | | |
| Image surface | ∞ | | | |

TABLE 15

(aspherical data)

| Surface No. | Parameters |
|---|---|
| 20 | K = 0.00000E+00, A4 = −4.64962E−05, A6 = −1.26354E−07, A8 = 7.29053E−09, A10 = −1.62407E−10 |

TABLE 16

(various data)

Zooming ratio 3.03421

| | Wide | Middle | Telephoto |
|---|---|---|---|
| Focal length | 14.4002 | 25.0830 | 43.6932 |
| F-number | 3.62531 | 4.79832 | 5.66523 |
| View angle | 40.4543 | 24.6084 | 14.1553 |
| Image height | 11.0000 | 11.0000 | 11.0000 |
| Overall length of lens system | 77.7025 | 85.6771 | 105.7196 |
| BF | 15.06999 | 26.58189 | 32.15024 |
| d4 | 0.5400 | 4.3311 | 20.6494 |
| d10 | 3.1685 | 2.6924 | 3.7256 |
| d12 | 11.3296 | 4.4773 | 1.6000 |

TABLE 17

(zoom lens unit data)

| Unit | Initial surface No. | Focal length |
|---|---|---|
| 1 | 1 | 72.67423 |
| 2 | 5 | −24.38947 |
| 3 | 11 | −30.54929 |
| 4 | 13 | 18.36280 |

Numerical Example 5

Figure 17:
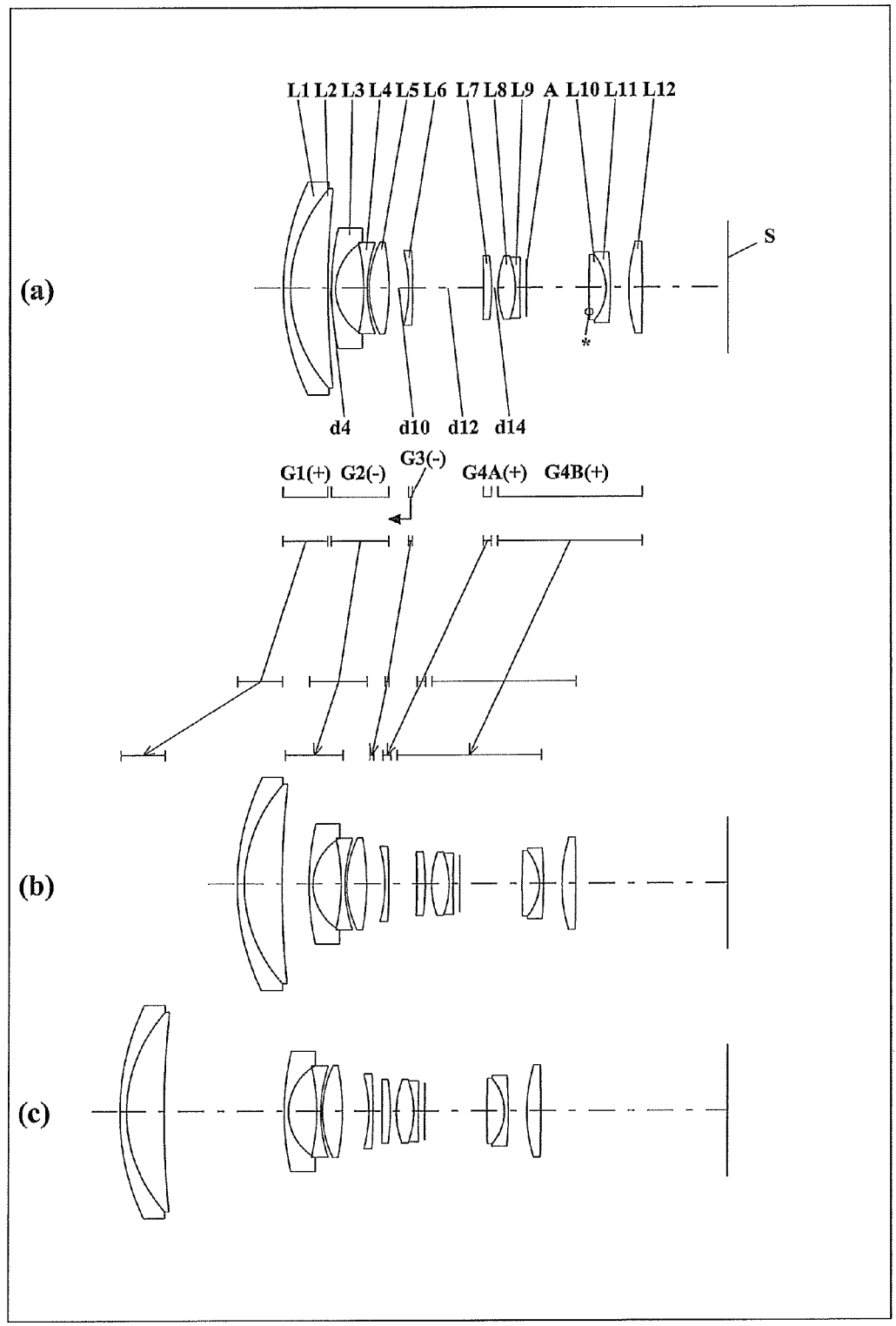
FIG. 17 is a lens arrangement diagram showing an infinity in-focus condition of a zoom lens system according to Embodiment 5 (Example 5)
Figure 18:
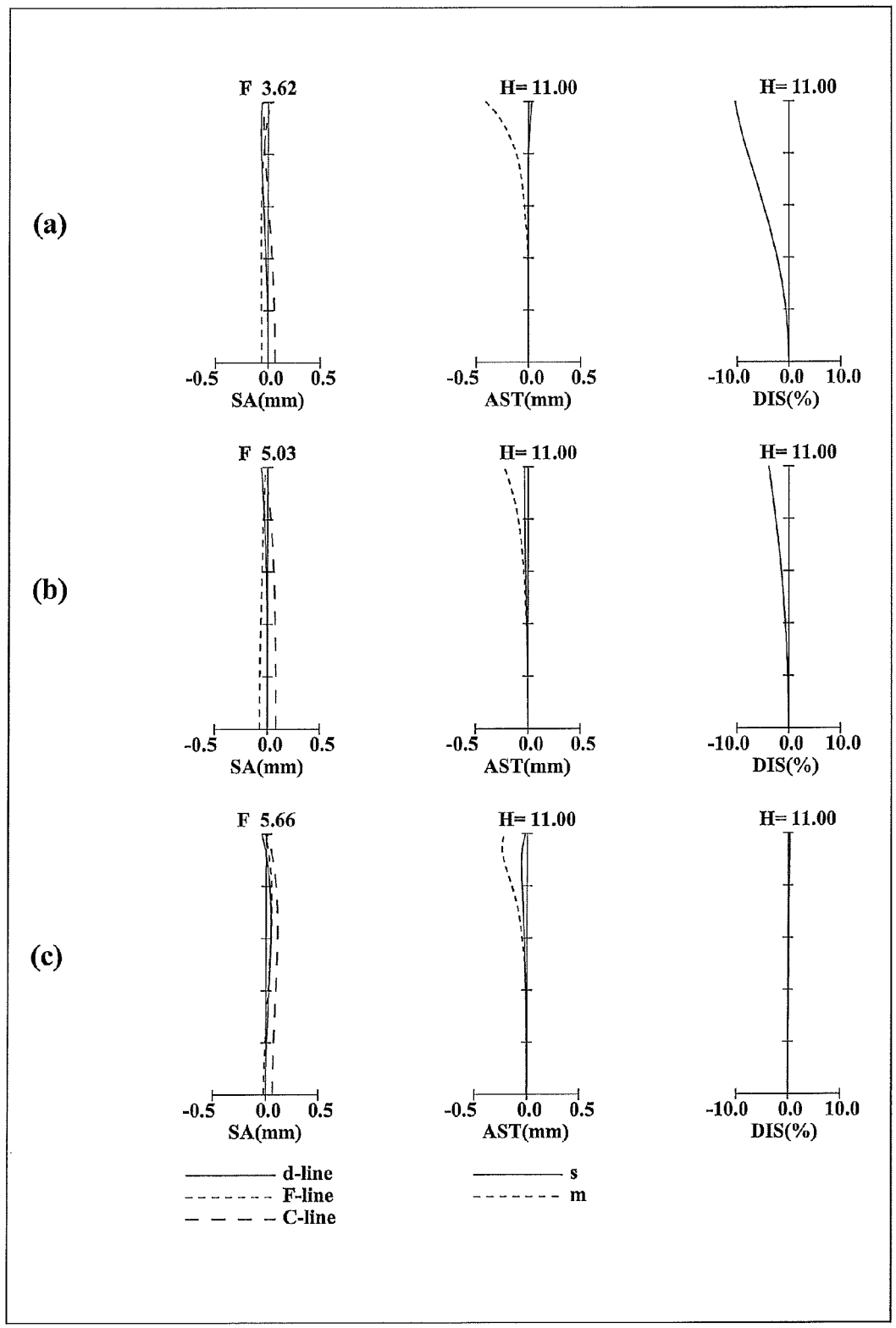
FIG. 18 is a longitudinal aberration diagram showing an infinity in-focus condition of a zoom lens system according to Example 5.
Figure 19:
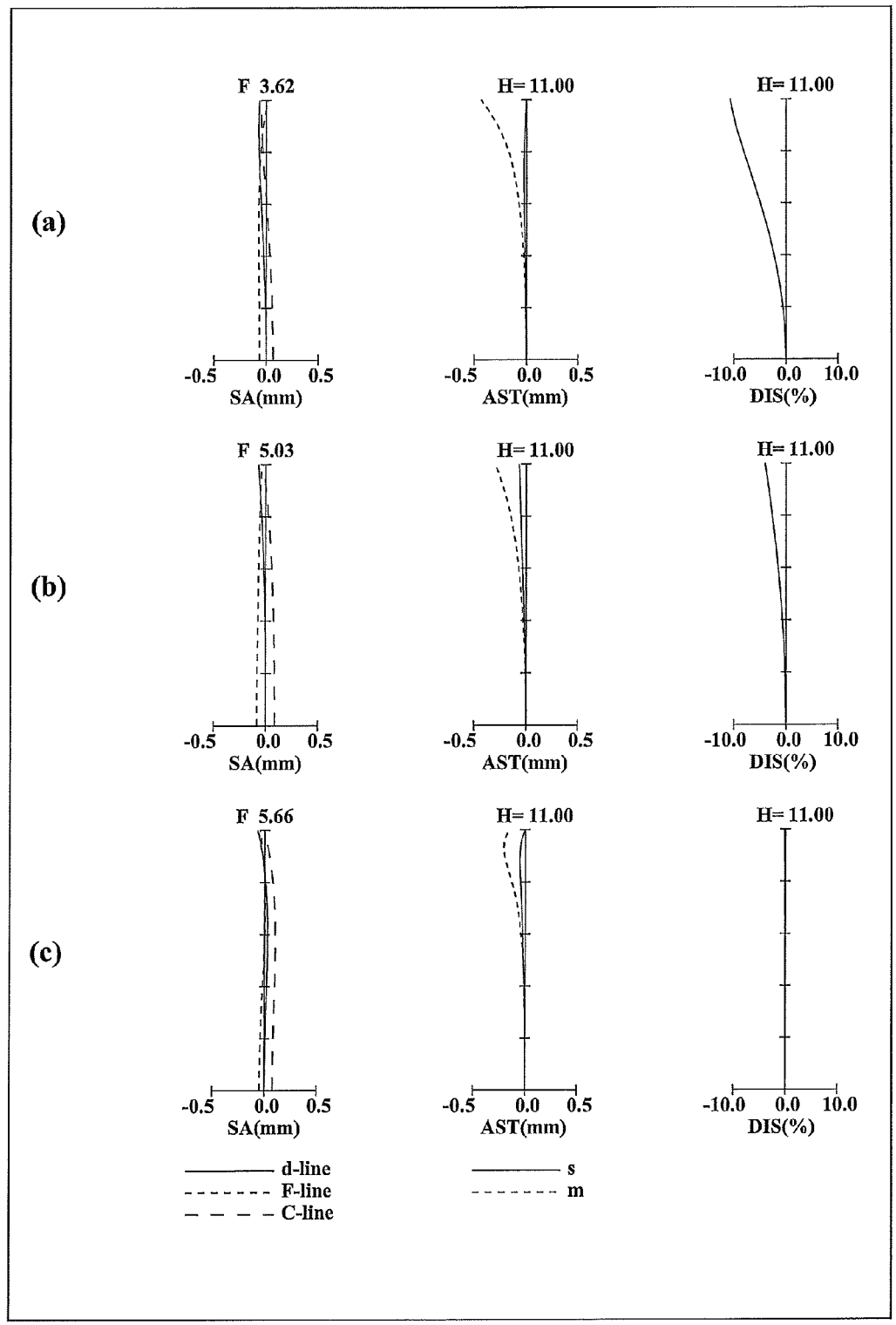
FIG. 19 is a longitudinal aberration diagram showing a close-point in-focus condition of a zoom lens system according to Example 5.
Figure 20:
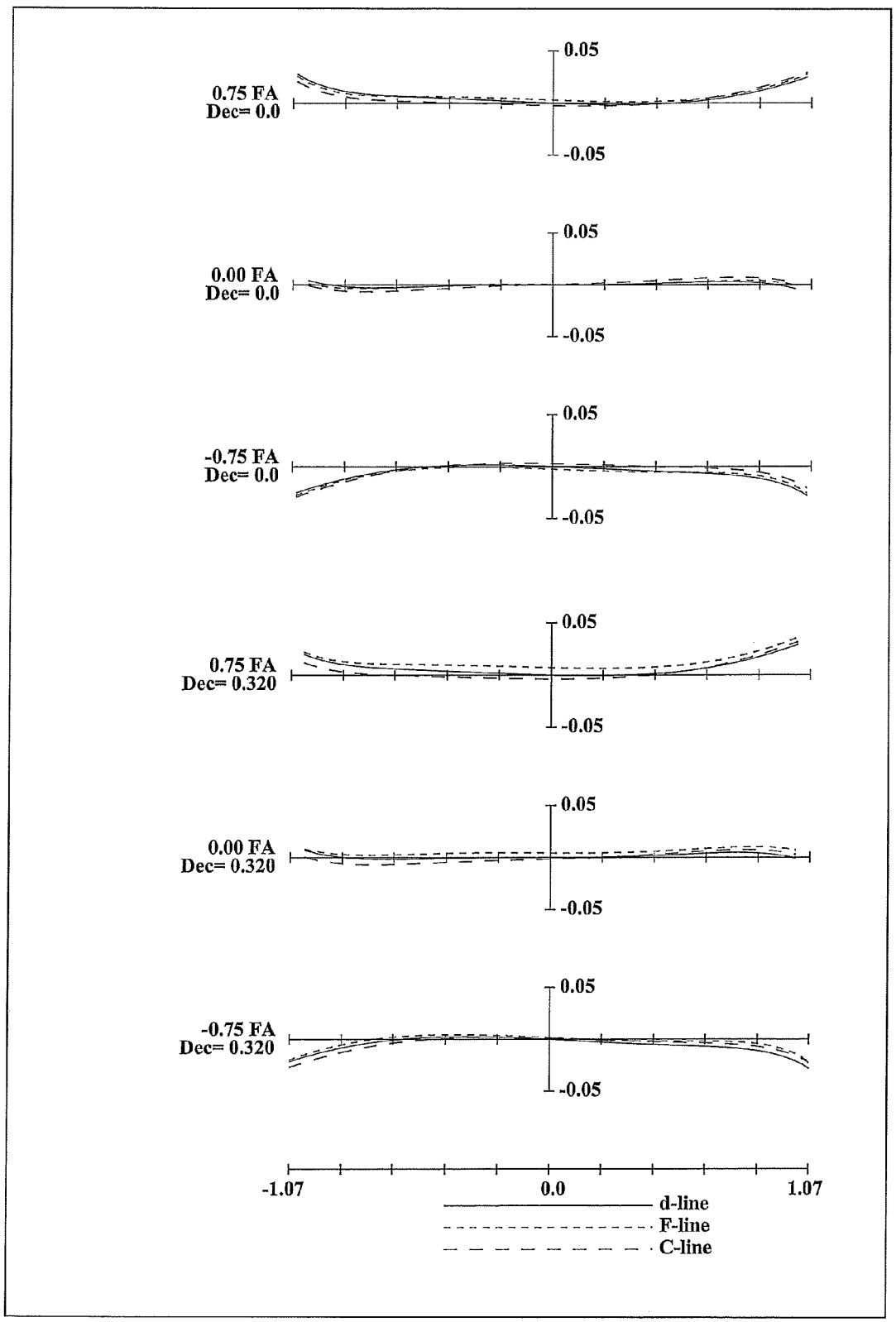
FIG. 20 is a lateral aberration diagram in a basic state where image blur compensation is not performed and in an image blur compensation state at a telephoto limit of a zoom lens system according to Example 5.

The zoom lens system of Numerical Example 5 corresponds to Embodiment 5 shown in FIG. 17. Table 18 shows the surface data of the zoom lens system of Numerical Example 5. Table 19 shows the aspherical data. Table 20 shows various data. Table 21 shows the zoom lens unit data.

TABLE 18

(surface data)

| Surface number | r | d | nd | vd |
|---|---|---|---|---|
| Object surface | ∞ | | | |
| 1 | 42.96070 | 1.20000 | 1.84666 | 23.8 |
| 2 | 25.92060 | 0.01000 | 1.56732 | 42.8 |
| 3 | 25.92060 | 6.55090 | 1.80420 | 46.5 |
| 4 | 169.01970 | Variable | | |
| 5 | 48.51820 | 0.70000 | 1.90366 | 31.3 |
| 6 | 9.29630 | 4.91560 | | |
| 7 | −35.68210 | 0.70000 | 1.80420 | 46.5 |
| 8 | 24.70060 | 0.29410 | | |
| 9 | 18.12650 | 3.49270 | 1.92286 | 20.9 |
| 10 | −42.04300 | Variable | | |
| 11 | −24.12750 | 0.70000 | 1.80610 | 33.3 |
| 12 | −126.46290 | Variable | | |
| 13 | −199.24170 | 1.43970 | 1.80420 | 46.5 |
| 14 | −41.67830 | 1.10000 | | |
| 15 | 16.18500 | 3.04630 | 1.78590 | 43.9 |
| 16 | −15.20920 | 0.01000 | 1.56732 | 42.8 |
| 17 | −15.20920 | 0.71710 | 1.84666 | 23.8 |
| 18 | 190.44830 | 1.15620 | | |
| 19 | ∞ | 10.81490 | | |
| (Aperture) | | | | |
| 20* | 104.94440 | 3.00310 | 1.51443 | 63.3 |
| 21 | −8.88270 | 0.01000 | 1.56732 | 42.8 |
| 22 | −8.88270 | 0.70000 | 1.80420 | 46.5 |
| 23 | −78.31910 | 3.20510 | | |
| 24 | 26.91780 | 2.38950 | 1.54814 | 45.8 |
| 25 | −500.00000 | BF | | |
| Image surface | ∞ | | | |

TABLE 19

(aspherical data)

| Surface No. | Parameters |
|---|---|
| 20 | K = 0.00000E+00, A4 = −6.89162E−05, A6 = −1.16507E−07, A8 = −1.02112E−08, A10 = 3.91677E−11 |

TABLE 20

(various data)

Zooming ratio 3.01481

| | Wide | Middle | Telephoto |
|---|---|---|---|
| Focal length | 14.4010 | 25.0043 | 43.4164 |
| F-number | 3.62104 | 5.03037 | 5.66149 |
| View angle | 40.4482 | 24.5894 | 14.1746 |
| Image height | 11.0000 | 11.0000 | 11.0000 |
| Overall length of lens system | 77.5984 | 85.4062 | 105.7130 |
| BF | 15.06783 | 26.51298 | 32.51998 |
| d4 | 0.6229 | 4.6469 | 20.7822 |
| d10 | 3.4652 | 3.1732 | 4.6556 |
| d12 | 12.2873 | 4.9179 | 1.6000 |

TABLE 21

(zoom lens unit data)

| Unit | Initial surface No. | Focal length |
|---|---|---|
| 1 | 1 | 72.96184 |
| 2 | 5 | −22.11132 |
| 3 | 11 | −37.10127 |
| 4 | 13 | 19.15115 |

Numerical Example 6

Figure 21:
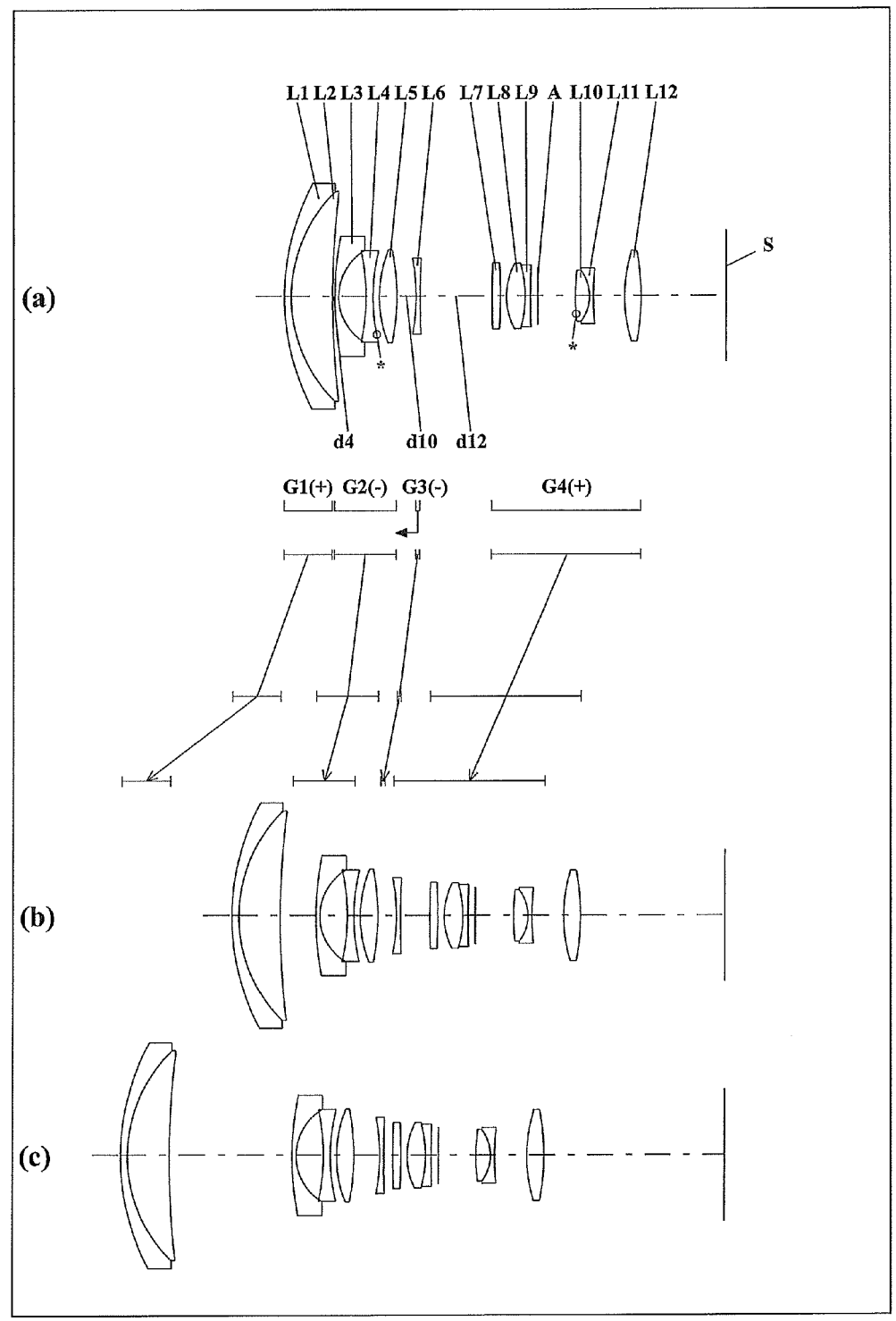
FIG. 21 is a lens arrangement diagram showing an infinity in-focus condition of a zoom lens system according to Embodiment 6 (Example 6)
Figure 22:
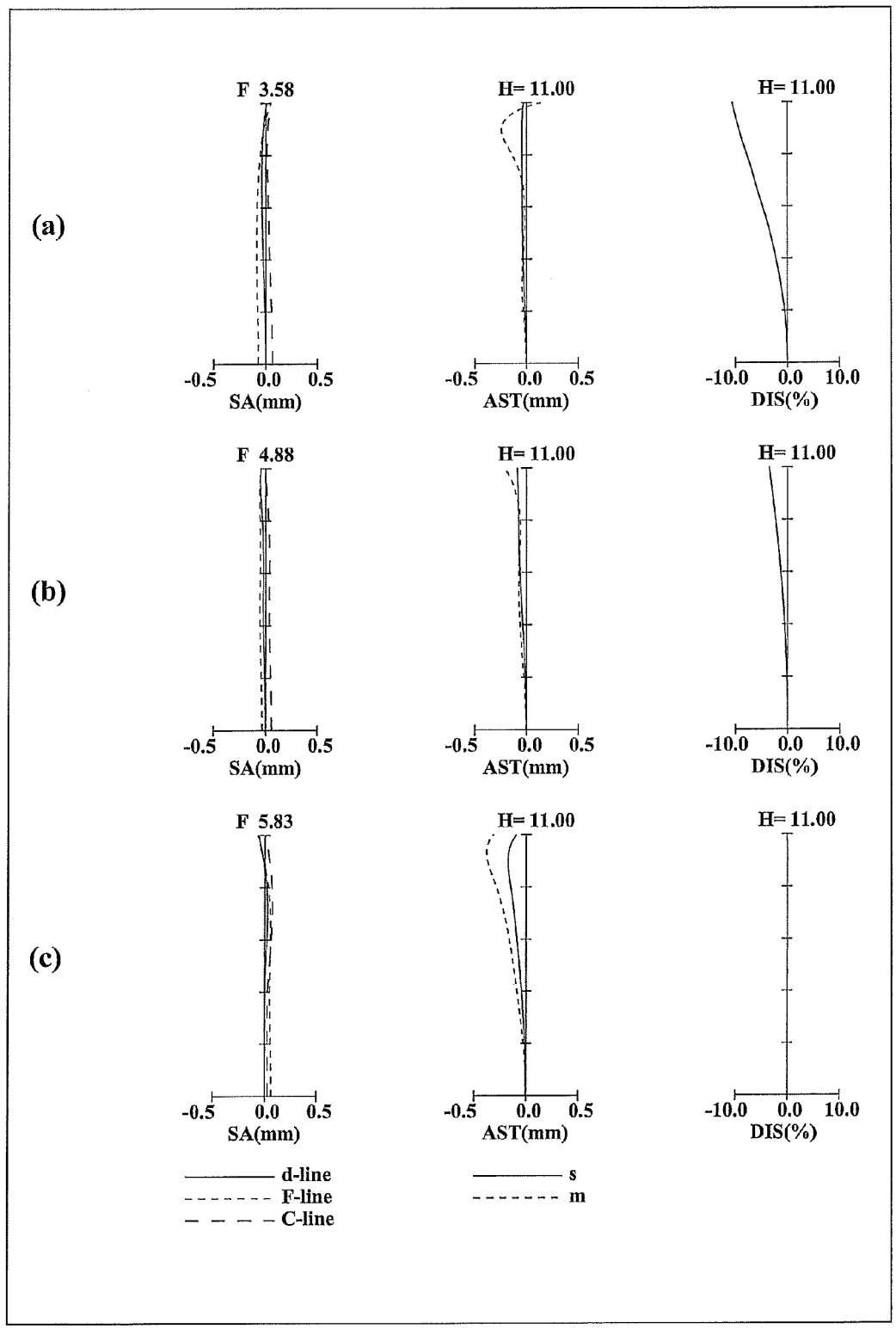
FIG. 22 is a longitudinal aberration diagram showing an infinity in-focus condition of a zoom lens system according to Example 6.
Figure 23:
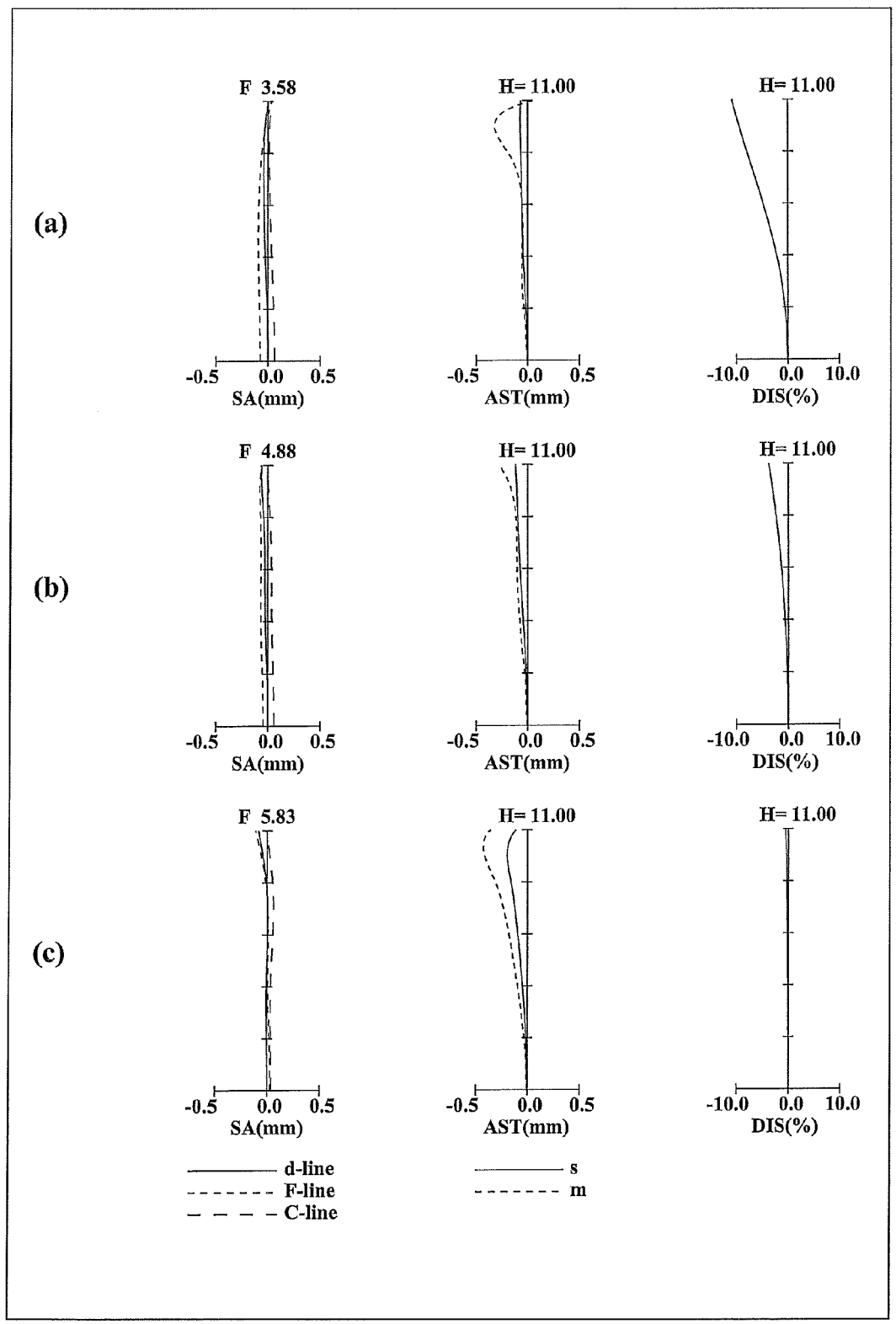
FIG. 23 is a longitudinal aberration diagram showing a close-point in-focus condition of a zoom lens system according to Example 6.
Figure 24:
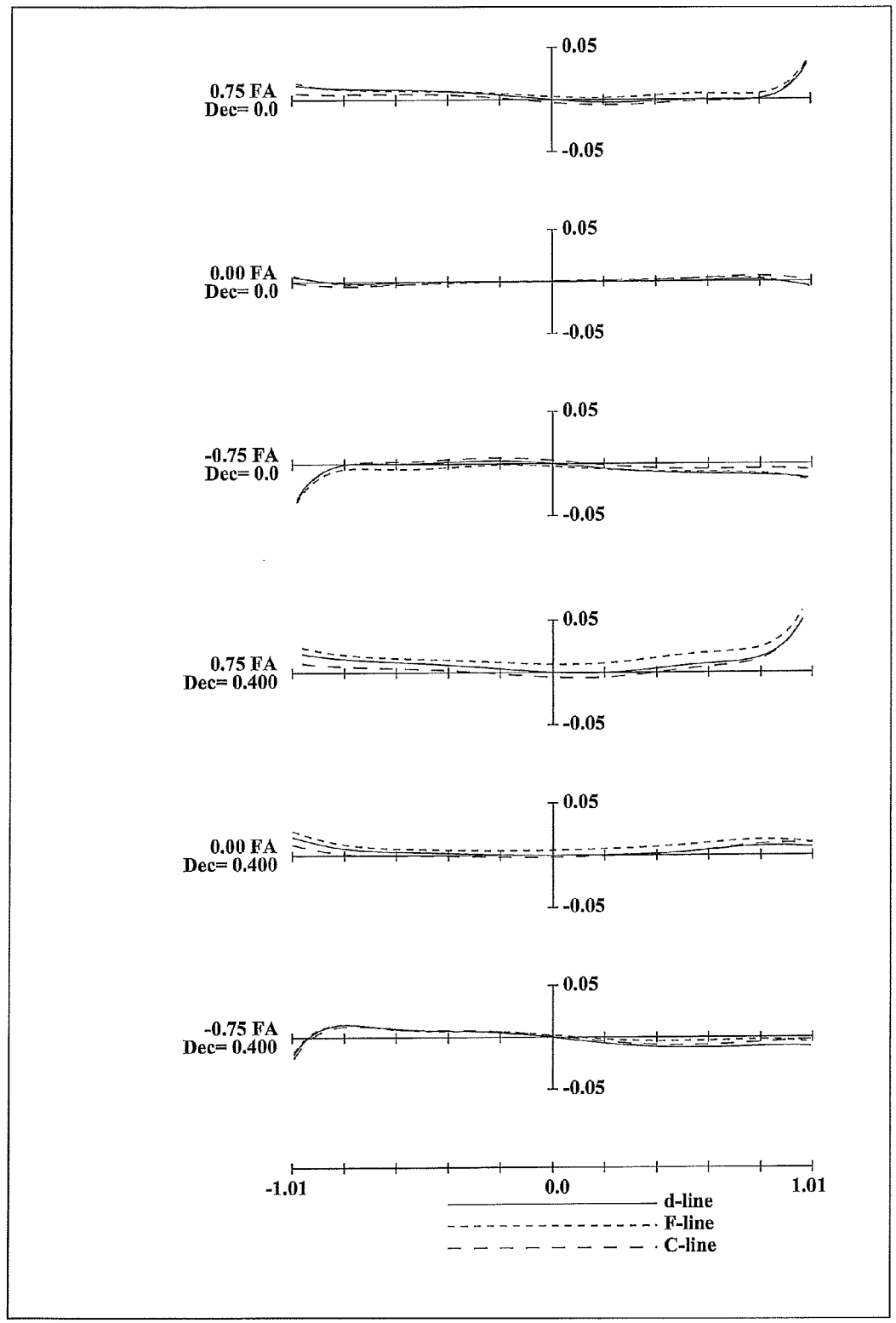
FIG. 24 is a lateral aberration diagram in a basic state where image blur compensation is not performed and in an image blur compensation state at a telephoto limit of a zoom lens system according to Example 6.

The zoom lens system of Numerical Example 6 corresponds to Embodiment 6 shown in FIG. 21. Table 22 shows the surface data of the zoom lens system of Numerical Example 6. Table 23 shows the aspherical data. Table 24 shows various data. Table 25 shows the zoom lens unit data.

TABLE 22

(surface data)

| Surface number | r | d | nd | vd |
|---|---|---|---|---|
| Object surface | ∞ | | | |
| 1 | 42.07080 | 1.20000 | 1.84666 | 23.8 |
| 2 | 25.79060 | 0.01000 | 1.56732 | 42.8 |
| 3 | 25.79060 | 7.28790 | 1.80420 | 46.5 |
| 4 | 149.71930 | Variable | | |
| 5 | 53.82100 | 0.70000 | 1.90366 | 31.3 |
| 6 | 9.38730 | 4.85820 | | |
| 7 | −37.12600 | 1.20000 | 1.80470 | 41.0 |
| 8* | 32.30060 | 1.13550 | | |
| 9 | 21.79130 | 3.07180 | 1.92286 | 20.9 |
| 10 | −42.23590 | Variable | | |
| 11 | −35.48460 | 0.70000 | 1.80610 | 33.3 |
| 12 | 145.22990 | Variable | | |
| 13 | 150.96840 | 1.40280 | 1.80420 | 46.5 |
| 14 | −112.84260 | 1.10000 | | |
| 15 | 12.62530 | 3.20010 | 1.74330 | 49.2 |
| 16 | −21.40160 | 0.01000 | 1.56732 | 42.8 |
| 17 | −21.40160 | 0.92210 | 1.84666 | 23.8 |
| 18 | 149.23410 | 1.27460 | | |
| 19 (Aperture) | ∞ | 6.54640 | | |
| 20* | 29.12070 | 2.50410 | 1.51443 | 63.3 |
| 21 | −7.46520 | 0.01000 | 1.56732 | 42.8 |
| 22 | −7.46520 | 0.70000 | 1.80420 | 46.5 |
| 23 | 48.76610 | 5.51350 | | |
| 24 | 26.79300 | 2.94610 | 1.48749 | 70.4 |
| 25 | −43.27020 | BF | | |
| Image surface | ∞ | | | |

TABLE 23

(aspherical data)

| Surface No. | Parameters |
|---|---|
| 8 | K = 0.00000E+00, A4 = −6.79186E−06, A6 = 2.75874E−07, A8 = −8.27389E−09, A10 = 6.56929E−11 |
| 20 | K = 0.00000E+00, A4 = −1.25292E−04, A6 = −3.82479E−06, A8 = 3.46565E−07, A10 = −1.23309E−08 |

TABLE 24

(various data)

| Zooming ratio | 3.02778 | | |
|---|---|---|---|
| | Wide | Middle | Telephoto |
| Focal length | 14.4201 | 25.0932 | 43.6607 |
| F-number | 3.58227 | 4.87586 | 5.83037 |
| View angle | 40.4947 | 24.4473 | 14.1473 |
| Image height | 11.0000 | 11.0000 | 11.0000 |
| Overall length of lens system | 77.5939 | 86.5453 | 105.7177 |
| BF | 15.06249 | 25.57110 | 31.85013 |
| d4 | 0.4000 | 6.3000 | 21.4205 |
| d10 | 3.3746 | 3.2765 | 4.5540 |
| d12 | 12.4637 | 5.1046 | 1.6000 |

TABLE 25

(zoom lens unit data)

| Unit | Initial surface No. | Focal length |
|---|---|---|
| 1 | 1 | 73.53054 |
| 2 | 5 | −25.93488 |
| 3 | 11 | −35.31538 |
| 4 | 13 | 19.55654 |

Numerical Example 7

Figure 25:
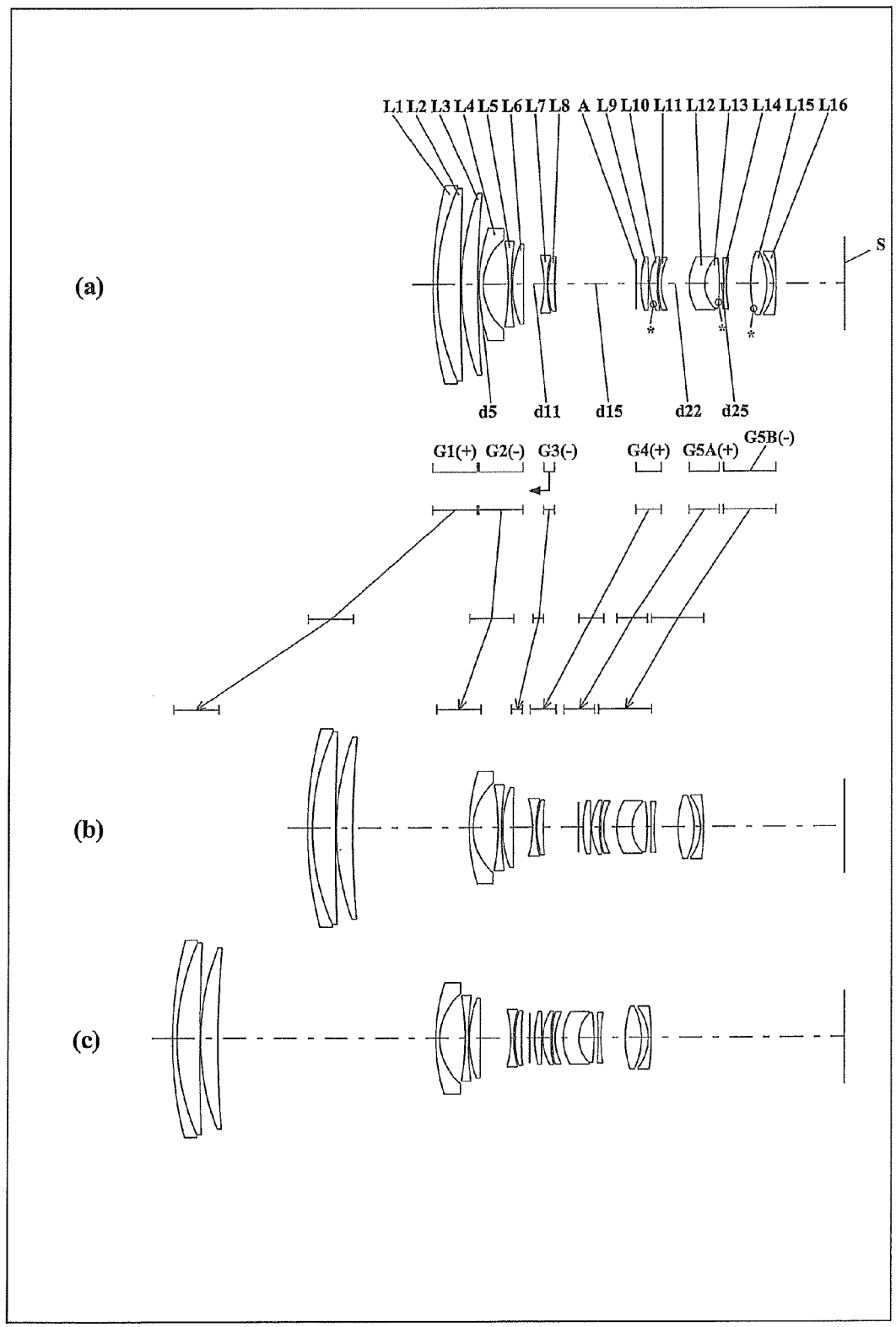
FIG. 25 is a lens arrangement diagram showing an infinity in-focus condition of a zoom lens system according to Embodiment 7 (Example 7)
Figure 26:
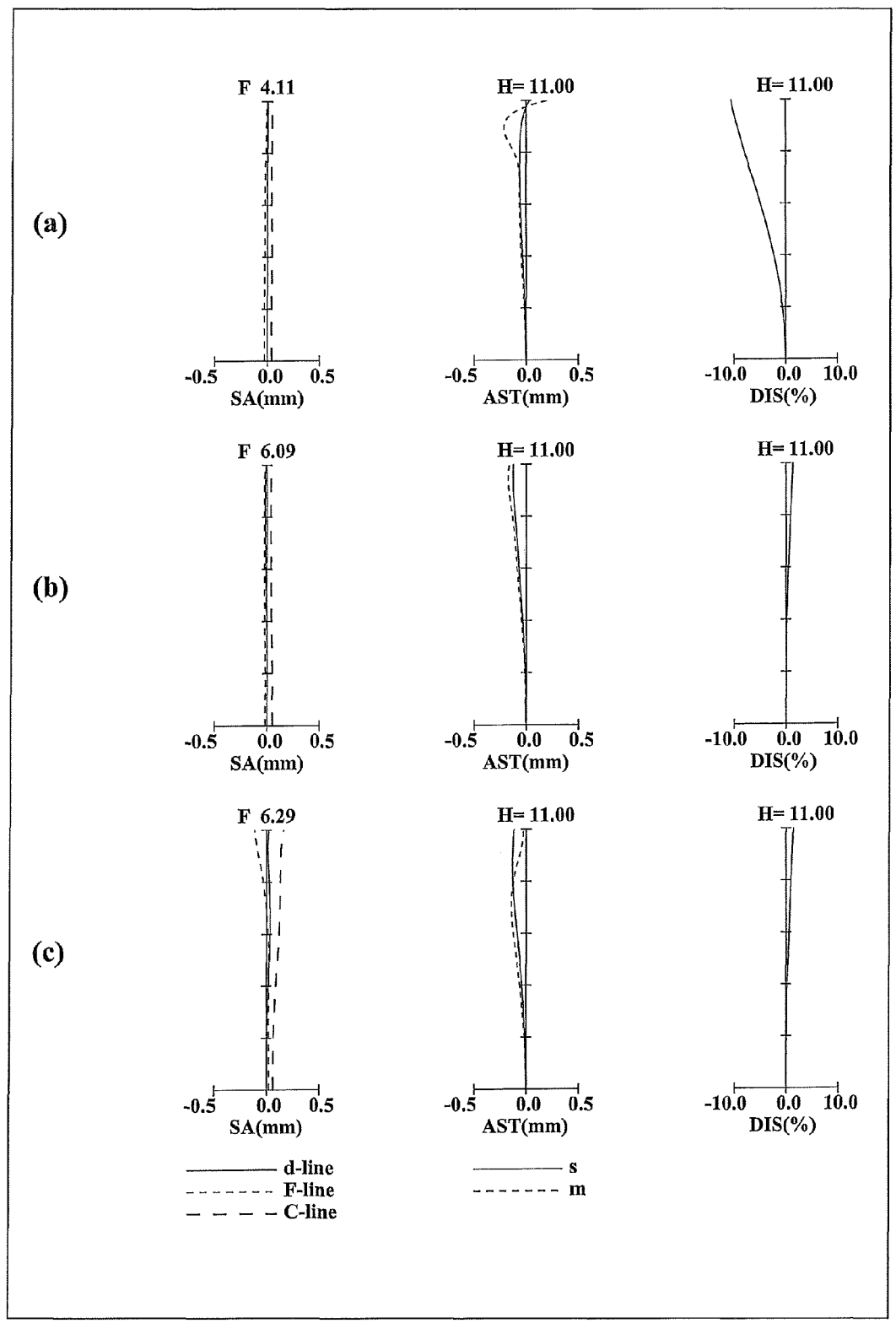
FIG. 26 is a longitudinal aberration diagram showing an infinity in-focus condition of a zoom lens system according to Example 7.
Figure 27:
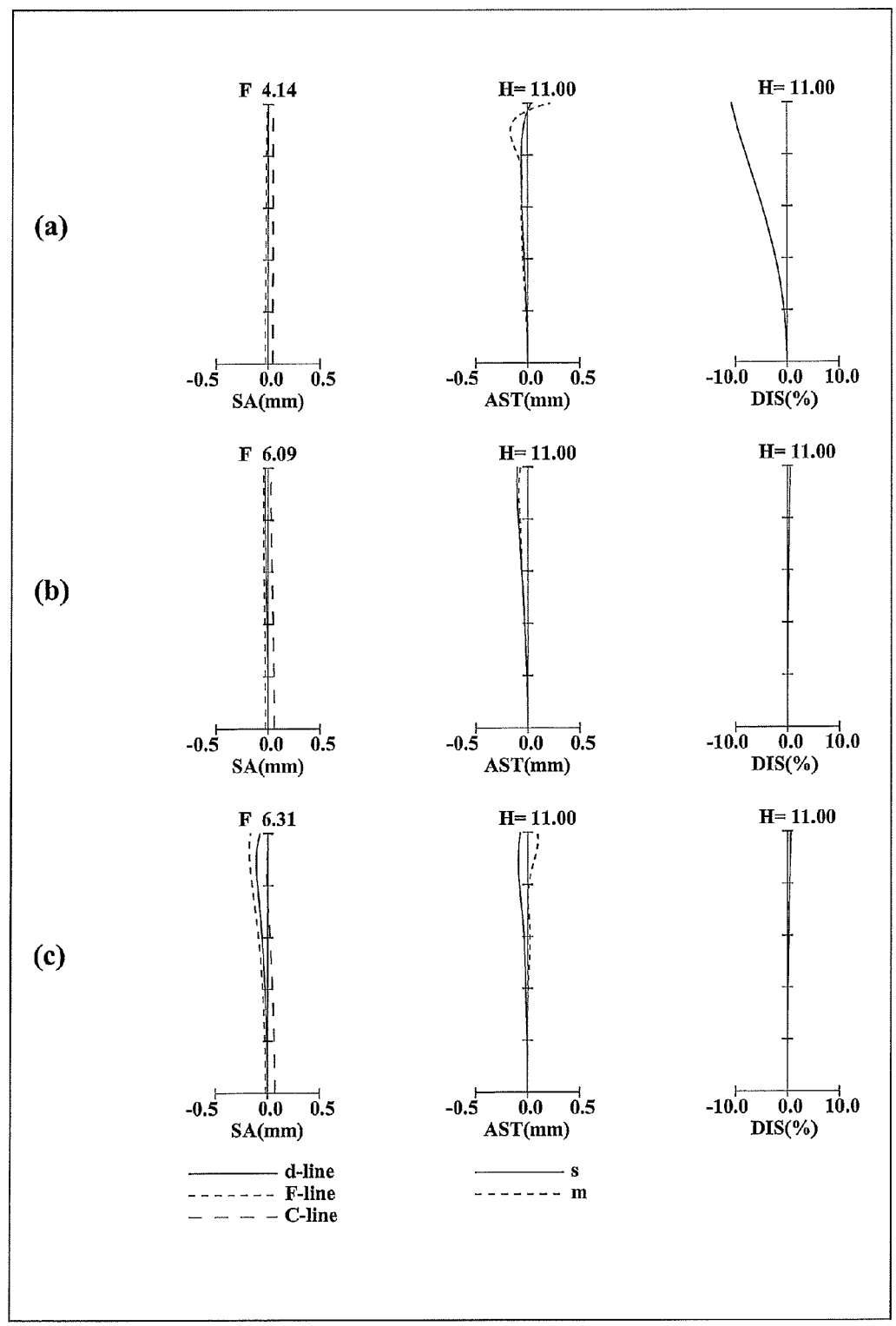
FIG. 27 is a longitudinal aberration diagram showing a close-point in-focus condition of a zoom lens system according to Example 7.
Figure 28:
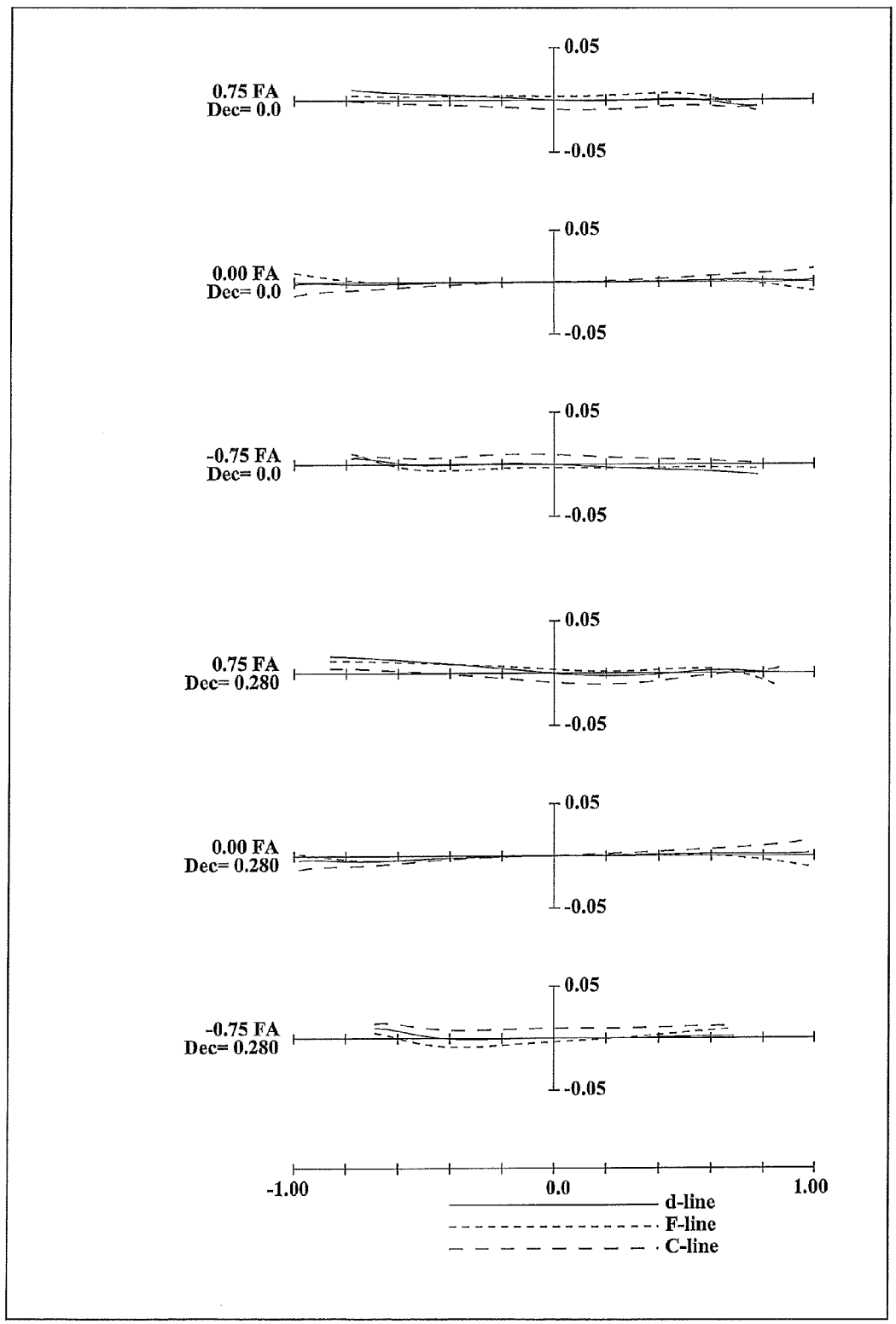
FIG. 28 is a lateral aberration diagram in a basic state where image blur compensation is not performed and in an image blur compensation state at a telephoto limit of a zoom lens system according to Example 7.

The zoom lens system of Numerical Example 7 corresponds to Embodiment 7 shown in FIG. 25. Table 26 shows the surface data of the zoom lens system of Numerical Example 7. Table 27 shows the aspherical data. Table 28 shows various data. Table 29 shows the zoom lens unit data.

TABLE 26

(surface data)

| Surface number | r | d | nd | vd |
|---|---|---|---|---|
| Object surface | ∞ | | | |
| 1 | 97.18260 | 1.20000 | 1.84666 | 23.8 |
| 2 | 59.22040 | 5.64620 | 1.49700 | 81.6 |
| 3 | 623.98800 | 0.20000 | | |
| 4 | 64.74630 | 4.11060 | 1.72916 | 54.7 |
| 5 | 257.04630 | Variable | | |
| 6 | 44.95400 | 1.00000 | 1.88300 | 40.8 |
| 7 | 14.89470 | 6.11710 | | |
| 8 | −65.21500 | 0.80000 | 1.83481 | 42.7 |
| 9 | 79.27340 | 0.30000 | | |
| 10 | 27.37660 | 2.66150 | 1.92286 | 18.9 |
| 11 | 975.15220 | Variable | | |
| 12 | −25.99020 | 0.70000 | 1.83481 | 42.7 |
| 13 | 25.72820 | 0.30000 | | |
| 14 | 24.64350 | 1.58960 | 1.84666 | 23.8 |
| 15 | 83.01740 | Variable | | |
| 16 (Aperture) | ∞ | 1.17000 | | |
| 17 | 27.09090 | 1.74340 | 1.62299 | 58.1 |
| 18 | −241.48760 | 0.30000 | | |
| 19* | 12.93580 | 1.93840 | 1.48749 | 70.4 |
| 20 | 33.46510 | 0.30000 | | |
| 21 | 28.94950 | 0.70000 | 1.83400 | 37.3 |
| 22 | 14.51370 | Variable | | |
| 23 | 13.46950 | 3.82840 | 1.84666 | 23.8 |
| 24 | 8.75400 | 3.67160 | 1.51760 | 63.5 |
| 25* | −42.54940 | 1.00000 | | |
| 26 | −113.24540 | 0.70000 | 1.84666 | 23.8 |
| 27 | 37.31110 | 5.96160 | | |
| 28* | 27.61410 | 4.00480 | 1.68893 | 31.1 |
| 29 | −18.37350 | 1.65420 | | |
| 30 | −12.35470 | 0.70000 | 1.83481 | 42.7 |
| 31 | −66.88770 | BF | | |
| Image surface | ∞ | | | |

TABLE 27

(aspherical data)

| Surface No. | Parameters |
|---|---|
| 19 | K = 0.00000E+00, A4 = −2.54373E−05, A6 = −4.36871E−09, A8 = −1.59208E−09, A10 = 0.00000E+00 |
| 25 | K = 0.00000E+00, A4 = 5.90621E−05, A6 = 1.10756E−07, A8 = −7.79429E−09, A10 = 8.72488E−11 |
| 28 | K = 0.00000E+00, A4 = 2.57689E−05, A6 = 8.95676E−08, A8 = 8.00095E−10, A10 = 2.23671E−11 |

TABLE 28

(various data)

| Zooming ratio | | 10.01328 | |
|---|---|---|---|
| | Wide | Middle | Telephoto |
| Focal length | 14.4802 | 47.0012 | 144.9939 |
| F-number | 4.10714 | 6.08617 | 6.29290 |
| View angle | 40.3350 | 13.0043 | 4.2787 |
| Image height | 11.0000 | 11.0000 | 11.0000 |
| Overall length of lens system | 101.5678 | 132.1204 | 165.0546 |
| BF | 16.86766 | 34.71640 | 47.67448 |
| d5 | 0.3000 | 28.6184 | 53.5827 |
| d11 | 5.0309 | 4.6988 | 7.5000 |
| d15 | 20.1091 | 8.5806 | 2.0000 |
| d22 | 6.9627 | 3.2088 | 2.0000 |

TABLE 29

(zoom lens unit data)

| Unit | Initial surface No. | Focal length |
|---|---|---|
| 1 | 1 | 95.87909 |
| 2 | 6 | −38.06367 |
| 3 | 12 | −24.81420 |
| 4 | 16 | 38.91764 |
| 5 | 23 | 35.37675 |

Numerical Example 8

Figure 29:
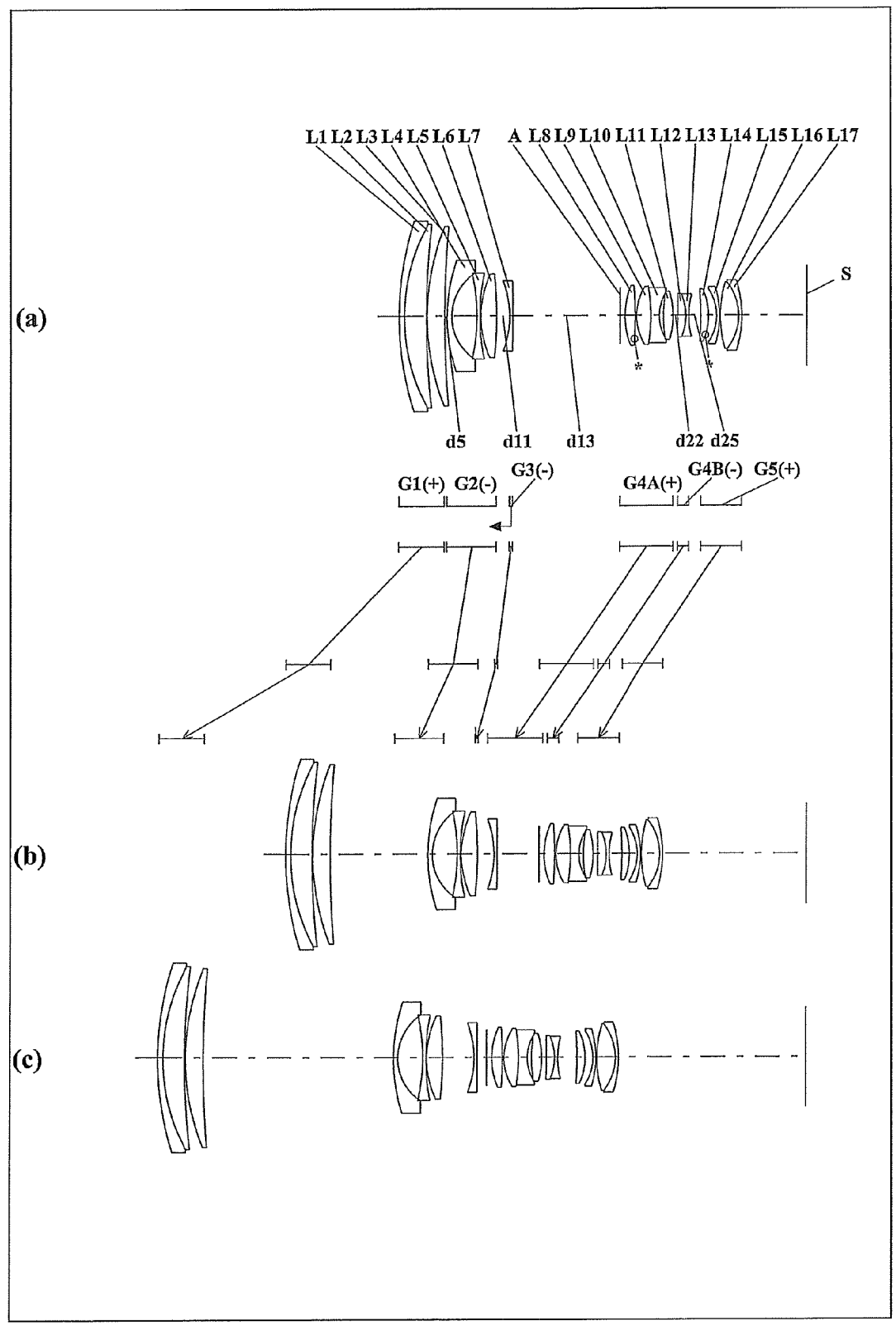
FIG. 29 is a lens arrangement diagram showing an infinity in-focus condition of a zoom lens system according to Embodiment 8 (Example 8)
Figure 30:
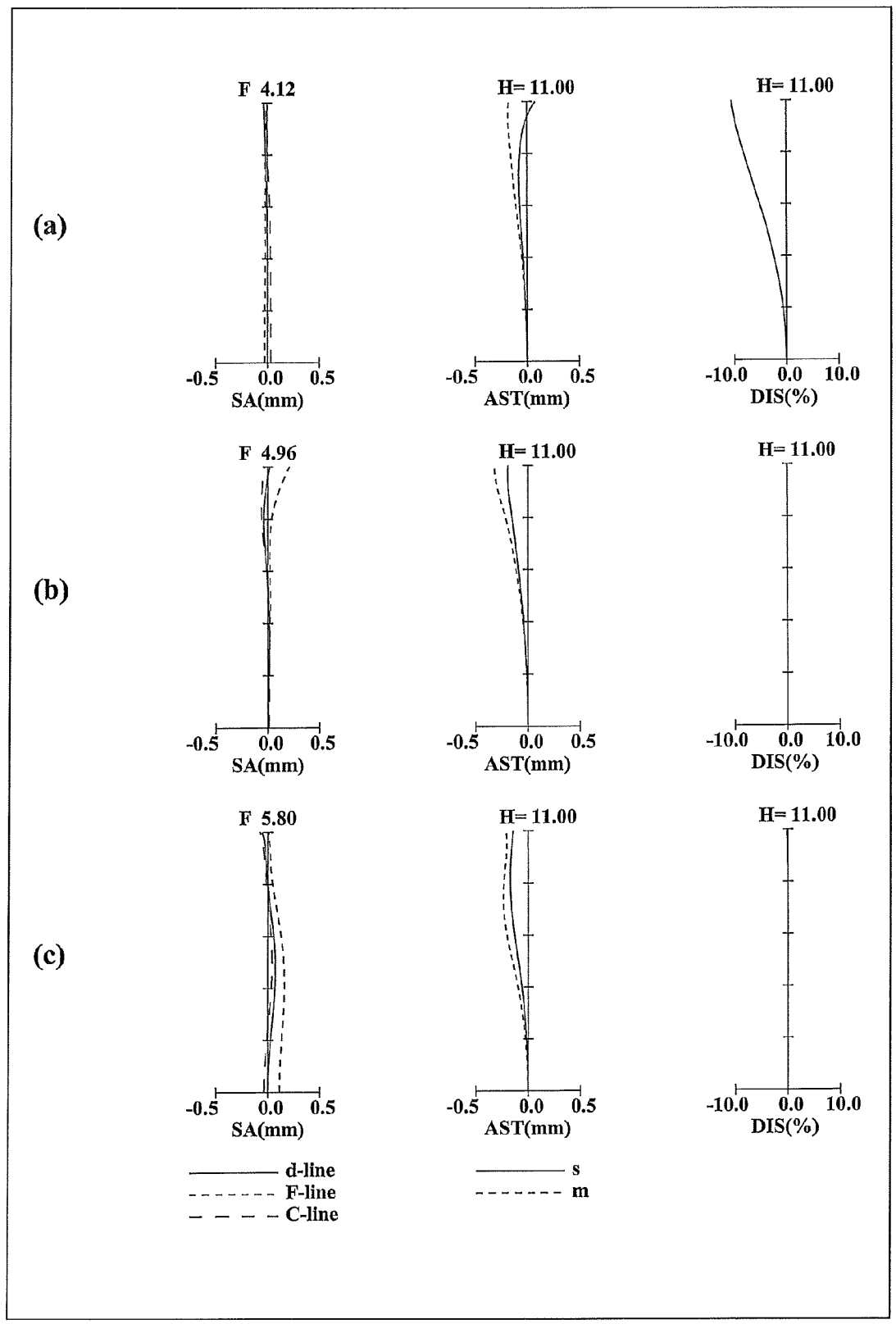
FIG. 30 is a longitudinal aberration diagram showing an infinity in-focus condition of a zoom lens system according to Example 8.
Figure 31:
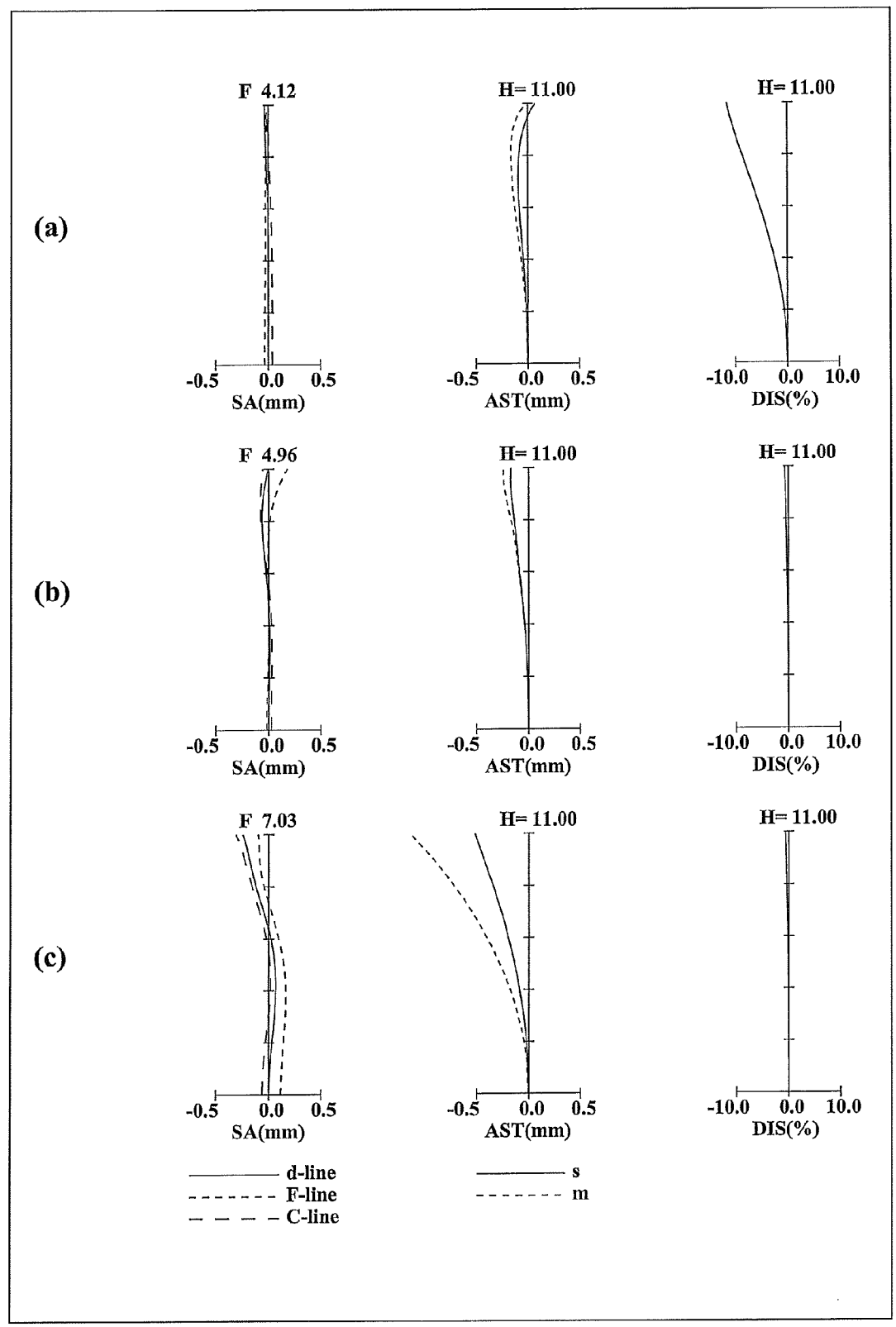
FIG. 31 is a longitudinal aberration diagram showing a close-point in-focus condition of a zoom lens system according to Example 8.
Figure 32:
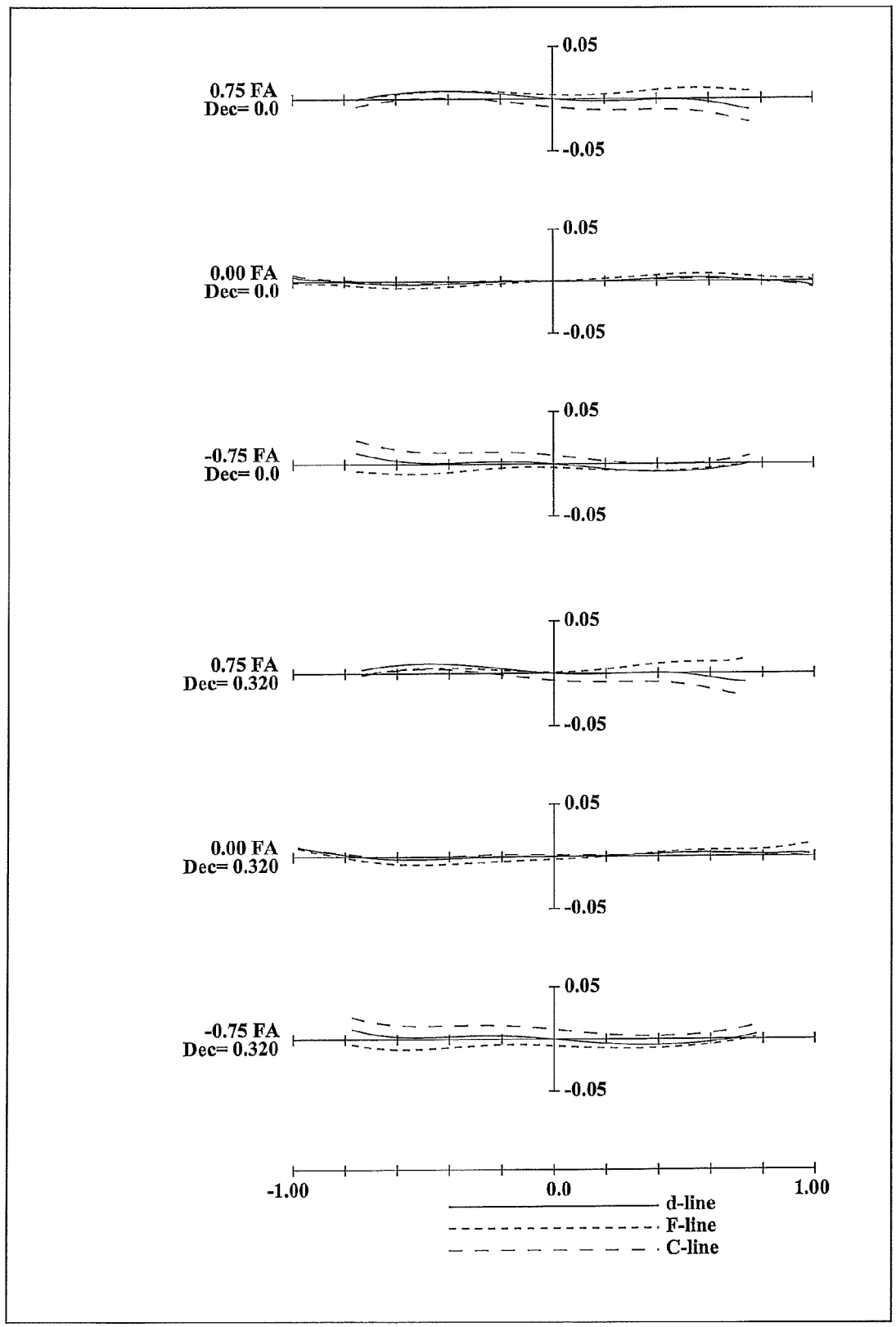
FIG. 32 is a lateral aberration diagram in a basic state where image blur compensation is not performed and in an image blur compensation state at a telephoto limit of a zoom lens system according to Example 8.

The zoom lens system of Numerical Example 8 corresponds to Embodiment 8 shown in FIG. 29. Table 30 shows the surface data of the zoom lens system of Numerical Example 8. Table 31 shows the aspherical data. Table 32 shows various data. Table 33 shows the zoom lens unit data.

TABLE 30

(surface data)

| Surface number | r | d | nd | vd |
|---|---|---|---|---|
| Object surface | ∞ | | | |
| 1 | 72.06380 | 1.20000 | 1.84666 | 23.8 |
| 2 | 44.82460 | 4.94400 | 1.49700 | 81.6 |
| 3 | 179.32400 | 0.20000 | | |
| 4 | 56.21680 | 3.99930 | 1.77250 | 49.6 |
| 5 | 235.44770 | Variable | | |
| 6 | 40.85450 | 1.00000 | 1.90366 | 31.3 |
| 7 | 12.04170 | 5.66070 | | |
| 8 | −46.87750 | 0.70000 | 1.80610 | 33.3 |
| 9 | 49.74080 | 0.20000 | | |
| 10 | 22.47680 | 3.63460 | 1.94595 | 18.0 |
| 11 | −94.62740 | Variable | | |
| 12 | −23.49900 | 0.70000 | 1.80420 | 46.5 |
| 13 | −836.21030 | Variable | | |
| 14 (Aperture) | ∞ | 1.17000 | | |
| 15 | 17.38230 | 2.43350 | 1.69400 | 56.3 |
| 16* | −68.55390 | 0.30000 | | |
| 17 | 12.85750 | 3.27960 | 1.61800 | 63.4 |
| 18 | −39.58700 | 0.01000 | 1.56732 | 42.8 |
| 19 | −39.58700 | 1.98900 | 1.80610 | 33.3 |
| 20 | 10.06630 | 0.96040 | | |
| 21 | 31.38760 | 2.27190 | 1.48749 | 70.4 |
| 22 | −19.38890 | 1.05190 | | |
| 23 | −531.47260 | 1.91500 | 1.84666 | 23.8 |
| 24 | −12.13420 | 0.70000 | 1.80610 | 33.3 |
| 25 | 18.75770 | Variable | | |
| 26 | −86.82700 | 1.78870 | 1.51760 | 63.5 |

TABLE 30-continued (surface data)

| Surface number | r | d | nd | vd |
|---|---|---|---|---|
| 27* | −15.68550 | 1.84310 | | |
| 28 | −10.98090 | 0.70000 | 1.80420 | 46.5 |
| 29 | −22.08400 | 0.20000 | | |
| 30 | 26.94980 | 4.22470 | 1.51742 | 52.1 |
| 31 | −12.32080 | 0.01000 | 1.56732 | 42.8 |
| 32 | −12.32080 | 0.70000 | 1.80420 | 46.5 |
| 33 | −27.27430 | BF | | |
| Image surface | ∞ | | | |

TABLE 31

(aspherical data)

| Surface No. | Parameters |
|---|---|
| 16 | K = 0.00000E+00, A4 = 4.31647E−05, A6 = −1.18892E−07, A8 = 1.91929E−09, A10 = −1.91817E−11, A12 = 0.00000E+00 |
| 27 | K = 0.00000E+00, A4 = −4.60035E−05, A6 = −2.87752E−07, A8 = −6.89809E−09, A10 = −8.47311E−11, A12 = 6.07866E−13 |

TABLE 32

(various data)

| Zooming ratio | | 8.31912 | |
|---|---|---|---|
| | Wide | Middle | Telephoto |
| Focal length | 14.5000 | 45.7985 | 120.6276 |
| F-number | 4.12045 | 4.96080 | 5.80028 |
| View angle | 40.3065 | 13.5211 | 5.2219 |
| Image height | 11.0000 | 11.0000 | 11.0000 |
| Overall length of lens system | 93.5691 | 119.5950 | 148.5703 |
| BF | 14.95014 | 33.17625 | 43.27012 |
| d5 | 0.6000 | 22.5177 | 43.8164 |
| d11 | 2.9000 | 3.8000 | 7.1000 |
| d13 | 24.5466 | 9.4198 | 2.1700 |
| d25 | 2.7860 | 2.8949 | 4.4274 |

TABLE 33

(zoom lens unit data)

| Unit | Initial surface No. | Focal length |
|---|---|---|
| 1 | 1 | 85.89197 |
| 2 | 6 | −39.48361 |
| 3 | 12 | −30.07678 |
| 4 | 14 | 21.41574 |
| 5 | 26 | 57.67340 |

Numerical Example 9

Figure 33:
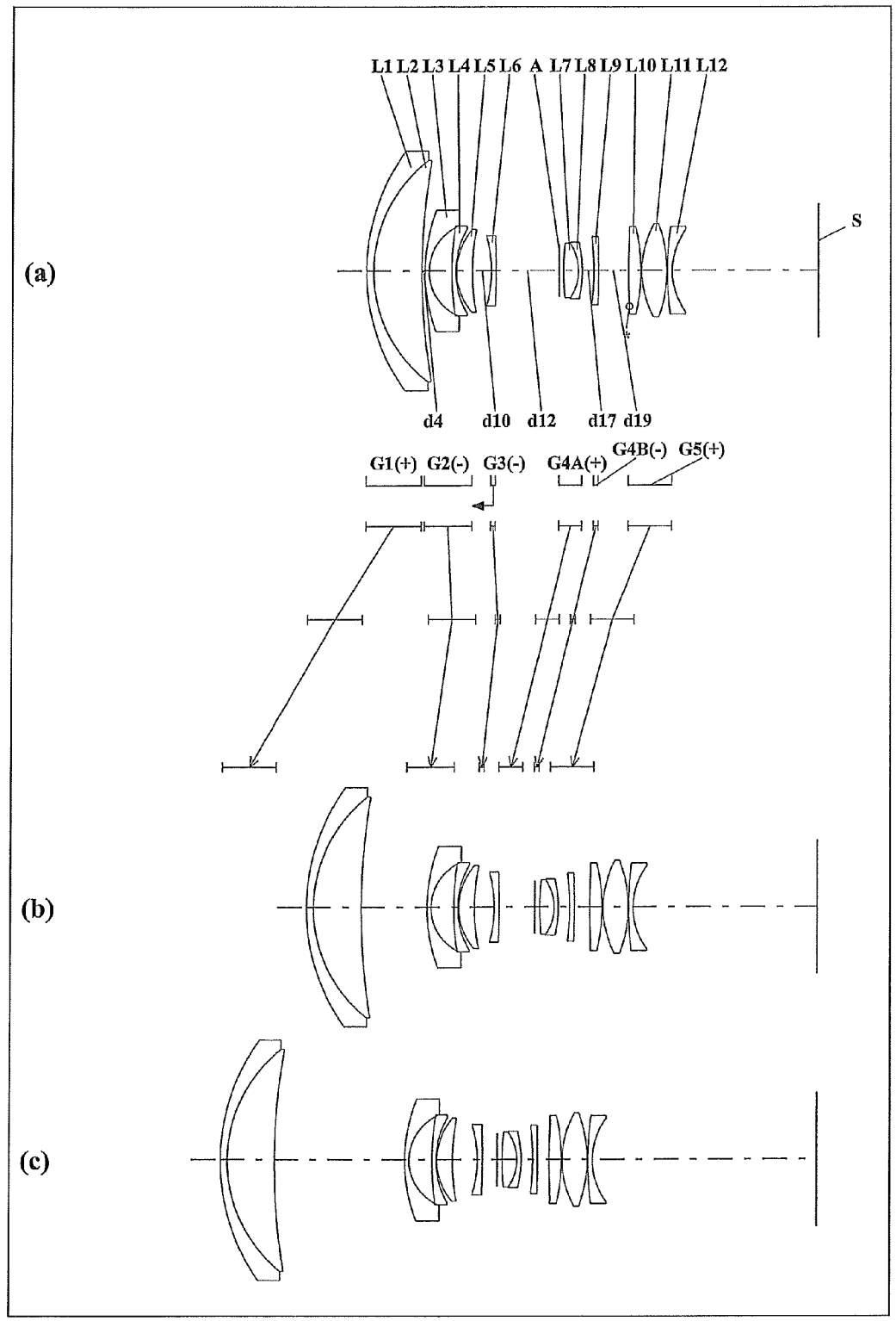
FIG. 33 is a lens arrangement diagram showing an infinity in-focus condition of a zoom lens system according to Embodiment 9 (Example 9)
Figure 34:
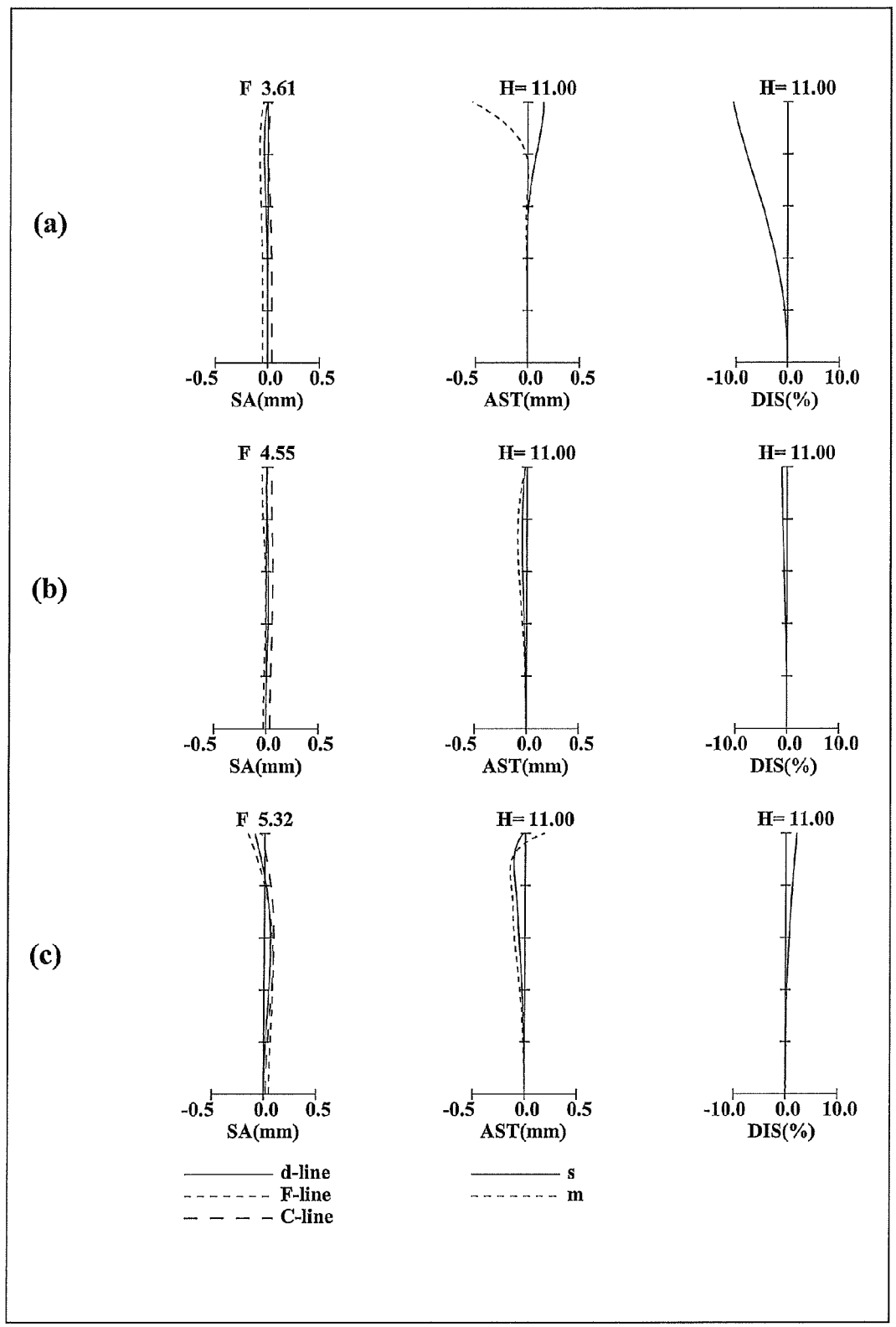
FIG. 34 is a longitudinal aberration diagram showing an infinity in-focus condition of a zoom lens system according to Example 9.
Figure 35:
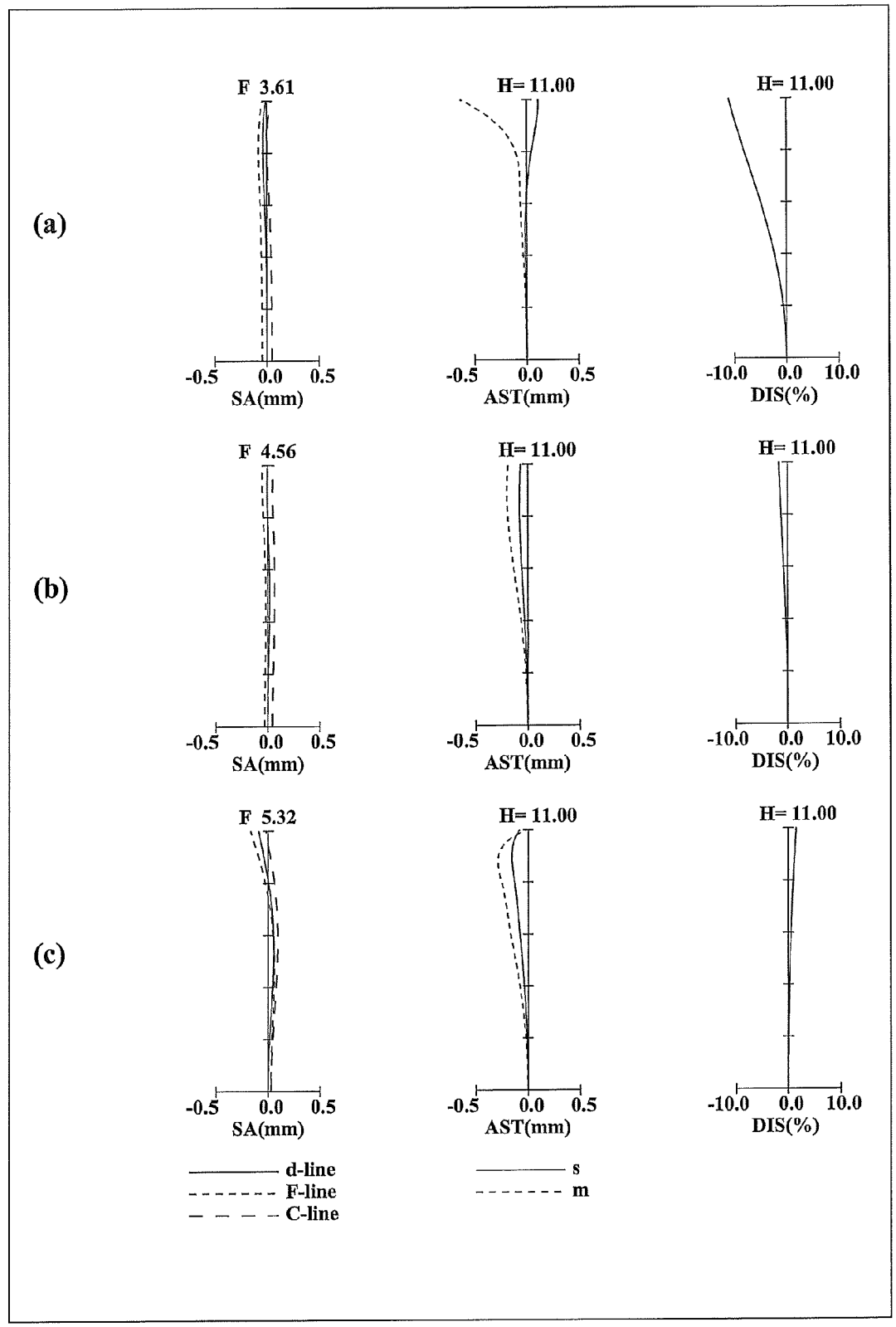
FIG. 35 is a longitudinal aberration diagram showing a close-point in-focus condition of a zoom lens system according to Example 9.
Figure 36:
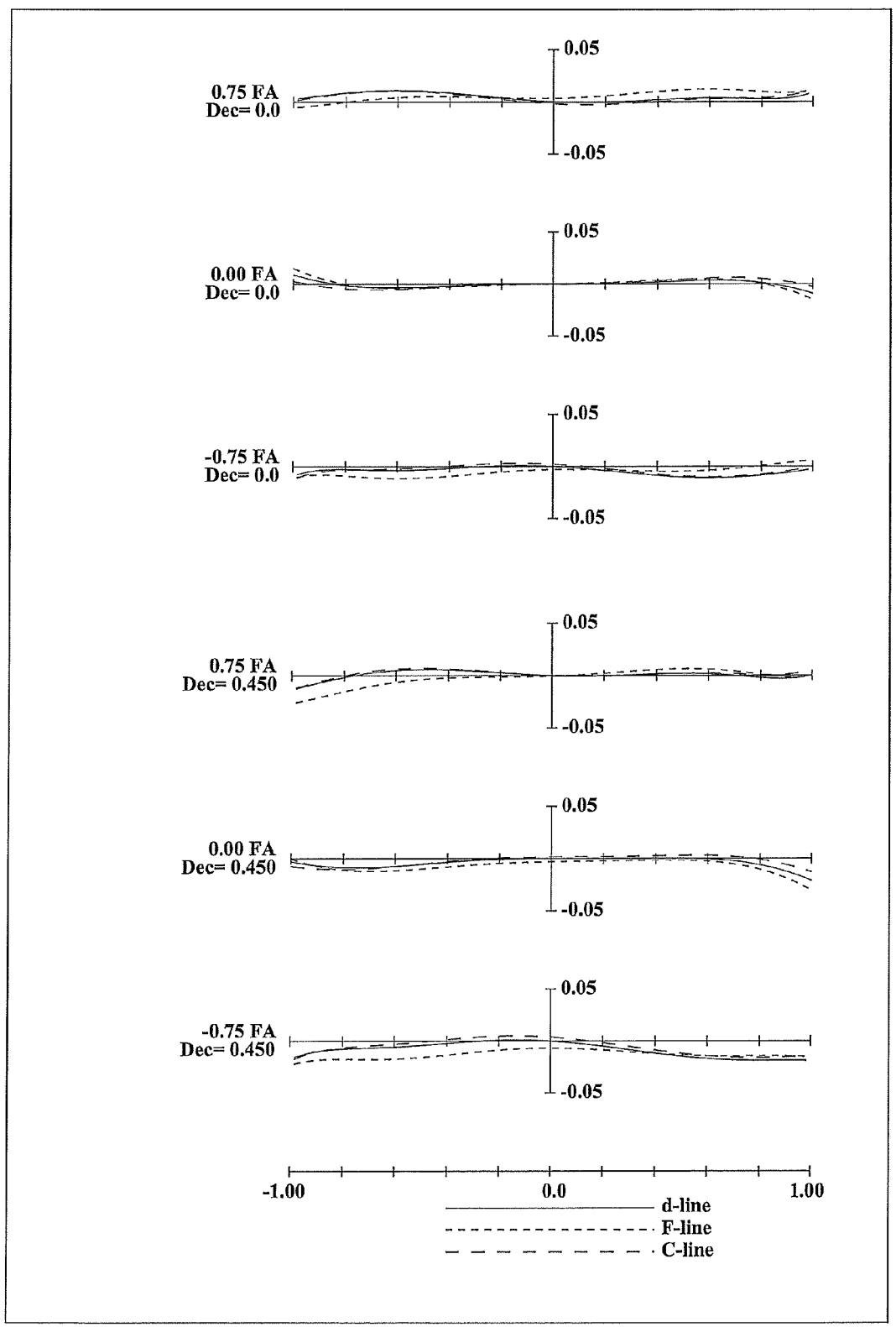
FIG. 36 is a lateral aberration diagram in a basic state where image blur compensation is not performed and in an image blur compensation state at a telephoto limit of a zoom lens system according to Example 9.

The zoom lens system of Numerical Example 9 corresponds to Embodiment 9 shown in FIG. 33. Table 34 shows the surface data of the zoom lens system of Numerical Example 9. Table 35 shows the aspherical data. Table 36 shows various data. Table 37 shows the zoom lens unit data.

TABLE 34

(surface data)

| Surface number | r | d | nd | vd |
|---|---|---|---|---|
| Object surface | ∞ | | | |
| 1 | 35.57350 | 1.20000 | 1.84666 | 23.8 |
| 2 | 24.39090 | 0.01000 | 1.56732 | 42.8 |
| 3 | 24.39090 | 8.21250 | 1.72916 | 54.7 |
| 4 | 112.49750 | Variable | | |
| 5 | 29.46230 | 0.70000 | 1.88300 | 40.8 |
| 6 | 8.55300 | 3.90780 | | |
| 7 | 49.08160 | 0.70000 | 1.80420 | 46.5 |
| 8 | 14.90170 | 0.15020 | | |
| 9 | 11.22820 | 2.66860 | 1.88627 | 20.9 |
| 10 | 38.17570 | Variable | | |
| 11 | −21.57740 | 0.80000 | 1.80420 | 46.5 |
| 12 | −208.58690 | Variable | | |
| 13 | ∞ | 0.80000 | | |
| (Aperture) | | | | |
| 14 | 38.62380 | 2.55330 | 1.65741 | 58.1 |
| 15 | −8.46830 | 0.01000 | 1.56732 | 42.8 |
| 16 | −8.46830 | 0.70000 | 1.81573 | 36.6 |
| 17 | −20.64780 | 2.00000 | | |
| 18 | −49.37020 | 0.80000 | 1.72916 | 54.7 |
| 19 | −275.28120 | Variable | | |
| 20* | 72.15450 | 2.17600 | 1.73185 | 54.3 |
| 21 | −31.32140 | 0.15010 | | |
| 22 | 16.93800 | 4.32260 | 1.48749 | 70.4 |
| 23 | −23.22450 | 0.10000 | | |
| 24 | 56.11280 | 0.80000 | 1.81730 | 35.6 |
| 25 | 12.18130 | BF | | |
| Image surface | ∞ | | | |

TABLE 35

(aspherical data)

| Surface No. | Parameters |
|---|---|
| 20 | K = 0.00000E+00, A4 = −6.87649E−05, A6 = 1.14968E−07, A8 = −4.14869E−09 |

TABLE 36

(various data)

Zooming ratio 3.05354

| | Wide | Middle | Telephoto |
|---|---|---|---|
| Focal length | 14.3999 | 25.1622 | 43.9705 |
| F-number | 3.60603 | 4.55238 | 5.32062 |
| View angle | 40.5114 | 23.8476 | 13.7742 |
| Image height | 11.0000 | 11.0000 | 11.0000 |
| Overall length of lens system | 77.6987 | 87.6960 | 102.4577 |
| BF | 25.09499 | 31.53207 | 38.41726 |
| d4 | 0.5000 | 11.2352 | 22.4826 |
| d10 | 3.2373 | 3.3918 | 4.1968 |
| d12 | 10.9135 | 6.1013 | 2.5999 |
| d19 | 5.1918 | 2.6745 | 2.0000 |

TABLE 37

(zoom lens unit data)

| Unit | Initial surface No. | Focal length |
|---|---|---|
| 1 | 1 | 75.39944 |
| 2 | 5 | −20.57322 |
| 3 | 11 | −29.98384 |
| 4 | 13 | 37.91877 |
| 5 | 20 | 25.50754 |

Numerical Example 10

Figure 37:
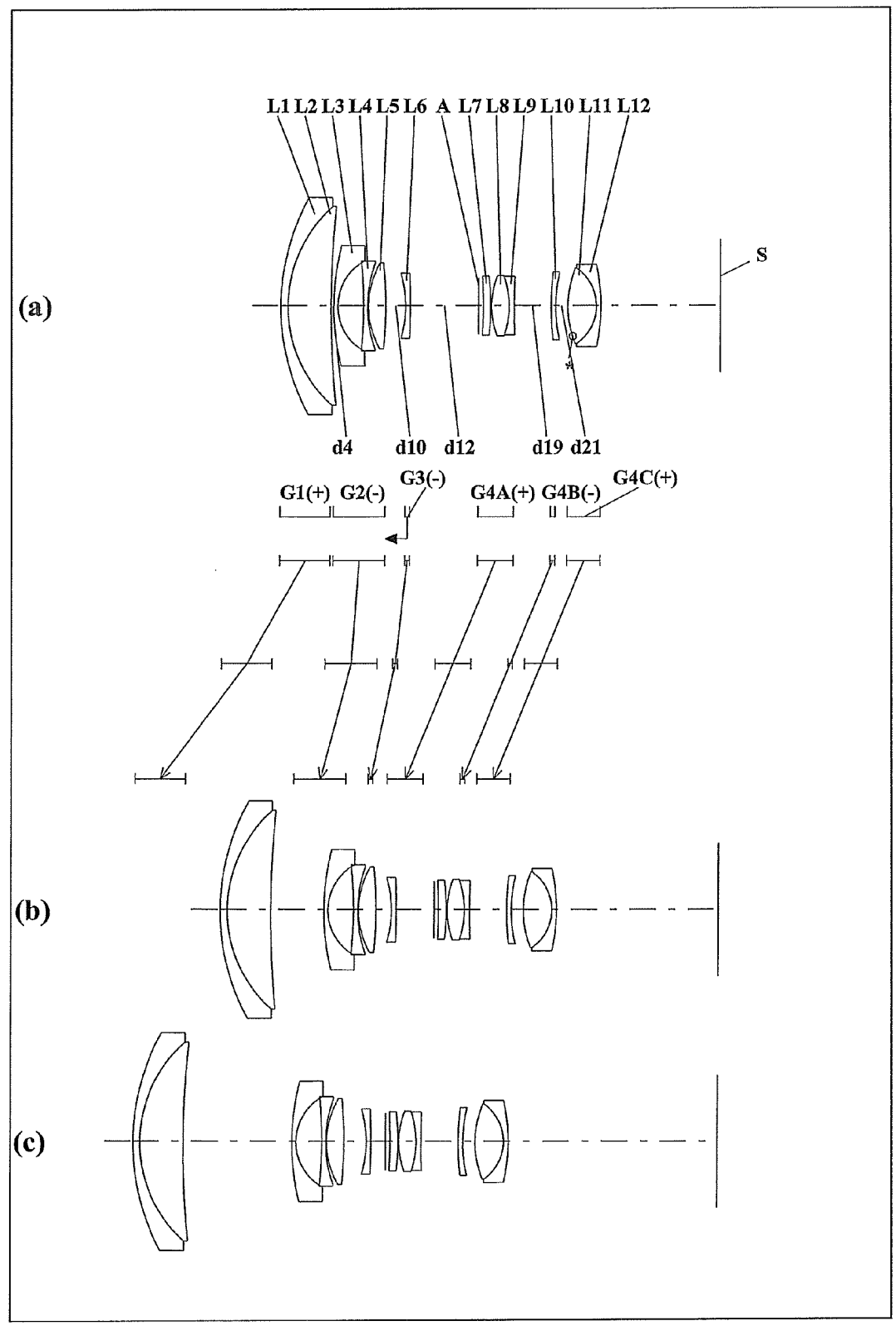
FIG. 37 is a lens arrangement diagram showing an infinity in-focus condition of a zoom lens system according to Embodiment 10 (Example 10)
Figure 38:
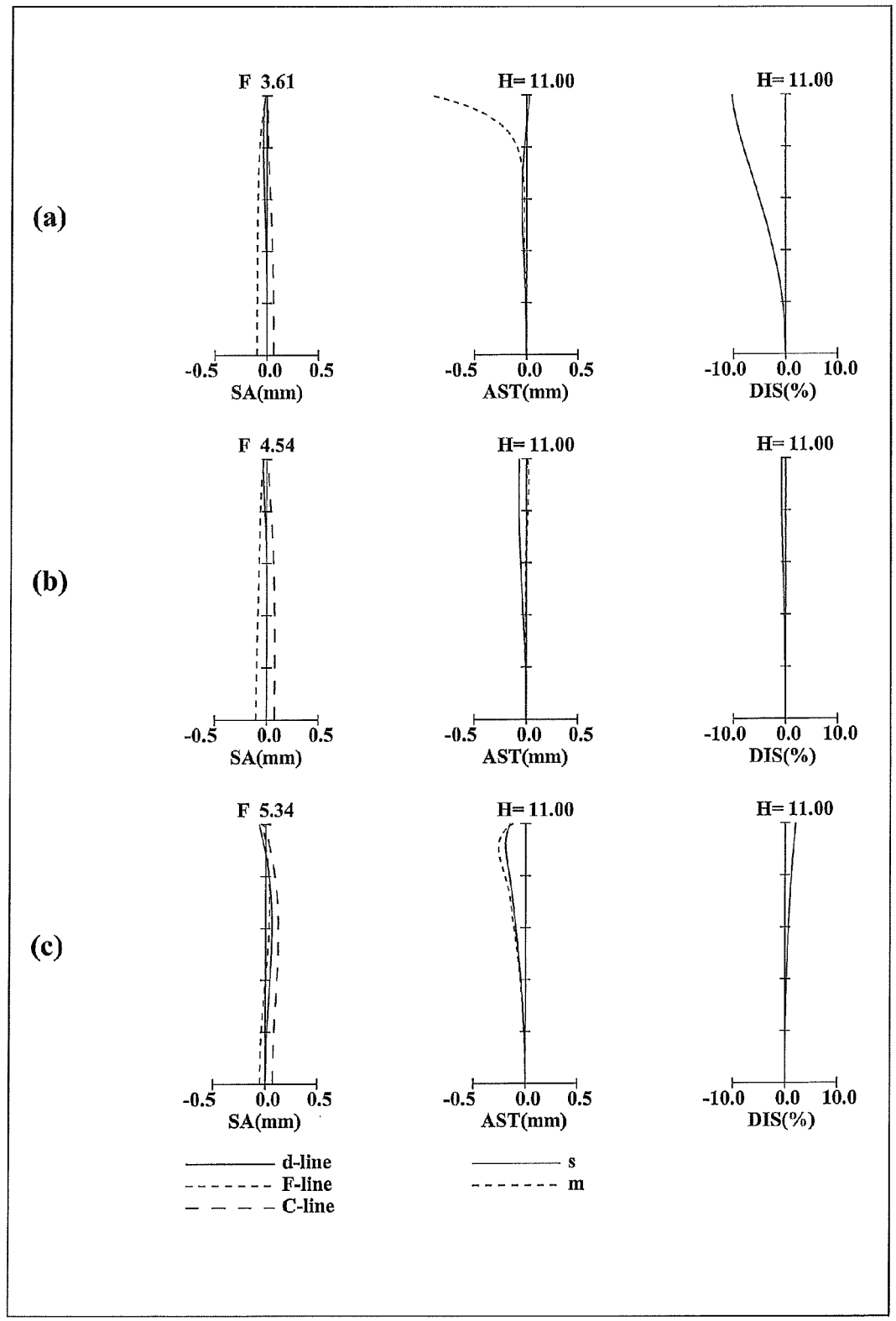
FIG. 38 is a longitudinal aberration diagram showing an infinity in-focus condition of a zoom lens system according to Example 10.
Figure 39:
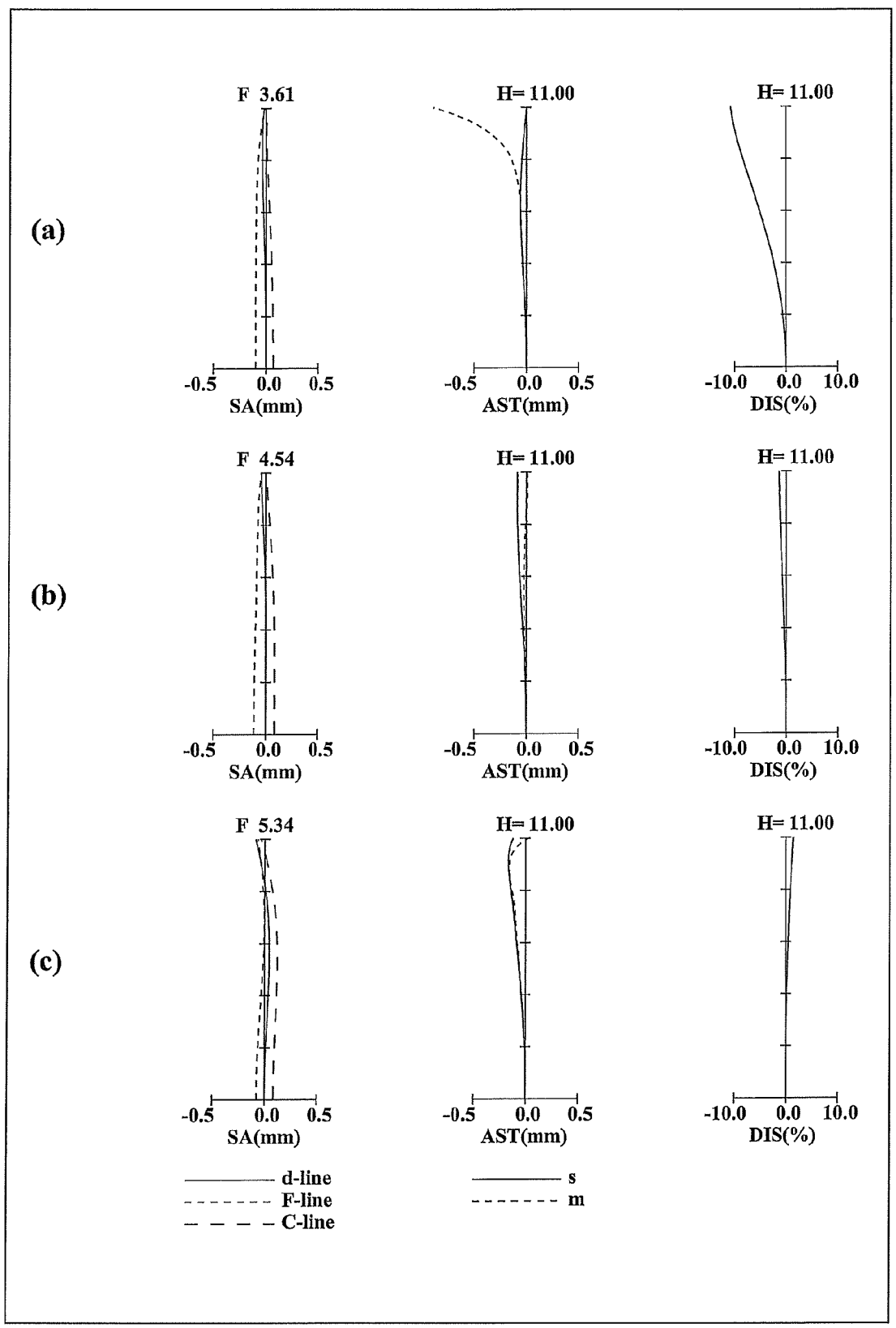
FIG. 39 is a longitudinal aberration diagram showing a close-point in-focus condition of a zoom lens system according to Example 10.
Figure 40:
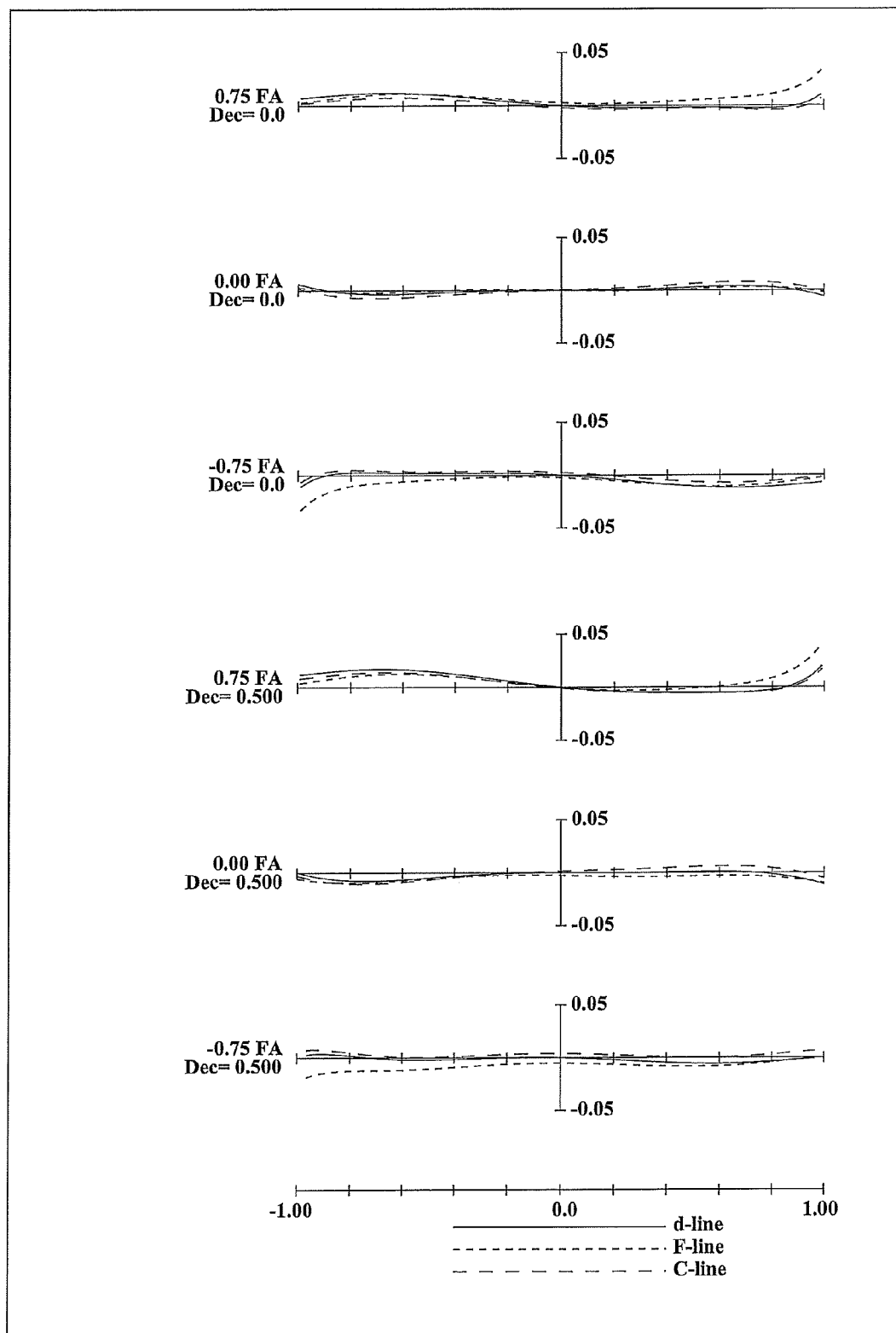
FIG. 40 is a lateral aberration diagram in a basic state where image blur compensation is not performed and in an image blur compensation state at a telephoto limit of a zoom lens system according to Example 10.

The zoom lens system of Numerical Example 10 corresponds to Embodiment 10 shown in FIG. 37. Table 38 shows the surface data of the zoom lens system of Numerical Example 10. Table 39 shows the aspherical data. Table 40 shows various data. Table 41 shows the zoom lens unit data.

TABLE 38

(surface data)

| Surface number | r | d | nd | vd |
|---|---|---|---|---|
| Object surface | ∞ | | | |
| 1 | 39.75020 | 1.20000 | 1.84666 | 23.8 |
| 2 | 23.31650 | 0.01000 | 1.56732 | 42.8 |
| 3 | 23.31650 | 7.53790 | 1.80420 | 46.5 |
| 4 | 167.75010 | Variable | | |
| 5 | 42.91510 | 0.70000 | 1.88300 | 40.8 |
| 6 | 9.03750 | 4.49980 | | |
| 7 | −75.23540 | 0.70000 | 1.80420 | 46.5 |
| 8 | 22.01970 | 0.15000 | | |
| 9 | 14.96860 | 3.06300 | 1.84666 | 23.8 |
| 10 | −72.10310 | Variable | | |
| 11 | −19.97180 | 0.80000 | 1.80420 | 46.5 |
| 12 | −130.61870 | Variable | | |
| 13 | ∞ | 0.80000 | | |
| (Aperture) | | | | |
| 14 | −106.10960 | 1.34960 | 1.80420 | 46.5 |
| 15 | −42.01180 | 0.15000 | | |
| 16 | 14.23240 | 3.02120 | 1.73636 | 53.7 |
| 17 | −15.89850 | 0.01000 | 1.56732 | 42.8 |
| 18 | −15.89850 | 0.86370 | 1.82815 | 30.0 |
| 19 | 140.77420 | 6.45490 | | |
| 20 | 50.63850 | 0.80000 | 1.62041 | 60.3 |
| 21 | 25.63810 | 2.11440 | | |
| 22* | 16.88120 | 4.95270 | 1.51443 | 63.3 |
| 23 | −8.03600 | 0.01000 | 1.56732 | 42.8 |
| 24 | −8.03600 | 0.80000 | 1.77823 | 48.9 |
| 25 | −32.94730 | BF | | |
| Image surface | ∞ | | | |

TABLE 39

(aspherical data)

| Surface No. | Parameters |
|---|---|
| 22 | K = 2.89522E+00, A4 = −1.28550E−04, A6 = −1.62009E−07, A8 = −5.76957E−09, A10 = 2.55610E−11 |

TABLE 40

(various data)

Zooming ratio 3.05354

| | Wide | Middle | Telephoto |
|---|---|---|---|
| Focal length | 14.4000 | 25.1644 | 43.9710 |
| F-number | 3.60857 | 4.53853 | 5.34109 |
| View angle | 40.4086 | 23.7802 | 13.7807 |
| Image height | 11.0000 | 11.0000 | 11.0000 |
| Overall length of lens system | 76.6965 | 86.7484 | 101.6734 |
| BF | 20.86496 | 28.17383 | 36.35448 |
| d4 | 0.5000 | 9.2699 | 18.8608 |
| d10 | 3.4709 | 2.7585 | 3.8709 |
| d12 | 11.8734 | 6.5590 | 2.6000 |

TABLE 41

(zoom lens unit data)

| Unit | Initial surface No. | Focal length |
|---|---|---|
| 1 | 1 | 65.93589 |
| 2 | 5 | −22.50678 |
| 3 | 11 | −29.41177 |
| 4 | 13 | 17.42374 |

Numerical Example 11

Figure 41:
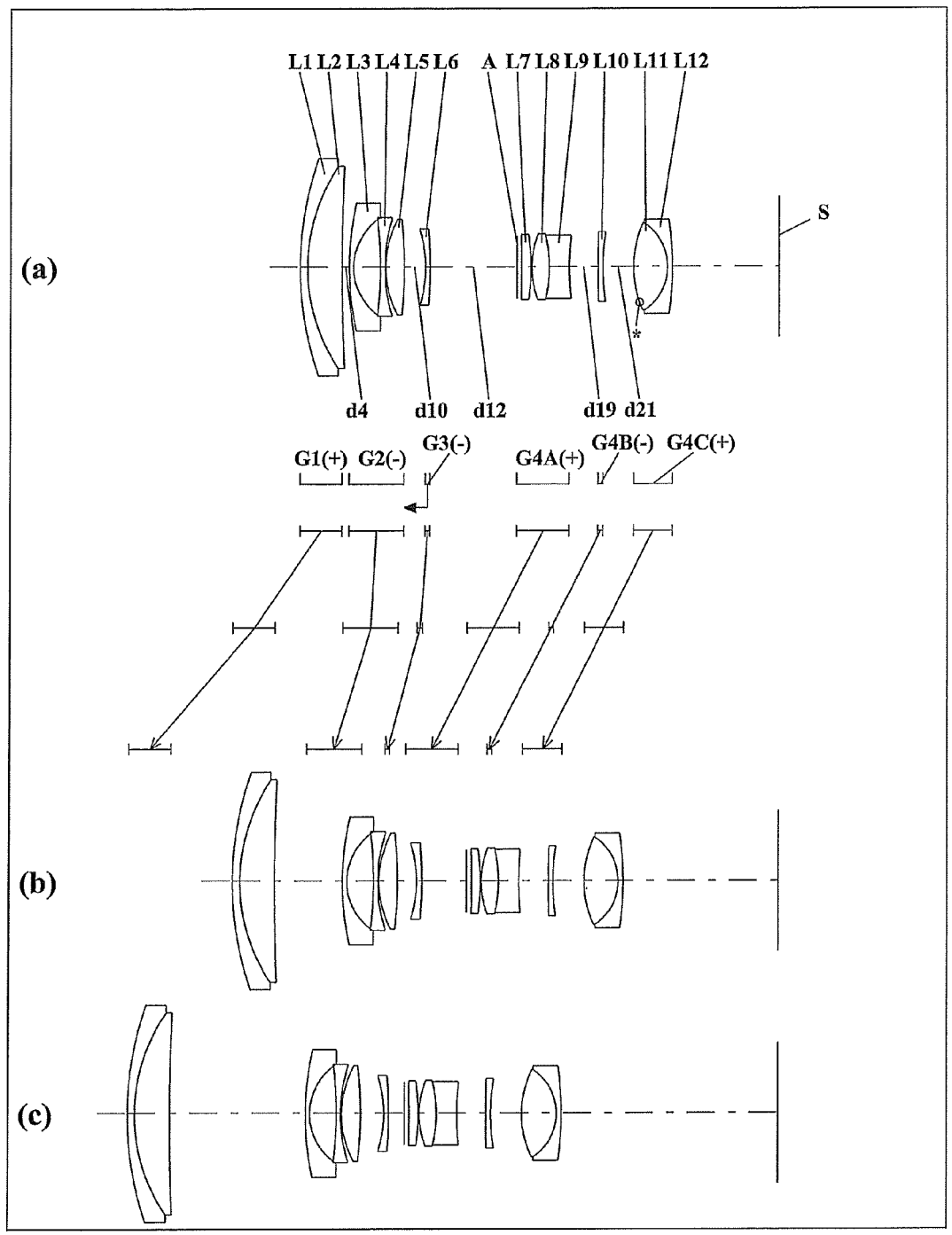
FIG. 41 is a lens arrangement diagram showing an infinity in-focus condition of a zoom lens system according to Embodiment 11 (Example 11)
Figure 42:
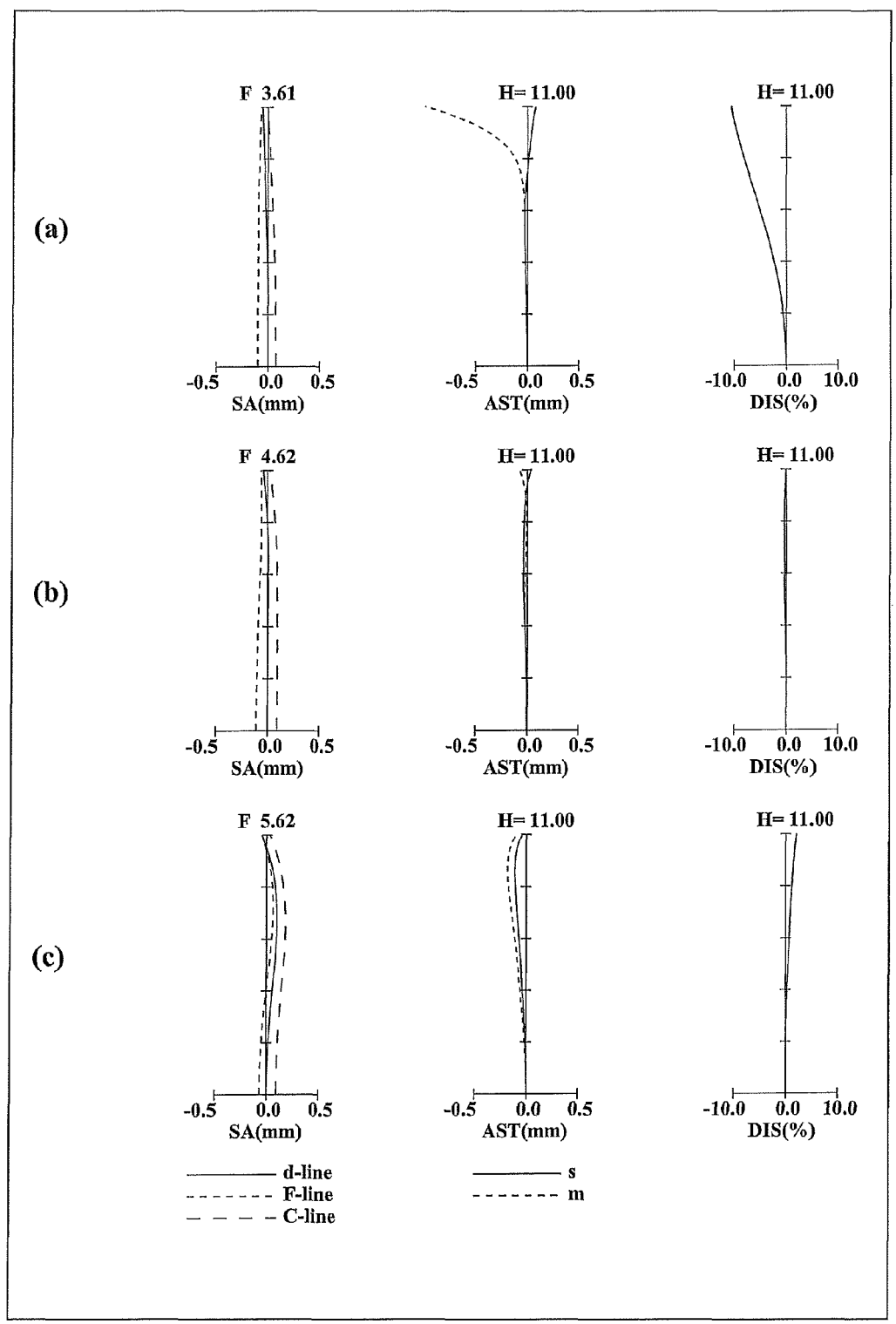
FIG. 42 is a longitudinal aberration diagram showing an infinity in-focus condition of a zoom lens system according to Example 11.
Figure 43:
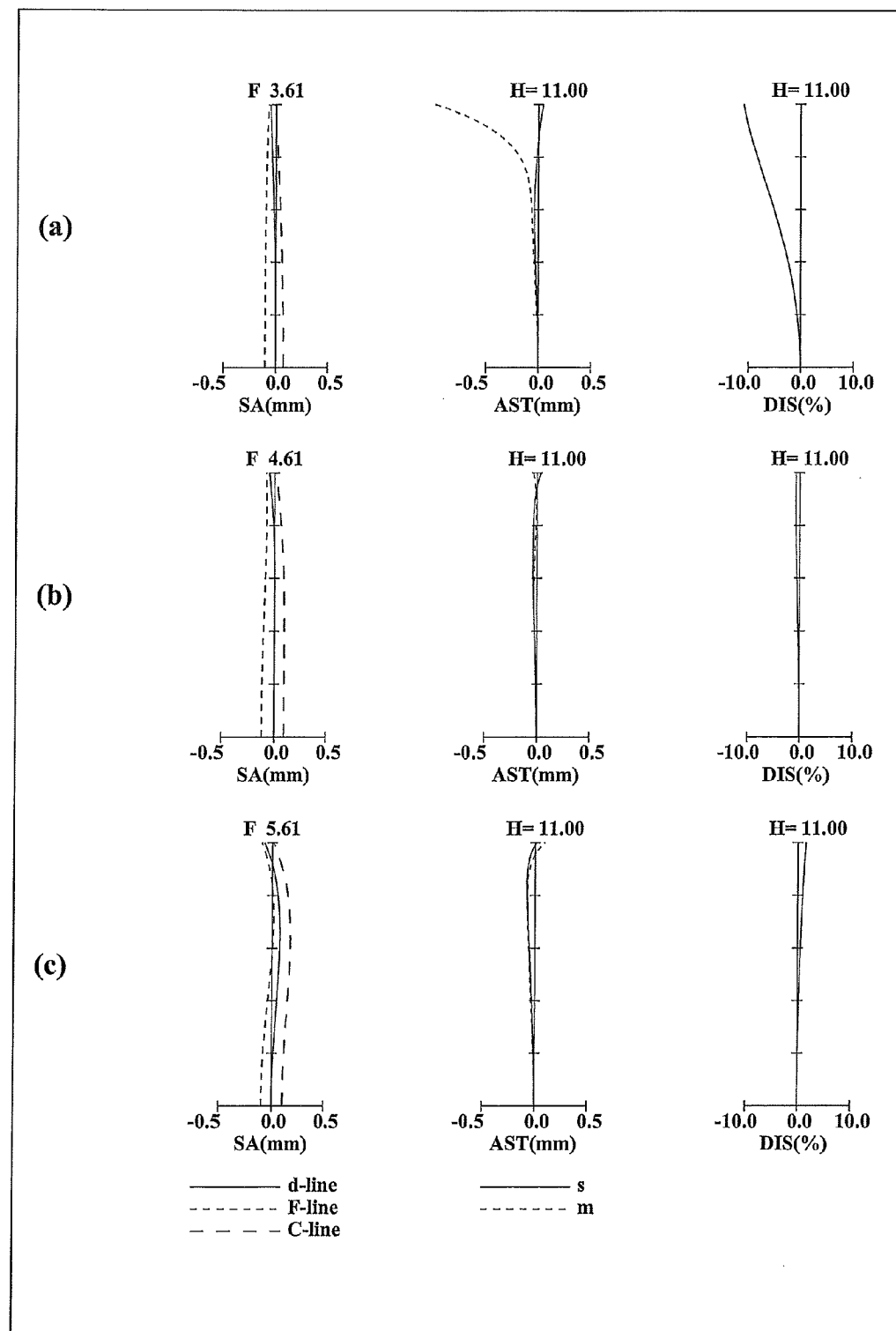
FIG. 43 is a longitudinal aberration diagram showing a close-point in-focus condition of a zoom lens system according to Example 11.
Figure 44:
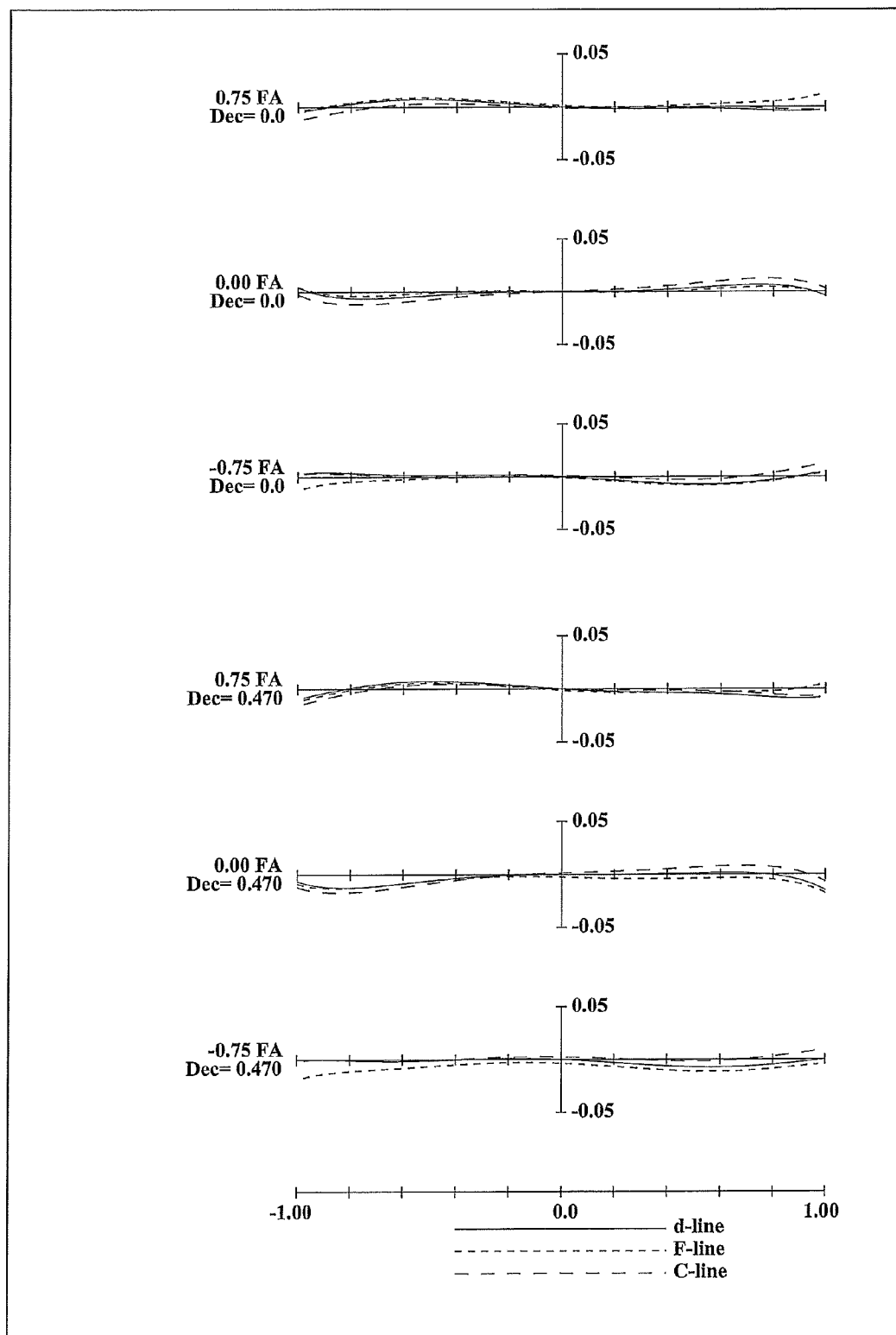
FIG. 44 is a lateral aberration diagram in a basic state where image blur compensation is not performed and in an image blur compensation state at a telephoto limit of a zoom lens system according to Example 11.

The zoom lens system of Numerical Example 11 corresponds to Embodiment 11 shown in FIG. 41. Table 42 shows the surface data of the zoom lens system of Numerical Example 11. Table 43 shows the aspherical data. Table 44 shows various data. Table 45 shows the zoom lens unit data.

TABLE 42

(surface data)

| Surface number | r | d | nd | vd |
|---|---|---|---|---|
| Object surface | ∞ | | | |
| 1 | 54.67070 | 1.20000 | 1.84666 | 23.8 |
| 2 | 29.73640 | 0.01000 | 1.56732 | 42.8 |
| 3 | 29.73640 | 5.69850 | 1.80420 | 46.5 |
| 4 | 366.83850 | Variable | | |
| 5 | 47.76190 | 0.70000 | 1.88300 | 40.8 |
| 6 | 9.80640 | 4.42270 | | |
| 7 | −66.68270 | 0.70000 | 1.80420 | 46.5 |
| 8 | 26.99710 | 0.15000 | | |
| 9 | 16.93620 | 3.04290 | 1.84666 | 23.8 |
| 10 | −71.10620 | Variable | | |
| 11 | −21.70620 | 0.80000 | 1.80420 | 46.5 |
| 12 | −77.48440 | Variable | | |
| 13 | ∞ | 0.80000 | | |
| (Aperture) | | | | |
| 14 | −641.22280 | 1.47800 | 1.80420 | 46.5 |
| 15 | −37.85060 | 0.15000 | | |
| 16 | 15.49410 | 2.79940 | 1.74330 | 49.2 |
| 17 | −23.08580 | 0.01000 | 1.56732 | 42.8 |
| 18 | −23.08580 | 3.30070 | 1.80518 | 25.5 |
| 19 | 48.95390 | 4.75370 | | |
| 20 | 209.66310 | 0.80000 | 1.51680 | 64.2 |
| 21 | 35.68140 | 5.06070 | | |
| 22* | 16.93910 | 5.60780 | 1.51443 | 63.3 |
| 23 | −8.63840 | 0.01000 | 1.56732 | 42.8 |
| 24 | −8.63840 | 0.80000 | 1.74330 | 49.2 |
| 25 | −56.39880 | BF | | |
| Image surface | ∞ | | | |

TABLE 43

(aspherical data)

| Surface No. | Parameters |
|---|---|
| 22 | K = 2.91946E+00, A4 = −1.15818E−04, A6 = −3.30944E−07, A8 = −5.69984E−10, A10 = −9.08042E−11 |

TABLE 44

(various data)

| Zooming ratio | 3.05357 | | |
|---|---|---|---|
| | Wide | Middle | Telephoto |
| Focal length | 14.4015 | 25.1650 | 43.9760 |
| F-number | 3.60574 | 4.61537 | 5.61571 |
| View angle | 40.4525 | 23.6345 | 13.7790 |
| Image height | 11.0000 | 11.0000 | 11.0000 |

TABLE 44-continued (various data)

| Overall length of lens system | 78.5958 | 89.5418 | 106.5805 |
|---|---|---|---|
| BF | 17.56606 | 25.56657 | 35.56770 |
| d4 | 1.1532 | 11.2057 | 22.2817 |
| d10 | 3.4367 | 3.1363 | 3.8367 |
| d12 | 14.1454 | 7.3388 | 2.6000 |

TABLE 45

(zoom lens unit data)

| Unit | Initial surface No. | Focal length |
|---|---|---|
| 1 | 1 | 83.33335 |
| 2 | 5 | −24.19692 |
| 3 | 11 | −37.73591 |
| 4 | 13 | 18.61647 |

Numerical Example 12

Figure 45:
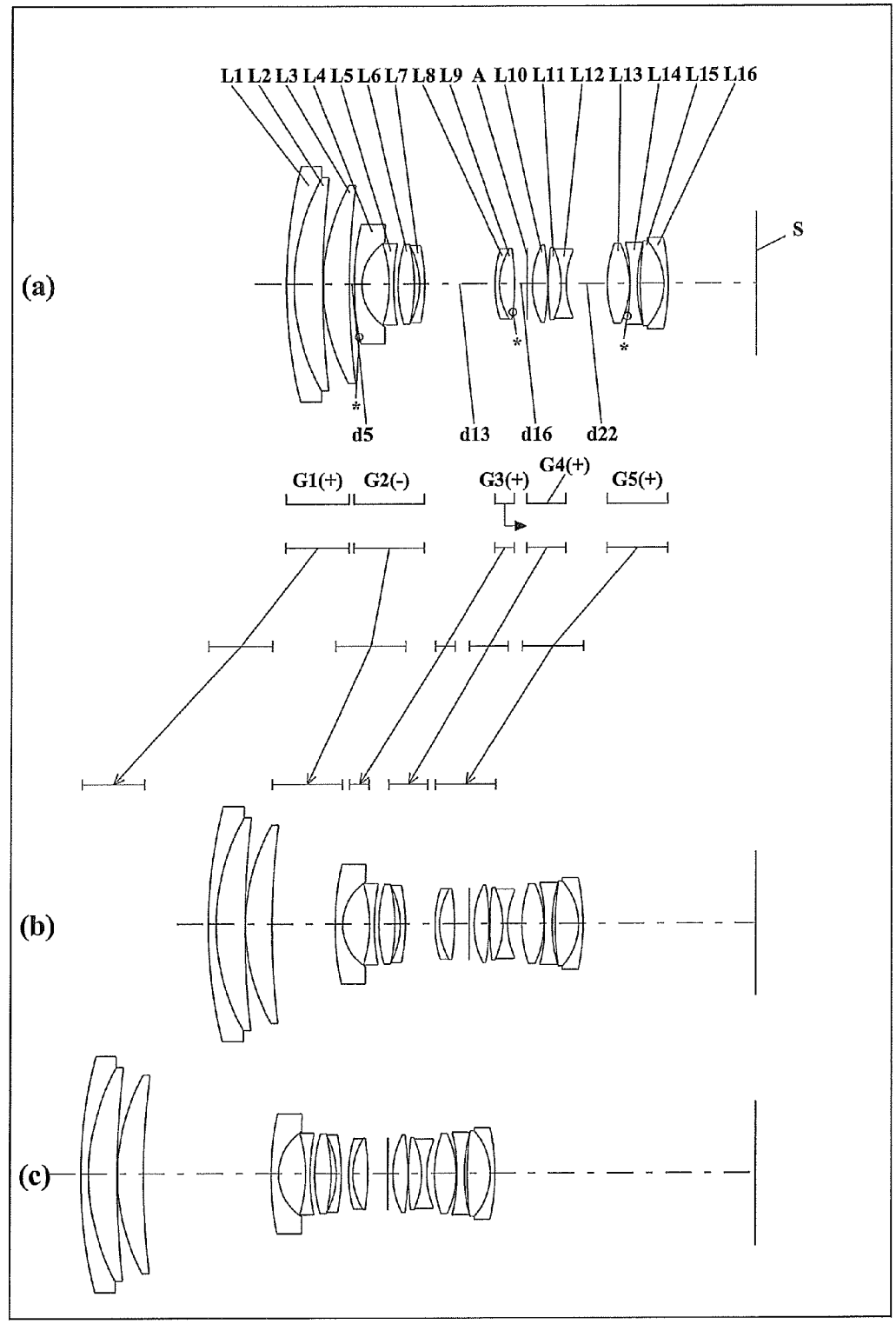
FIG. 45 is a lens arrangement diagram showing an infinity in-focus condition of a zoom lens system according to Embodiment 12 (Example 12)
Figure 46:
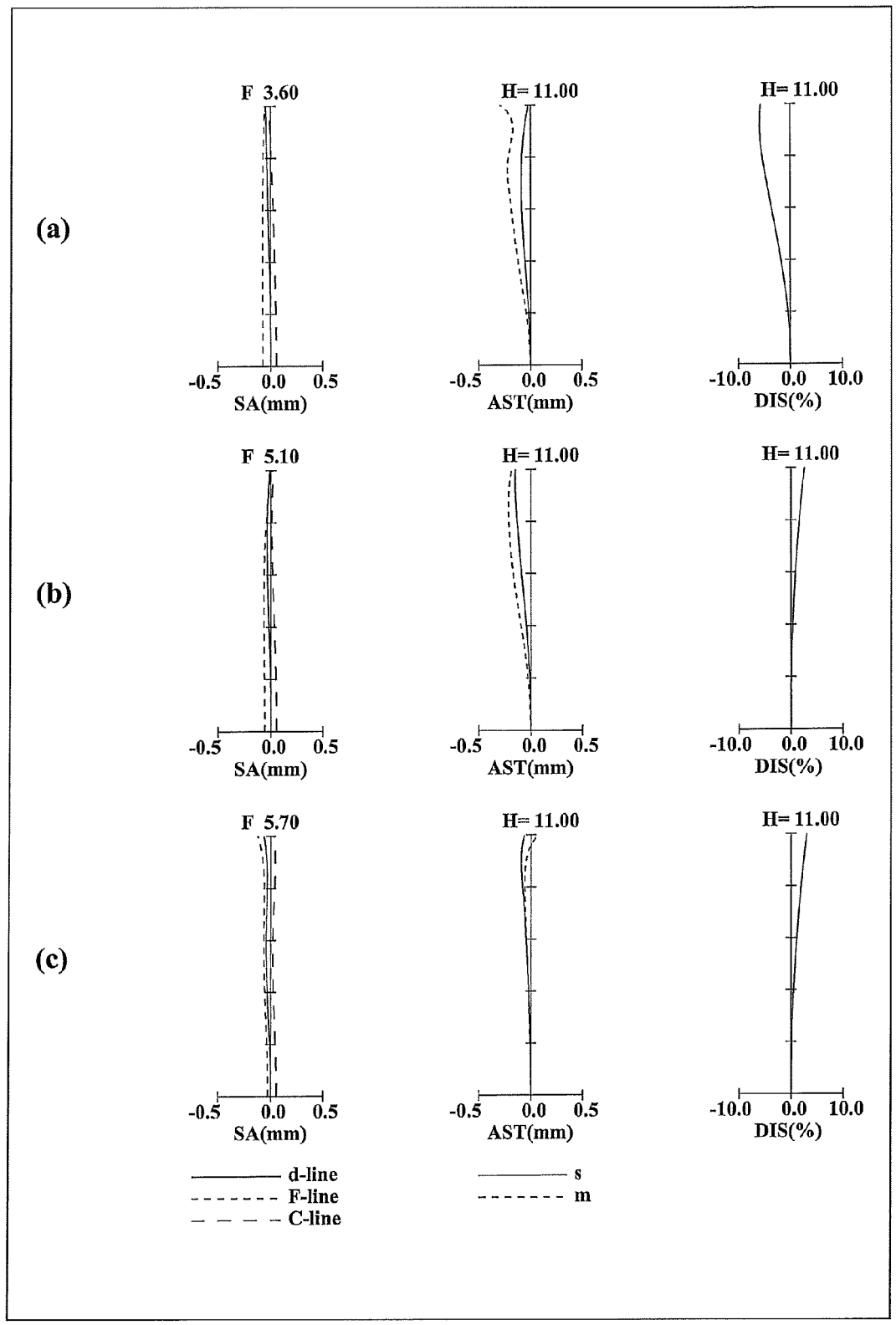
FIG. 46 is a longitudinal aberration diagram showing an infinity in-focus condition of a zoom lens system according to Example 12.
Figure 47:
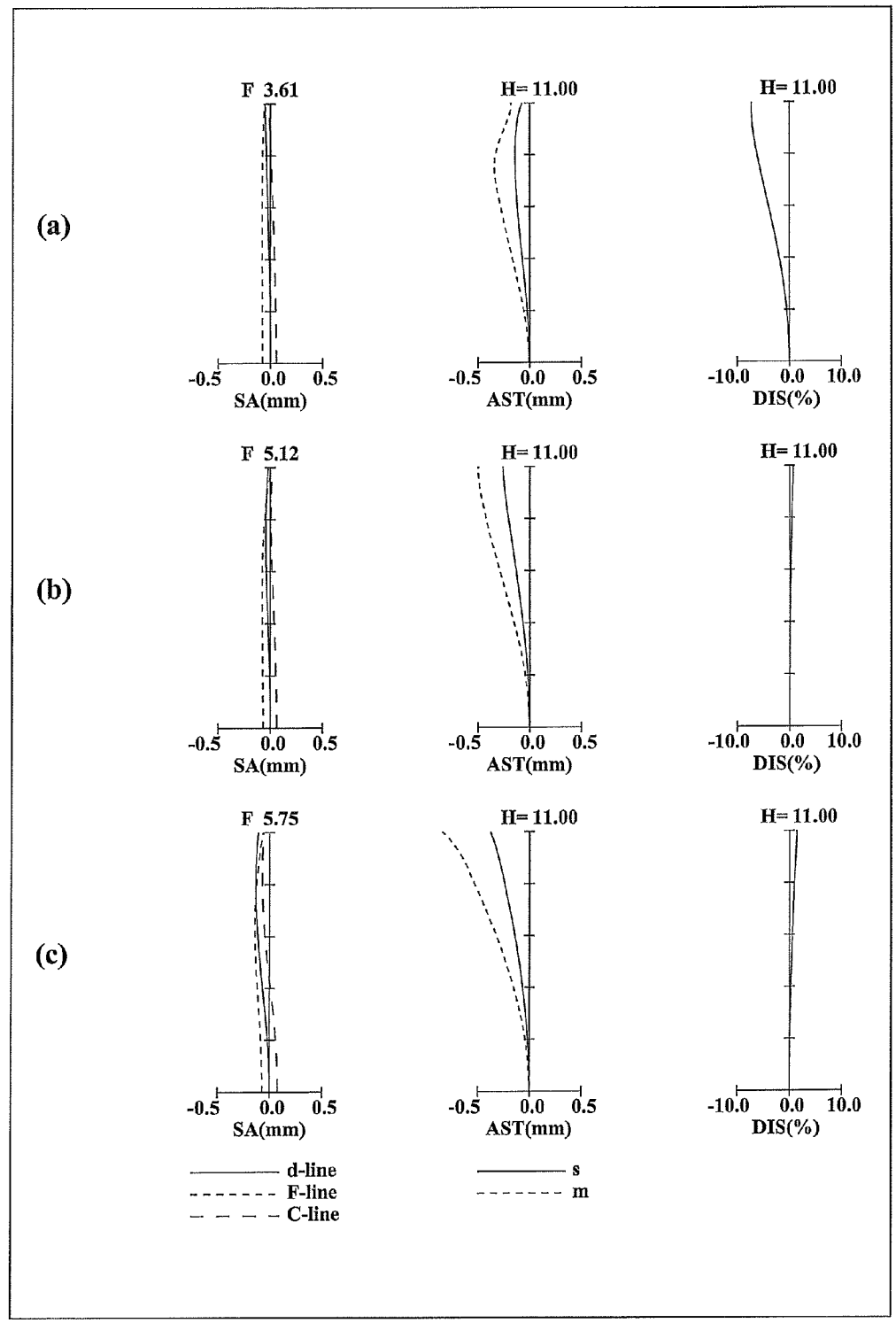
FIG. 47 is a longitudinal aberration diagram showing a close-point in-focus condition of a zoom lens system according to Example 12.
Figure 48:
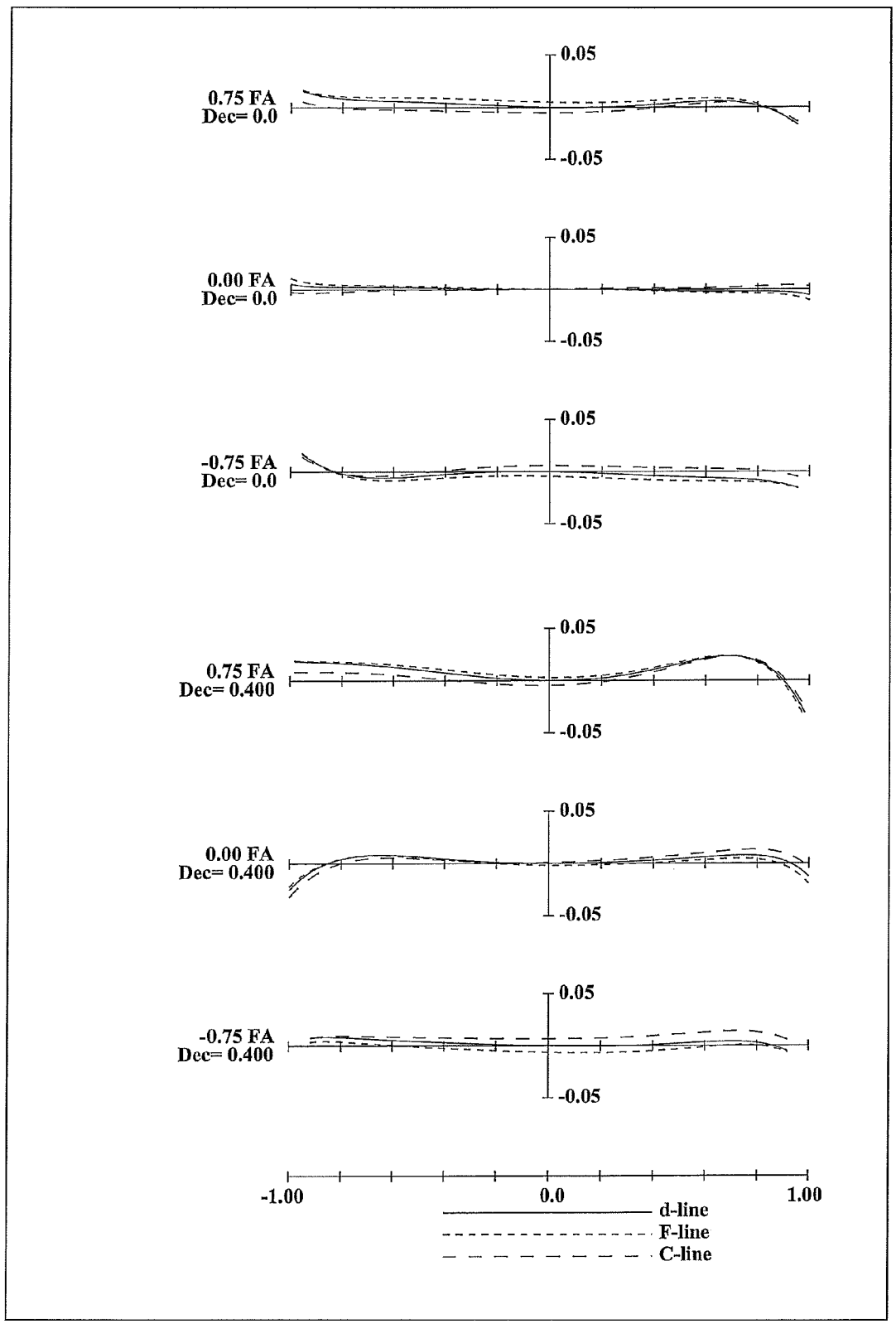
FIG. 48 is a lateral aberration diagram in a basic state where image blur compensation is not performed and in an image blur compensation state at a telephoto limit of a zoom lens system according to Example 12.

The zoom lens system of Numerical Example 12 corresponds to Embodiment 12 shown in FIG. 45. Table 46 shows the surface data of the zoom lens system of Numerical Example 12. Table 47 shows the aspherical data. Table 48 shows various data. Table 49 shows the zoom lens unit data.

TABLE 46

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 35.23940 | 4.60490 | 1.62299 | 58.1 |
| 3 | 146.60500 | 0.10000 | | |
| 4 | 32.99430 | 4.17360 | 1.80420 | 46.5 |
| 5 | 121.46300 | Variable | | |
| 6* | 56.16390 | 1.20000 | 1.85976 | 40.5 |
| 7 | 8.12330 | 4.35250 | | |
| 8 | −21.45650 | 0.70000 | 1.88300 | 40.8 |
| 9 | 34.64830 | 0.71300 | | |
| 10 | 22.59170 | 2.59950 | 1.92286 | 20.9 |
| 11 | −28.93770 | 0.83860 | | |
| 12 | −13.14350 | 0.80000 | 1.80420 | 46.5 |
| 13 | −30.75660 | Variable | | |
| 14 | 19.23570 | 0.70000 | 1.81183 | 28.8 |
| 15 | 10.73730 | 2.42280 | 1.64139 | 56.0 |
| 16* | −36.39360 | Variable | | |
| 17 | ∞ | 0.80000 | | |
| (Aperture) | | | | |
| 18 | 14.06440 | 2.43070 | 1.63547 | 59.4 |
| 19 | −37.47820 | 0.10000 | | |
| 20 | 48.44800 | 2.04680 | 1.51782 | 55.4 |
| 21 | −14.08110 | 0.80000 | 1.80429 | 46.4 |
| 22 | 13.50040 | Variable | | |
| 23 | 18.77840 | 3.50520 | 1.48749 | 70.4 |
| 24 | −15.03170 | 0.09980 | | |
| 25* | −38.22710 | 1.20000 | 1.68400 | 31.3 |
| 26 | 24.64730 | 0.47430 | | |
| 27 | 48.87990 | 3.73520 | 1.56071 | 43.9 |
| 28 | −10.22970 | 0.70000 | 1.80420 | 46.5 |
| 29 | −35.25900 | BF | | |
| Image surface | ∞ | | | |

TABLE 47

(aspherical data)

| Surface No. | Parameters |
|---|---|
| 6 | K = 0.00000E+00, A4 = 3.77145E−05, A6 = −3.27660E−07, A8 = 4.20835E−09, A10 = −3.84294E−11, A12 = 1.53222E−13 |
| 16 | K = 0.00000E+00, A4 = 3.61692E−05, A6 = −6.05514E−08, A8 = −1.68025E−09, A10 = 0.00000E+00, A12 = 0.00000E+00 |
| 25 | K = 0.00000E+00, A4 = −9.27327E−05, A6 = −7.61534E−07, A8 = −1.95775E−09, A10 = 2.58420E−10, A12 = −3.50474E−12 |

TABLE 48

(various data)

Zooming ratio 4.77508

| | Wide | Middle | Telephoto |
|---|---|---|---|
| Focal length | 12.2510 | 26.7706 | 58.4997 |
| F-number | 3.60055 | 5.10050 | 5.70104 |
| View angle | 43.5988 | 21.8377 | 10.3518 |
| Image height | 11.0000 | 11.0000 | 11.0000 |
| Overall length of lens system | 75.1917 | 87.4143 | 107.7782 |
| BF | 14.23280 | 27.63772 | 41.54696 |
| d5 | 0.8000 | 10.1196 | 20.3594 |
| d13 | 11.2845 | 4.7436 | 1.2000 |
| d16 | 2.0562 | 2.3579 | 3.1478 |
| d22 | 6.5213 | 2.2586 | 1.2271 |

TABLE 49

(zoom lens unit data)

| Unit | Initial surface No. | Focal length |
|---|---|---|
| 1 | 1 | 55.88415 |
| 2 | 6 | −8.05102 |
| 3 | 14 | 23.12958 |
| 4 | 17 | 169.26047 |
| 5 | 23 | 41.63152 |

Numerical Example 13

Figure 49:
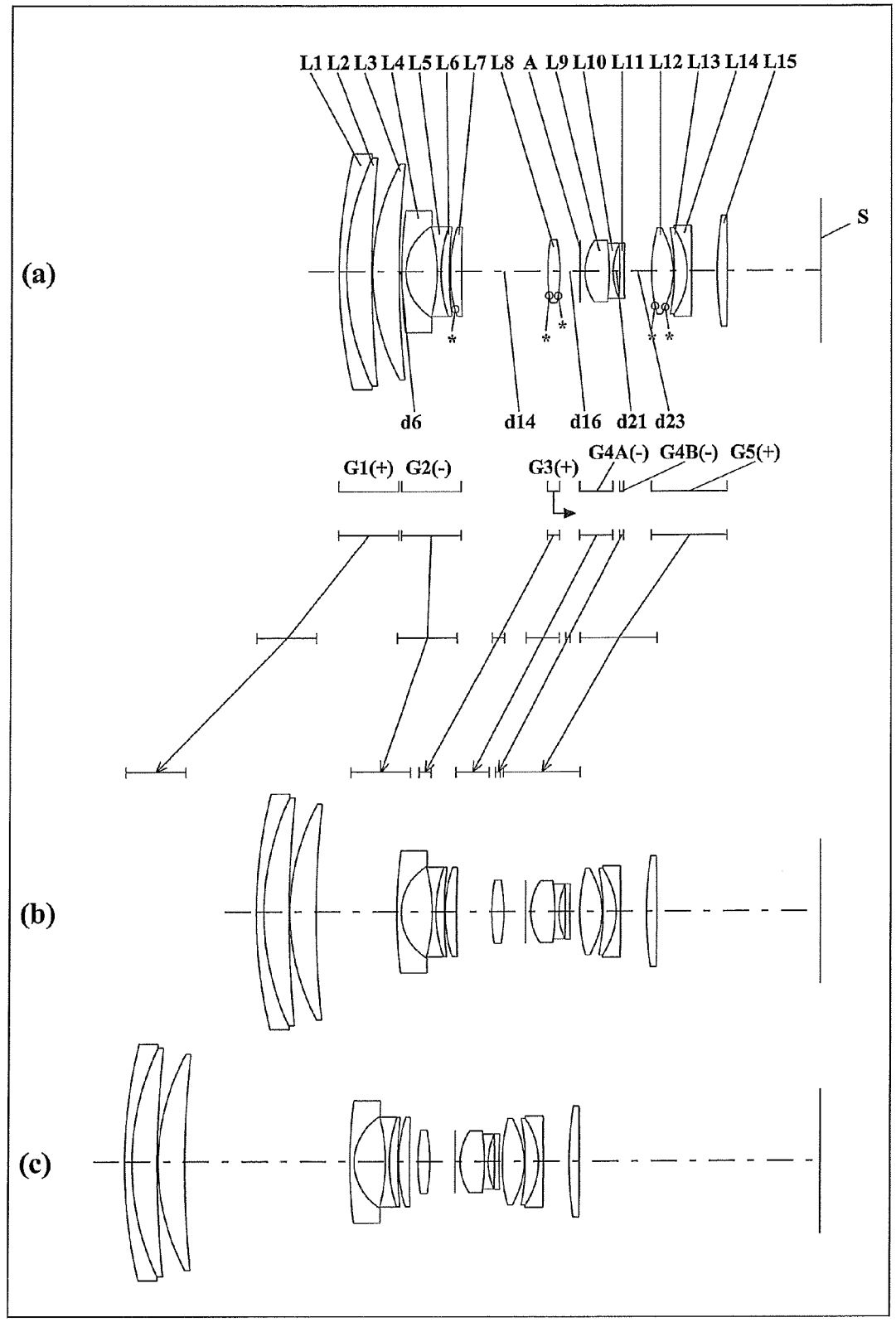
FIG. 49 is a lens arrangement diagram showing an infinity in-focus condition of a zoom lens system according to Embodiment 13 (Example 13)
Figure 50:
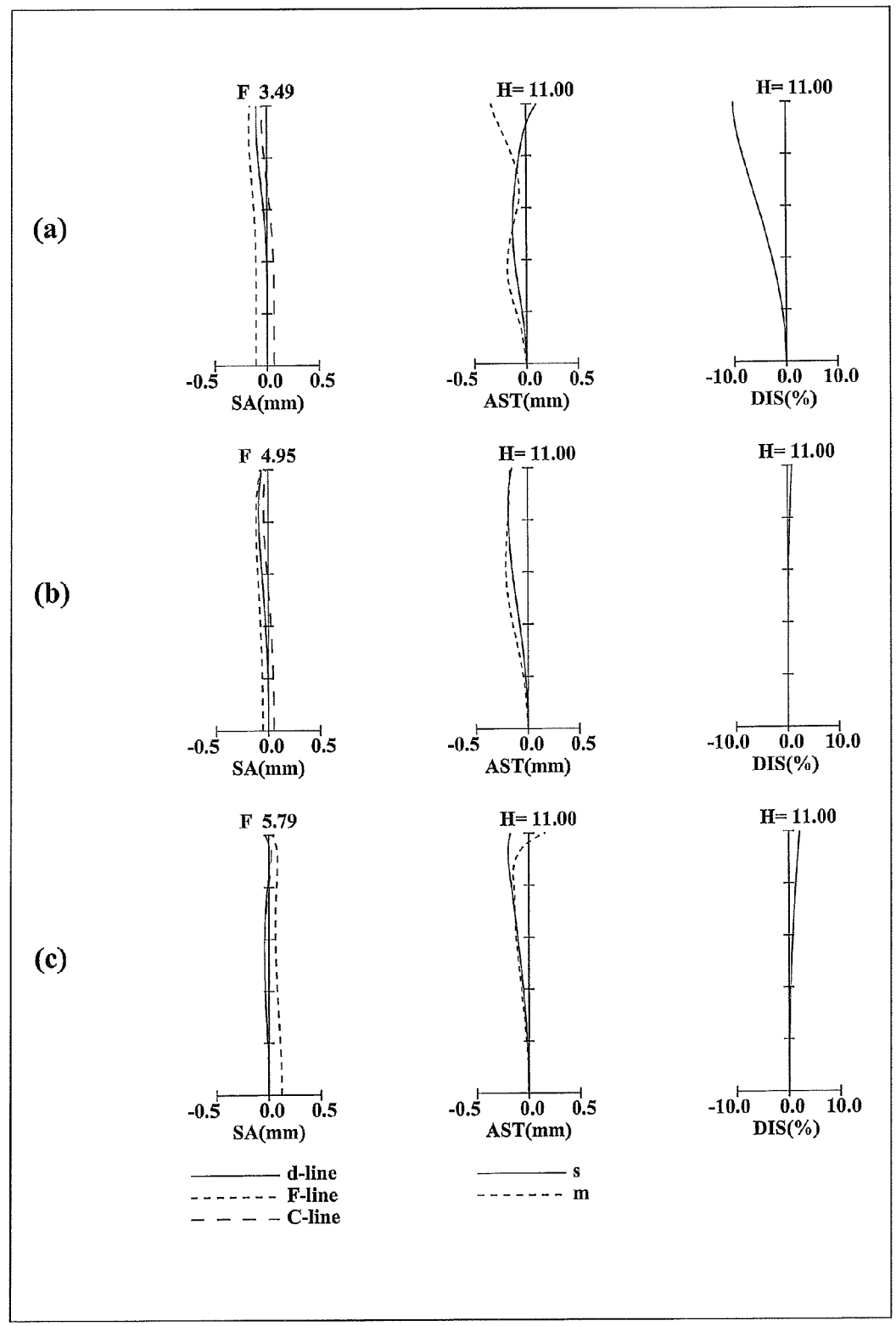
FIG. 50 is a longitudinal aberration diagram showing an infinity in-focus condition of a zoom lens system according to Example 13.
Figure 51:
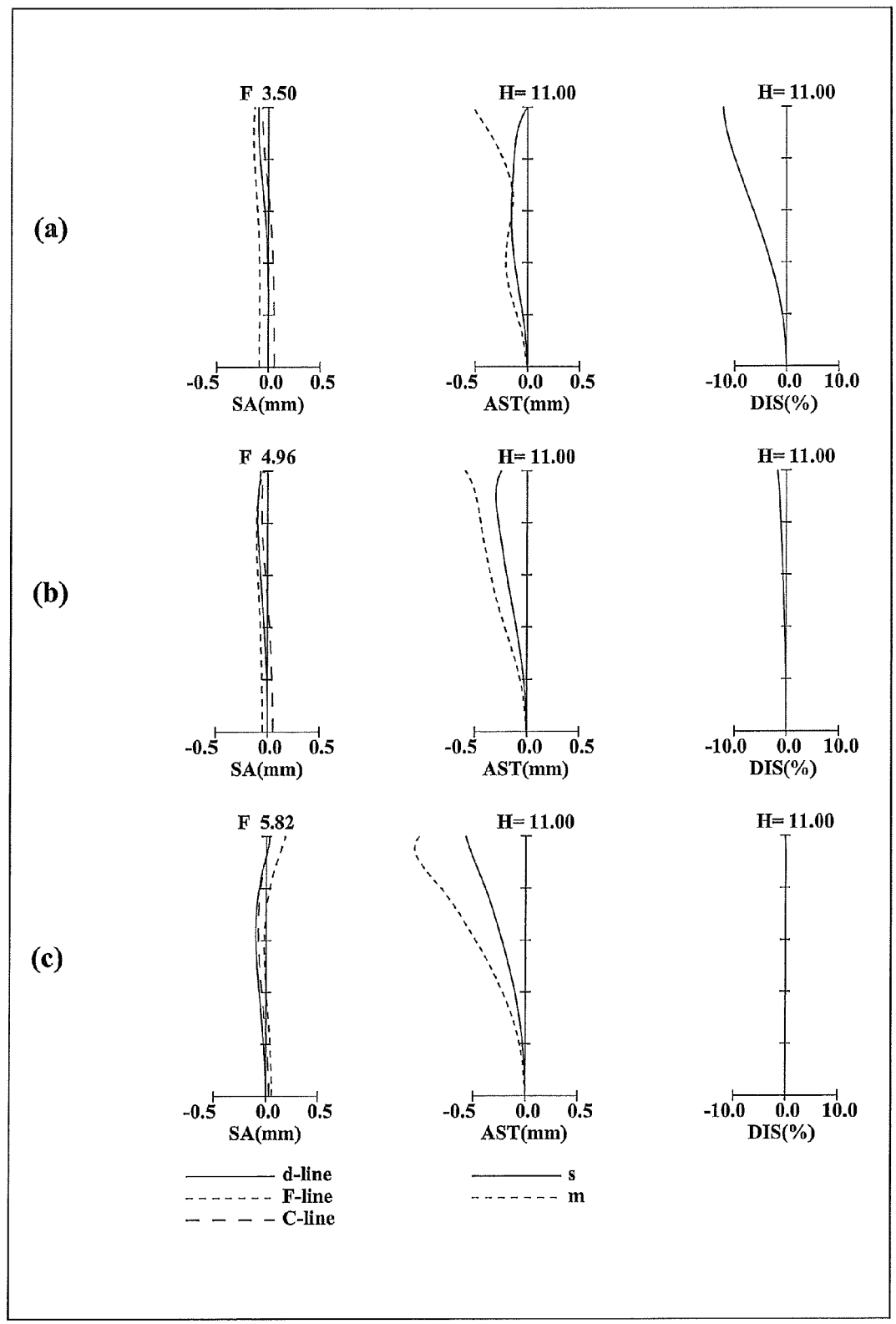
FIG. 51 is a longitudinal aberration diagram showing a close-point in-focus condition of a zoom lens system according to Example 13.
Figure 52:
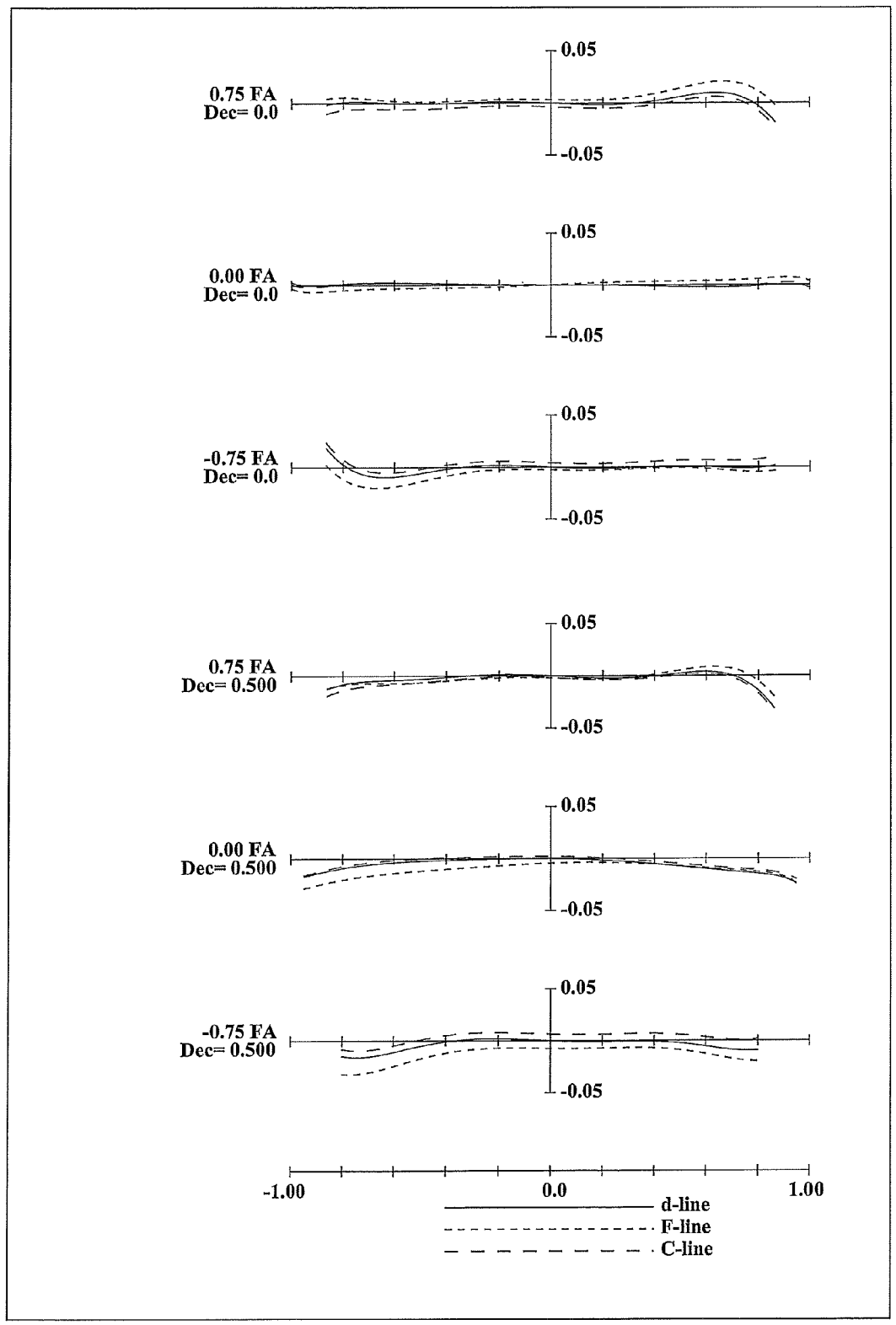
FIG. 52 is a lateral aberration diagram in a basic state where image blur compensation is not performed and in an image blur compensation state at a telephoto limit of a zoom lens system according to Example 13.

The zoom lens system of Numerical Example 13 corresponds to Embodiment 13 shown in FIG. 49. Table 50 shows the surface data of the zoom lens system of Numerical Example 13. Table 51 shows the aspherical data. Table 52 shows various data. Table 53 shows the zoom lens unit data.

TABLE 50

(surface data)

| Surface number | r | d | nd | vd |
|---|---|---|---|---|
| Object surface | ∞ | | | |
| 1 | 79.85740 | 1.20000 | 1.84666 | 23.8 |
| 2 | 42.90190 | 0.01000 | 1.56732 | 42.8 |
| 3 | 42.90190 | 4.02100 | 1.62299 | 58.1 |
| 4 | 178.47990 | 0.15000 | | |
| 5 | 36.47630 | 4.21400 | 1.58913 | 61.3 |
| 6 | 156.48860 | Variable | | |
| 7 | 75.42430 | 0.70000 | 1.88300 | 40.8 |
| 8 | 8.63110 | 4.99200 | | |
| 9 | −27.78580 | 0.60000 | 1.72916 | 54.7 |
| 10 | 22.16910 | 0.01000 | 1.56732 | 42.8 |
| 11 | 22.16910 | 1.32120 | 1.94595 | 18.0 |
| 12 | 64.47310 | 0.15000 | | |
| 13* | 25.20890 | 1.78380 | 1.68400 | 31.3 |
| 14 | 200.13630 | Variable | | |
| 15* | 31.56710 | 1.92050 | 1.68863 | 52.8 |
| 16* | −24.98200 | Variable | | |
| 17 (Aperture) | ∞ | 0.80000 | | |
| 18 | 8.86320 | 3.88860 | 1.51214 | 67.9 |
| 19 | −34.59720 | 0.01000 | 1.56732 | 42.8 |
| 20 | −34.59720 | 0.60000 | 1.83400 | 37.3 |
| 21 | 10.45970 | 1.02340 | | |
| 22 | −171.29230 | 0.70000 | 1.81427 | 37.6 |
| 23 | 85.40420 | Variable | | |
| 24* | 25.85530 | 3.50930 | 1.60820 | 57.8 |
| 25* | −12.17470 | 0.15160 | | |
| 26 | −37.41050 | 2.11200 | 1.48746 | 70.3 |
| 27 | −12.12240 | 0.01000 | 1.56732 | 42.8 |
| 28 | −12.12240 | 0.70000 | 1.82087 | 33.5 |
| 29 | −623.66470 | 4.14200 | | |
| 30 | 59.92360 | 1.62660 | 1.84679 | 23.9 |
| 31 | −573.64510 | BF | | |
| Image surface | ∞ | | | |

TABLE 51

(aspherical data)

| Surface No. | Parameters |
|---|---|
| 13 | K = 7.76662E−01, A4 = 3.17829E−05, A6 = −8.33555E−08, A8 = −1.21719E−09, A10 = 1.59898E−10, A12 = −2.09850E−12 |
| 15 | K = 0.00000E+00, A4 = −6.99200E−06, A6 = 1.81625E−06, A8 = −2.31634E−08, A10 = 1.64207E−09, A12 = 0.00000E+00 |
| 16 | K = 0.00000E+00, A4 = 2.92032E−05, A6 = 1.26564E−06, A8 = −1.15990E−08, A10 = 1.65715E−09, A12 = 0.00000E+00 |
| 24 | K = −7.69668E−01, A4 = −3.70313E−05, A6 = 8.27040E−07, A8 = −5.36566E−08, A10 = 1.55393E−09, A12 = −9.43912E−12 |
| 25 | K = 1.15274E+00, A4 = 1.22175E−04, A6 = 3.94692E−06, A8 = −9.69229E−08, A10 = 1.83580E−09, A12 = 0.00000E+00 |

TABLE 52

(various data)

Zooming ratio 4.69384

| | Wide | Middle | Telephoto |
|---|---|---|---|
| Focal length | 12.3601 | 26.7744 | 58.0164 |
| F-number | 3.49386 | 4.94748 | 5.78661 |
| View angle | 44.7403 | 22.1717 | 10.5263 |
| Image height | 11.0000 | 11.0000 | 11.0000 |
| Overall length of lens system | 77.2022 | 90.3080 | 111.1832 |
| BF | 15.01926 | 26.33363 | 38.54196 |
| d6 | 0.4209 | 12.9271 | 26.4526 |
| d14 | 13.7989 | 5.6781 | 1.3151 |
| d16 | 3.2098 | 3.4219 | 4.0175 |
| d23 | 4.4073 | 1.6013 | 0.5100 |

TABLE 53

(zoom lens unit data)

| Unit | Initial surface No. | Focal length |
|---|---|---|
| 1 | 1 | 69.86430 |
| 2 | 7 | −10.08322 |
| 3 | 15 | 20.53559 |
| 4 | 17 | −34.55578 |
| 5 | 24 | 21.26831 |

Numerical Example 14

Figure 53:
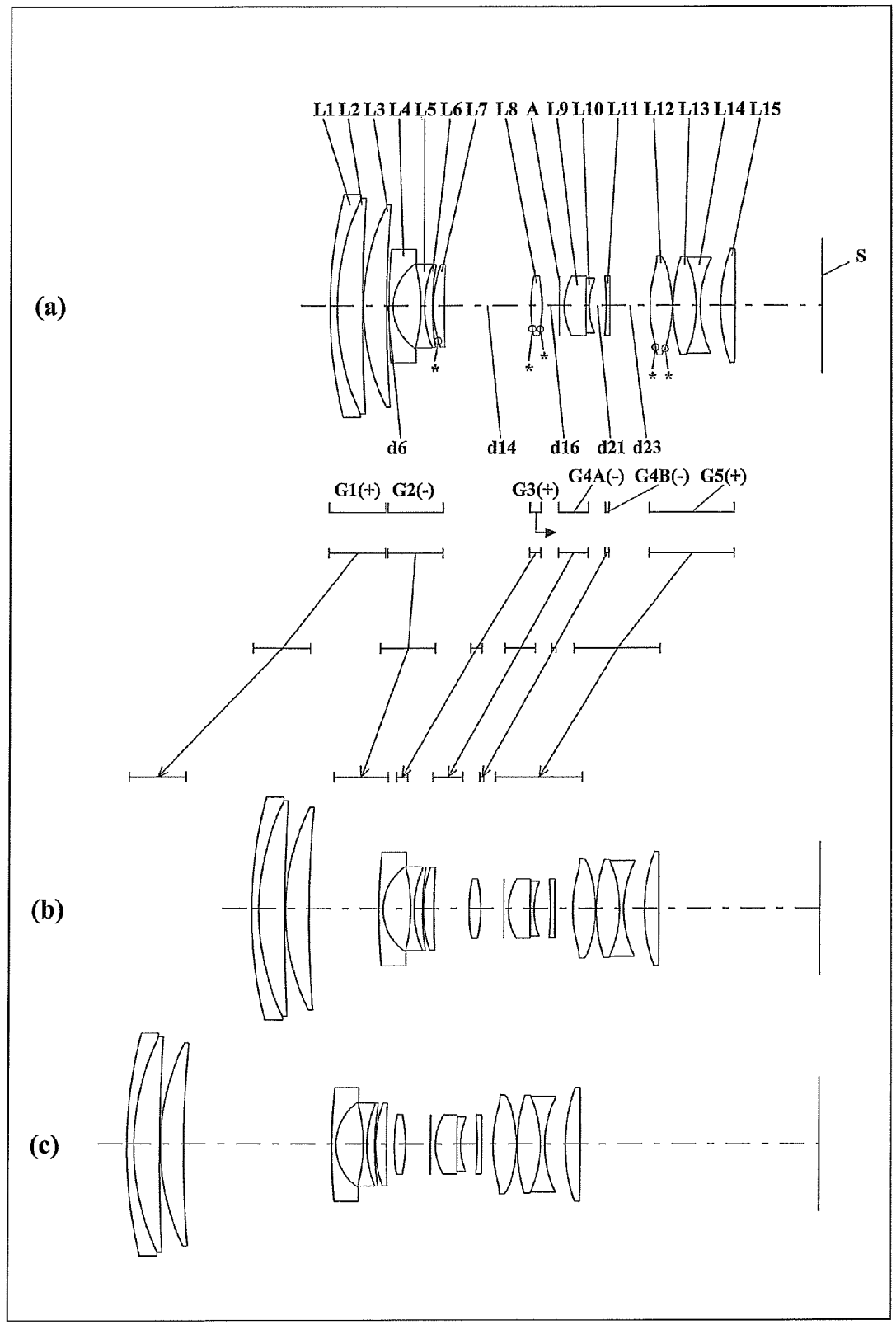
FIG. 53 is a lens arrangement diagram showing an infinity in-focus condition of a zoom lens system according to Embodiment 14 (Example 14)
Figure 54:
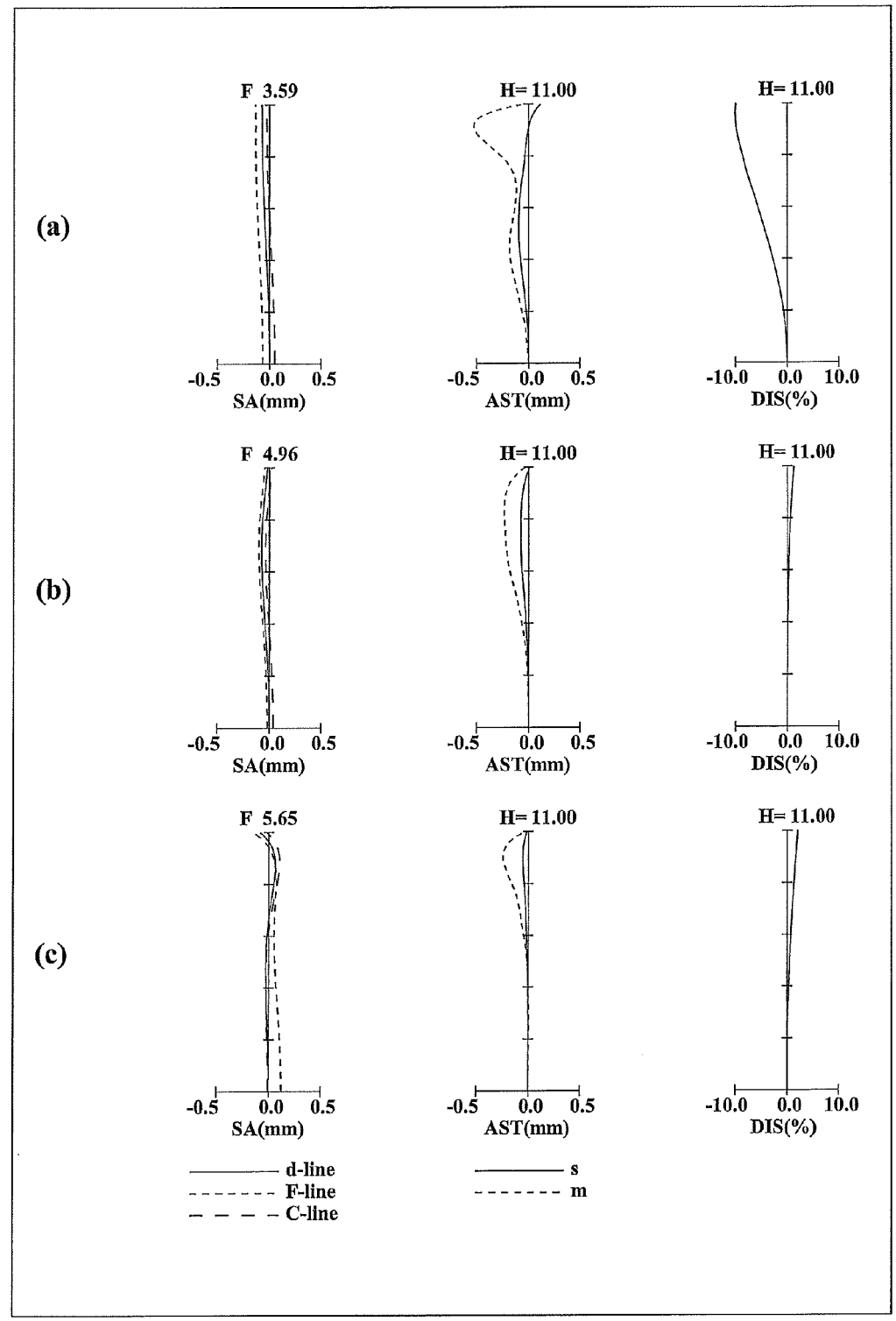
FIG. 54 is a longitudinal aberration diagram showing an infinity in-focus condition of a zoom lens system according to Example 14.
Figure 55:
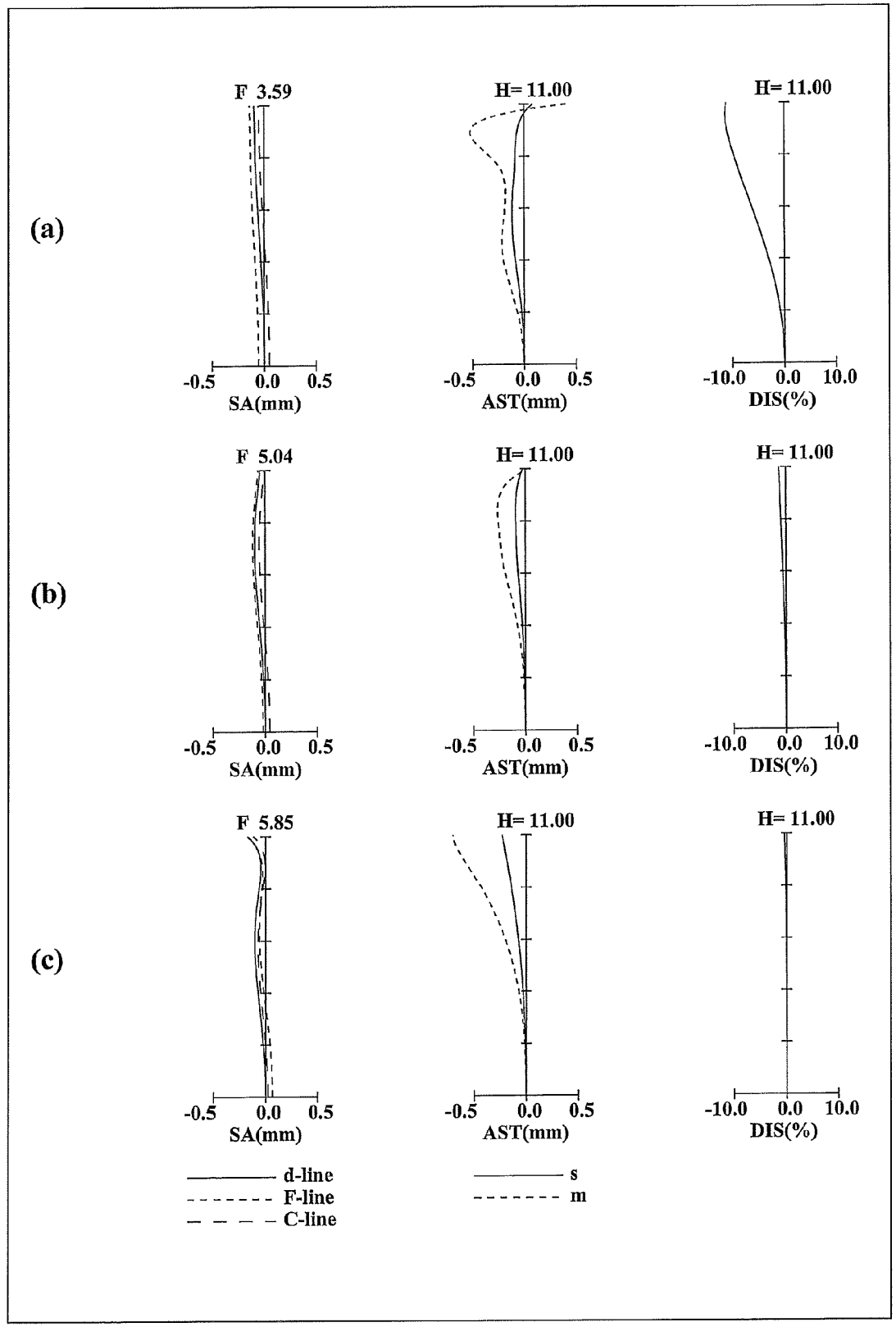
FIG. 55 is a longitudinal aberration diagram showing a close-point in-focus condition of a zoom lens system according to Example 14.
Figure 56:
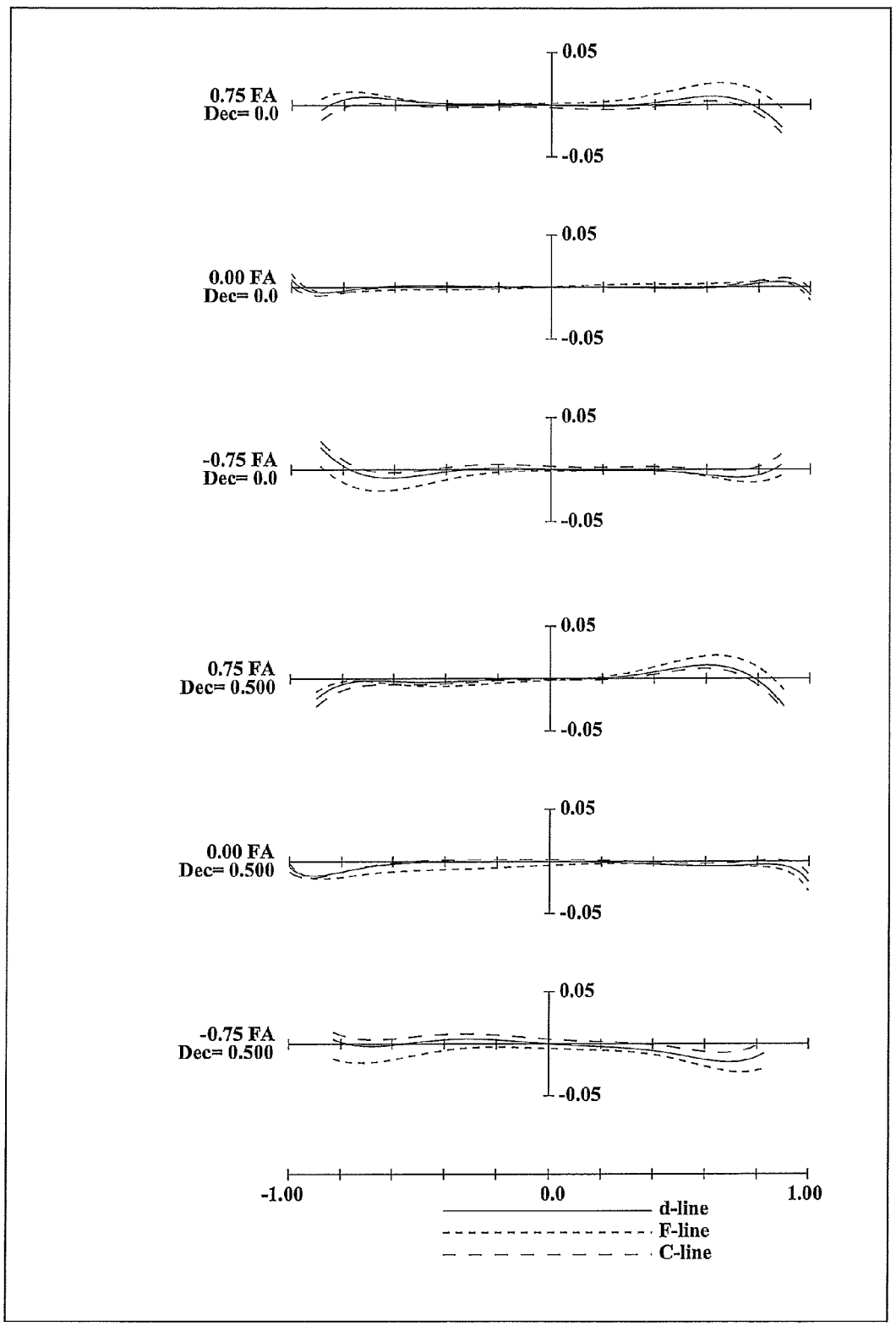
FIG. 56 is a lateral aberration diagram in a basic state where image blur compensation is not performed and in an image blur compensation state at a telephoto limit of a zoom lens system according to Example 14.

The zoom lens system of Numerical Example 14 corresponds to Embodiment 14 shown in FIG. 53. Table 53 shows the surface data of the zoom lens system of Numerical Example 14. Table 54 shows the aspherical data. Table 55 shows various data. Table 56 shows the zoom lens unit data.

TABLE 54

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 43.67470 | 0.01000 | 1.56732 | 42.8 |
| 3 | 43.67470 | 4.41580 | 1.62299 | 58.1 |
| 4 | 314.96890 | 0.15000 | | |
| 5 | 39.85940 | 3.99980 | 1.58913 | 61.3 |
| 6 | 199.87000 | Variable | | |
| 7 | 107.66530 | 0.70000 | 1.88300 | 40.8 |
| 8 | 8.91870 | 4.77870 | | |
| 9 | −28.67460 | 0.60000 | 1.72916 | 54.7 |
| 10 | 18.55870 | 0.01000 | 1.56732 | 42.8 |
| 11 | 18.55870 | 1.38500 | 1.94595 | 18.0 |
| 12 | 44.73720 | 0.15000 | | |
| 13* | 22.50310 | 1.83090 | 1.68400 | 31.3 |
| 14 | 149.31330 | Variable | | |
| 15* | 31.63230 | 1.91490 | 1.60671 | 57.4 |
| 16* | −23.40760 | Variable | | |
| 17 (Aperture) | ∞ | 0.80000 | | |
| 18 | 10.42680 | 3.70590 | 1.49434 | 66.2 |
| 19 | 293.33330 | 0.01000 | 1.56732 | 42.8 |
| 20 | 293.33330 | 0.60000 | 1.82093 | 33.5 |
| 21 | 12.24480 | 2.86850 | | |
| 22 | −60.34770 | 0.70000 | 1.80420 | 46.5 |
| 23 | ∞ | Variable | | |
| 24* | 23.63400 | 3.89020 | 1.60600 | 57.5 |
| 25* | −22.45830 | 0.15000 | | |
| 26 | 27.72330 | 3.99190 | 1.48749 | 70.4 |
| 27 | −21.04610 | 0.01000 | 1.56732 | 42.8 |
| 28 | −21.04610 | 0.70000 | 1.82852 | 29.8 |
| 29 | 18.79900 | 3.53510 | | |
| 30 | 29.94510 | 2.53130 | 1.84666 | 23.8 |
| 31 | −705.16990 | BF | | |
| Image surface | ∞ | | | |

TABLE 55

(aspherical data)

| Surface No. | Parameters |
|---|---|
| 13 | K = 5.57201E+00, A4 = −3.56370E−05, A6 = −3.74234E−07, A8 = −1.39332E−08, A10 = 3.28664E−10, A12 = −4.83633E−12 |
| 15 | K = 0.00000E+00, A4 = 1.15577E−05, A6 = −5.20999E−07, A8 = 1.19760E−07, A10 = 1.70358E−10, A12 = 0.00000E+00 |
| 16 | K = 0.00000E+00, A4 = 4.94436E−05, A6 = −4.81411E−07, A8 = 1.04384E−07, A10 = 6.85884E−10, A12 = 0.00000E+00 |

TABLE 55-continued (aspherical data)

| Surface No. | Parameters |
|---|---|
| 24 | K = 0.00000E+00, A4 = 8.79077E−06, A6 = −1.74664E−06, A8 = 4.96314E−08, A10 = −8.19694E−10, A12 = 2.72586E−12 |
| 25 | K = 2.19312E+00, A4 = 6.16469E−05, A6 = −8.57834E−07, A8 = 2.53752E−08, A10 = −3.86943E−10, A12 = 0.00000E+00 |

TABLE 56

(various data)

| Zooming ratio | 4.70901 | | |
|---|---|---|---|
| | Wide | Middle | Telephoto |
| Focal length | 12.3606 | 26.8091 | 58.2061 |
| F-number | 3.59003 | 4.95559 | 5.65473 |
| View angle | 44.6462 | 22.0536 | 10.4938 |
| Image height | 11.0000 | 11.0000 | 11.0000 |
| Overall length of lens system | 84.7185 | 97.6260 | 118.6772 |
| BF | 14.96866 | 27.74422 | 41.07506 |
| d6 | 0.4179 | 12.1408 | 25.2691 |
| d14 | 14.8605 | 6.0603 | 1.3629 |
| d16 | 2.9824 | 3.9321 | 4.3321 |
| d23 | 6.8510 | 3.1106 | 2.0000 |

TABLE 57

(zoom lens unit data)

| Unit | Initial surface No. | Focal length |
|---|---|---|
| 1 | 1 | 65.51468 |
| 2 | 7 | −9.77604 |
| 3 | 15 | 22.46848 |
| 4 | 17 | −46.31576 |
| 5 | 24 | 23.77370 |

Numerical Example 15

Figure 57:
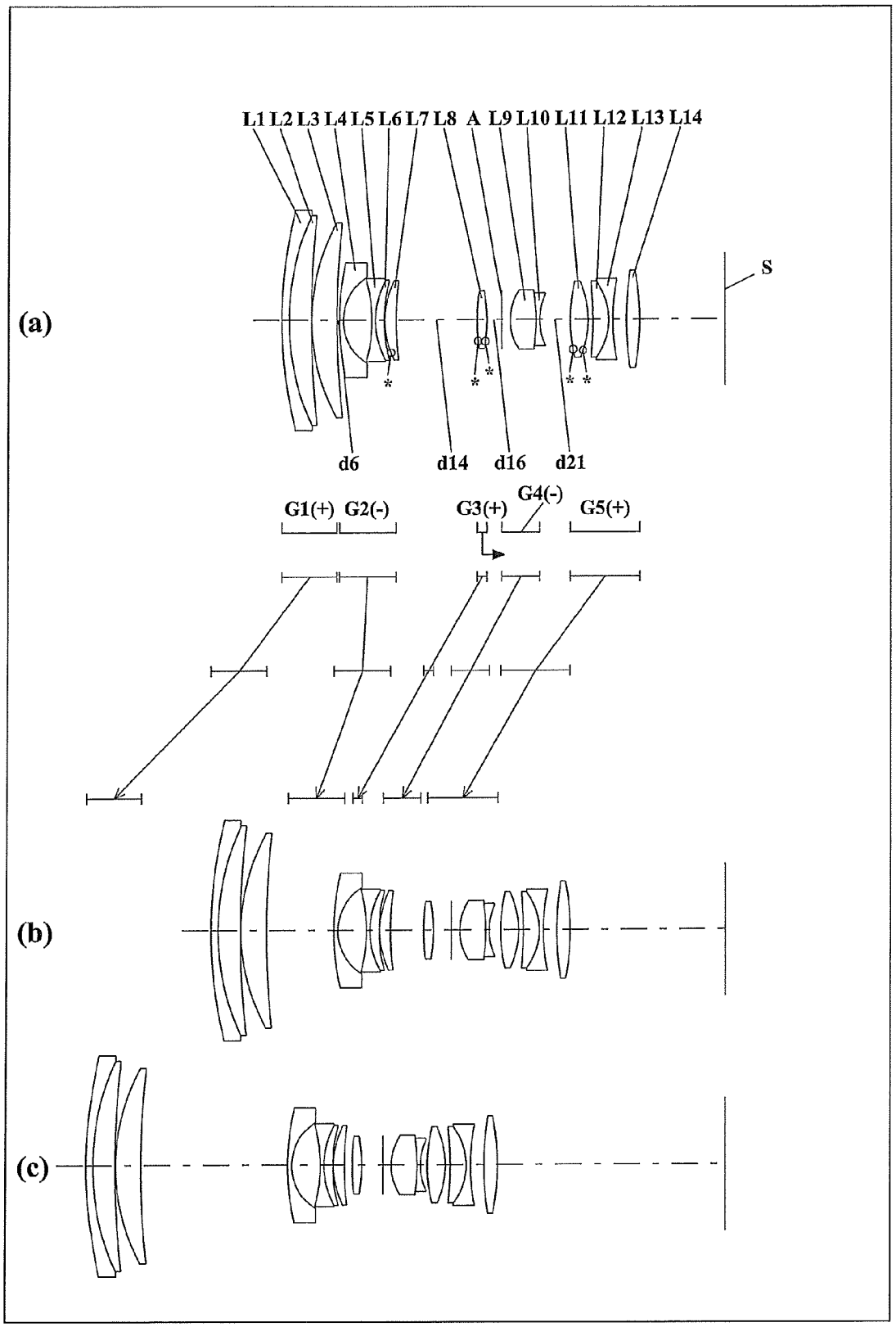
FIG. 57 is a lens arrangement diagram showing an infinity in-focus condition of a zoom lens system according to Embodiment 15 (Example 15)
Figure 58:
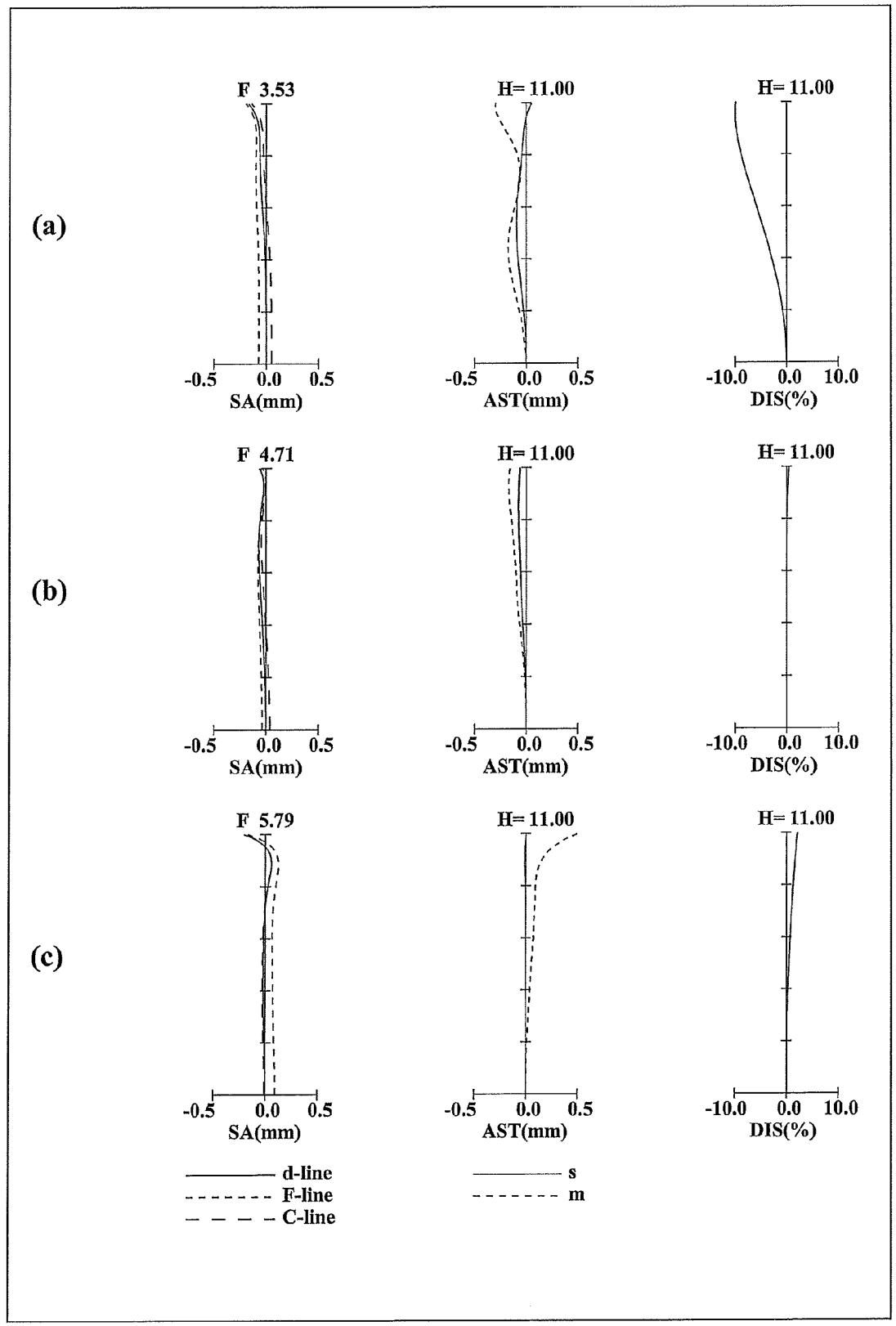
FIG. 58 is a longitudinal aberration diagram showing an infinity in-focus condition of a zoom lens system according to Example 15.
Figure 59:
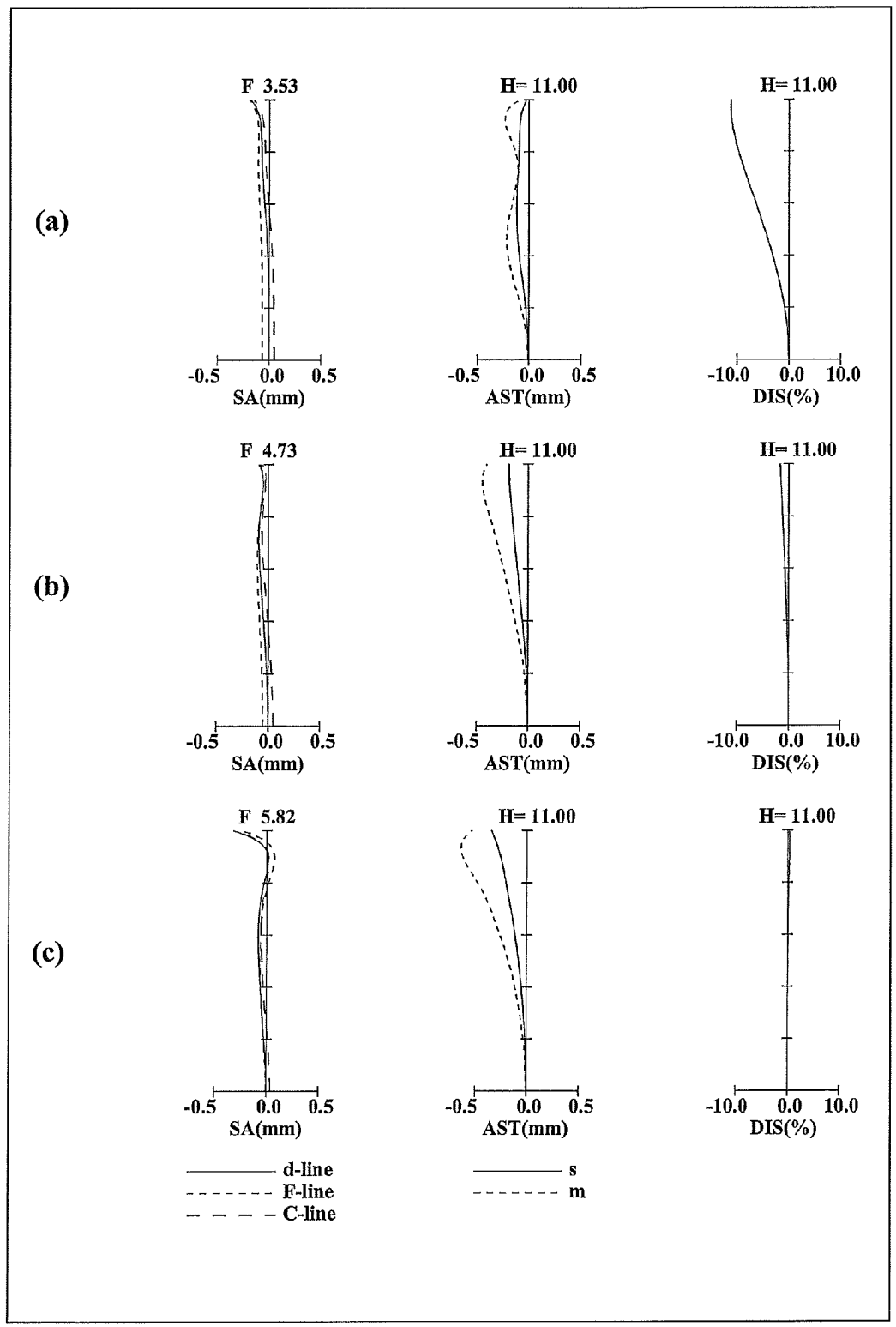
FIG. 59 is a longitudinal aberration diagram showing a close-point in-focus condition of a zoom lens system according to Example 15.
Figure 60:
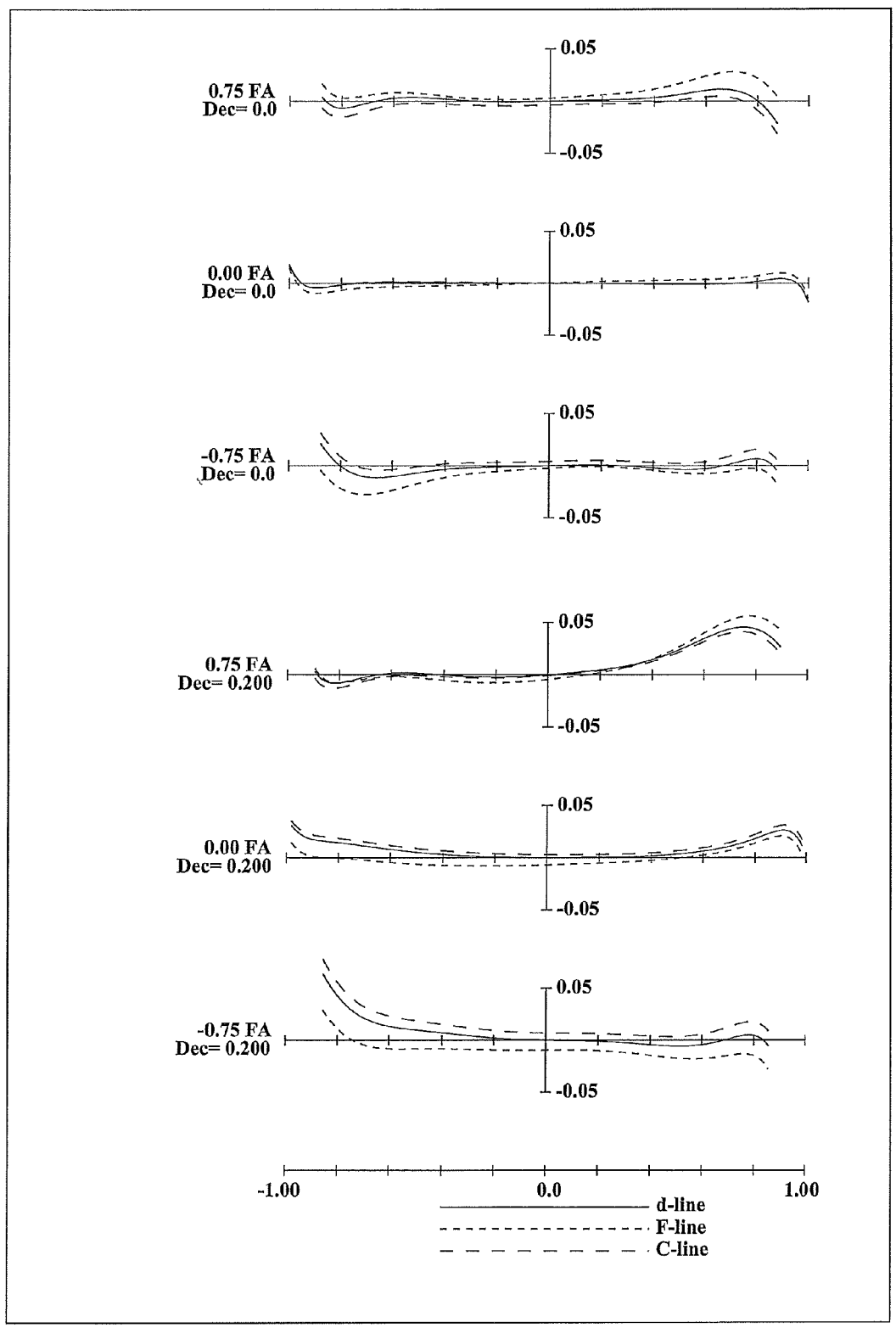
FIG. 60 is a lateral aberration diagram in a basic state where image blur compensation is not performed and in an image blur compensation state at a telephoto limit of a zoom lens system according to Example 15.

The zoom lens system of Numerical Example 15 corresponds to Embodiment 15 shown in FIG. 57. Table 58 shows the surface data of the zoom lens system of Numerical Example 15. Table 59 shows the aspherical data. Table 60 shows various data. Table 61 shows the zoom lens unit data.

TABLE 58

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 43.69660 | 0.01000 | 1.56732 | 42.8 |
| 3 | 43.69660 | 3.88150 | 1.62299 | 58.1 |
| 4 | 157.89800 | 0.10000 | | |
| 5 | 35.15840 | 4.43540 | 1.58913 | 61.3 |
| 6 | 154.58910 | Variable | | |
| 7 | 44.74720 | 0.70000 | 1.88300 | 40.8 |
| 8 | 8.75050 | 5.05830 | | |
| 9 | −26.46620 | 0.60000 | 1.72916 | 54.7 |
| 10 | 14.41410 | 0.01000 | 1.56732 | 42.8 |
| 11 | 14.41410 | 1.55510 | 1.94595 | 18.0 |
| 12 | 25.71210 | 0.10000 | | |
| 13* | 14.48460 | 1.92570 | 1.68400 | 31.3 |

TABLE 58-continued (surface data)

| Surface number | r | d | nd | vd |
|---|---|---|---|---|
| 14 | 51.53140 | Variable | | |
| 15* | 51.43310 | 1.63020 | 1.68863 | 52.8 |
| 16* | −25.11770 | Variable | | |
| 17 (Aperture) | ∞ | 1.50000 | | |
| 18 | 9.83310 | 4.44230 | 1.60311 | 60.7 |
| 19 | −33.30170 | 0.01000 | 1.56732 | 42.8 |
| 20 | −33.30170 | 0.60000 | 1.80610 | 33.3 |
| 21 | 10.37750 | Variable | | |
| 22* | 26.68240 | 3.10680 | 1.60820 | 57.8 |
| 23* | −15.69060 | 0.80680 | | |
| 24 | −67.36380 | 2.76710 | 1.48749 | 70.4 |
| 25 | −11.15520 | 0.01000 | 1.56732 | 42.8 |
| 26 | −11.15520 | 0.70000 | 1.80610 | 33.3 |
| 27 | 34.70820 | 2.32680 | | |
| 28 | 53.61740 | 2.36440 | 1.84666 | 23.8 |
| 29 | −45.70260 | BF | | |
| Image surface | ∞ | | | |

TABLE 59

(aspherical data)

| Surface No. | Parameters |
|---|---|
| 13 | K = −1.08699E+00, A4 = 1.98621E−06, A6 = 6.17544E−07, A8 = −4.81601E−08, A10 = 1.15961E−09, A12 = −1.05549E−11 |
| 15 | K = 0.00000E+00, A4 = −1.41590E−05, A6 = 8.39493E−06, A8 = −2.60947E−07, A10 = 8.46868E−09, A12 = 0.00000E+00 |
| 16 | K = 0.00000E+00, A4 = 1.73948E−05, A6 = 7.29318E−06, A8 = −2.08987E−07, A10 = 7.67727E−09, A12 = 0.00000E+00 |
| 22 | K = −1.89956E+00, A4 = −2.26837E−05, A6 = 4.15838E−07, A8 = −2.91604E−08, A10 = 2.58289E−10, A12 = 7.19058E−12 |
| 23 | K = 6.66600E−01, A4 = 1.65507E−05, A6 = 2.46380E−06, A8 = −8.78790E−08, A10 = 1.26195E−09, A12 = 0.00000E+00 |

TABLE 60

(various data)

Zooming ratio  4.69353

| | Wide | Middle | Telephoto |
|---|---|---|---|
| Focal length | 12.3602 | 26.7801 | 58.0130 |
| F-number | 3.52521 | 4.71488 | 5.78858 |
| View angle | 44.6330 | 22.2493 | 10.5212 |
| Image height | 11.0000 | 11.0000 | 11.0000 |
| Overall length of lens system | 77.2191 | 89.5268 | 111.1808 |
| BF | 14.96922 | 27.09637 | 39.63498 |
| d6 | 0.3994 | 11.8062 | 25.4291 |
| d14 | 14.0462 | 5.7627 | 1.4326 |
| d16 | 2.5685 | 3.0755 | 3.6755 |
| d21 | 5.3954 | 1.9456 | 1.1682 |

TABLE 61

(zoom lens unit data)

| Unit | Initial surface No. | Focal length |
|---|---|---|
| 1 | 1 | 68.92235 |
| 2 | 7 | −9.77303 |
| 3 | 15 | 24.72151 |
| 4 | 17 | −148.93870 |
| 5 | 22 | 26.64608 |

Numerical Example 16

Figure 61:
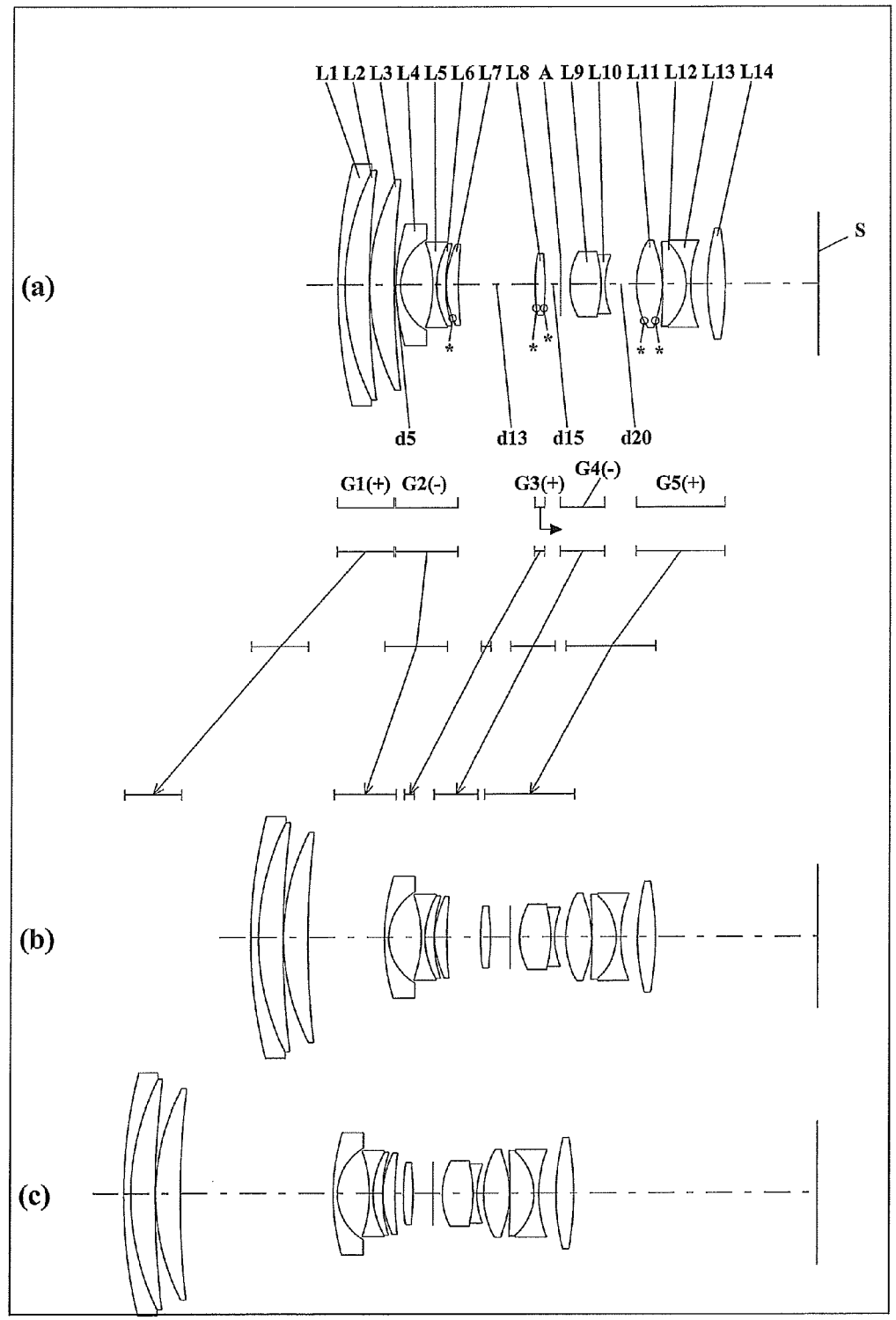
FIG. 61 is a lens arrangement diagram showing an infinity in-focus condition of a zoom lens system according to Embodiment 16 (Example 16)
Figure 62:
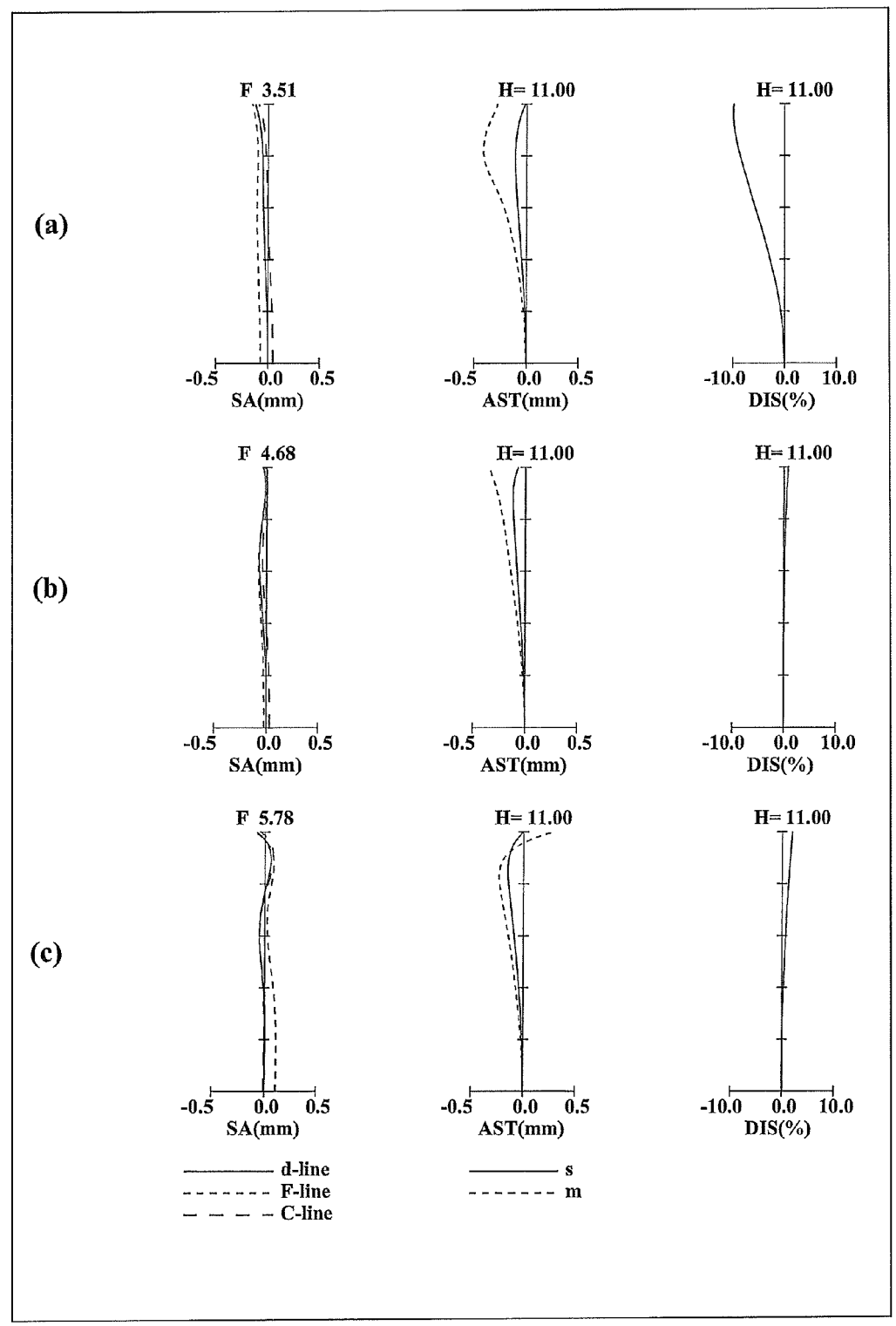
FIG. 62 is a longitudinal aberration diagram showing an infinity in-focus condition of a zoom lens system according to Example 16.
Figure 63:
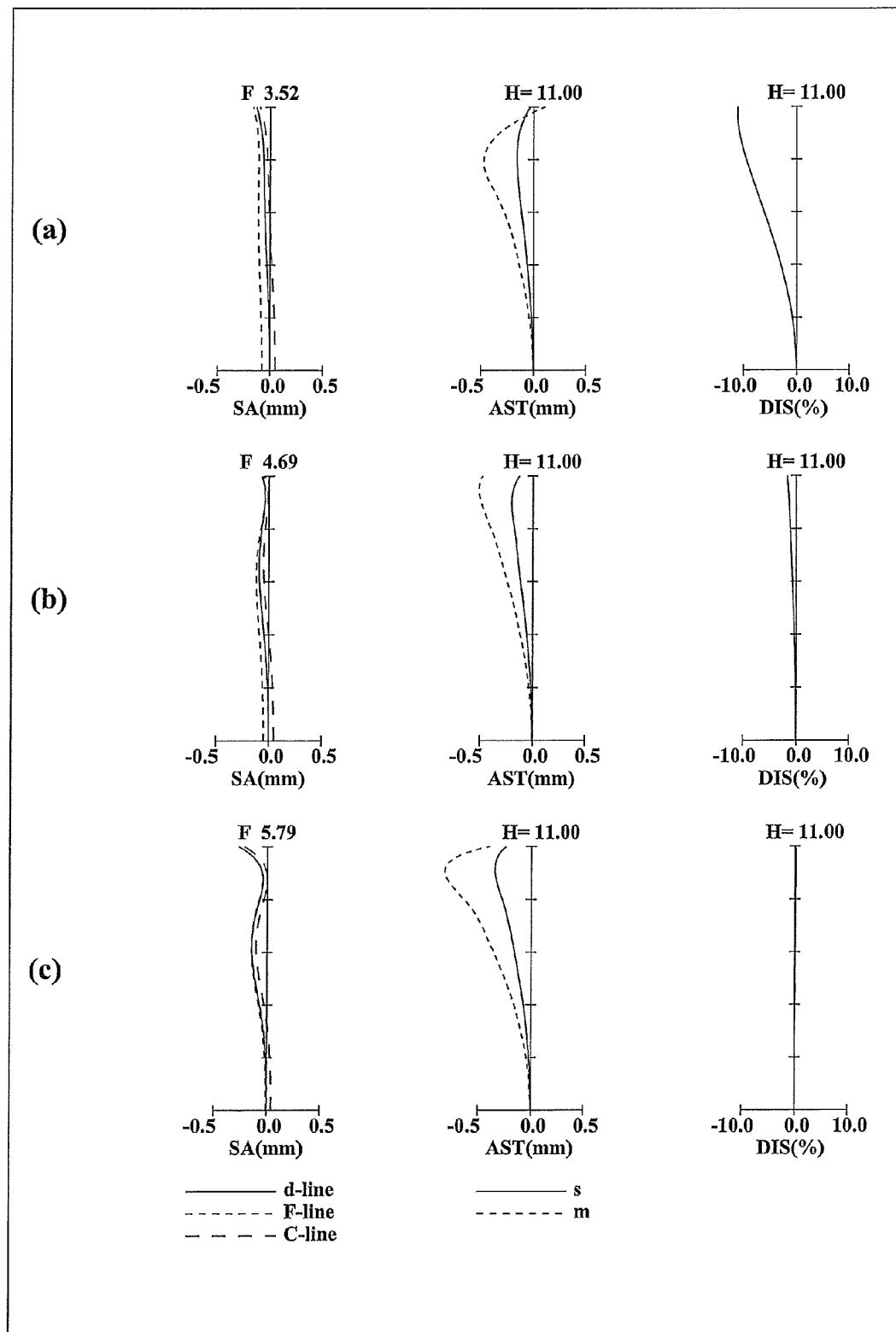
FIG. 63 is a longitudinal aberration diagram showing a close-point in-focus condition of a zoom lens system according to Example 16.
Figure 64:
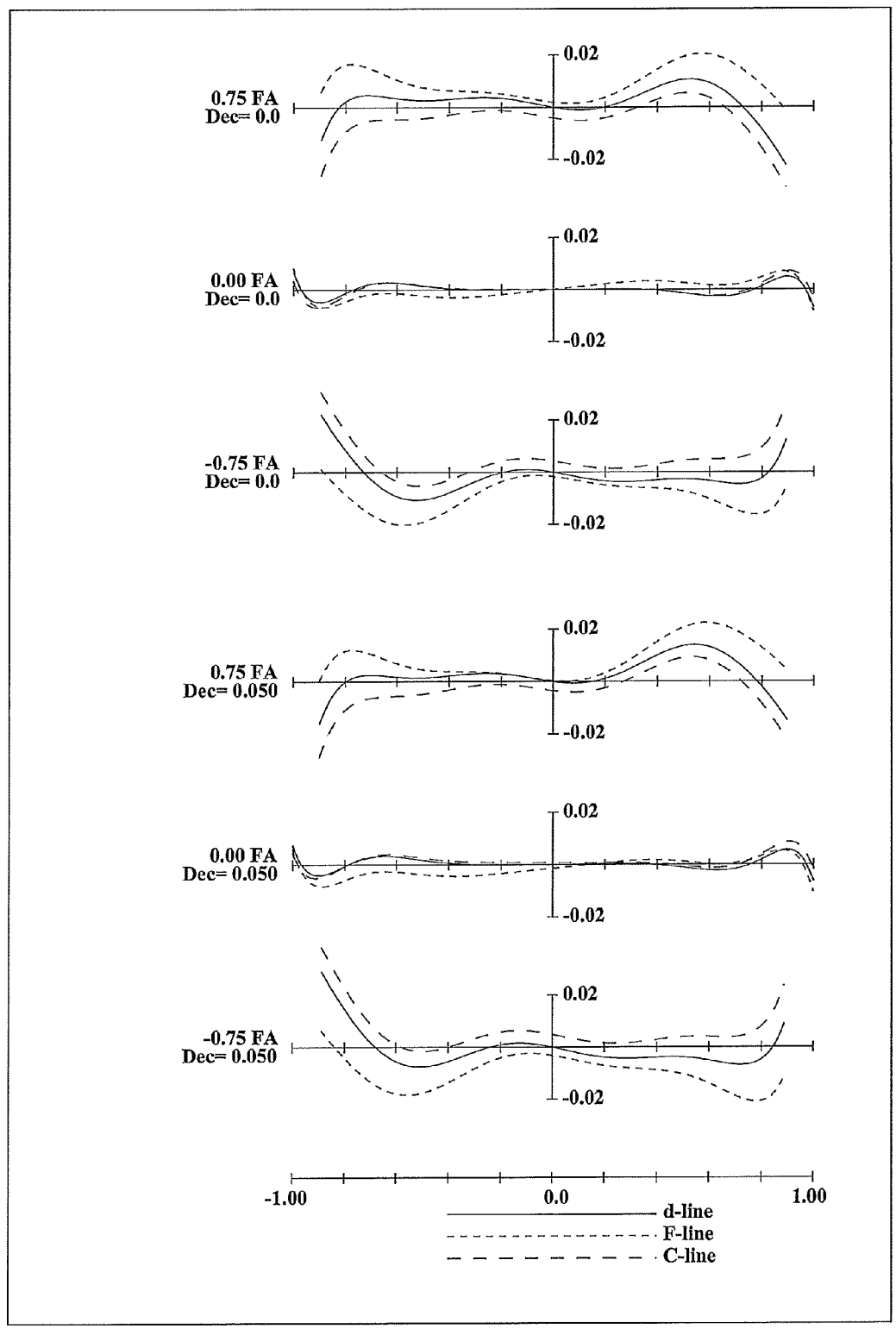
FIG. 64 is a lateral aberration diagram in a basic state where image blur compensation is not performed and in an image blur compensation state at a telephoto limit of a zoom lens system according to Example 16.

The zoom lens system of Numerical Example 16 corresponds to Embodiment 16 shown in FIG. 61. Table 62 shows the surface data of the zoom lens system of Numerical Example 16. Table 63 shows the aspherical data. Table 64 shows various data. Table 65 shows the zoom lens unit data.

TABLE 62

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 41.58340 | 3.90830 | 1.62299 | 58.1 |
| 3 | 144.84920 | 0.10000 | | |
| 4 | 37.06610 | 3.92650 | 1.72916 | 54.7 |
| 5 | 141.90650 | Variable | | |
| 6 | 33.75870 | 0.70000 | 1.88300 | 40.8 |
| 7 | 8.46830 | 5.19850 | | |
| 8 | −20.55630 | 0.60000 | 1.72916 | 54.7 |
| 9 | 13.22520 | 0.01000 | 1.56732 | 42.8 |
| 10 | 13.22520 | 1.47020 | 1.94595 | 18.0 |
| 11 | 21.73160 | 0.10000 | | |
| 12* | 13.49080 | 1.94590 | 1.68400 | 31.3 |
| 13 | 60.48790 | Variable | | |
| 14* | 46.43790 | 1.57530 | 1.68863 | 52.8 |
| 15* | −30.28080 | Variable | | |
| 16 (Aperture) | ∞ | 1.50000 | | |
| 17 | 11.07990 | 4.93530 | 1.61730 | 50.7 |
| 18 | −19.35760 | 0.01000 | 1.56732 | 42.8 |
| 19 | −19.35760 | 0.60000 | 1.80610 | 33.3 |
| 20 | 12.27420 | Variable | | |
| 21* | 15.17120 | 4.11750 | 1.60820 | 57.8 |
| 22* | −15.68910 | 0.10000 | | |
| 23 | −101.99330 | 3.81360 | 1.48749 | 70.4 |
| 24 | −8.95160 | 0.01000 | 1.56732 | 42.8 |
| 25 | −8.95160 | 0.70000 | 1.80610 | 33.3 |
| 26 | 19.61820 | 2.72370 | | |
| 27 | 34.10000 | 2.87450 | 1.84666 | 23.8 |
| 28 | −50.88280 | BF | | |
| Image surface | ∞ | | | |

TABLE 63

(aspherical data)

| Surface No. | Parameters |
|---|---|
| 12 | K = −2.91122E−01, A4 = −4.87111E−05, A6 = 3.58272E−07, A8 = −3.98970E−08, A10 = 8.17183E−10, A12 = −7.54821E−12 |
| 14 | K = 0.00000E+00, A4 = 1.14498E−04, A6 = −5.87437E−06, A8 = 5.18078E−07, A10 = −5.23207E−09, A12 = 0.00000E+00 |
| 15 | K = 0.00000E+00, A4 = 1.17386E−04, A6 = −4.48009E−06, A8 = 4.23034E−07, A10 = −2.80694E−09, A12 = 0.00000E+00 |
| 21 | K = −1.26649E−01, A4 = −4.33738E−05, A6 = 2.51212E−06, A8 = −1.02847E−07, A10 = 2.39403E−09, A12 = −1.16446E−11 |

TABLE 63-continued (aspherical data)

| Surface No. | Parameters |
|---|---|
| 22 | K = −4.78064E−01, A4 = 4.82511E−06, A6 = 2.51419E−06, A8 = −9.22663E−08, A10 = 1.63502E−09, A12 = 0.00000E+00 |

TABLE 64

(various data)

| Zooming ratio | 4.69375 | | |
|---|---|---|---|
| | Wide | Middle | Telephoto |
| Focal length | 12.3606 | 26.7881 | 58.0176 |
| F-number | 3.51495 | 4.68243 | 5.78475 |
| View angle | 44.6324 | 22.1606 | 10.5327 |
| Image height | 11.0000 | 11.0000 | 11.0000 |
| Overall length of lens system | 77.2128 | 90.9389 | 111.1817 |
| BF | 14.96805 | 26.13646 | 39.06839 |
| d5 | 0.2654 | 12.3490 | 24.4182 |
| d13 | 12.2765 | 5.4088 | 1.3371 |
| d15 | 2.4720 | 3.1413 | 3.1493 |
| d20 | 5.1115 | 1.7840 | 1.0894 |

TABLE 65

(zoom lens unit data)

| Unit | Initial surface No. | Focal length |
|---|---|---|
| 1 | 1 | 64.47440 |
| 2 | 6 | −9.11719 |
| 3 | 14 | 26.84137 |
| 4 | 16 | −171.73160 |
| 5 | 21 | 23.31583 |

Numerical Example 17

Figure 65:
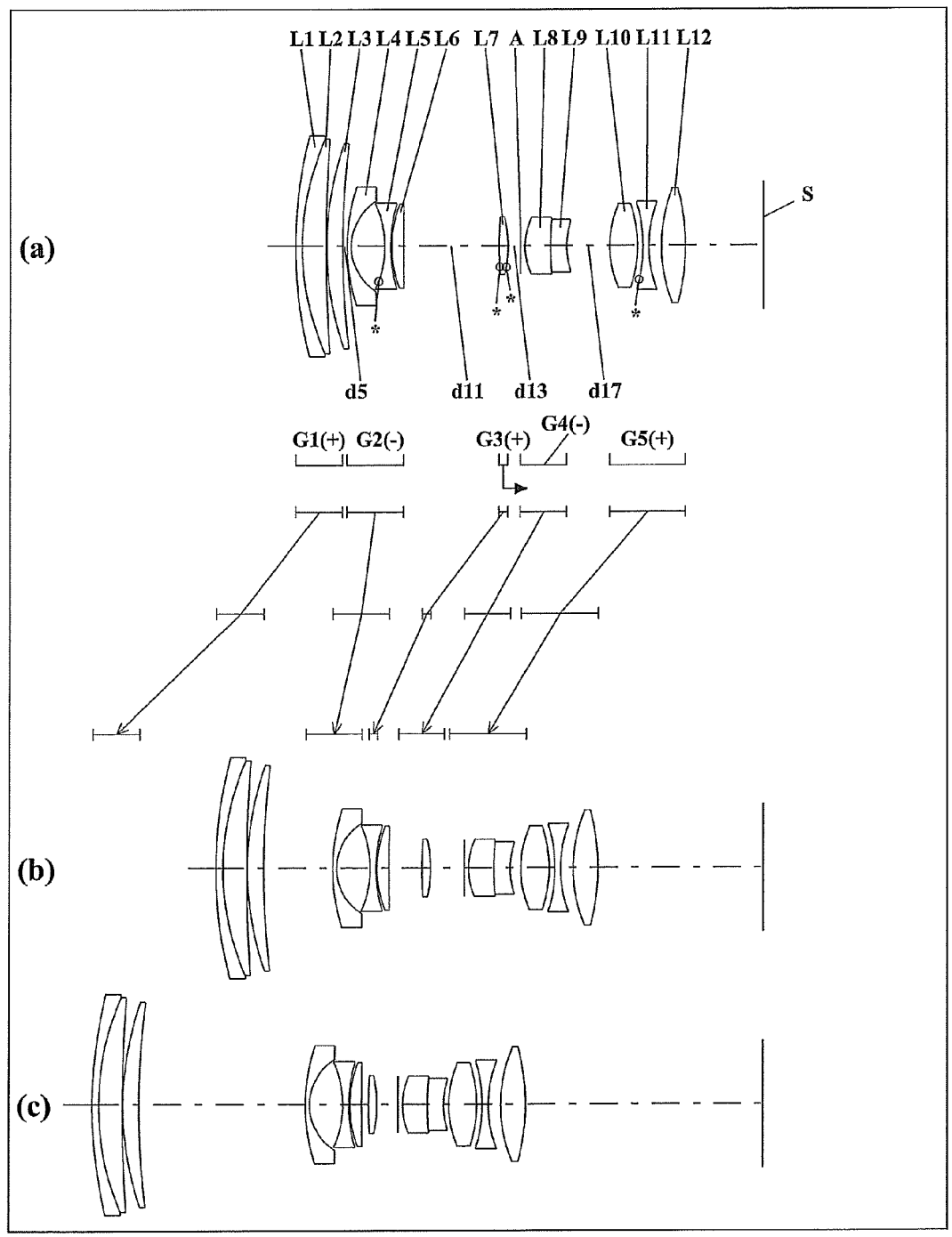
FIG. 65 is a lens arrangement diagram showing an infinity in-focus condition of a zoom lens system according to Embodiment 17 (Example 17)
Figure 66:
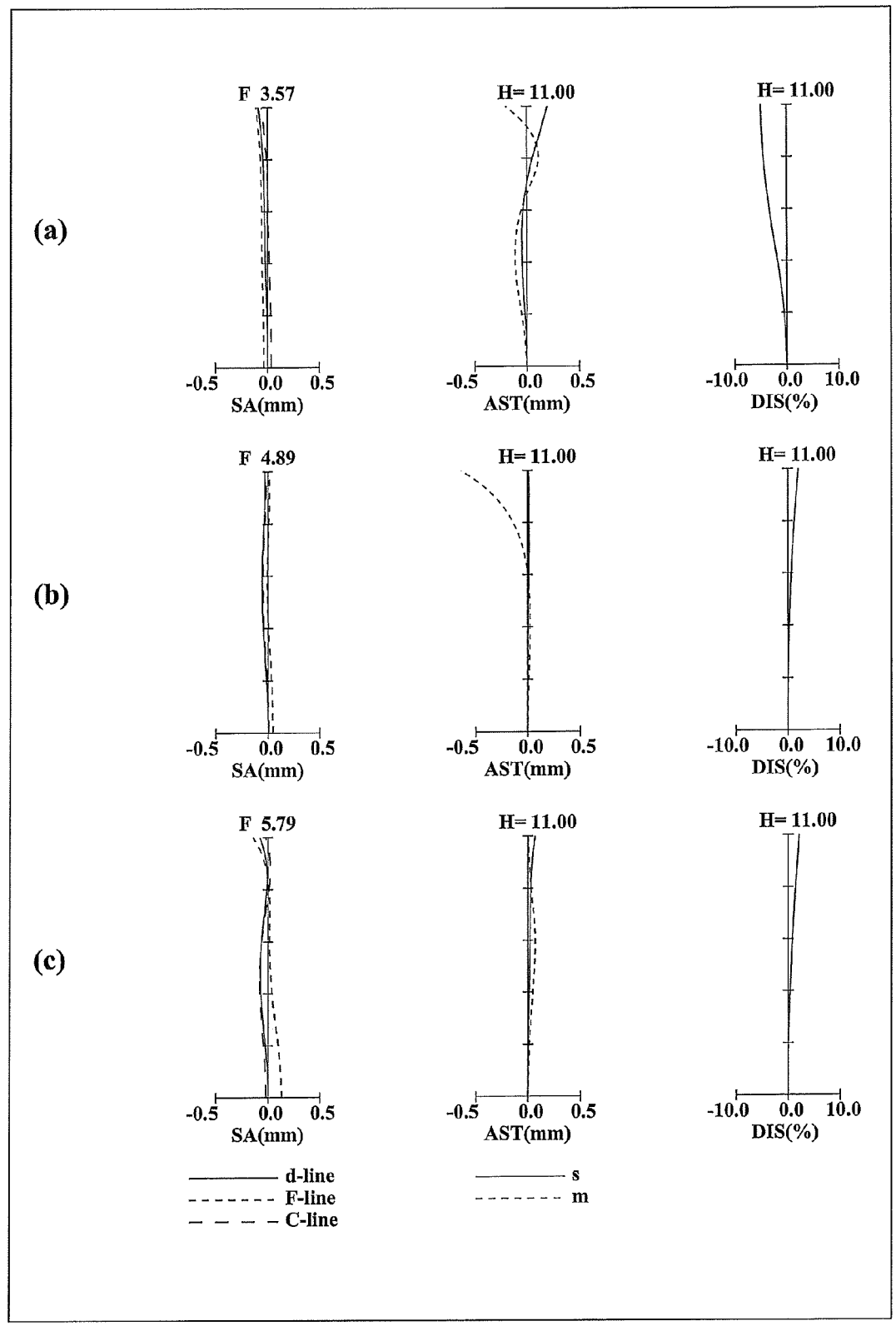
FIG. 66 is a longitudinal aberration diagram showing an infinity in-focus condition of a zoom lens system according to Example 17.
Figure 67:
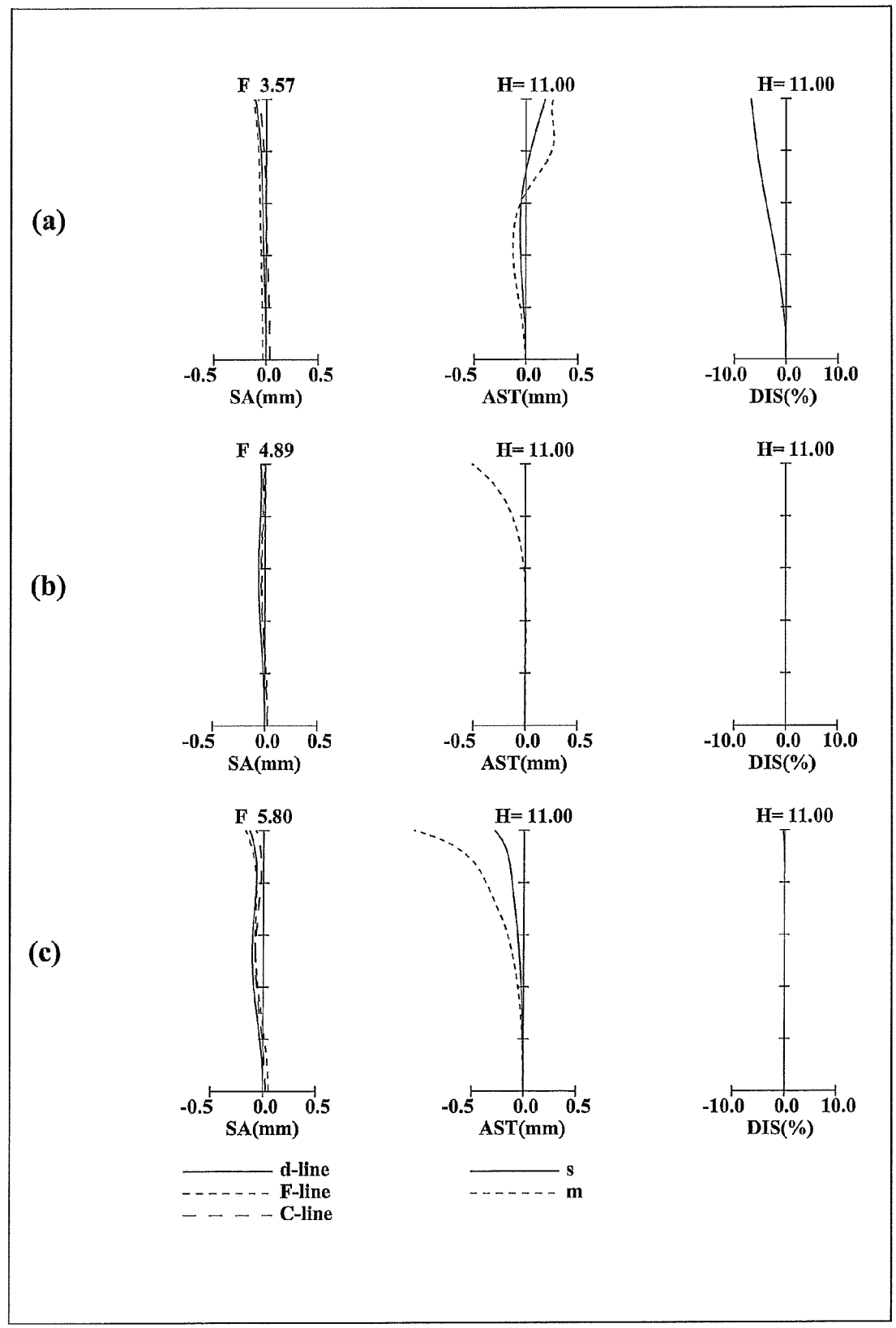
FIG. 67 is a longitudinal aberration diagram showing a close-point in-focus condition of a zoom lens system according to Example 17.

The zoom lens system of Numerical Example 17 corresponds to Embodiment 17 shown in FIG. 65. Table 66 shows the surface data of the zoom lens system of Numerical Example 17. Table 67 shows the aspherical data. Table 68 shows various data. Table 69 shows the zoom lens unit data.

TABLE 66

(surface data)

| Surface number | r | d | nd | vd |
|---|---|---|---|---|
| Object surface | ∞ | | | |
| 1 | 81.18370 | 1.20000 | 1.84666 | 23.8 |
| 2 | 47.92900 | 4.31140 | 1.62299 | 58.1 |
| 3 | 270.76510 | 0.10000 | | |
| 4 | 55.46980 | 2.96000 | 1.80420 | 46.5 |
| 5 | 152.01960 | Variable | | |
| 6 | 35.00000 | 0.70000 | 1.90366 | 31.3 |
| 7 | 9.59050 | 6.10680 | | |
| 8* | −18.76050 | 1.10000 | 1.68966 | 53.0 |
| 9 | 27.20680 | 0.20450 | | |
| 10 | 21.95800 | 2.10350 | 1.94595 | 18.0 |
| 11 | 518.28290 | Variable | | |
| 12* | 57.66300 | 1.55880 | 1.66547 | 55.2 |
| 13* | −25.83970 | Variable | | |
| 14 (Aperture) | ∞ | 0.80000 | | |
| 15 | 12.32080 | 4.50000 | 1.48749 | 70.4 |
| 16 | 53.34470 | 2.94110 | 1.84666 | 23.8 |
| 17 | 14.90930 | Variable | | |

TABLE 66-continued (surface data)

| Surface number | r | d | nd | vd |
|---|---|---|---|---|
| 18 | 19.51170 | 5.00000 | 1.48749 | 70.4 |
| 19 | −23.84230 | 0.96840 | | |
| 20* | −34.70410 | 1.10000 | 1.84666 | 23.8 |
| 21 | 23.21970 | 2.19410 | | |
| 22 | 27.08650 | 4.43980 | 1.75520 | 27.5 |
| 23 | −40.27110 | BF | | |
| Image surface | ∞ | | | |

TABLE 67

(aspherical data)

| Surface No. | Parameters |
|---|---|
| 8 | K = 0.00000E+00, A4 = 1.14451E−05, A6 = −9.67896E−08, A8 = −3.12143E−09, A10 = 0.00000E+00, A12 = 0.00000E+00 |
| 12 | K = 0.00000E+00, A4 = −8.09473E−05, A6 = 2.35817E−06, A8 = −5.50379E−08, A10 = 0.00000E+00, A12 = 0.00000E+00 |
| 13 | K = 0.00000E+00, A4 = −5.63697E−05, A6 = 2.26951E−06, A8 = −5.35582E−08, A10 = 0.00000E+00, A12 = 0.00000E+00 |
| 20 | K = 0.00000E+00, A4 = −6.16776E−05, A6 = −5.26771E−07, A8 = −8.63502E−09, A10 = 3.94452E−10, A12 = −3.94169E−12 |

TABLE 68

(various data)

| Zooming ratio | 4.70495 | | |
|---|---|---|---|
| | Wide | Middle | Telephoto |
| Focal length | 12.3700 | 26.8312 | 58.2002 |
| F-number | 3.56995 | 4.89113 | 5.78961 |
| View angle | 43.1080 | 21.9037 | 10.4919 |
| Image height | 11.0000 | 11.0000 | 11.0000 |
| Overall length of lens system | 84.5038 | 98.6937 | 120.9891 |
| BF | 14.24935 | 30.01939 | 42.80595 |
| d5 | 0.8000 | 12.4979 | 29.9184 |
| d11 | 17.1604 | 5.9161 | 1.2471 |
| d13 | 2.2642 | 6.0270 | 3.8046 |
| d17 | 7.7415 | 1.9449 | 0.9247 |

TABLE 69

(zoom lens unit data)

| Unit | Initial surface No. | Focal length |
|---|---|---|
| 1 | 1 | 78.75066 |
| 2 | 6 | −10.59398 |
| 3 | 12 | 27.01514 |
| 4 | 14 | −2616.77566 |
| 5 | 18 | 31.91944 |

Numerical Example 18

Figure 68:
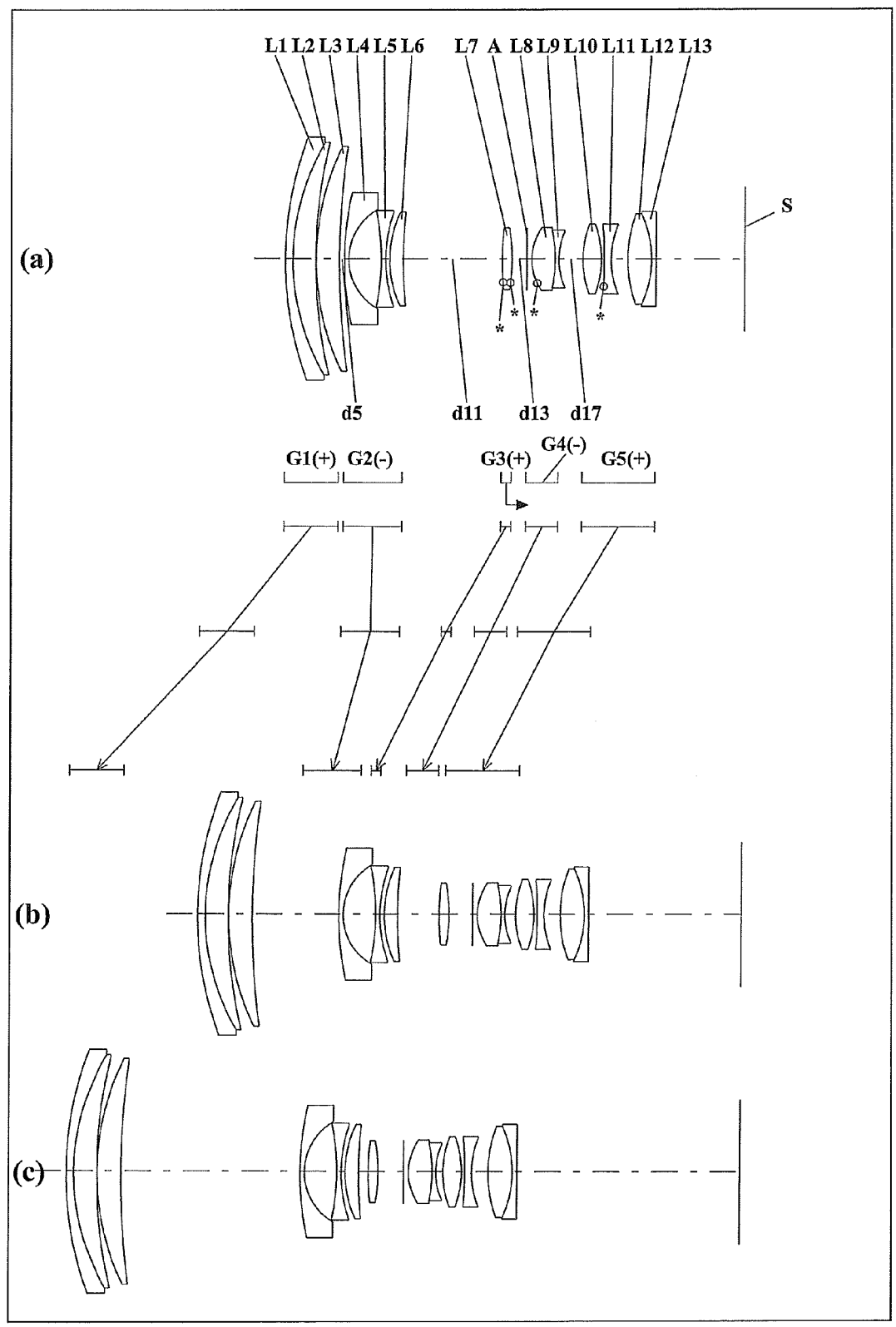
FIG. 68 is a lens arrangement diagram showing an infinity in-focus condition of a zoom lens system according to Embodiment 18 (Example 18)
Figure 69:
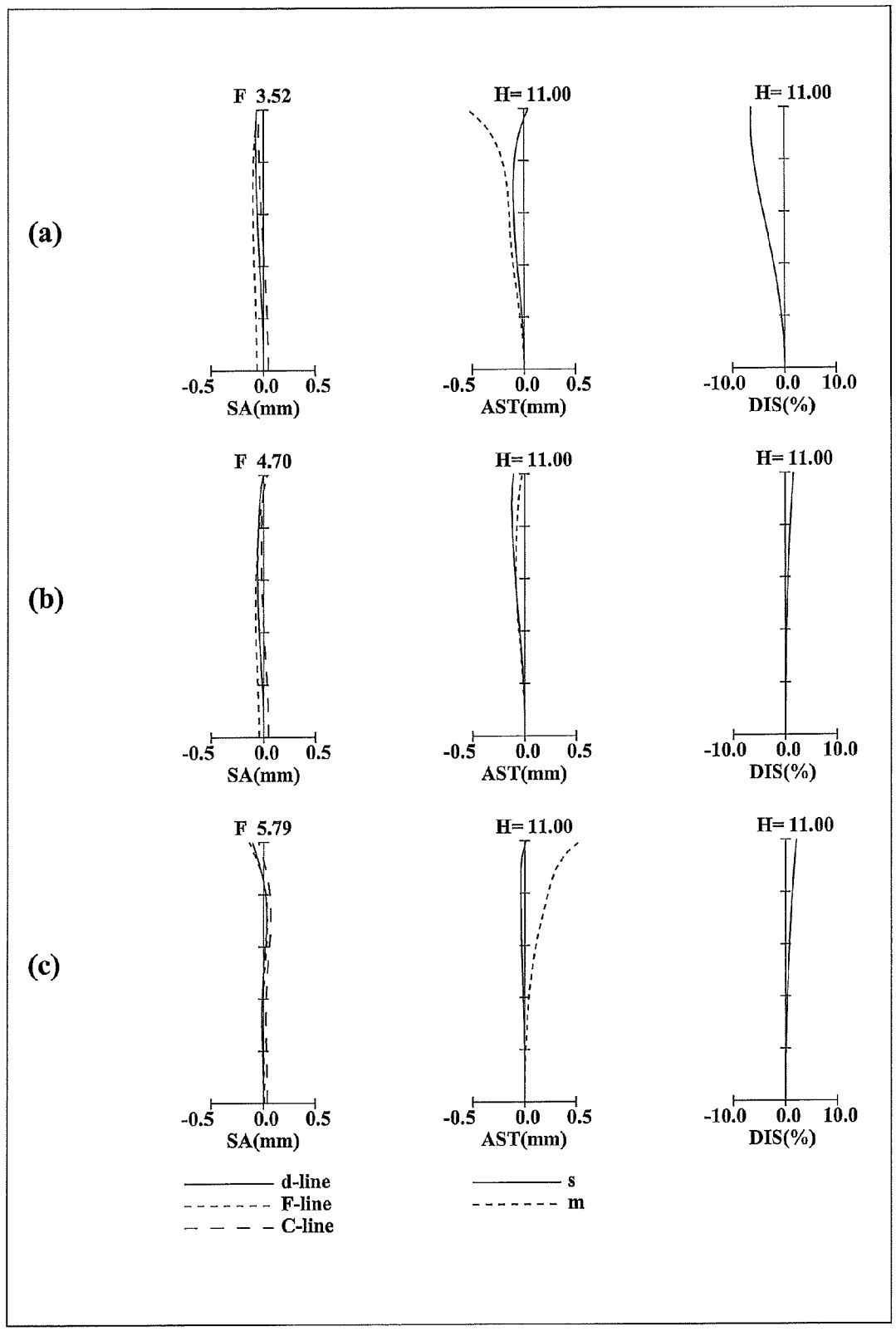
FIG. 69 is a longitudinal aberration diagram showing an infinity in-focus condition of a zoom lens system according to Example 18.
Figure 70:
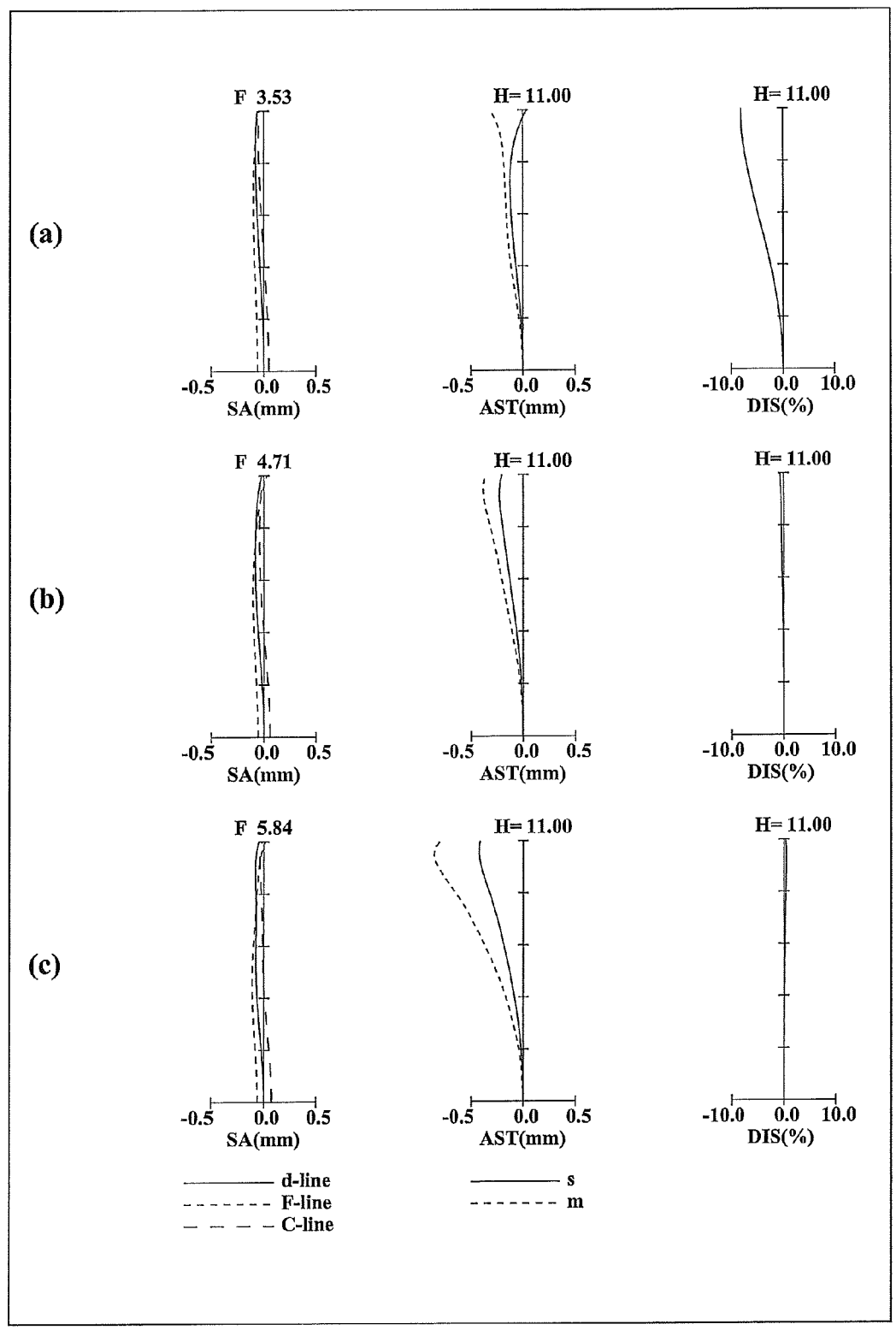
FIG. 70 is a longitudinal aberration diagram showing a close-point in-focus condition of a zoom lens system according to Example 18.

The zoom lens system of Numerical Example 18 corresponds to Embodiment 18 shown in FIG. 68. Table 70 shows the surface data of the zoom lens system of Numerical Example 18. Table 71 shows the aspherical data. Table 72 shows various data. Table 73 shows the zoom lens unit data.

TABLE 70

(surface data)

| Surface number | r | d | nd | vd |
|---|---|---|---|---|
| Object surface | ∞ | | | |
| 1 | 55.84490 | 1.20000 | 1.84666 | 23.8 |
| 2 | 36.51990 | 3.64760 | 1.62299 | 58.1 |
| 3 | 79.00430 | 0.10000 | | |
| 4 | 41.52110 | 3.72750 | 1.72916 | 54.7 |
| 5 | 127.00060 | Variable | | |
| 6 | 47.48680 | 0.70000 | 1.88300 | 40.8 |
| 7 | 9.21290 | 5.19790 | | |
| 8 | −36.31510 | 0.70000 | 1.71300 | 53.9 |
| 9 | 22.54950 | 0.66020 | | |
| 10 | 17.65370 | 2.13660 | 1.92286 | 20.9 |
| 11 | 70.50910 | Variable | | |
| 12* | 49.20190 | 1.57590 | 1.62299 | 58.1 |
| 13* | −25.66170 | Variable | | |
| 14 (Aperture) | ∞ | 0.80000 | | |
| 15* | 8.98950 | 3.73580 | 1.60602 | 57.4 |
| 16 | −23.04640 | 0.60110 | 1.80611 | 40.7 |
| 17 | 10.79680 | Variable | | |
| 18 | 15.23920 | 2.95980 | 1.51680 | 64.2 |
| 19 | −16.53070 | 0.47450 | | |
| 20* | −319.44100 | 1.10000 | 1.84666 | 23.8 |
| 21 | 14.29310 | 2.63530 | | |
| 22 | 20.46790 | 3.82610 | 1.67270 | 32.2 |
| 23 | −17.44610 | 0.70000 | 1.80420 | 46.5 |
| 24 | ∞ | BF | | |
| Image surface | ∞ | | | |

TABLE 71

(aspherical data)

| Surface No. | Parameters |
|---|---|
| 12 | K = 0.00000E+00, A4 = 4.08440E−05, A6 = 1.16725E−06, A8 = 1.00452E−08, A10 = 0.00000E+00, A12 = 0.00000E+00 |
| 13 | K = 0.00000E+00, A4 = 6.23327E−05, A6 = 8.72583E−07, A8 = 1.27905E−08, A10 = 0.00000E+00, A12 = 0.00000E+00 |
| 15 | K = 7.49904E−03, A4 = 2.87864E−07, A6 = −7.57882E−07, A8 = 1.85991E−08, A10 = −5.34654E−10, A12 = 0.00000E+00 |
| 20 | K = 0.00000E+00, A4 = −1.32368E−04, A6 = −1.96725E−06, A8 = 1.78704E−08, A10 = −3.79119E−12, A12 = −1.04689E−11 |

TABLE 72

(various data)

| Zooming ratio | 4.77533 | | |
|---|---|---|---|
| | Wide | Middle | Telephoto |
| Focal length | 12.2497 | 26.7697 | 58.4965 |
| F-number | 3.52073 | 4.69668 | 5.78910 |
| View angle | 43.8136 | 22.0230 | 10.4393 |
| Image height | 11.0000 | 11.0000 | 11.0000 |
| Overall length of lens system | 73.5030 | 86.8070 | 107.4608 |
| BF | 14.25155 | 24.41954 | 35.64772 |
| d5 | 0.8000 | 13.8560 | 28.6100 |
| d11 | 15.7500 | 6.6380 | 1.5347 |
| d13 | 2.3871 | 3.7055 | 4.0618 |
| d17 | 3.8361 | 1.7097 | 1.1283 |

TABLE 73

(zoom lens unit data)

| Unit | Initial surface No. | Focal length |
|---|---|---|
| 1 | 1 | 76.11081 |
| 2 | 6 | −11.08700 |
| 3 | 12 | 27.29203 |
| 4 | 14 | −731.80378 |
| 5 | 18 | 31.94297 |

Numerical Example 19

Figure 71:
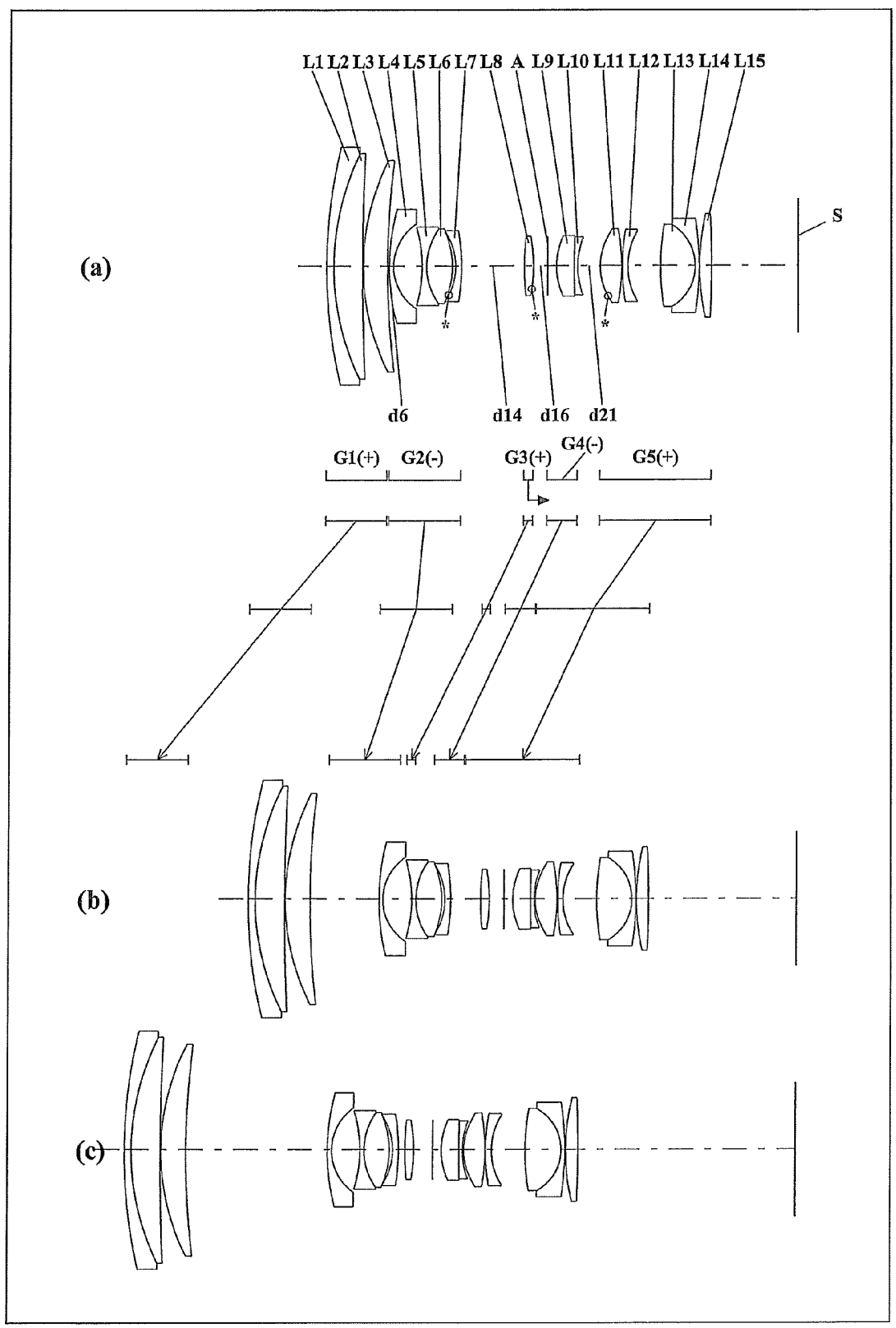
FIG. 71 is a lens arrangement diagram showing an infinity in-focus condition of a zoom lens system according to Embodiment 19 (Example 19)
Figure 72:
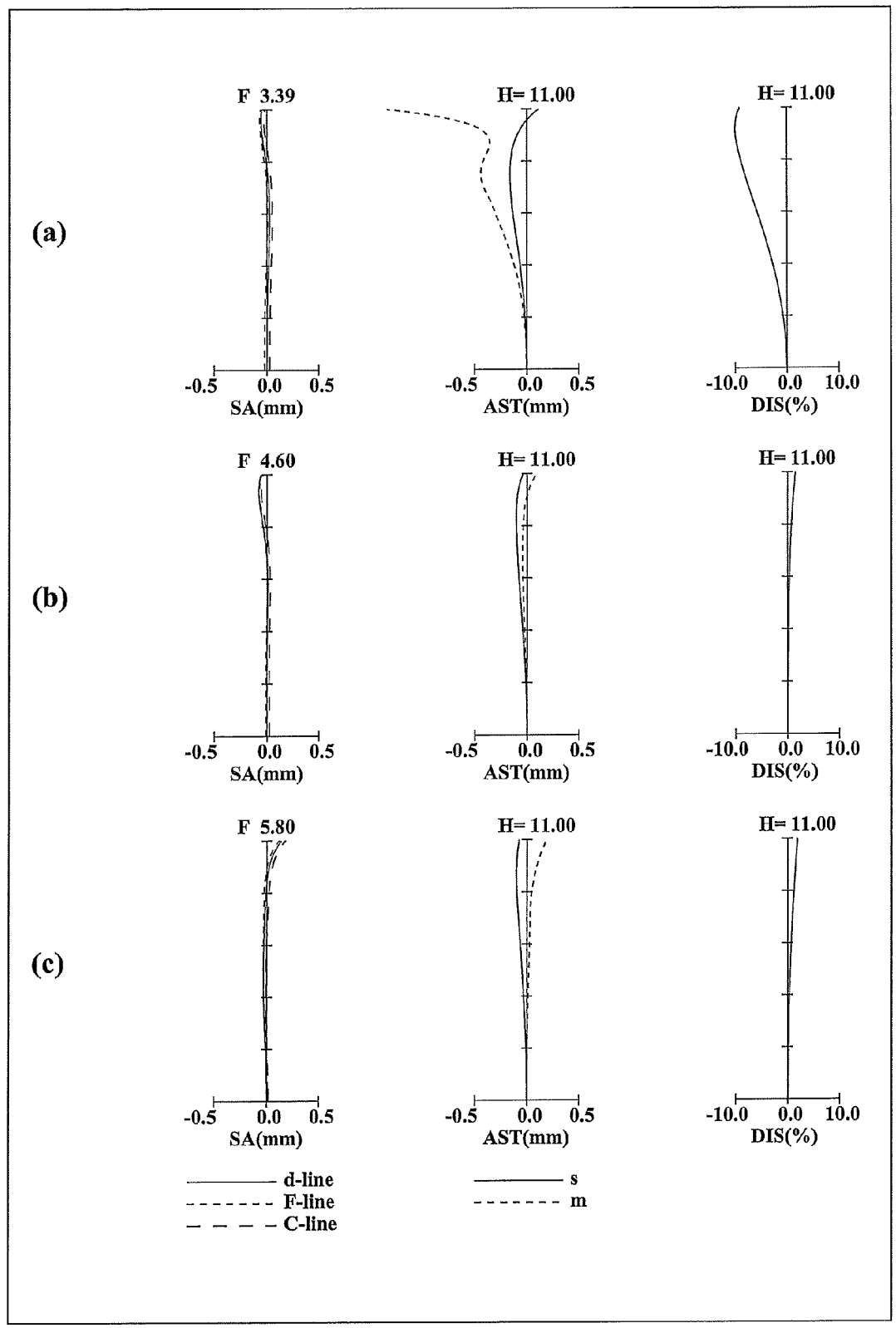
FIG. 72 is a longitudinal aberration diagram showing an infinity in-focus condition of a zoom lens system according to Example 19.
Figure 73:
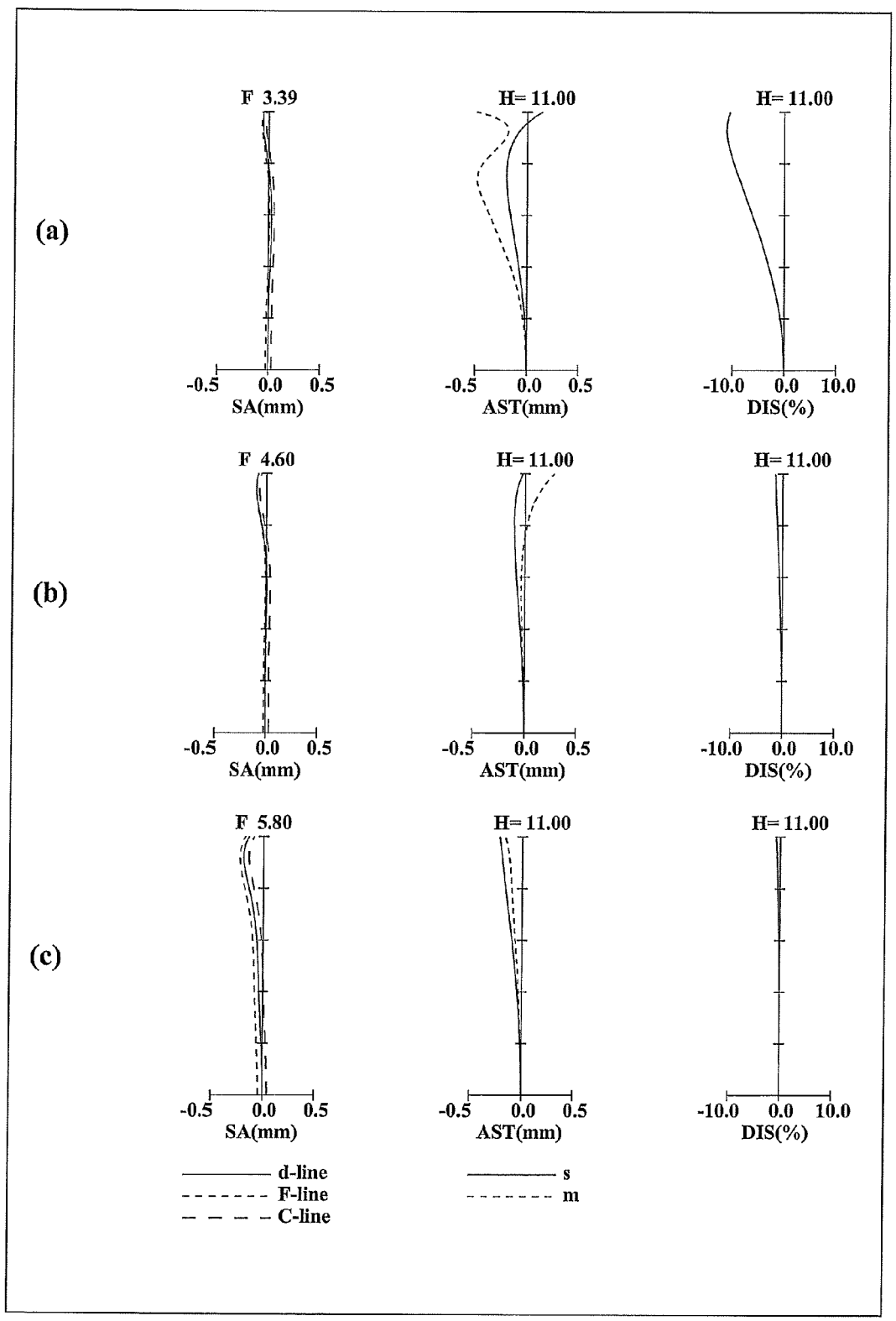
FIG. 73 is a longitudinal aberration diagram showing a close-point in-focus condition of a zoom lens system according to Example 19.

The zoom lens system of Numerical Example 19 corresponds to Embodiment 19 shown in FIG. 71. Table 74 shows the surface data of the zoom lens system of Numerical Example 19. Table 75 shows the aspherical data. Table 76 shows various data. Table 77 shows the zoom lens unit data.

TABLE 74

(surface data)

| Surface number | r | d | nd | vd |
|---|---|---|---|---|
| Object surface | ∞ | | | |
| 1 | 88.26400 | 1.20000 | 1.84666 | 23.8 |
| 2 | 43.50280 | 0.01000 | 1.56732 | 42.8 |
| 3 | 43.50280 | 4.99460 | 1.62299 | 58.1 |
| 4 | 413.57560 | 0.10000 | | |
| 5 | 39.72230 | 4.30830 | 1.72916 | 54.7 |
| 6 | 147.58050 | Variable | | |
| 7 | 38.98200 | 0.70000 | 1.88300 | 40.8 |
| 8 | 8.80120 | 4.94460 | | |
| 9 | −23.63000 | 0.70000 | 1.83481 | 42.7 |
| 10 | 11.23190 | 0.01000 | 1.56732 | 42.8 |
| 11 | 11.23190 | 4.41630 | 1.86818 | 26.1 |
| 12 | −15.50650 | 0.55940 | | |
| 13* | −10.59640 | 1.00000 | 1.80470 | 41.0 |
| 14 | −37.03350 | Variable | | |
| 15 | 48.84520 | 1.50000 | 1.66547 | 55.2 |
| 16* | −28.64240 | Variable | | |
| 17 (Aperture) | ∞ | 1.50000 | | |
| 18 | 12.11450 | 3.01020 | 1.48749 | 70.4 |
| 19 | 206.82520 | 0.01000 | 1.56732 | 42.8 |
| 20 | 206.82520 | 0.60000 | 1.80610 | 33.3 |
| 21 | 13.73900 | Variable | | |
| 22* | 10.25290 | 3.64690 | 1.60602 | 57.4 |
| 23 | −35.72650 | 0.10000 | | |
| 24 | 35.21880 | 0.99980 | 1.83046 | 28.8 |
| 25 | 11.73240 | 5.70560 | | |
| 26 | 42.34090 | 6.03880 | 1.48749 | 70.4 |
| 27 | −8.14660 | 0.01000 | 1.56732 | 42.8 |
| 28 | −8.14660 | 0.70000 | 1.80420 | 46.5 |
| 29 | −51.32470 | 0.10000 | | |
| 30 | 38.67420 | 2.06170 | 1.84666 | 23.8 |
| 31 | −187.37810 | BF | | |
| Image surface | ∞ | | | |

TABLE 75

(aspherical data)

| Surface No. | Parameters |
|---|---|
| 13 | K = 0.00000E+00, A4 = 7.39867E−05, A6 = 6.02754E−07, A8 = −2.24402E−08, A10 = 5.25424E−10 |
| 16 | K = 0.00000E+00, A4 = 1.84273E−05, A6 = 3.35332E−07, A8 = −2.88430E−08, A10 = 6.97520E−10 |
| 22 | K = −1.12797E+00, A4 = 2.54429E−05, A6 = −9.39921E−08, A8 = 1.65281E−09, A10 = 0.00000E+00 |

TABLE 76

(various data)

| Zooming ratio | | 4.67743 | |
|---|---|---|---|
| | Wide | Middle | Telephoto |
| Focal length | 12.4002 | 26.8121 | 58.0013 |
| F-number | 3.38665 | 4.60269 | 5.80130 |
| View angle | 44.3351 | 22.0102 | 10.5448 |
| Image height | 11.0000 | 11.0000 | 11.0000 |
| Overall length of lens system | 81.1993 | 94.2455 | 115.1998 |
| BF | 14.94738 | 25.62181 | 37.54806 |
| d6 | 0.3000 | 11.9797 | 24.2009 |
| d14 | 10.7089 | 5.0772 | 1.1000 |
| d16 | 2.4246 | 2.4406 | 3.2246 |
| d21 | 3.8922 | 0.2000 | 0.2000 |

TABLE 77

(zoom lens unit data)

| Unit | Initial surface No. | Focal length |
|---|---|---|
| 1 | 1 | 60.94651 |
| 2 | 7 | −8.55429 |
| 3 | 15 | 27.34279 |
| 4 | 17 | −87.62354 |
| 5 | 22 | 22.54271 |

Numerical Example 20

Figure 74:
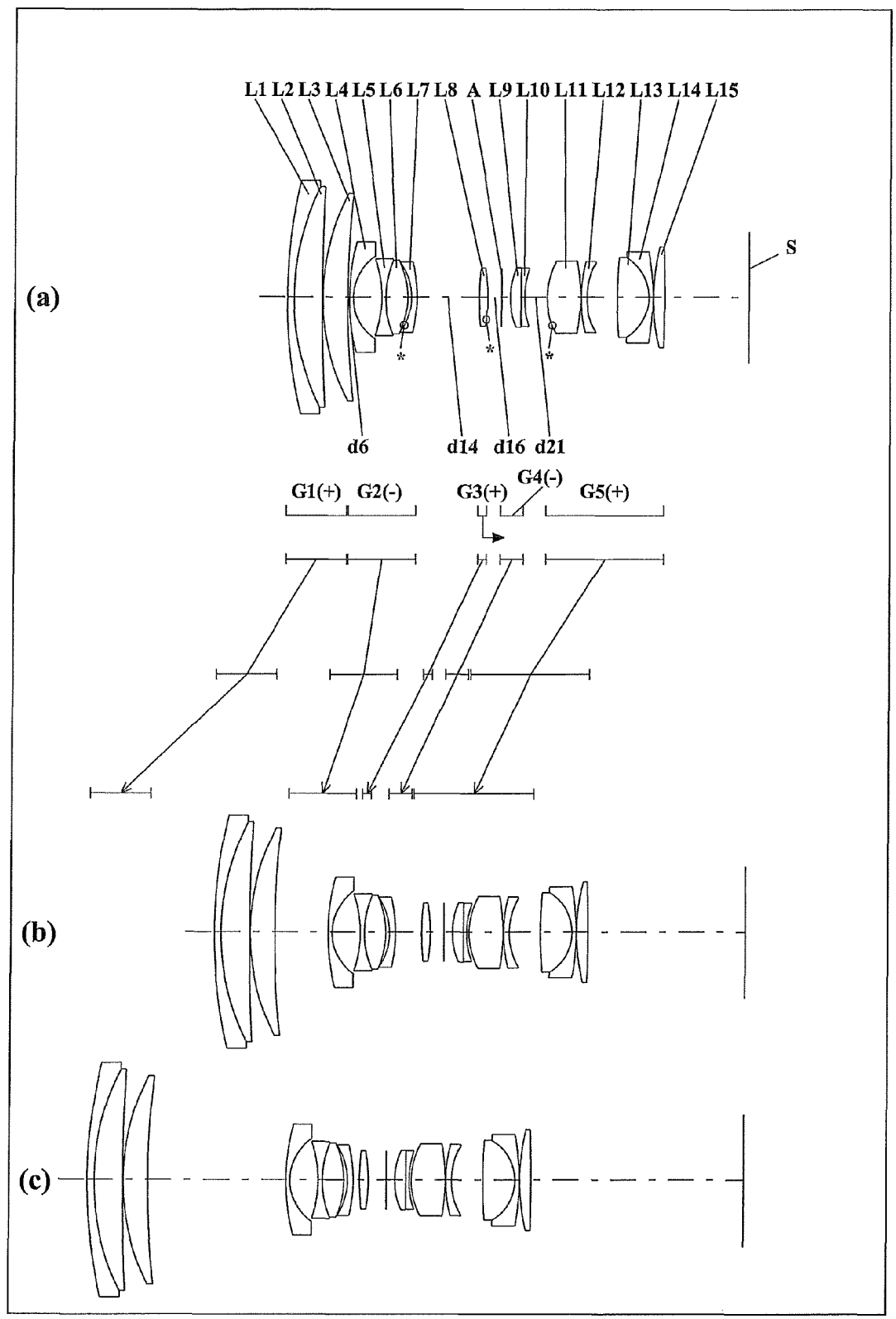
FIG. 74 is a lens arrangement diagram showing an infinity in-focus condition of a zoom lens system according to Embodiment 20 (Example 20)
Figure 75:
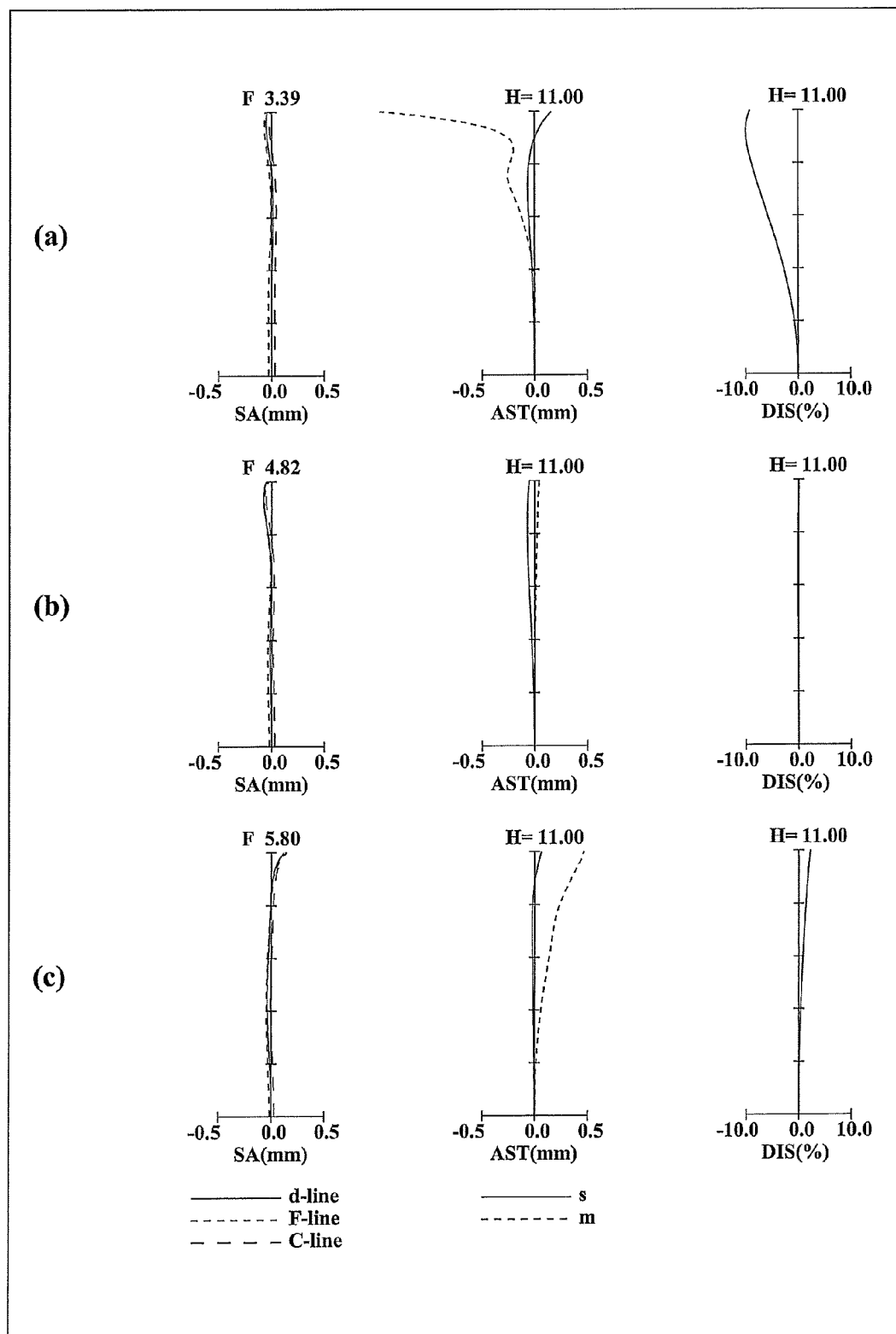
FIG. 75 is a longitudinal aberration diagram showing an infinity in-focus condition of a zoom lens system according to Example 20.
Figure 76:
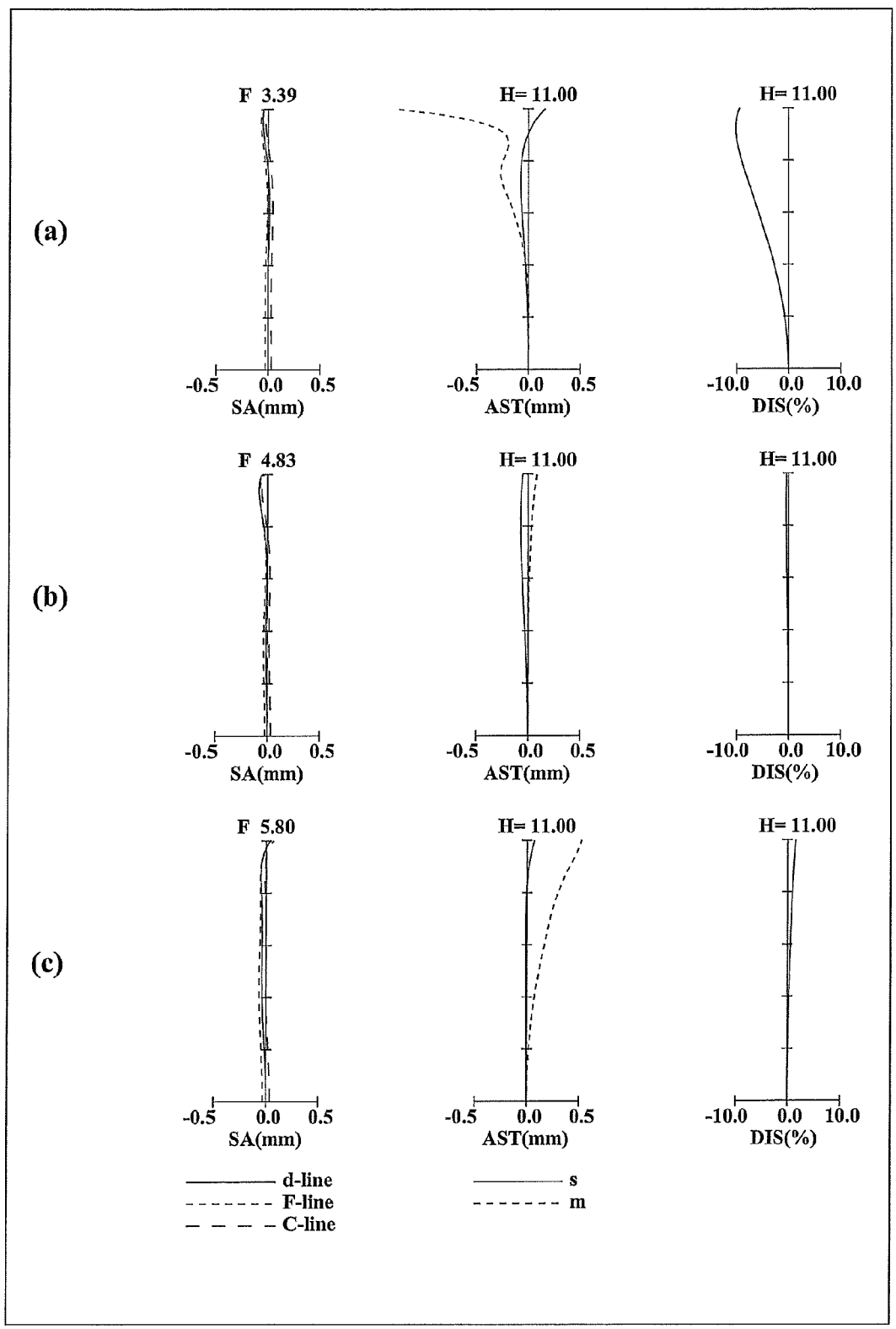
FIG. 76 is a longitudinal aberration diagram showing a close-point in-focus condition of a zoom lens system according to Example 20.

The zoom lens system of Numerical Example 20 corresponds to Embodiment 20 shown in FIG. 74. Table 78 shows the surface data of the zoom lens system of Numerical Example 20. Table 79 shows the aspherical data. Table 80 shows various data. Table 81 shows the zoom lens unit data.

TABLE 78

(surface data)

| Surface number | r | d | nd | vd |
|---|---|---|---|---|
| Object surface | ∞ | | | |
| 1 | 87.71220 | 1.20000 | 1.84666 | 23.8 |
| 2 | 42.95510 | 0.01000 | 1.56732 | 42.8 |
| 3 | 42.95510 | 5.00420 | 1.62299 | 58.1 |
| 4 | 369.62990 | 0.10000 | | |
| 5 | 39.91070 | 4.34270 | 1.72916 | 54.7 |
| 6 | 155.58550 | Variable | | |
| 7 | 37.02080 | 0.70000 | 1.88300 | 40.8 |
| 8 | 8.83250 | 5.00250 | | |
| 9 | −20.42380 | 0.70000 | 1.83481 | 42.7 |
| 10 | 16.57920 | 0.01000 | 1.56732 | 42.8 |
| 11 | 16.57920 | 3.78010 | 1.84666 | 23.8 |
| 12 | −15.28030 | 0.68100 | | |
| 13* | −10.23960 | 1.00000 | 1.80470 | 41.0 |
| 14 | −26.55310 | Variable | | |
| 15 | 45.43970 | 1.50000 | 1.66547 | 55.2 |
| 16* | −30.07070 | Variable | | |
| 17 (Aperture) | ∞ | 1.50000 | | |
| 18 | 12.92420 | 1.86330 | 1.48749 | 70.4 |
| 19 | 346.37330 | 0.01000 | 1.56732 | 42.8 |
| 20 | 346.37330 | 0.60000 | 1.80610 | 33.3 |
| 21 | 15.30680 | Variable | | |
| 22* | 12.36500 | 5.90880 | 1.60602 | 57.4 |
| 23 | −35.29670 | 0.10000 | | |
| 24 | 25.32620 | 1.00000 | 1.84666 | 23.8 |
| 25 | 12.40490 | 5.39410 | | |
| 26 | 77.10300 | 5.58810 | 1.48749 | 70.4 |
| 27 | −8.12600 | 0.01000 | 1.56732 | 42.8 |
| 28 | −8.12600 | 0.70000 | 1.80420 | 46.5 |
| 29 | −46.73290 | 0.10000 | | |
| 30 | 36.85660 | 1.98410 | 1.84666 | 23.8 |
| 31 | −341.26400 | BF | | |
| Image surface | ∞ | | | |

TABLE 79

(aspherical data)

| Surface No. | Parameters |
|---|---|
| 13 | K = 0.00000E+00, A4 = 7.28351E−05, A6 = 7.45521E−07, A8 = −1.74222E−08, A10 = 3.98208E−10 |
| 16 | K = 0.00000E+00, A4 = 1.57549E−05, A6 = 8.54823E−07, A8 = −4.95846E−08, A10 = 9.77720E−10 |
| 22 | K = −4.14123E+00, A4 = 2.08375E−04, A6 = −1.78708E−06, A8 = 1.16736E−08, A10 = 0.00000E+00 |

TABLE 80

(various data)

| Zooming ratio | | 4.67751 | |
|---|---|---|---|
| | Wide | Middle | Telephoto |
| Focal length | 12.4001 | 26.8181 | 58.0015 |
| F-number | 3.39366 | 4.82419 | 5.80135 |
| View angle | 44.3286 | 22.2858 | 10.5142 |
| Image height | 11.0000 | 11.0000 | 11.0000 |
| Overall length of lens system | 81.1832 | 93.3093 | 115.1803 |
| BF | 14.93352 | 27.81486 | 37.47430 |
| d6 | 0.3000 | 9.4198 | 24.2385 |
| d14 | 10.8135 | 4.5720 | 1.1000 |
| d16 | 2.4012 | 2.3411 | 3.2012 |
| d21 | 3.9461 | 0.3726 | 0.3774 |

TABLE 81

(zoom lens unit data)

| Unit | Initial surface No. | Focal length |
|---|---|---|
| 1 | 1 | 61.06108 |
| 2 | 7 | −8.58914 |
| 3 | 15 | 27.40972 |
| 4 | 17 | −91.81665 |
| 5 | 22 | 23.53555 |

Numerical Example 21

Figure 77:
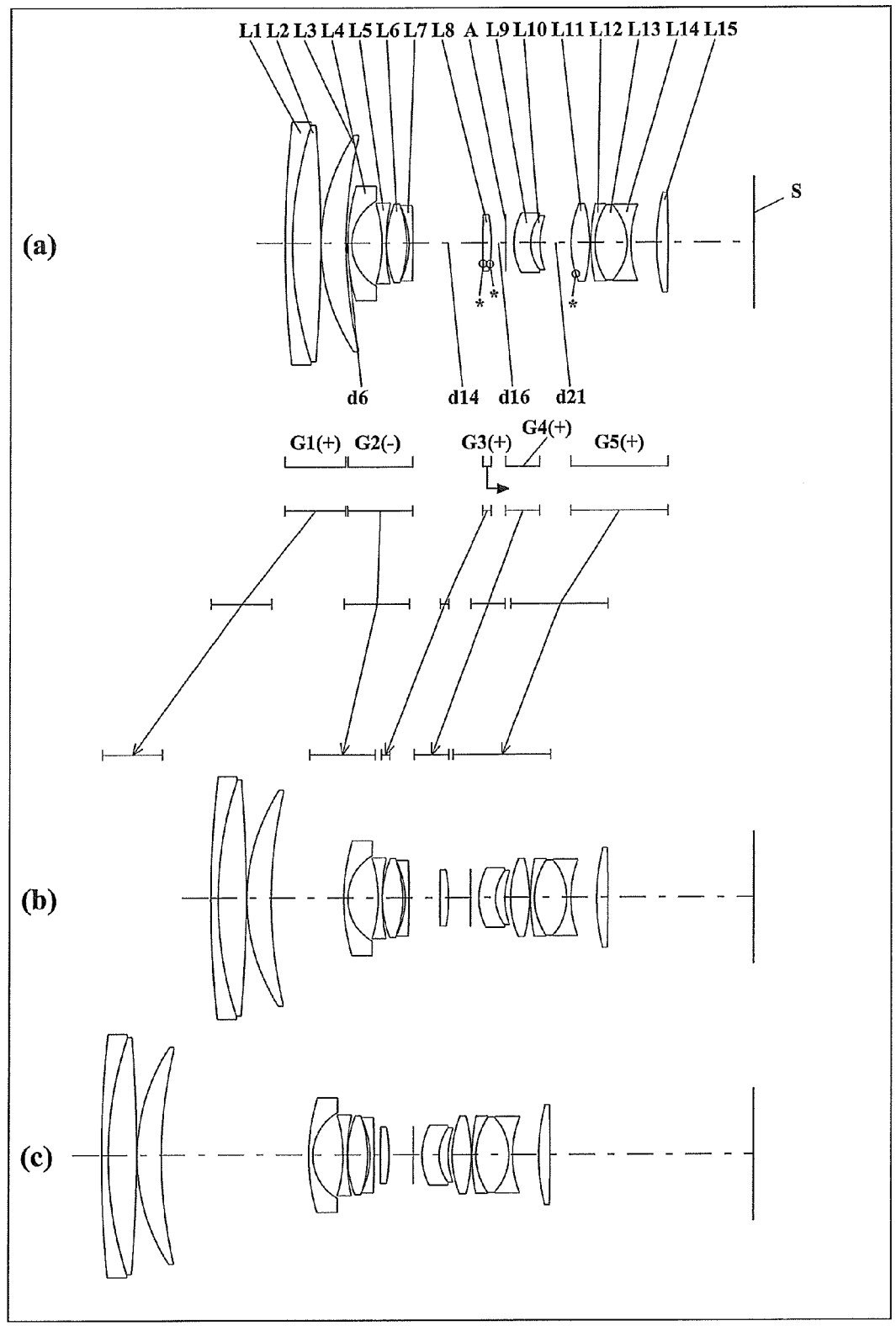
FIG. 77 is a lens arrangement diagram showing an infinity in-focus condition of a zoom lens system according to Embodiment 21 (Example 21)
Figure 78:
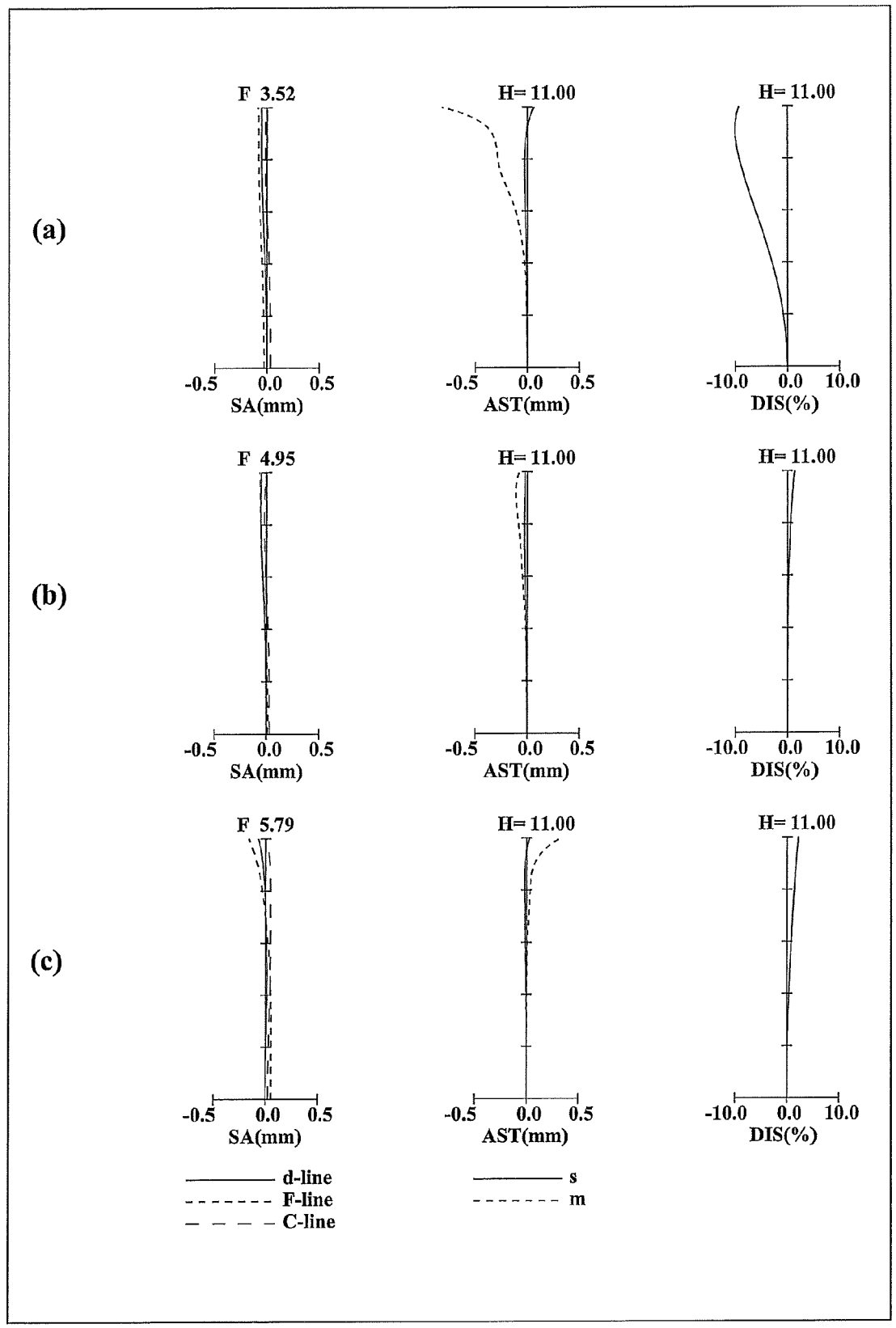
FIG. 78 is a longitudinal aberration diagram showing an infinity in-focus condition of a zoom lens system according to Example 21.
Figure 79:
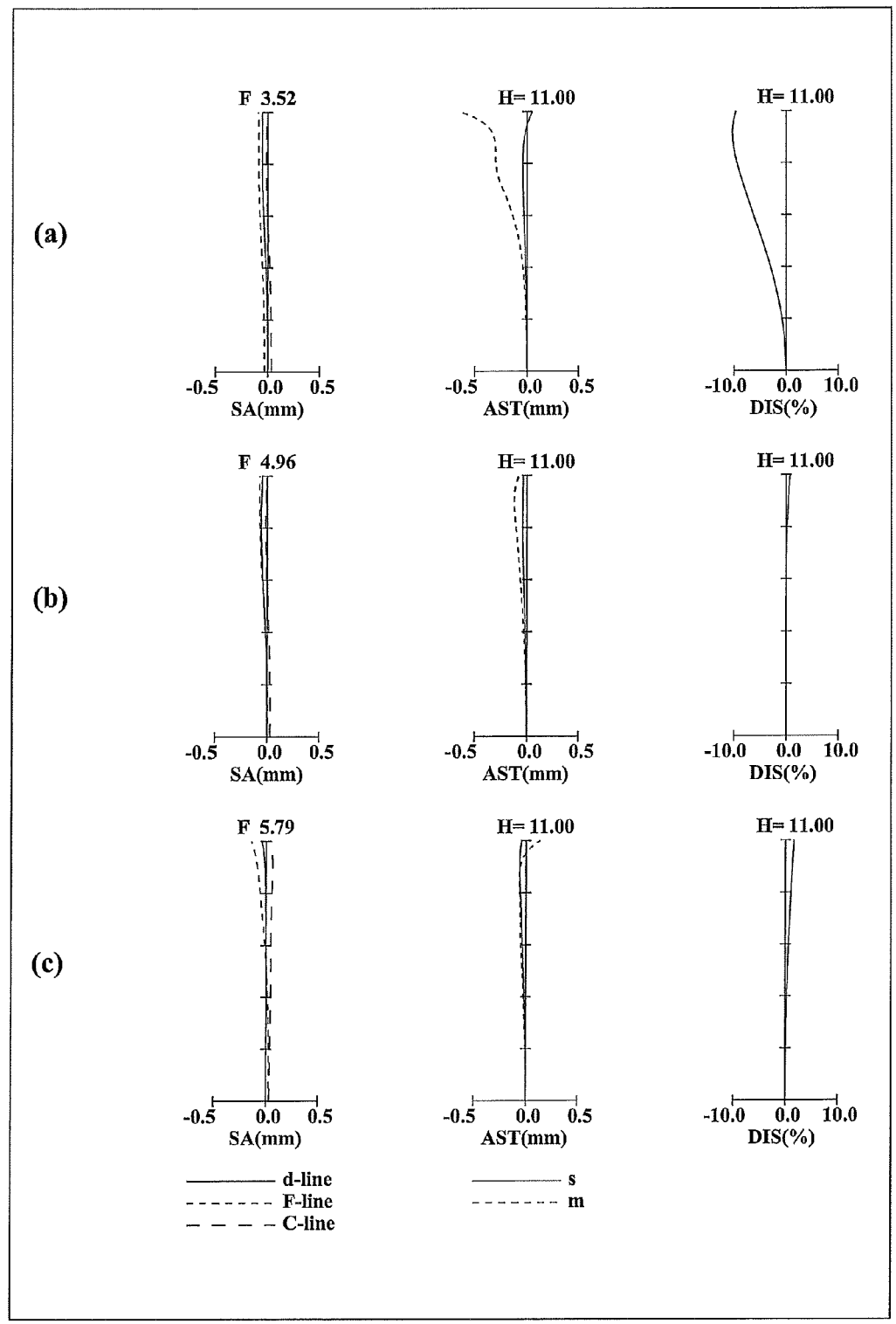
FIG. 79 is a longitudinal aberration diagram showing a close-point in-focus condition of a zoom lens system according to Example 21.

The zoom lens system of Numerical Example 21 corresponds to Embodiment 21 shown in FIG. 77. Table 82 shows the surface data of the zoom lens system of Numerical Example 21. Table 83 shows the aspherical data. Table 84 shows various data. Table 85 shows the zoom lens unit data.

TABLE 82

(surface data)

| Surface number | r | d | nd | vd |
|---|---|---|---|---|
| Object surface | ∞ | | | |
| 1 | 201.83550 | 1.20000 | 1.84666 | 23.8 |
| 2 | 66.61460 | 0.01000 | 1.56732 | 42.8 |
| 3 | 66.61460 | 4.93160 | 1.62299 | 58.1 |
| 4 | −249.78590 | 0.10000 | | |
| 5 | 34.41100 | 4.28390 | 1.72916 | 54.7 |
| 6 | 80.13850 | Variable | | |
| 7 | 35.00000 | 0.70000 | 1.88300 | 40.8 |
| 8 | 8.70330 | 5.25180 | | |
| 9 | −23.48370 | 0.70000 | 1.88300 | 40.8 |
| 10 | 33.38190 | 0.10000 | | |
| 11 | 18.81810 | 3.47930 | 1.84666 | 23.8 |
| 12 | −19.44510 | 0.39820 | | |
| 13 | −14.82460 | 0.70000 | 1.80610 | 40.7 |
| 14 | −147.35880 | Variable | | |
| 15* | 111.29190 | 1.50000 | 1.66547 | 55.2 |
| 16* | −31.23180 | Variable | | |
| 17 (Aperture) | ∞ | 1.50000 | | |
| 18 | 11.71290 | 2.90370 | 1.84666 | 23.8 |
| 19 | 8.08670 | 0.01000 | 1.56732 | 42.8 |
| 20 | 8.08670 | 1.57140 | 1.51805 | 55.3 |
| 21 | 13.49630 | Variable | | |
| 22* | 16.95600 | 3.26770 | 1.60602 | 57.4 |
| 23 | −26.94340 | 0.20000 | | |
| 24 | 32.29380 | 0.70000 | 1.84666 | 23.8 |
| 25 | 11.91580 | 0.01000 | 1.56732 | 42.8 |
| 26 | 11.91580 | 5.64970 | 1.60328 | 61.3 |
| 27 | −9.89430 | 0.01000 | 1.56732 | 42.8 |
| 28 | −9.89430 | 0.70000 | 1.77250 | 49.6 |
| 29 | 19.10340 | 4.48000 | | |
| 30 | 35.06040 | 2.02760 | 1.84666 | 23.8 |
| 31 | −284.69790 | BF | | |
| Image surface | ∞ | | | |

TABLE 83

(aspherical data)

| Surface No. | Parameters |
|---|---|
| 15 | K = 0.00000E+00, A4 = −8.51215E−05, A6 = 0.00000E+00, A8 = 0.00000E+00, A10 = 0.00000E+00 |
| 16 | K = 0.00000E+00, A4 = −6.08697E−05, A6 = −1.29115E−07, A8 = 1.22762E−08, A10 = −2.78378E−10 |
| 22 | K = 1.81114E+00, A4 = −8.25524E−05, A6 = −2.20802E−07, A8 = −3.61059E−09, A10 = 0.00000E+00 |

TABLE 84

(various data)

Zooming ratio  4.67735

| | Wide | Middle | Telephoto |
|---|---|---|---|
| Focal length | 12.3998 | 26.8163 | 57.9982 |
| F-number | 3.51704 | 4.95475 | 5.78611 |
| View angle | 44.3687 | 22.0462 | 10.5177 |
| Image height | 11.0000 | 11.0000 | 11.0000 |
| Overall length of lens system | 81.7158 | 94.5908 | 113.6458 |
| BF | 14.96629 | 25.42375 | 35.49561 |
| d6 | 0.3052 | 12.6295 | 25.7437 |
| d14 | 12.1104 | 5.3002 | 1.1000 |
| d16 | 2.4896 | 3.8216 | 4.2216 |
| d21 | 5.4594 | 1.0309 | 0.7000 |

TABLE 85

(zoom lens unit data)

| Unit | Initial surface No. | Focal length |
|---|---|---|
| 1 | 1 | 62.89272 |
| 2 | 7 | −9.16020 |
| 3 | 15 | 36.80232 |
| 4 | 17 | 270.40987 |
| 5 | 22 | 25.37175 |

Numerical Example 22

Figure 80:
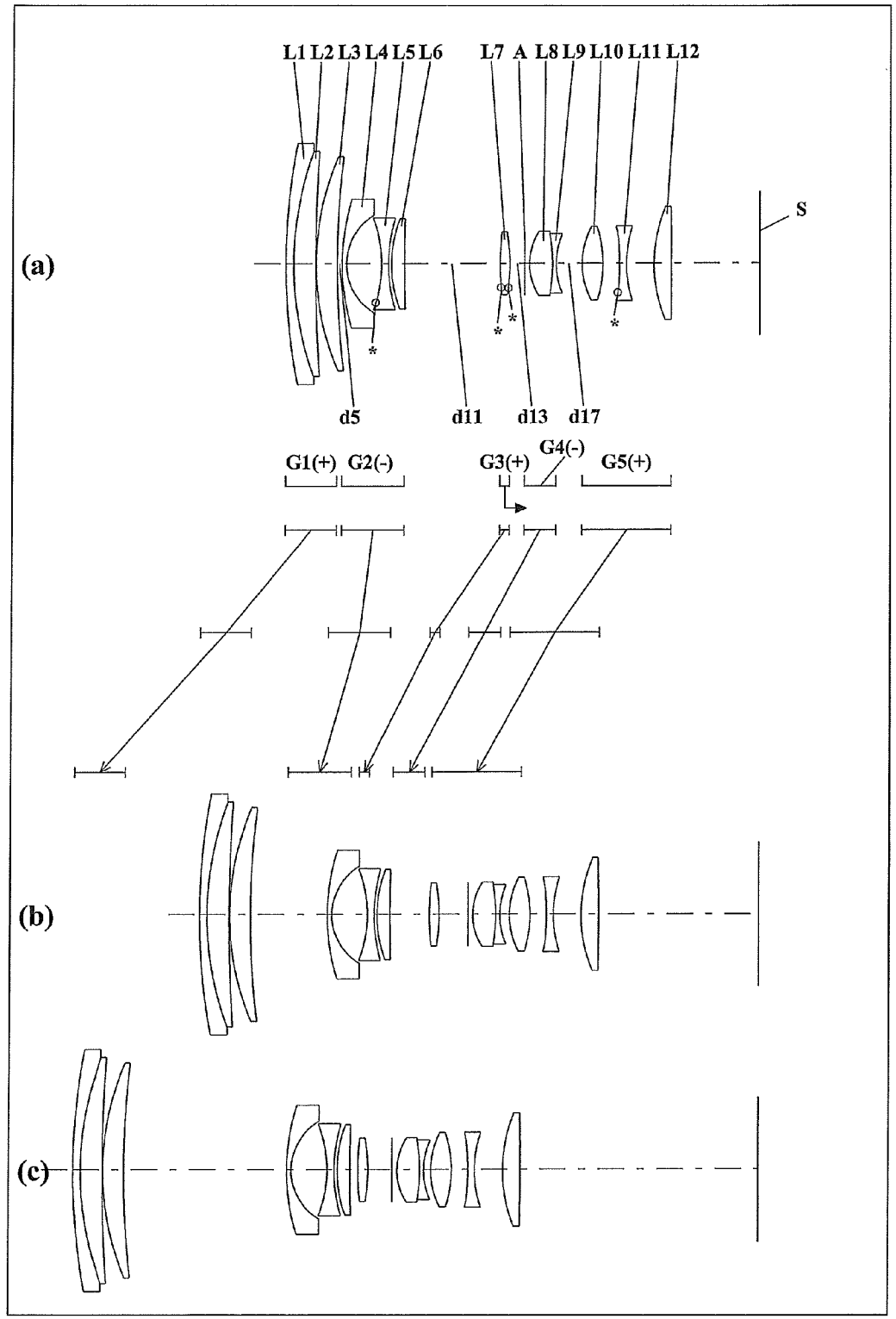
FIG. 80 is a lens arrangement diagram showing an infinity in-focus condition of a zoom lens system according to Embodiment 22 (Example 22)
Figure 81:
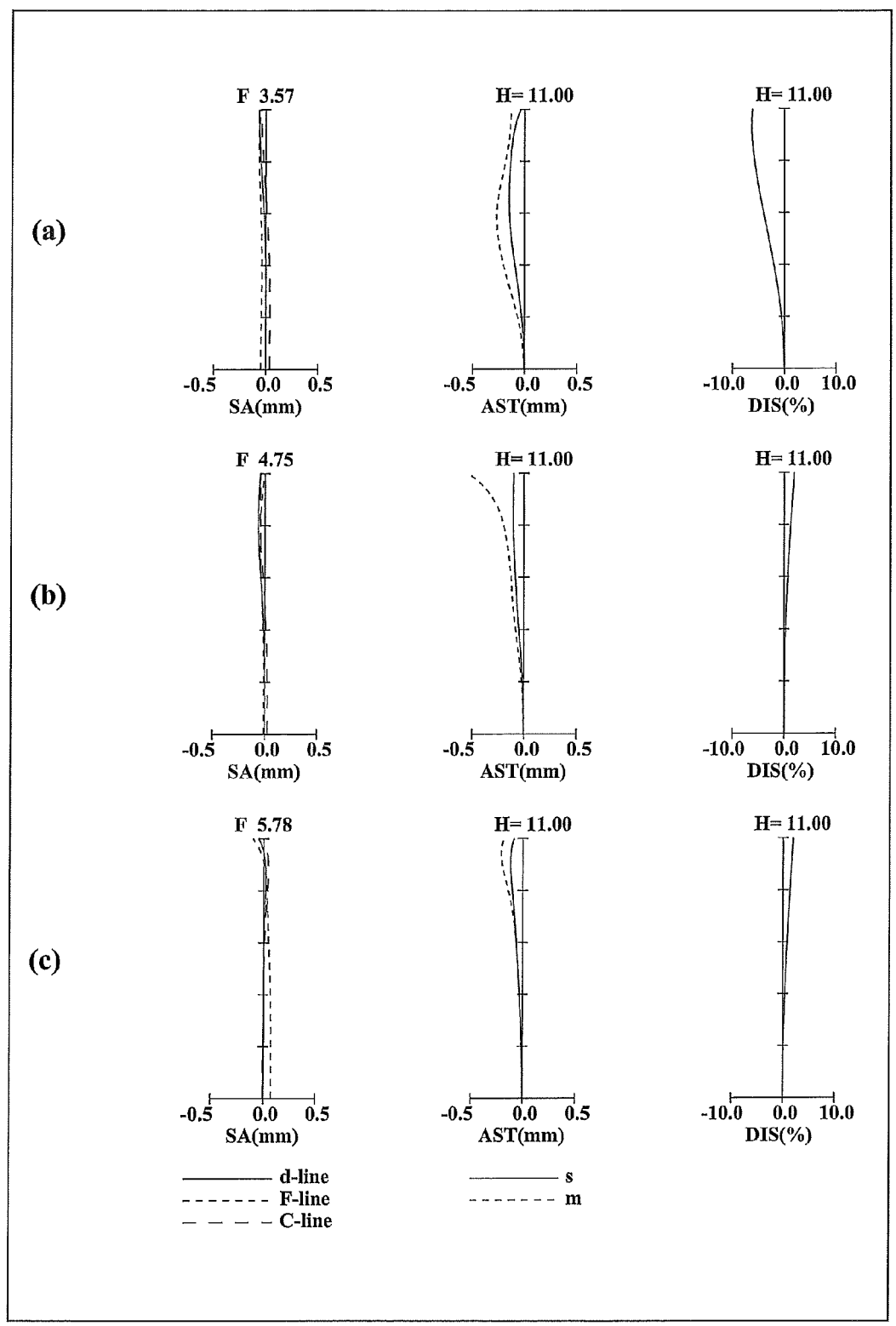
FIG. 81 is a longitudinal aberration diagram showing an infinity in-focus condition of a zoom lens system according to Example 22.
Figure 82:
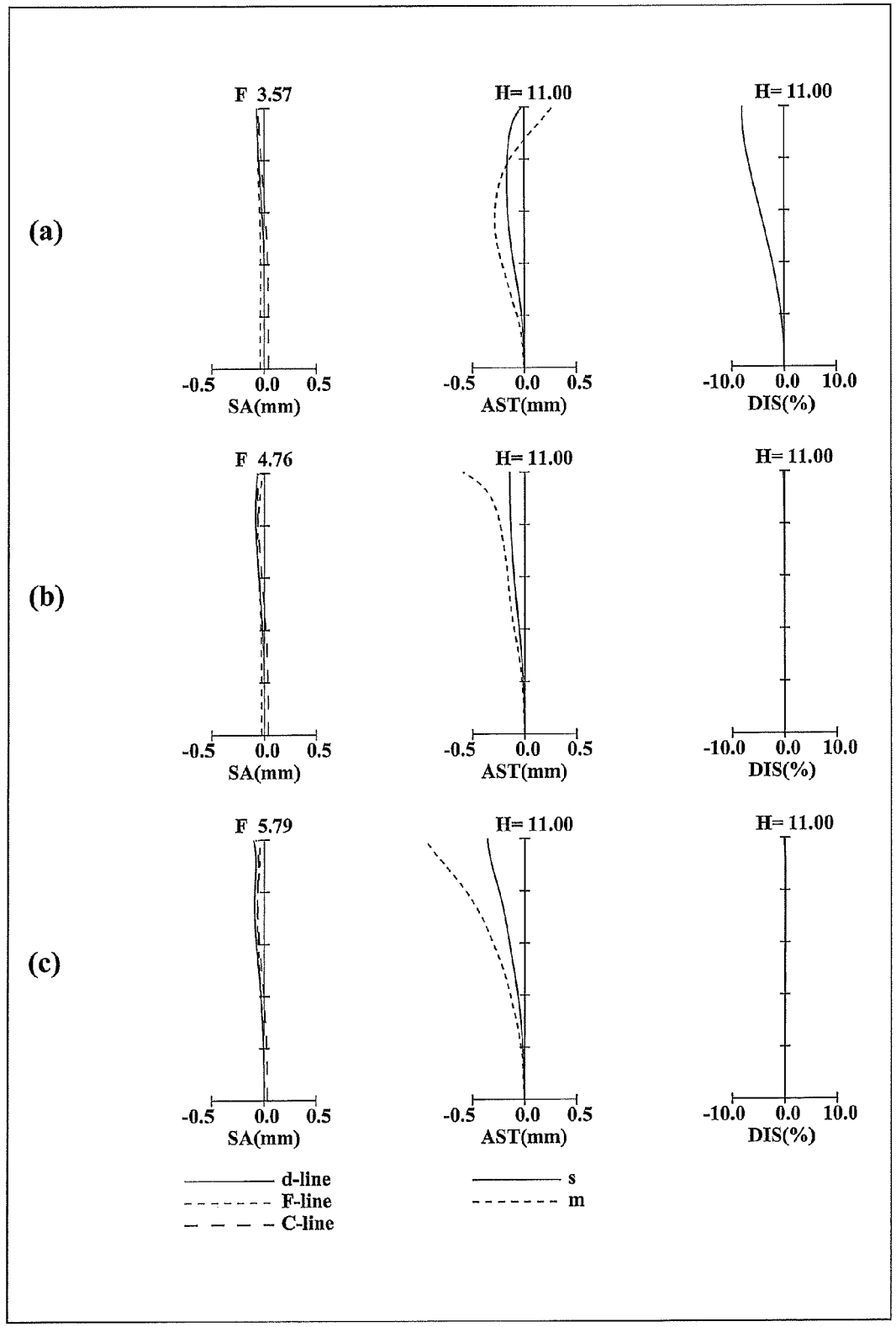
FIG. 82 is a longitudinal aberration diagram showing a close-point in-focus condition of a zoom lens system according to Example 22.

The zoom lens system of Numerical Example 22 corresponds to Embodiment 22 shown in FIG. 80. Table 86 shows the surface data of the zoom lens system of Numerical Example 22. Table 87 shows the aspherical data. Table 88 shows various data. Table 89 shows the zoom lens unit data.

TABLE 86

(surface data)

| Surface number | r | d | nd | vd |
|---|---|---|---|---|
| Object surface | ∞ | | | |
| 1 | 103.95510 | 1.20000 | 1.84666 | 23.8 |
| 2 | 52.03290 | 3.50590 | 1.72916 | 54.7 |
| 3 | 259.37390 | 0.10000 | | |
| 4 | 44.12290 | 3.31660 | 1.72916 | 54.7 |
| 5 | 138.91860 | Variable | | |
| 6 | 35.00000 | 0.70000 | 1.90366 | 31.3 |
| 7 | 9.09080 | 5.72300 | | |
| 8* | −20.87040 | 1.10000 | 1.68966 | 53.0 |
| 9 | 25.47610 | 0.48520 | | |
| 10 | 20.61470 | 2.05620 | 1.94595 | 18.0 |
| 11 | 222.90760 | Variable | | |
| 12* | 43.00460 | 1.59480 | 1.66547 | 55.2 |
| 13* | −28.28110 | Variable | | |
| 14 (Aperture) | ∞ | 0.80000 | | |
| 15 | 9.54420 | 3.66900 | 1.51680 | 64.2 |
| 16 | −28.87700 | 0.60600 | 1.80611 | 40.7 |
| 17 | 11.90270 | Variable | | |
| 18 | 12.92730 | 3.29950 | 1.48749 | 70.4 |
| 19 | −19.14670 | 2.62610 | | |
| 20* | −63.90600 | 1.10000 | 1.84666 | 23.8 |
| 21 | 19.01980 | 4.45410 | | |
| 22 | 23.66820 | 2.78760 | 1.71736 | 29.5 |
| 23 | −500.00000 | BF | | |
| Image surface | ∞ | | | |

TABLE 87

(aspherical data)

| Surface No. | Parameters |
|---|---|
| 8 | K = 0.00000E+00, A4 = 6.10086E−06, A6 = −2.02053E−07, A8 = −2.99368E−09, A10 = 0.00000E+00, A12 = 0.00000E+00 |
| 12 | K = 0.00000E+00, A4 = −1.33328E−05, A6 = 5.11687E−07, A8 = 4.90565E−08, A10 = 0.00000E+00, A12 = 0.00000E+00 |
| 13 | K = 0.00000E+00, A4 = 1.10487E−05, A6 = 9.31836E−08, A8 = 5.77089E−08, A10 = 0.00000E+00, A12 = 0.00000E+00 |
| 20 | K = 0.00000E+00, A4 = −1.39315E−04, A6 = −2.38804E−06, A8 = 4.02673E−08, A10 = −1.43563E−09, A12 = 1.91908E−11 |

TABLE 88

(various data)

| Zooming ratio | | 4.70507 | |
|---|---|---|---|
| | Wide | Middle | Telephoto |
| Focal length | 12.3694 | 26.8235 | 58.1992 |
| F-number | 3.56734 | 4.75407 | 5.78285 |
| View angle | 43.4525 | 21.9127 | 10.5030 |
| Image height | 11.0000 | 11.0000 | 11.0000 |
| Overall length of lens system | 76.0039 | 89.4503 | 109.6387 |
| BF | 14.25166 | 25.64873 | 38.09690 |
| d5 | 0.8000 | 12.2022 | 26.0988 |
| d11 | 15.3235 | 6.3161 | 1.2987 |
| d13 | 2.3385 | 4.5843 | 3.8822 |
| d17 | 4.1662 | 1.5750 | 1.1381 |

TABLE 89

(zoom lens unit data)

| Unit | Initial surface No. | Focal length |
|---|---|---|
| 1 | 1 | 69.39989 |
| 2 | 6 | −10.56381 |
| 3 | 12 | 25.86902 |
| 4 | 14 | −80.77582 |
| 5 | 18 | 25.62722 |

Numerical Example 23

Figure 83:
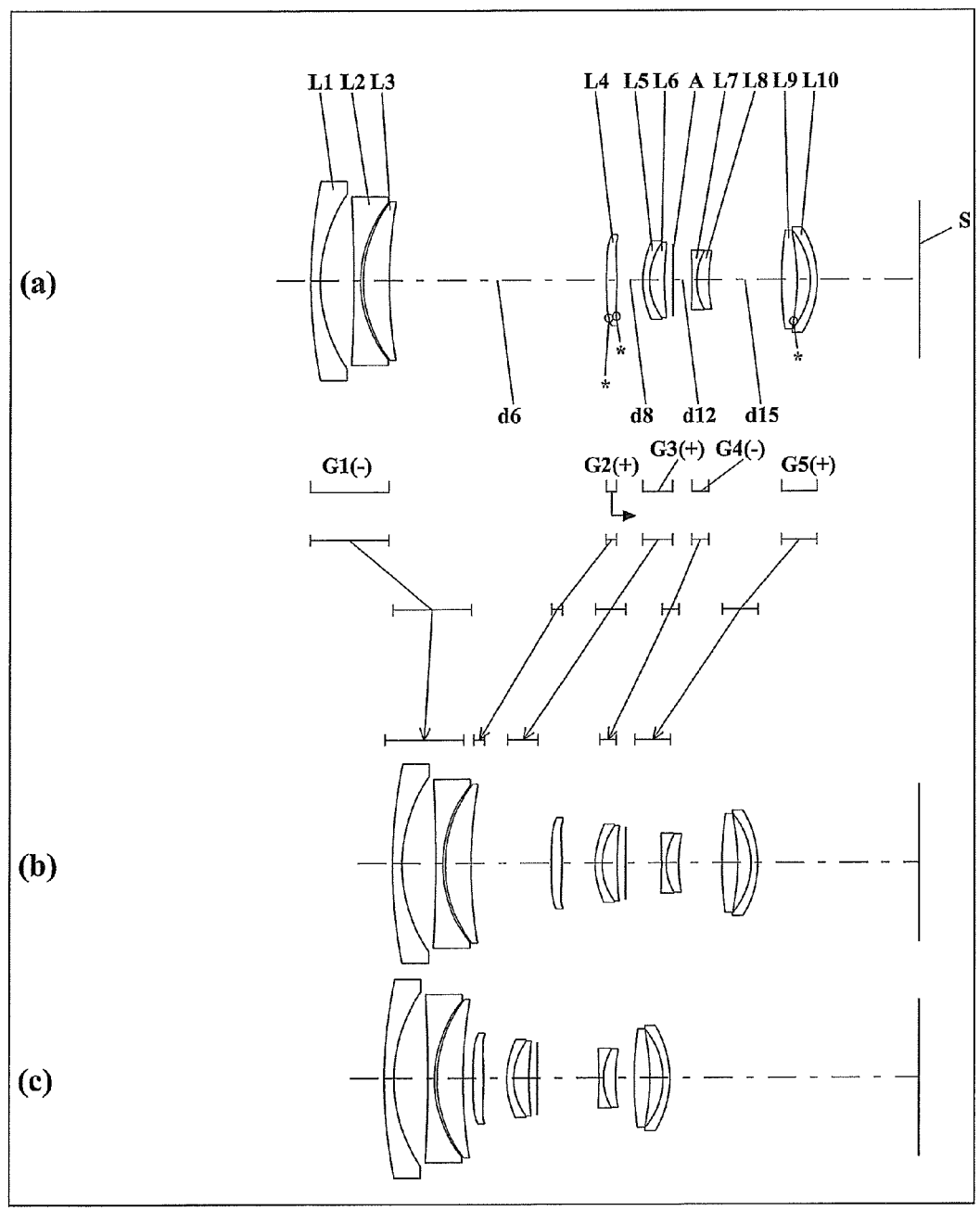
FIG. 83 is a lens arrangement diagram showing an infinity in-focus condition of a zoom lens system according to Embodiment 23 (Example 23)
Figure 84:
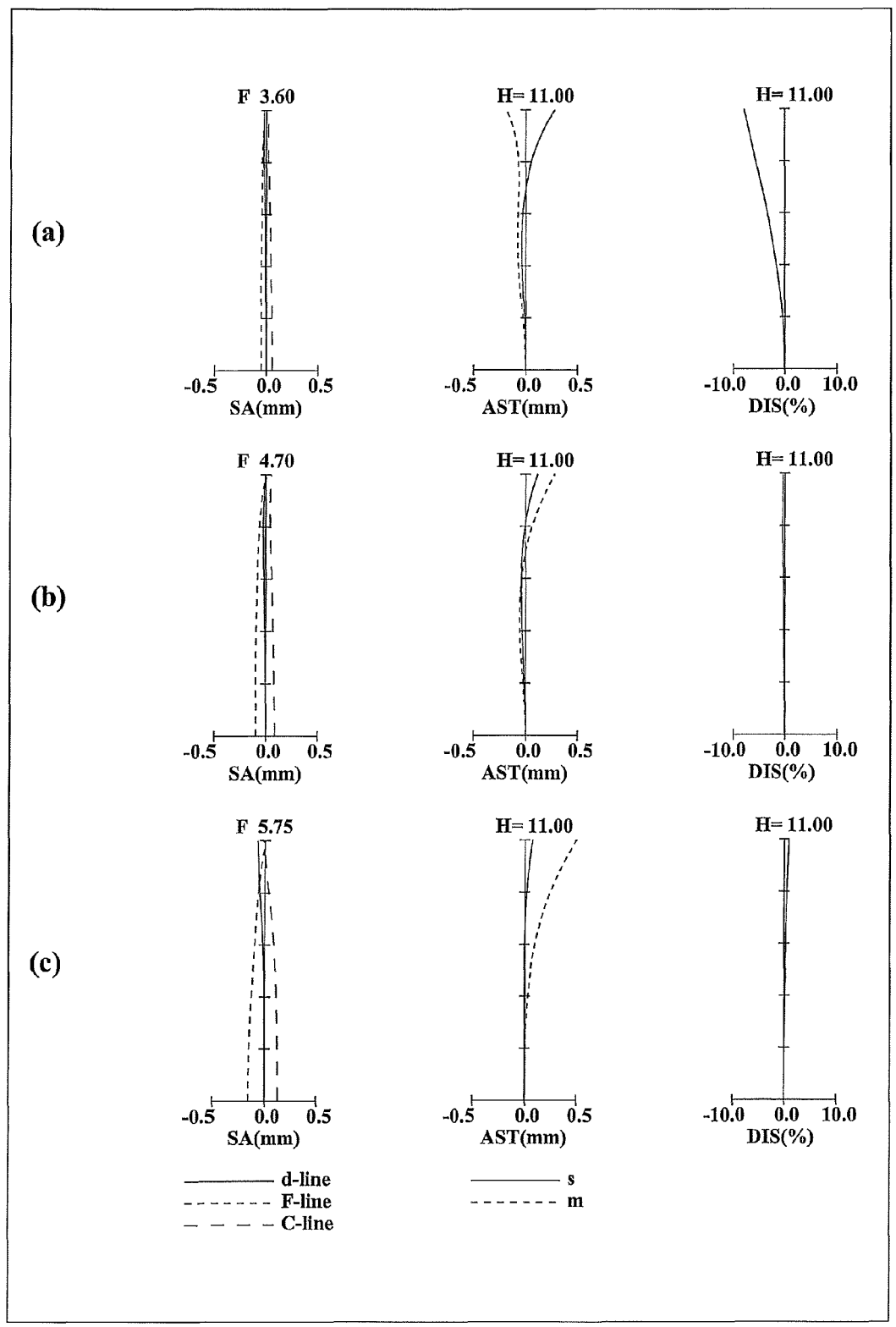
FIG. 84 is a longitudinal aberration diagram showing an infinity in-focus condition of a zoom lens system according to Example 23.
Figure 85:
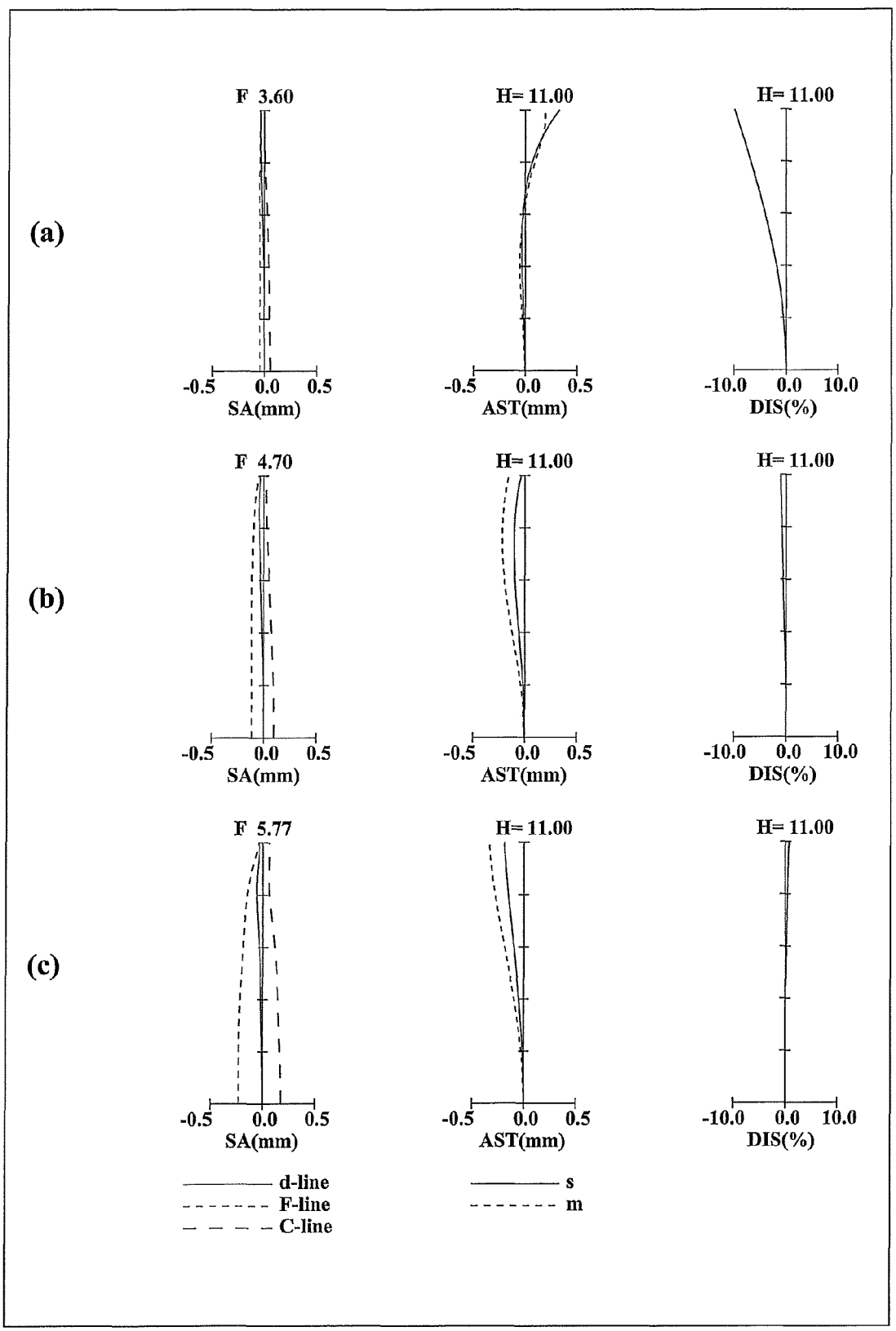
FIG. 85 is a longitudinal aberration diagram showing a close-point in-focus condition of a zoom lens system according to Example 23.
Figure 86:
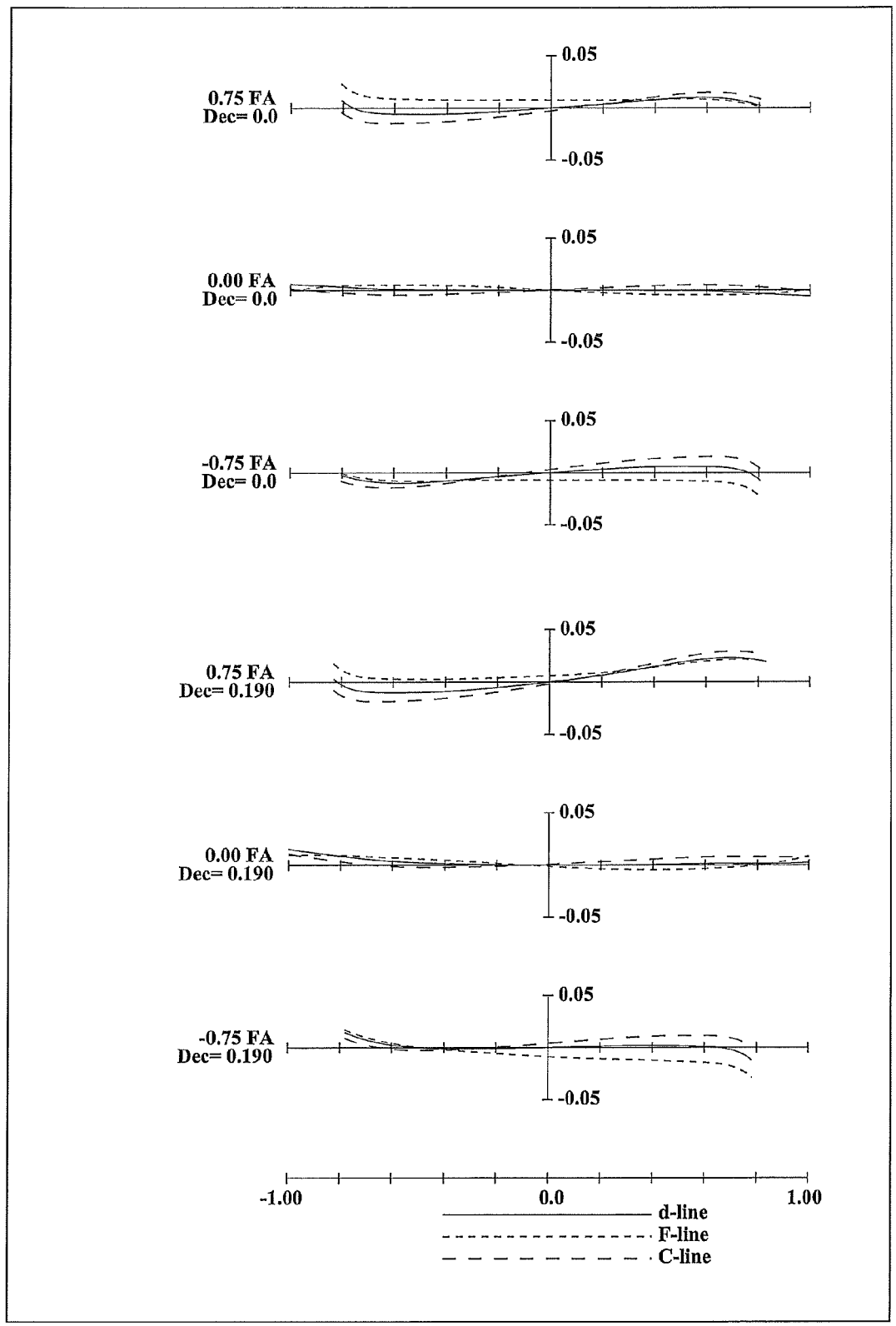
FIG. 86 is a lateral aberration diagram in a basic state where image blur compensation is not performed and in an image blur compensation state at a telephoto limit of a zoom lens system according to Example 23.

The zoom lens system of Numerical Example 23 corresponds to Embodiment 23 shown in FIG. 83. Table 90 shows the surface data of the zoom lens system of Numerical Example 23. Table 91 shows the aspherical data. Table 92 shows various data. Table 93 shows the zoom lens unit data.

TABLE 90

(surface data)

| Surface number | r | d | nd | vd |
|---|---|---|---|---|
| Object surface | ∞ | | | |
| 1 | 72.55050 | 1.40000 | 1.80420 | 46.5 |
| 2 | 22.68830 | 4.97310 | | |
| 3 | −219.34300 | 1.00000 | 1.80420 | 46.5 |
| 4 | 18.49320 | 0.35430 | | |
| 5 | 19.05780 | 3.78460 | 1.84666 | 23.8 |
| 6 | 68.03340 | Variable | | |
| 7* | 117.87940 | 1.53950 | 1.68966 | 53.0 |
| 8* | −54.52770 | Variable | | |
| 9 | 13.48120 | 1.00000 | 1.92286 | 20.9 |
| 10 | 9.28500 | 2.21940 | 1.72916 | 54.7 |
| 11 | 49.07930 | 1.19710 | | |
| 12 (Aperture) | ∞ | Variable | | |
| 13 | −99.27440 | 0.70000 | 1.71736 | 29.5 |
| 14 | 8.78500 | 1.75450 | 1.84666 | 23.8 |
| 15 | 22.25760 | Variable | | |
| 16 | 51.33200 | 2.31150 | 1.60602 | 57.4 |
| 17* | −28.78510 | 1.92940 | | |
| 18 | −11.11530 | 1.00000 | 1.48749 | 70.4 |
| 19 | −14.67710 | BF | | |
| Image surface | ∞ | | | |

TABLE 91

(aspherical data)

| Surface No. | Parameters |
|---|---|
| 7 | K = 0.00000E+00, A4 = 1.48389E−04, A6 = 1.86271E−06, A8 = 7.47459E−09, A10 = 4.54402E−10 |
| 8 | K = 0.00000E+00, A4 = 1.47193E−04, A6 = 2.02307E−06, A8 = 3.82490E−09, A10 = 6.95792E−10 |
| 17 | K = 0.00000E+00, A4 = 3.95339E−05, A6 = 5.52587E−07, A8 = −5.12231E−09, A10 = 4.48625E−11 |

TABLE 92

(various data)

| Zooming ratio | | 3.07285 | |
|---|---|---|---|
| | Wide | Middle | Telephoto |
| Focal length | 14.3017 | 24.8417 | 43.9469 |
| F-number | 3.60063 | 4.70064 | 5.75092 |
| View angle | 39.8681 | 23.9577 | 13.9367 |
| Image height | 11.0000 | 11.0000 | 11.0000 |
| Overall length of lens system | 89.0690 | 76.9542 | 78.0693 |
| BF | 14.94860 | 23.59111 | 36.37799 |
| d6 | 31.7378 | 11.6595 | 1.5000 |
| d8 | 3.7589 | 4.8874 | 3.3845 |
| d12 | 2.8000 | 5.2843 | 8.9492 |
| d15 | 10.6603 | 6.3685 | 2.6942 |

TABLE 93

(zoom lens unit data)

| Unit | Initial surface No. | Focal length |
|---|---|---|
| 1 | 1 | −24.46369 |
| 2 | 7 | 54.25636 |
| 3 | 9 | 28.62846 |
| 4 | 13 | −32.95658 |
| 5 | 16 | 43.70255 |

Numerical Example 24

Figure 87:
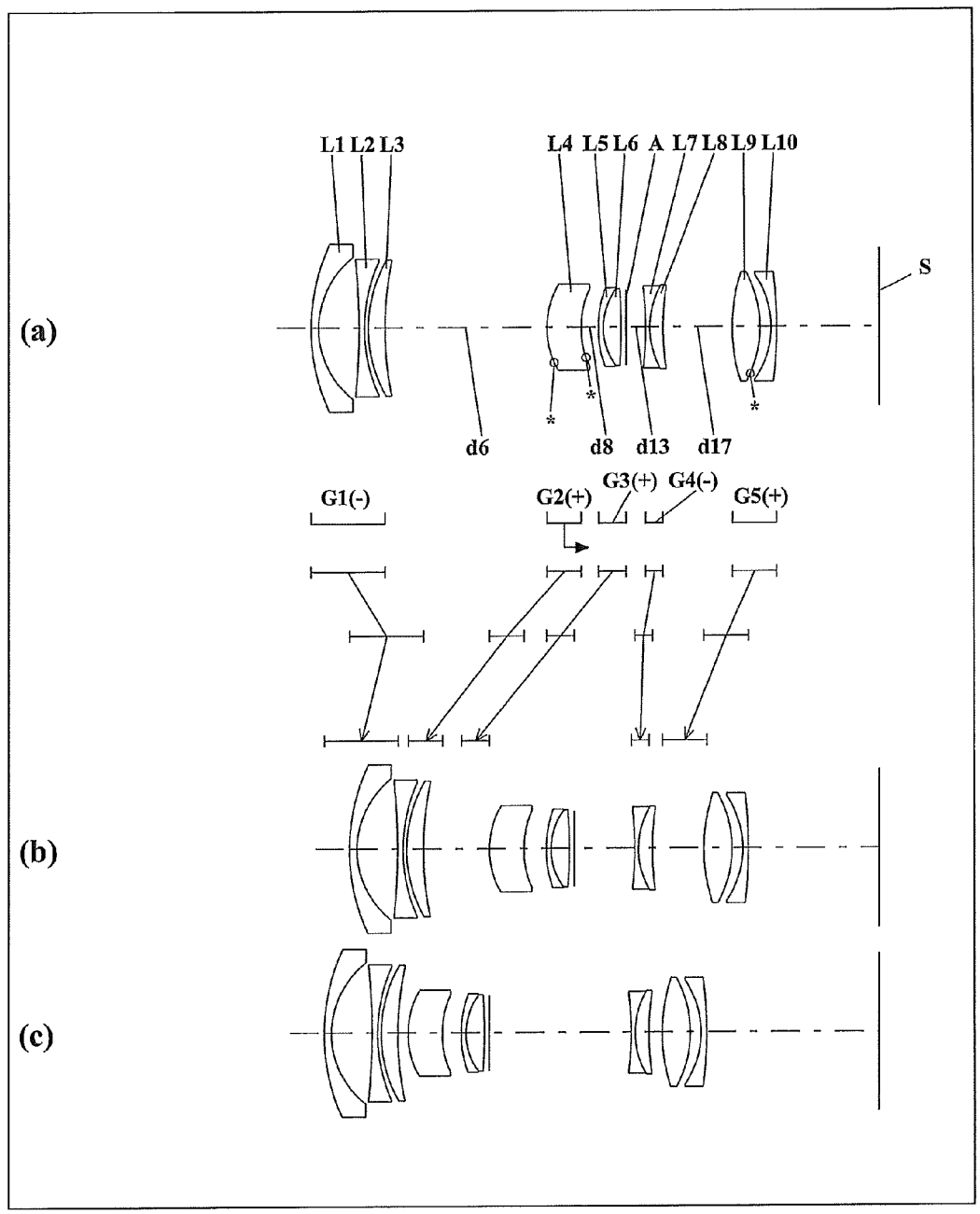
FIG. 87 is a lens arrangement diagram showing an infinity in-focus condition of a zoom lens system according to Embodiment 24 (Example 24)
Figure 88:
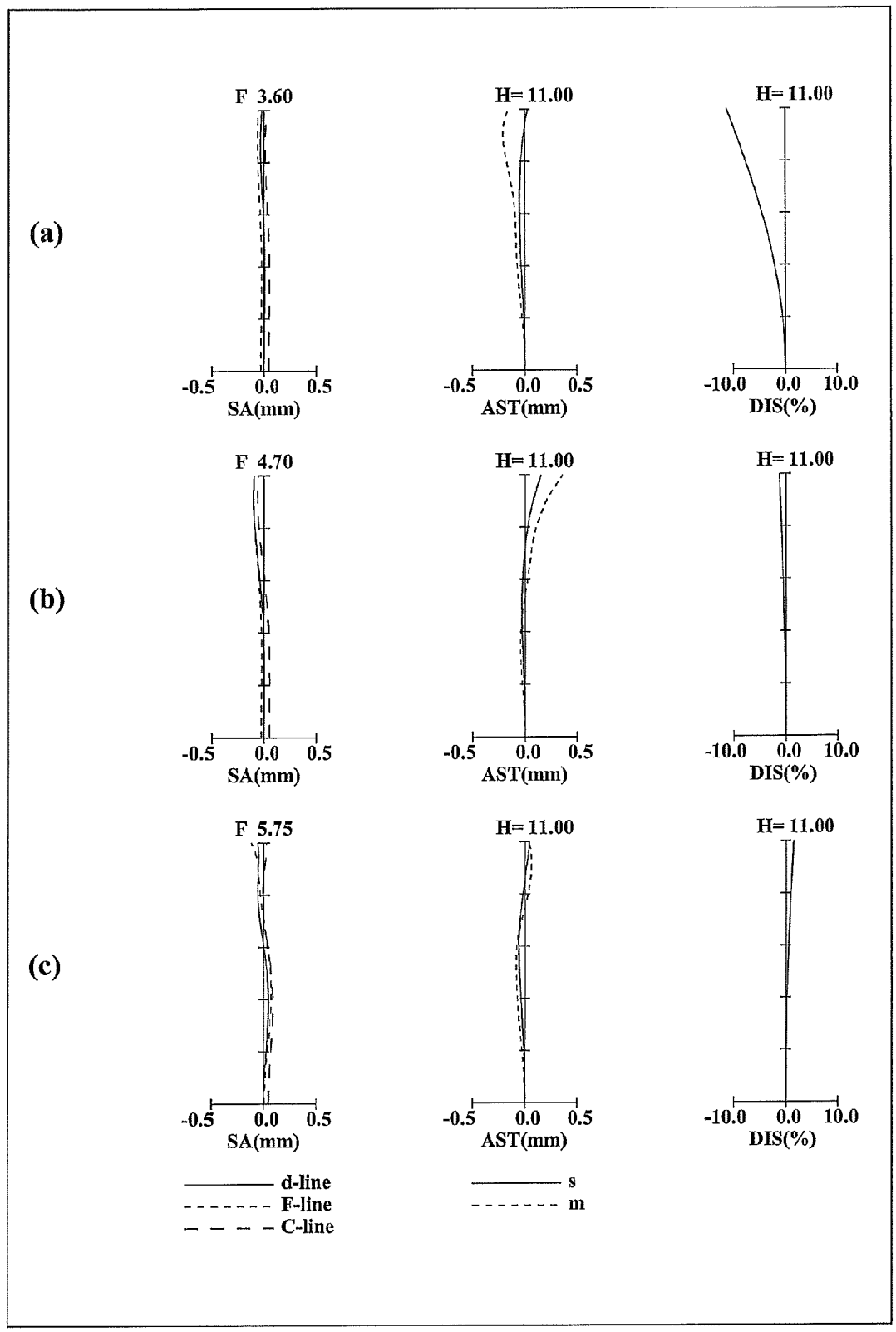
FIG. 88 is a longitudinal aberration diagram showing an infinity in-focus condition of a zoom lens system according to Example 24.
Figure 89:
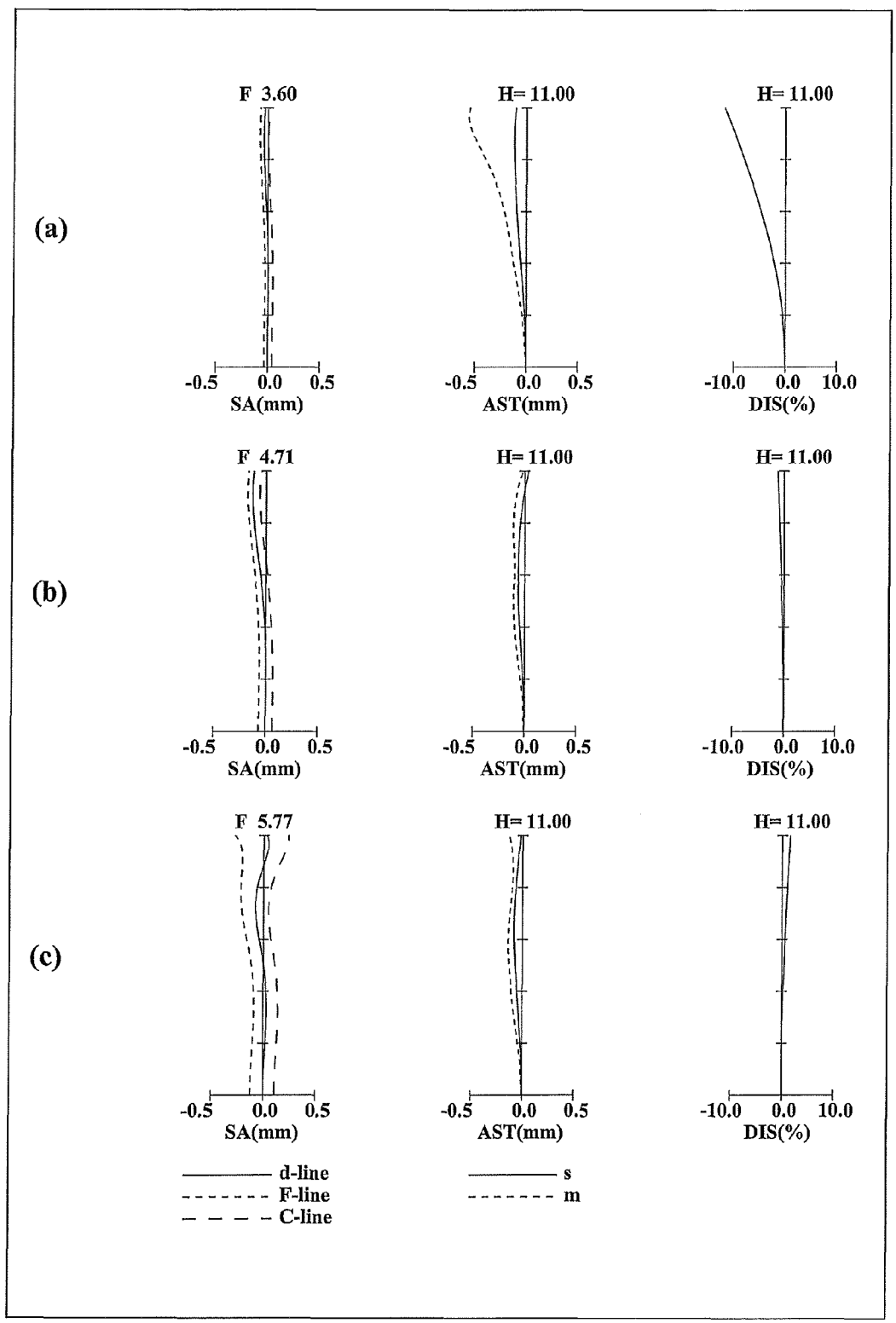
FIG. 89 is a longitudinal aberration diagram showing a close-point in-focus condition of a zoom lens system according to Example 24.
Figure 90:
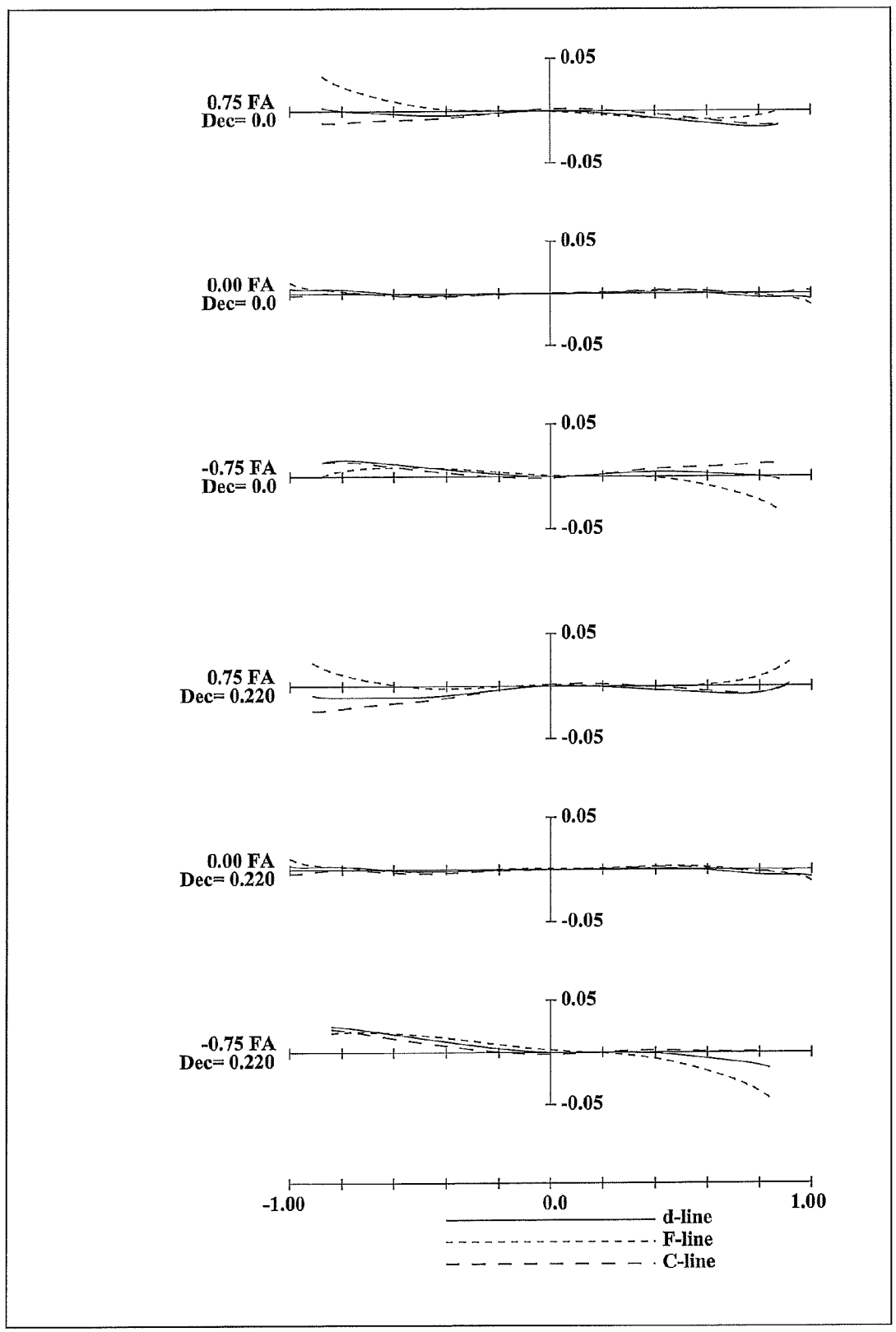
FIG. 90 is a lateral aberration diagram in a basic state where image blur compensation is not performed and in an image blur compensation state at a telephoto limit of a zoom lens system according to Example 24.

The zoom lens system of Numerical Example 24 corresponds to Embodiment 24 shown in FIG. 87. Table 94 shows the surface data of the zoom lens system of Numerical Example 24. Table 95 shows the aspherical data. Table 96 shows various data. Table 97 shows the zoom lens unit data.

TABLE 94

(surface data)

| Surface number | r | d | nd | vd |
|---|---|---|---|---|
| Object surface | ∞ | | | |
| 1 | 29.17200 | 1.10000 | 1.84337 | 40.7 |
| 2 | 13.13380 | 5.95770 | | |
| 3 | −98.49340 | 0.80000 | 1.80420 | 46.5 |
| 4 | 23.81290 | 0.54330 | | |
| 5 | 19.94600 | 2.47260 | 1.94595 | 18.0 |
| 6 | 48.05080 | Variable | | |
| 7* | 13.26890 | 5.00000 | 1.78964 | 41.9 |
| 8* | 16.13090 | Variable | | |
| 9 | 16.66390 | 0.70000 | 1.93637 | 19.8 |
| 10 | 9.49050 | 0.01000 | 1.56732 | 42.8 |

TABLE 94-continued (surface data)

| Surface number | r | d | nd | vd |
|---|---|---|---|---|
| 11 | 9.49050 | 2.64730 | 1.72916 | 54.7 |
| 12 | −82.74180 | 0.71200 | | |
| 13 (Aperture) | ∞ | Variable | | |
| 14 | −52.61650 | 0.60000 | 1.80621 | 32.4 |
| 15 | 12.03220 | 0.01000 | 1.56732 | 42.8 |
| 16 | 12.03220 | 2.00040 | 1.84666 | 23.8 |
| 17 | 40.33600 | Variable | | |
| 18 | 25.99780 | 4.11770 | 1.70226 | 48.7 |
| 19* | −15.89150 | 1.60430 | | |
| 20 | −13.35780 | 0.80000 | 1.80420 | 46.5 |
| 21 | −69.46920 | BF | | |
| Image surface | ∞ | | | |

TABLE 95

(aspherical data)

| Surface No. | Parameters |
|---|---|
| 7 | K = 0.00000E+00, A4 = 5.27752E−05, A6 = 2.49201E−07, A8 = 2.40244E−09, A10 = 6.33394E−12 |
| 8 | K = 0.00000E+00, A4 = 1.49695E−04, A6 = 6.31479E−07, A8 = 2.46035E−08, A10 = −7.51934E−11 |
| 19 | K = 0.00000E+00, A4 = 2.04195E−05, A6 = 2.02892E−07, A8 = −5.02541E−09, A10 = 3.22068E−11 |

TABLE 96

(various data)

Zooming ratio  3.02724

| | Wide | Middle | Telephoto |
|---|---|---|---|
| Focal length | 14.3587 | 24.4033 | 43.4670 |
| F-number | 3.60081 | 4.70042 | 5.75085 |
| View angle | 40.8109 | 24.5445 | 14.0042 |
| Image height | 11.0000 | 11.0000 | 11.0000 |
| Overall length of lens system | 83.0691 | 77.3587 | 81.0693 |
| BF | 14.94397 | 19.13216 | 25.23902 |
| d6 | 23.5922 | 9.5594 | 1.5003 |
| d8 | 2.4600 | 3.2254 | 2.7250 |
| d13 | 2.8000 | 8.7329 | 20.5297 |
| d17 | 10.1976 | 7.6335 | 2.0000 |

TABLE 97

(zoom lens unit data)

| Unit | Initial surface No. | Focal length |
|---|---|---|
| 1 | 1 | −19.79642 |
| 2 | 7 | 53.48332 |
| 3 | 9 | 23.27615 |
| 4 | 14 | −30.01961 |
| 5 | 18 | 35.58929 |

Numerical Example 25

Figure 91:
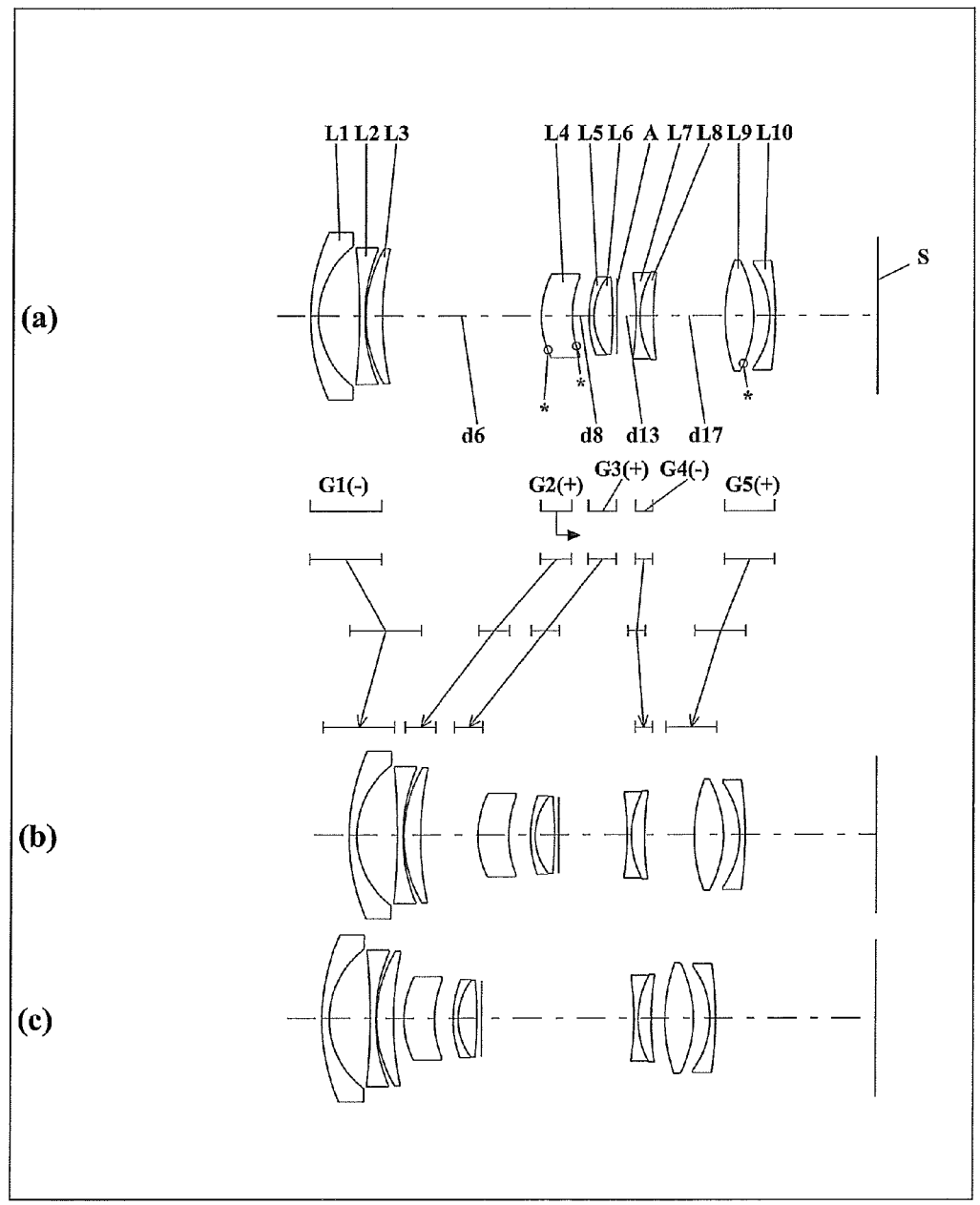
FIG. 91 is a lens arrangement diagram showing an infinity in-focus condition of a zoom lens system according to Embodiment 25 (Example 25)
Figure 92:
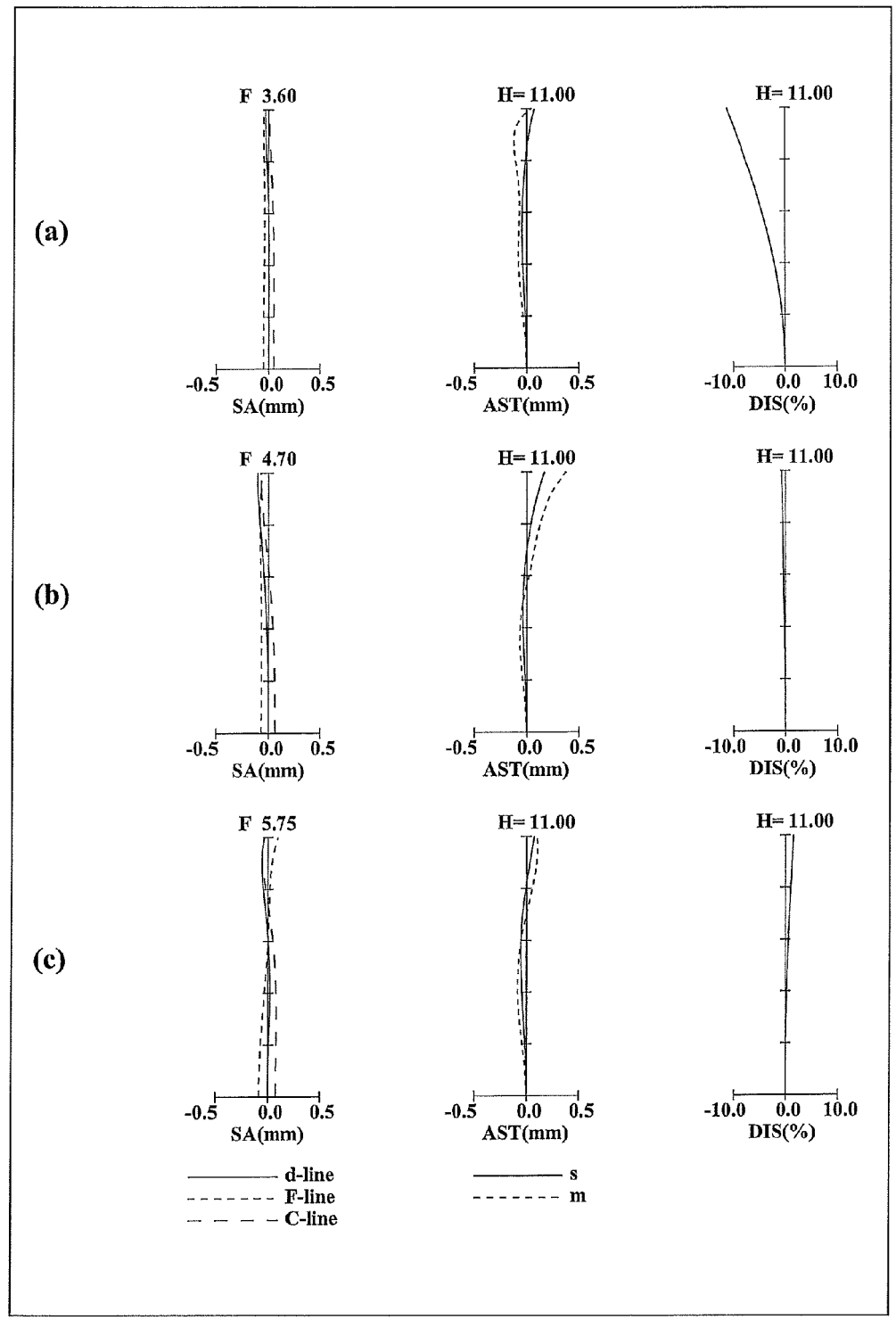
FIG. 92 is a longitudinal aberration diagram showing an infinity in-focus condition of a zoom lens system according to Example 25.
Figure 93:
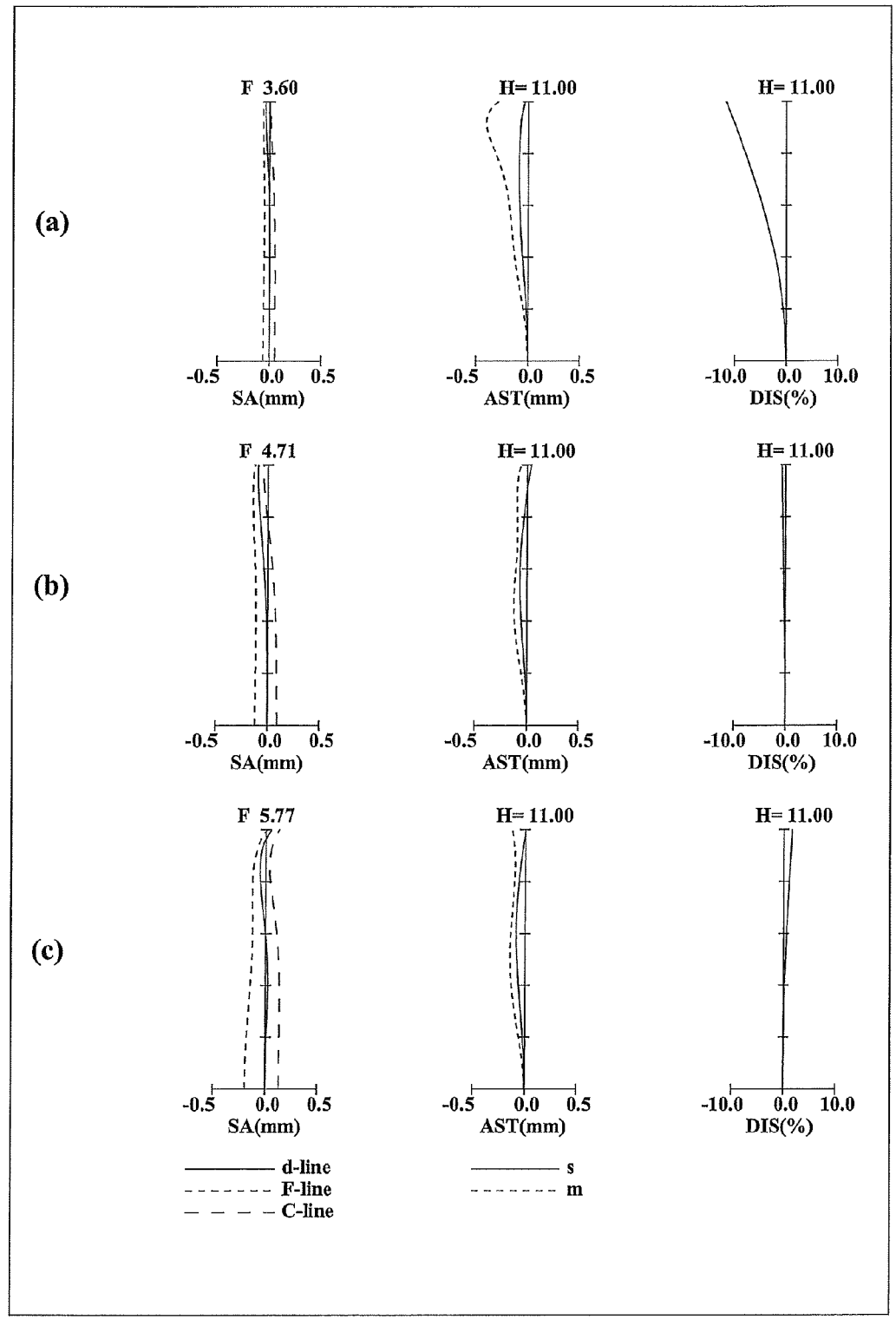
FIG. 93 is a longitudinal aberration diagram showing a close-point in-focus condition of a zoom lens system according to Example 25.
Figure 94:
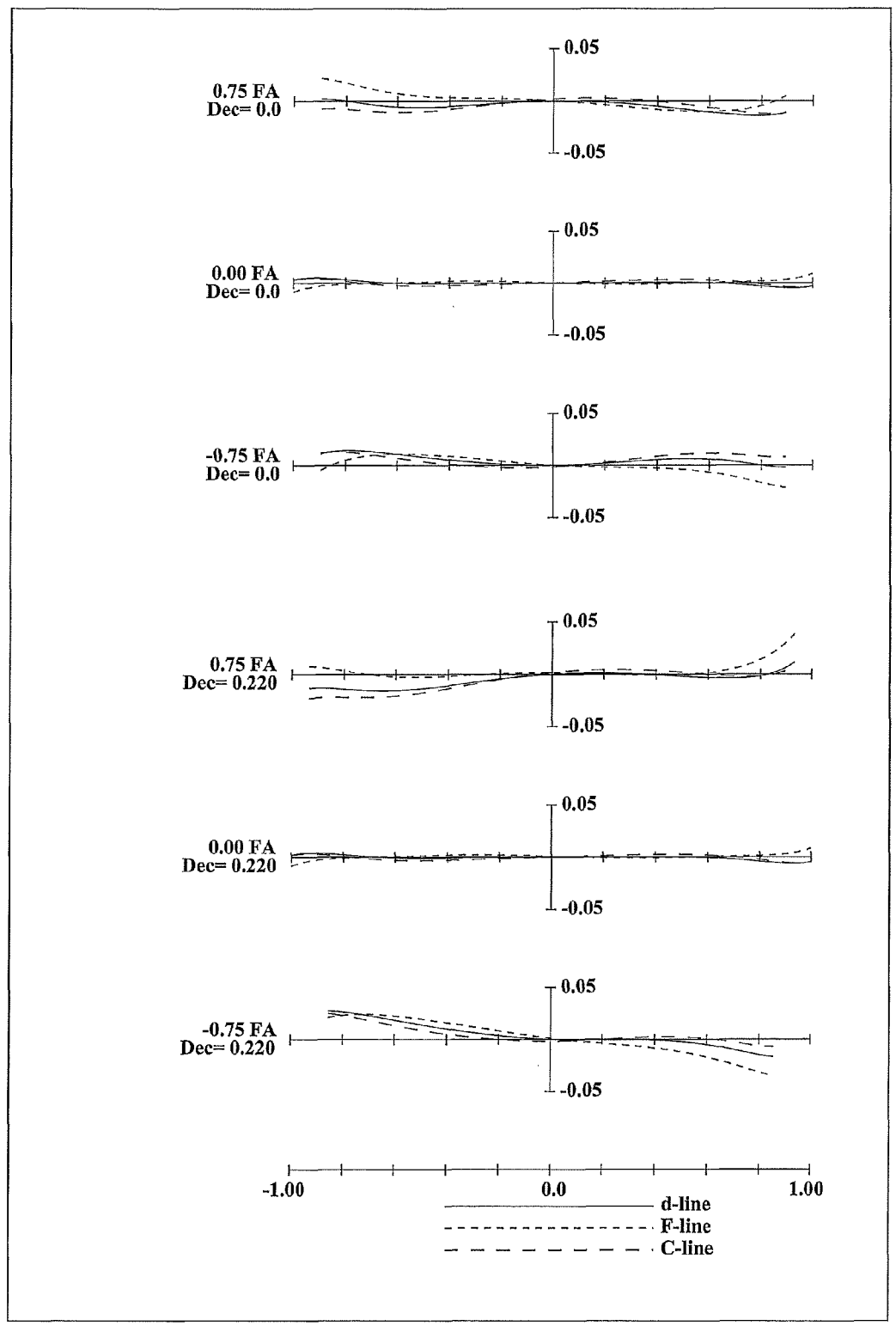
FIG. 94 is a lateral aberration diagram in a basic state where image blur compensation is not performed and in an image blur compensation state at a telephoto limit of a zoom lens system according to Example 25.

The zoom lens system of Numerical Example 25 corresponds to Embodiment 25 shown in FIG. 91. Table 98 shows the surface data of the zoom lens system of Numerical Example 25. Table 99 shows the aspherical data. Table 100 shows various data. Table 101 shows the zoom lens unit data.

TABLE 98

(surface data)

| Surface number | r | d | nd | vd |
|---|---|---|---|---|
| Object surface | ∞ | | | |
| 1 | 30.77580 | 1.10000 | 1.82072 | 44.3 |
| 2 | 12.97980 | 5.96670 | | |
| 3 | −98.16440 | 0.80000 | 1.80420 | 46.5 |
| 4 | 26.08570 | 0.15000 | | |
| 5 | 19.72170 | 2.44730 | 1.94595 | 18.0 |
| 6 | 45.82600 | Variable | | |
| 7* | 14.37680 | 4.50000 | 1.80500 | 40.9 |
| 8* | 16.92800 | Variable | | |
| 9 | 16.80370 | 0.70000 | 1.92817 | 21.8 |
| 10 | 9.25920 | 0.01000 | 1.56732 | 42.8 |
| 11 | 9.25920 | 2.74380 | 1.72918 | 54.7 |
| 12 | −65.97580 | 0.66190 | | |
| 13 (Aperture) | ∞ | Variable | | |
| 14 | −43.98730 | 0.60000 | 1.77203 | 33.3 |
| 15 | 13.58210 | 0.01000 | 1.56732 | 42.8 |
| 16 | 13.58210 | 1.94520 | 1.84666 | 23.8 |
| 17 | 42.64650 | Variable | | |
| 18 | 24.65560 | 4.22090 | 1.67212 | 53.5 |
| 19* | −16.83420 | 2.39620 | | |
| 20 | −12.92180 | 0.80000 | 1.75772 | 51.1 |
| 21 | −59.71170 | BF | | |
| Image surface | ∞ | | | |

TABLE 99

(aspherical data)

| Surface No. | Parameters |
|---|---|
| 7 | K = 0.00000E+00, A4 = 4.90501E−05, A6 = 1.81313E−07, A8 = 1.44948E−09, A10 = −4.67024E−12 |
| 8 | K = 0.00000E+00, A4 = 1.18002E−04, A6 = 5.03323E−07, A8 = 5.73806E−09, A10 = 3.80432E−11 |
| 19 | K = 0.00000E+00, A4 = 1.82411E−05, A6 = 2.50638E−07, A8 = −6.17574E−09, A10 = 3.94938E−11 |

TABLE 100

(various data)

Zooming ratio  3.00057

| | Wide | Middle | Telephoto |
|---|---|---|---|
| Focal length | 14.3706 | 25.6936 | 43.1199 |
| F-number | 3.60070 | 4.70060 | 5.75075 |
| View angle | 40.7813 | 23.3345 | 14.1019 |
| Image height | 11.0000 | 11.0000 | 11.0000 |
| Overall length of lens system | 83.0700 | 77.2163 | 81.0715 |
| BF | 14.96257 | 19.18737 | 23.42574 |
| d6 | 23.2602 | 8.4145 | 1.5391 |
| d8 | 2.4600 | 3.1905 | 2.7596 |
| d13 | 2.8000 | 10.0335 | 22.2951 |
| d17 | 10.5352 | 7.3384 | 2.0000 |

TABLE 101

(zoom lens unit data)

| Unit | Initial surface No. | Focal length |
|---|---|---|
| 1 | 1 | −20.04519 |
| 2 | 7 | 66.32630 |
| 3 | 9 | 22.52038 |
| 4 | 14 | −31.01148 |
| 5 | 18 | 34.91978 |

The following Tables 102 to 108 show values corresponding to the individual conditions in the zoom lens systems of the numerical examples.

TABLE 102

(values corresponding to individual conditions: Numerical Examples 1 to 4)

| Conditions | 1 | 2 | 3 | 4 |
|---|---|---|---|---|
| (1) $|f_F/f_W|$ | 1.99561 | 1.80526 | 1.62215 | 2.12143 |
| (2) $|f_F/f_T|$ | 0.65399 | 0.59120 | 0.53138 | 0.69917 |
| (3) $|f_F/f_{NW}|$ | 3.17346 | 2.83286 | 2.58857 | 2.96526 |
| (4) $\beta_{NT}/\beta_{NW}$ | 1.53665 | 1.55566 | 1.55763 | 1.59346 |
| (5) $D_F/\Sigma D$ | 0.01783 | 0.01817 | 0.01804 | 0.01471 |
| (6) $|f_1/f_{NW}|$ | 6.42549 | 6.49814 | 6.50453 | 7.05410 |
| (7) $D_{FWA}/f_W$ | 1.16728 | 1.07160 | 1.02080 | 1.30093 |
| (8) $(D_F/f_W) * (f_T/f_W)$ | 0.16943 | 0.16964 | 0.16954 | 0.14749 |
| (9) $|D_F/f_F|$ | 0.02782 | 0.03077 | 0.03424 | 0.02291 |
| (10) $|f_1/f_2|$ | 2.80116 | 2.69553 | 2.40477 | 2.97976 |
| (11) $|f_2/f_F|$ | 0.72283 | 0.85098 | 1.04492 | 0.79836 |
| (12) $|f_1/f_F|$ | 2.02475 | 2.29385 | 2.51279 | 2.37892 |
| (13) $(r_{EF} - r_{IF})/(r_{EF} + r_{IF})$ | 0.74995 | 0.76119 | 0.87123 | 0.67739 |
| (14) $D_{FWA}/f_W$ | — | — | — | — |
| (15) $(D_F/f_W) * (f_T/f_W)$ | — | — | — | — |
| (16) $|D_F/f_F|$ | — | — | — | — |
| (17) $|f_1/f_2|$ | — | — | — | — |
| (18) $|f_2/f_F|$ | — | — | — | — |
| (19) $|f_1/f_F|$ | — | — | — | — |

TABLE 103

(values corresponding to individual conditions: Numerical Examples 5 to 8)

| Conditions | 5 | 6 | 7 | 8 |
|---|---|---|---|---|
| (1) $|f_F/f_W|$ | 2.57629 | 2.44906 | 1.71365 | 2.07425 |
| (2) $|f_F/f_T|$ | 0.85455 | 0.80886 | 0.17114 | 0.24934 |
| (3) $|f_F/f_{NW}|$ | 3.44090 | 3.23073 | 2.09418 | 2.23928 |
| (4) $\beta_{NT}/\beta_{NW}$ | 1.57193 | 1.61106 | 3.66975 | 3.07933 |
| (5) $D_F/\Sigma D$ | 0.01517 | 0.01512 | 0.05065 | 0.01502 |
| (6) $|f_1/f_{NW}|$ | 6.76675 | 6.72672 | 8.09168 | 6.39482 |
| (7) $D_{FWA}/f_W$ | 1.37189 | 1.41285 | 1.38873 | 1.69286 |
| (8) $(D_F/f_W) * (f_T/f_W)$ | 0.14654 | 0.14698 | 1.79075 | 0.40161 |
| (9) $|D_F/f_F|$ | 0.01887 | 0.01982 | 0.10436 | 0.02327 |
| (10) $|f_1/f_2|$ | 3.29975 | 2.83522 | 2.51892 | 2.17540 |
| (11) $|f_2/f_F|$ | 0.59597 | 0.73437 | 1.53394 | 1.31274 |
| (12) $|f_1/f_F|$ | 1.96656 | 2.08211 | 3.86388 | 2.85575 |
| (13) $(r_{EF} - r_{IF})/(r_{EF} + r_{IF})$ | 0.67956 | 1.59766 | 1.91150 | 0.94533 |
| (14) $D_{FWA}/f_W$ | — | — | — | — |
| (15) $(D_F/f_W) * (f_T/f_W)$ | — | — | — | — |
| (16) $|D_F/f_F|$ | — | — | — | — |
| (17) $|f_1/f_2|$ | — | — | — | — |
| (18) $|f_2/f_F|$ | — | — | — | — |
| (19) $|f_1/f_F|$ | — | — | — | — |

TABLE 104

(values corresponding to individual conditions: Numerical Examples 9 to 11)

| Conditions | 9 | 10 | 11 |
|---|---|---|---|
| (1) $|f_F/f_W|$ | 2.08223 | 2.04249 | 2.62029 |
| (2) $|f_F/f_T|$ | 0.68191 | 0.66888 | 0.85810 |
| (3) $|f_F/f_{NW}|$ | 2.94598 | 2.95261 | 3.15057 |
| (4) $\beta_{NT}/\beta_{NW}$ | 1.66984 | 1.63688 | 1.48882 |
| (5) $D_F/\Sigma D$ | 0.02276 | 0.02041 | 0.01928 |
| (6) $|f_1/f_{NW}|$ | 7.40813 | 6.61920 | 6.95749 |
| (7) $D_{FWA}/f_W$ | 0.75789 | 0.82454 | 0.98223 |
| (8) $(D_F/f_W) * (f_T/f_W)$ | 0.16964 | 0.16964 | 0.16963 |
| (9) $|D_F/f_F|$ | 0.02668 | 0.02720 | 0.02120 |
| (10) $|f_1/f_2|$ | 3.66489 | 2.92961 | 3.44397 |
| (11) $|f_2/f_F|$ | 0.68615 | 0.76523 | 0.64122 |
| (12) $|f_1/f_F|$ | 2.51466 | 2.24181 | 2.20833 |
| (13) $(r_{EF} - r_{IF})/(r_{EF} + r_{IF})$ | 0.81250 | 0.73475 | 0.56233 |
| (14) $D_{FWA}/f_W$ | — | — | — |
| (15) $(D_F/f_W) * (f_T/f_W)$ | — | — | — |
| (16) $|D_F/f_F|$ | — | — | — |
| (17) $|f_1/f_2|$ | — | — | — |
| (18) $|f_2/f_F|$ | — | — | — |
| (19) $|f_1/f_F|$ | — | — | — |

TABLE 105

(values corresponding to individual conditions: Numerical Examples 12 to 15)

| Conditions | 12 | 13 | 14 | 15 |
|---|---|---|---|---|
| (1) $|f_F/f_W|$ | 1.88798 | 1.66143 | 1.81774 | 2.00011 |
| (2) $|f_F/f_T|$ | 0.39539 | 0.35396 | 0.38602 | 0.42614 |
| (3) $|f_F/f_{NW}|$ | 2.87284 | 2.03660 | 2.29831 | 2.52957 |
| (4) $\beta_{NT}/\beta_{NW}$ | 1.89887 | 1.93201 | 1.98256 | 1.90850 |
| (5) $D_F/\Sigma D$ | 0.07906 | 0.04868 | 0.04368 | 0.04252 |
| (6) $|f_1/f_{NW}|$ | 6.94116 | 6.92872 | 6.70152 | 7.05231 |
| (7) $D_{FWA}/f_W$ | — | — | — | — |
| (8) $(D_F/f_W) * (f_T/f_W)$ | — | — | — | — |
| (9) $|D_F/f_F|$ | — | — | — | — |
| (10) $|f_1/f_2|$ | — | — | — | — |
| (11) $|f_2/f_F|$ | — | — | — | — |
| (12) $|f_1/f_F|$ | — | — | — | — |
| (13) $(r_{EF} - r_{IF})/(r_{EF} + r_{IF})$ | — | — | — | — |
| (14) $D_{FWA}/f_W$ | 0.16784 | 0.25970 | 0.24129 | 0.20781 |
| (15) $(D_F/f_W) * (f_T/f_W)$ | 1.21716 | 0.73102 | 0.72949 | 0.61902 |
| (16) $|D_F/f_F|$ | 0.13501 | 0.09374 | 0.08522 | 0.06594 |
| (17) $|f_1/f_2|$ | 6.94116 | 6.92872 | 6.70152 | 7.05231 |
| (18) $|f_2/f_F|$ | 0.34809 | 0.49102 | 0.43510 | 0.39532 |
| (19) $|f_1/f_F|$ | 2.41614 | 3.40211 | 2.91585 | 2.78795 |

TABLE 106

(values corresponding to individual conditions: Numerical Examples 16 to 19)

| Conditions | 16 | 17 | 18 | 19 |
|---|---|---|---|---|
| (1) $|f_F/f_W|$ | 2.17154 | 2.18393 | 2.22792 | 2.20506 |
| (2) $|f_F/f_T|$ | 0.46265 | 0.46418 | 0.46653 | 0.47143 |
| (3) $|f_F/f_{NW}|$ | 1.45339 | 2.55005 | 2.46164 | 3.19642 |
| (4) $\beta_{NT}/\beta_{NW}$ | 2.00911 | 1.89400 | 1.92207 | 2.08539 |
| (5) $D_F/\Sigma D$ | 0.04073 | 0.03757 | 0.04376 | 0.03163 |
| (6) $|f_1/f_{NW}|$ | 3.49113 | 7.43351 | 6.86494 | 7.12476 |
| (7) $D_{FWA}/f_W$ | — | — | — | — |
| (8) $(D_F/f_W) * (f_T/f_W)$ | — | — | — | — |

TABLE 106-continued (values corresponding to individual conditions: Numerical Examples 16 to 19)

| Conditions | Numerical Example | | | |
|---|---|---|---|---|
| | 16 | 17 | 18 | 19 |
| (9) $|D_F/f_F|$ | — | — | — | — |
| (10) $|f_1/f_2|$ | — | — | — | — |
| (11) $|f_2/f_F|$ | — | — | — | — |
| (12) $|f_1/f_F|$ | — | — | — | — |
| (13) $(r_{EF} - r_{IF})/(r_{EF} + r_{IF})$ | — | — | — | — |
| (14) $D_{FWA}/f_W$ | 0.19999 | 0.18305 | 0.19487 | 0.19553 |
| (15) $(D_F/f_W) * (f_T/f_W)$ | 0.59819 | 0.59289 | 0.61434 | 0.56582 |
| (16) $|D_F/f_F|$ | 0.05869 | 0.05770 | 0.05774 | 0.05486 |
| (17) $|f_1/f_2|$ | 3.49113 | 7.43351 | 6.86494 | 7.12476 |
| (18) $|f_2/f_F|$ | 0.68805 | 0.39215 | 0.40623 | 0.31285 |
| (19) $|f_1/f_F|$ | 2.40206 | 2.91505 | 2.78876 | 2.22898 |

TABLE 107

(values corresponding to individual conditions: Numerical Examples 20 to 22)

| Conditions | Numerical Example | | |
|---|---|---|---|
| | 20 | 21 | 22 |
| (1) $|f_F/f_W|$ | 2.21046 | 2.96793 | 2.09137 |
| (2) $|f_F/f_T|$ | 0.47258 | 0.63452 | 0.44449 |
| (3) $|f_F/f_{NW}|$ | 3.19118 | 4.01763 | 2.44886 |
| (4) $\beta_{NT}/\beta_{NW}$ | 2.08253 | 2.15197 | 1.91320 |
| (5) $D_F/\Sigma D$ | 0.03172 | 0.03342 | 0.04151 |
| (6) $|f_1/f_{NW}|$ | 7.10904 | 6.86587 | 6.56965 |
| (7) $D_{FWA}/f_W$ | — | — | — |
| (8) $(D_F/f_W) * (f_T/f_W)$ | — | — | — |
| (9) $|D_F/f_F|$ | — | — | — |
| (10) $|f_1/f_2|$ | — | — | — |
| (11) $|f_2/f_F|$ | — | — | — |
| (12) $|f_1/f_F|$ | — | — | — |
| (13) $(r_{EF} - r_{IF})/(r_{EF} + r_{IF})$ | — | — | — |
| (14) $D_{FWA}/f_W$ | 0.19365 | 0.20077 | 0.18906 |
| (15) $(D_F/f_W) * (f_T/f_W)$ | 0.56582 | 0.56582 | 0.60664 |
| (16) $|D_F/f_F|$ | 0.05473 | 0.04076 | 0.06165 |
| (17) $|f_1/f_2|$ | 7.10904 | 6.86587 | 6.56965 |
| (18) $|f_2/f_F|$ | 0.31336 | 0.24890 | 0.40835 |
| (19) $|f_1/f_F|$ | 2.22772 | 1.70893 | 2.68274 |

TABLE 108

(values corresponding to individual conditions: Numerical Examples 22 to 25)

| Conditions | Numerical Example | | |
|---|---|---|---|
| | 23 | 24 | 25 |
| (1) $|f_F/f_W|$ | 3.79373 | 3.72479 | 4.61542 |
| (2) $|f_F/f_T|$ | 1.23461 | 1.23043 | 1.53820 |
| (3) $|f_F/f_{NW}|$ | 2.21782 | 2.70166 | 3.30883 |
| (4) $\beta_{NT}/\beta_{NW}$ | — | — | — |
| (5) $D_F/\Sigma D$ | — | — | — |
| (6) $|f_1/f_{NW}|$ | — | — | — |
| (7) $D_{FWA}/f_W$ | — | — | — |
| (8) $(D_F/f_W) * (f_T/f_W)$ | — | — | — |
| (9) $|D_F/f_F|$ | — | — | — |
| (10) $|f_1/f_2|$ | — | — | — |
| (11) $|f_2/f_F|$ | — | — | — |
| (12) $|f_1/f_F|$ | — | — | — |
| (13) $(r_{EF} - r_{IF})/(r_{EF} + r_{IF})$ | — | — | — |
| (14) $D_{FWA}/f_W$ | — | — | — |
| (15) $(D_F/f_W) * (f_T/f_W)$ | — | — | — |
| (16) $|D_F/f_F|$ | — | — | — |
| (17) $|f_1/f_2|$ | — | — | — |
| (18) $|f_2/f_F|$ | — | — | — |
| (19) $|f_1/f_F|$ | — | — | — |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for an imaging device in a digital still camera, a digital video camera or the like that requires high image quality.

Details of the present invention have been described above. However, the above-mentioned description is completely illustrative from every point of view, and does not limit the scope of the present invention. Obviously, various improvements and modifications can be performed without departing from the scope of the present invention.

What is claimed is:

1. A zoom lens system comprising a plurality of lens units and an aperture diaphragm arranged in the lens units, wherein the plurality of lens units include:
   a negative lens unit that is arranged on an object side relative to the aperture diaphragm and provided with negative optical power having an absolute value greatest in the entire system and that moves in a direction along an optical axis at the time of zooming; and
   a focusing lens unit that is arranged in an optical path between the negative lens unit and the aperture diaphragm and that moves in a direction along the optical axis at the time of focusing such that an interval relative to the negative lens unit should vary.

2. The zoom lens system as claimed in claim 1, wherein the interval between the negative lens unit and the focusing lens units varies at the time of zooming.

3. The zoom lens system as claimed in claim 1, satisfying the following condition:

$$1.2 < |f_F/f_W| < 6.0 \quad (1)$$

(here, $f_T/f_W > 3.0$)

where, $f_F$ is a focal length of the focusing lens unit, $f_T$ is a focal length of the entire system at a telephoto limit, and $f_W$ is focal length of the entire system at a wide-angle limit.

4. The zoom lens system as claimed in claim 1, satisfying the following condition:

$$0.10 < |f_F/f_T| < 1.8 \quad (2)$$

(here, $f_T/f_W > 3.0$)

where, $f_F$ is a focal length of the focusing lens unit, $f_T$ is a focal length of the entire system at a telephoto limit, and $f_W$ is focal length of the entire system at a wide-angle limit.

5. The zoom lens system as claimed in claim 1, satisfying the following condition:

$$1.00 < |f_F/f_{NW}| < 5.00 \quad (3)$$

(here, $f_T/f_W > 3.0$)

where, $f_F$ is a focal length of the focusing lens unit, $f_{NW}$ is a composite focal length of the focusing lens unit and the negative lens unit in an infinity in-focus condition at a wide-angle limit when the focusing lens unit has negative optical power, or the focal length of the negative lens unit when the focusing lens unit has positive optical power, $f_T$ is a focal length of the entire system at a telephoto limit, and $f_W$ is focal length of the entire system at a wide-angle limit.

6. The zoom lens system as claimed in claim 1, wherein the negative lens unit is arranged on the image side relative to the lens unit having positive optical power with the interval in between that varies at the time of zooming, and wherein the following condition is satisfied:

$$1.20 < \beta_{NT}/\beta_{NW} < 4.50 \quad (4)$$

(here, $f_T/f_W > 3.0$)

where, $\beta_{NT}$ is a composite focal length of the focusing lens unit and the negative lens unit in an infinity in-focus condition at a telephoto limit when the focusing lens unit has negative optical power, or a lateral magnification of the negative lens unit at a telephoto limit in an infinity in-focus condition when the focusing lens unit has positive optical power, $\beta_{NW}$ is a composite focal length of the focusing lens unit and the negative lens unit in an infinity in-focus condition at a wide-angle limit when the focusing lens unit has negative optical power, or a lateral magnification of the negative lens unit at a wide-angle limit in an infinity in-focus condition when the focusing lens unit has positive optical power, $f_T$ is a focal length of the entire system at a telephoto limit, and $f_W$ is focal length of the entire system at a wide-angle limit.

7. The zoom lens system as claimed in claim 1, wherein the negative lens unit is arranged on the image side relative to the lens unit having positive optical power with the interval in between that varies at the time of zooming, and wherein the following condition is satisfied:

$$0.01 < D_F/\Sigma D < 0.10 \quad (5)$$

where, $D_F$ is an axial thickness of the focusing lens unit, and $\Sigma D$ is a total of axial thicknesses of the lens elements in the entire system.

8. An interchangeable lens apparatus comprising:
a zoom lens system including a plurality of lens units and an aperture diaphragm arranged in the lens units; and
a camera mount section connected to a camera body provided with an image sensor for receiving an optical image formed by the zoom lens system and then converting the optical image into an electric image signal, wherein
the plurality of lens units include:
a negative lens unit that is arranged on an object side relative to the aperture diaphragm and provided with negative optical power having an absolute value greatest in the entire system and that moves in a direction along an optical axis at the time of zooming; and
a focusing lens unit that is arranged in an optical path between the negative lens unit and the aperture diaphragm and that moves in a direction along the optical axis at the time of focusing such that an interval relative to the negative lens unit should vary.

9. A camera system comprising:
an interchangeable lens apparatus that includes a zoom lens system including a plurality of lens units and an aperture diaphragm arranged in the lens units; and
a camera body that is connected to the interchangeable lens apparatus via a camera mount section in an attachable and detachable manner and that includes an image sensor for receiving an optical image formed by the zoom lens system and then converting the optical image into an electric image signal, wherein
the plurality of lens units include:
a negative lens unit that is arranged on an object side relative to the aperture diaphragm and provided with negative optical power having an absolute value greatest in the entire system and that moves in a direction along an optical axis at the time of zooming; and
a focusing lens unit that is arranged in an optical path between the negative lens unit and the aperture diaphragm and that moves in a direction along the optical axis at the time of focusing such that an interval relative to the negative lens unit should vary.

* * * * *